US012465686B2

(12) United States Patent
Rosinko et al.

(10) Patent No.: US 12,465,686 B2
(45) Date of Patent: Nov. 11, 2025

(54) EMERGENCY MEDICAMENT DOSE CONTROL

(71) Applicant: Beta Bionics, Inc., Concord, MA (US)

(72) Inventors: Michael J. Rosinko, Las Vegas, NV (US); Firas H. El-Khatib, Allston, MA (US); Edward R. Damiano, Acton, MA (US); David Chi-Wai Lim, Irvine, CA (US); Edward B. Raskin, Irvine, CA (US)

(73) Assignee: Beta Bionics, Inc., Concord, MA (US)

( * ) Notice: Subject to any disclaimer, the term of this patent is extended or adjusted under 35 U.S.C. 154(b) by 461 days.

(21) Appl. No.: 17/882,469

(22) Filed: Aug. 5, 2022

(65) Prior Publication Data

US 2023/0166035 A1 Jun. 1, 2023

Related U.S. Application Data

(63) Continuation of application No. PCT/US2022/071308, filed on Mar. 24, 2022, which
(Continued)

(51) Int. Cl.
*A61M 5/172* (2006.01)
*A61B 5/145* (2006.01)
*G16H 20/17* (2018.01)

(52) U.S. Cl.
CPC ....... *A61M 5/1723* (2013.01); *A61B 5/14532* (2013.01); *G16H 20/17* (2018.01)

(58) Field of Classification Search
None
See application file for complete search history.

(56) References Cited

U.S. PATENT DOCUMENTS

| | | |
|---|---|---|
| 4,280,494 A | 7/1981 | Cosgrove, Jr. et al. |
| 4,464,170 A | 8/1984 | Clemens et al. |

(Continued)

FOREIGN PATENT DOCUMENTS

| | | |
|---|---|---|
| CN | 1489741 A | 4/2004 |
| CN | 1973768 A | 6/2007 |

(Continued)

OTHER PUBLICATIONS

European Application No. 21911945.0, Extended European Search Report mailed Oct. 21, 2024, 15 pages.
(Continued)

*Primary Examiner* — Manuel A Mendez
(74) *Attorney, Agent, or Firm* — Patnstr®, APC

(57) ABSTRACT

Automated glucose level control system that provide therapy to a subject, such as glucose control, are disclosed. The system generates dose control signals using control algorithms configured to autonomously determine doses of insulin to be infused into a subject. When the system determines that an initial dose control signal does not indicate health-appropriate therapy, the system can modify a manual therapy instruction and transmit an emergency dose control signal to the medicament pump. Disclosed systems and devices can track insulin therapy administered to the subject over a tracking period, including storing an indication of the autonomously determined doses of insulin delivered to the subject. The system can generate a backup therapy protocol with insulin therapy instructions based at least in part on the insulin therapy administered to the subject over the tracking period.

15 Claims, 62 Drawing Sheets

Related U.S. Application Data is a continuation-in-part of application No. PCT/US2022/017368, filed on Feb. 22, 2022, and application No. PCT/US2022/012795, Jan. 18, 2022, which is a continuation-in-part of application No. PCT/US2021/064228, filed on Dec. 17, 2021, and a continuation-in-part of application No. PCT/US2021/072742, filed on Dec. 3, 2021, and a continuation-in-part of application No. 17/212,984, filed on Mar. 25, 2021, now Pat. No. 11,957,876.

(60) Provisional application No. 63/321,514, filed on Mar. 18, 2022, provisional application No. 63/320,591, filed on Mar. 16, 2022, provisional application No. 63/320,587, filed on Mar. 16, 2022, provisional application No. 63/295,361, filed on Dec. 30, 2021, provisional application No. 63/264,645, filed on Nov. 29, 2021, provisional application No. 63/263,602, filed on Nov. 5, 2021, provisional application No. 63/276,481, filed on Nov. 5, 2021, provisional application No. 63/249,975, filed on Sep. 29, 2021, provisional application No. 63/261,290, filed on Sep. 16, 2021, provisional application No. 63/239,365, filed on Aug. 31, 2021, provisional application No. 63/238,670, filed on Aug. 30, 2021, provisional application No. 63/216,177, filed on Jun. 29, 2021, provisional application No. 63/215,857, filed on Jun. 28, 2021, provisional application No. 63/212,521, filed on Jun. 18, 2021, provisional application No. 63/194,126, filed on May 27, 2021, provisional application No. 63/183,900, filed on May 4, 2021, provisional application No. 63/169,112, filed on Mar. 31, 2021, provisional application No. 63/168,203, filed on Mar. 30, 2021, provisional application No. 63/167,563, filed on Mar. 29, 2021.

(56) References Cited

U.S. PATENT DOCUMENTS

| | | | |
|---|---|---|---|
| 4,585,439 | A | 4/1986 | Michel |
| 5,338,157 | A | 8/1994 | Blomquist |
| 5,665,065 | A | 9/1997 | Colman et al. |
| 5,876,370 | A | 3/1999 | Blomquist |
| 6,164,921 | A | 12/2000 | Moubayed et al. |
| 6,544,212 | B2 | 4/2003 | Galley et al. |
| 6,554,798 | B1 | 4/2003 | Mann et al. |
| 6,572,542 | B1 | 6/2003 | Houben et al. |
| 6,572,545 | B2 | 6/2003 | Knobbe et al. |
| 6,575,905 | B2 | 6/2003 | Knobbe et al. |
| 6,650,951 | B1 | 11/2003 | Jones et al. |
| 6,744,350 | B2 | 6/2004 | Blomquist |
| 6,852,104 | B2 | 2/2005 | Blomquist |
| 6,923,763 | B1 | 8/2005 | Kovatchev et al. |
| D545,837 | S | 7/2007 | Haldimann et al. |
| 7,347,836 | B2 | 3/2008 | Peterson et al. |
| 7,491,187 | B2 | 2/2009 | Berghe et al. |
| D592,223 | S | 5/2009 | Neuhaus |
| 7,651,845 | B2 | 1/2010 | Doyle, III et al. |
| 7,655,618 | B2 | 2/2010 | Green et al. |
| 7,678,762 | B2 | 3/2010 | Green et al. |
| 7,678,763 | B2 | 3/2010 | Green et al. |
| 7,683,027 | B2 | 3/2010 | Green et al. |
| 7,717,903 | B2 | 5/2010 | Estes et al. |
| 7,766,829 | B2 | 8/2010 | Sloan et al. |
| 7,806,854 | B2 | 10/2010 | Damiano et al. |
| 7,850,641 | B2 | 12/2010 | Lebel et al. |
| 7,887,505 | B2 | 2/2011 | Flaherty |
| 8,010,174 | B2 | 8/2011 | Goode, Jr. et al. |
| 8,109,921 | B2 | 2/2012 | Estes et al. |
| 8,120,995 | B2 | 2/2012 | Liu |
| 8,192,394 | B2 | 6/2012 | Estes et al. |
| D665,163 | S | 8/2012 | Leifeld et al. |
| 8,273,052 | B2 | 9/2012 | Damiano et al. |
| 8,348,842 | B1 | 1/2013 | Osorio et al. |
| 8,377,031 | B2 | 2/2013 | Hayter et al. |
| 8,454,510 | B2 | 6/2013 | Yodfat et al. |
| 8,457,901 | B2 | 6/2013 | Beshan et al. |
| 8,478,557 | B2 | 7/2013 | Hayter et al. |
| 8,562,587 | B2 | 10/2013 | Kovatchev et al. |
| 8,622,988 | B2 | 1/2014 | Hayter |
| 8,679,016 | B2 | 3/2014 | Mastrototaro et al. |
| 8,690,820 | B2 | 4/2014 | Cinar et al. |
| 8,753,316 | B2 | 6/2014 | Blomquist |
| 8,823,528 | B2 | 9/2014 | Blomquist |
| 8,840,582 | B2 | 9/2014 | Blomquist et al. |
| D717,822 | S | 11/2014 | Brotman et al. |
| 8,936,573 | B2 | 1/2015 | Blomquist |
| 9,078,971 | B2 | 7/2015 | Scarpaci et al. |
| 9,114,210 | B2 | 8/2015 | Estes |
| 9,215,075 | B1 | 12/2015 | Poltorak |
| D747,731 | S | 1/2016 | Oliveira |
| 9,238,100 | B2 | 1/2016 | Kruse et al. |
| 9,242,043 | B2 | 1/2016 | Ludolph |
| 9,247,901 | B2 | 2/2016 | Kamath et al. |
| 9,283,323 | B2 | 3/2016 | Toumazou et al. |
| 9,317,657 | B2 | 4/2016 | Breton et al. |
| 9,335,910 | B2 | 5/2016 | Farnan et al. |
| 9,351,670 | B2 | 5/2016 | Dunn et al. |
| 9,398,869 | B2 | 7/2016 | Kovatchev et al. |
| 9,421,329 | B2 | 8/2016 | Kruse |
| 9,436,481 | B2 | 9/2016 | Drew |
| 9,445,757 | B2 | 9/2016 | Desborough et al. |
| 9,486,571 | B2 | 11/2016 | Rosinko |
| 9,486,578 | B2 | 11/2016 | Finan et al. |
| 9,503,526 | B2 | 11/2016 | Daoud et al. |
| 9,629,901 | B2 | 4/2017 | Estes |
| D792,907 | S | 7/2017 | Lim et al. |
| 9,715,327 | B2 | 7/2017 | Rosinko et al. |
| D794,068 | S | 8/2017 | Gyllensward et al. |
| 9,731,072 | B2 | 8/2017 | Estes |
| 9,750,438 | B2 | 9/2017 | Kovatchev et al. |
| 9,760,363 | B2 | 9/2017 | Dicks et al. |
| 9,801,997 | B2 | 10/2017 | Estes et al. |
| D801,986 | S | 11/2017 | Pirklbauer |
| 9,814,835 | B2 | 11/2017 | Kruse et al. |
| 9,833,570 | B2 | 12/2017 | El-Khatib et al. |
| 9,839,395 | B2 | 12/2017 | Shariati et al. |
| 9,844,627 | B2 | 12/2017 | Estes |
| 9,871,866 | B2 | 1/2018 | Borges et al. |
| D810,098 | S | 2/2018 | Lee et al. |
| D811,420 | S | 2/2018 | Gaur et al. |
| 9,888,337 | B1 | 2/2018 | Zalewski et al. |
| 9,895,491 | B2 | 2/2018 | Ludolph |
| 9,901,677 | B2 | 2/2018 | Estes |
| 9,907,909 | B2 | 3/2018 | Finan et al. |
| 9,940,441 | B2 | 4/2018 | Walsh |
| 9,959,746 | B2 | 5/2018 | Krishnamoorthy et al. |
| 9,980,140 | B1 | 5/2018 | Spencer et al. |
| 9,999,728 | B2 | 6/2018 | Parikh et al. |
| 10,010,273 | B2 | 7/2018 | Sloan et al. |
| 10,016,561 | B2 | 7/2018 | Saint et al. |
| 10,052,049 | B2 | 8/2018 | Blomquist et al. |
| 10,117,993 | B2 | 11/2018 | Estes et al. |
| D836,769 | S | 12/2018 | Kabel-Eckes et al. |
| D837,807 | S | 1/2019 | Baber et al. |
| D839,287 | S | 1/2019 | Hersh et al. |
| 10,188,793 | B2 | 1/2019 | Mazlish |
| 10,188,795 | B2 | 1/2019 | El-Khatib et al. |
| 10,213,547 | B2 | 2/2019 | Rosinko |
| 10,272,200 | B2 | 4/2019 | Shapley et al. |
| D849,039 | S | 5/2019 | Huh et al. |
| 10,341,866 | B1 | 7/2019 | Spencer et al. |
| 10,357,607 | B2 | 7/2019 | Blomquist et al. |
| D858,571 | S | 9/2019 | Jang et al. |
| 10,434,253 | B2 | 10/2019 | DiPerna et al. |
| 10,448,885 | B2 | 10/2019 | Schmid |
| 10,449,294 | B1 | 10/2019 | Estes |
| 10,463,786 | B2 | 11/2019 | Saint |
| 10,478,551 | B2 | 11/2019 | Rosinko |

(56) References Cited

U.S. PATENT DOCUMENTS

| | | |
|---|---|---|
| D868,809 S | 12/2019 | Cullum et al. |
| 10,541,987 B2 | 1/2020 | Gillespie |
| 10,543,313 B2 | 1/2020 | Damiano et al. |
| 10,561,789 B2 | 2/2020 | Mastrototaro et al. |
| 10,569,016 B2 | 2/2020 | Rosinko |
| 10,603,433 B2 | 3/2020 | Estes |
| D880,525 S | 4/2020 | Ive et al. |
| 10,653,834 B2 | 5/2020 | Kruse et al. |
| 10,772,556 B2 | 9/2020 | Ambrósio |
| 10,806,851 B2 | 10/2020 | Rosinko |
| 10,817,832 B1 | 10/2020 | Agrawal et al. |
| 10,842,934 B2 | 11/2020 | El-Khatib et al. |
| 10,864,322 B2 | 12/2020 | Saint et al. |
| 10,940,267 B2 | 3/2021 | Damiano et al. |
| 10,960,137 B2 | 3/2021 | Raskin et al. |
| D915,418 S | 4/2021 | Osborne et al. |
| 10,987,032 B2 | 4/2021 | Ambrósio |
| 11,045,602 B2 | 6/2021 | Patel et al. |
| 11,081,226 B2 | 8/2021 | Booth et al. |
| 11,103,638 B2 | 8/2021 | Rosinko et al. |
| 11,116,902 B2 | 9/2021 | El-Khatib et al. |
| 11,123,485 B2 | 9/2021 | Patel et al. |
| 11,123,486 B2 | 9/2021 | Rosinko et al. |
| 11,126,955 B1 | 9/2021 | Watson et al. |
| 11,129,938 B2 | 9/2021 | Rosinko et al. |
| 11,135,363 B2 | 10/2021 | Rosinko et al. |
| 11,135,364 B2 | 10/2021 | Rosinko et al. |
| 11,135,366 B2 | 10/2021 | Rosinko et al. |
| 11,154,656 B2 | 10/2021 | El-Khatib et al. |
| 11,238,133 B1 | 2/2022 | Brewer et al. |
| 11,260,174 B2 | 3/2022 | Patel et al. |
| 11,404,141 B2 | 8/2022 | Xie et al. |
| 2002/0032582 A1 | 3/2002 | Feeney et al. |
| 2003/0065308 A1 | 4/2003 | Lebel et al. |
| 2003/0095648 A1 | 5/2003 | Kaib et al. |
| 2003/0114836 A1 | 6/2003 | Estes et al. |
| 2003/0181852 A1 | 9/2003 | Mann et al. |
| 2004/0028707 A1 | 2/2004 | Pinkerton |
| 2004/0034295 A1 | 2/2004 | Salganicoff |
| 2004/0122353 A1 | 6/2004 | Shahmirian et al. |
| 2004/0147872 A1 | 7/2004 | Thompson |
| 2004/0176984 A1 | 9/2004 | White et al. |
| 2004/0253736 A1 | 12/2004 | Stout et al. |
| 2005/0065464 A1 | 3/2005 | Talbot et al. |
| 2005/0143864 A1 | 6/2005 | Blomquist |
| 2005/0182366 A1 | 8/2005 | Vogt et al. |
| 2005/0272640 A1 | 12/2005 | Doyle et al. |
| 2006/0173406 A1 | 8/2006 | Hayes et al. |
| 2006/0229557 A1 | 10/2006 | Fathallah et al. |
| 2006/0272652 A1 | 12/2006 | Stocker et al. |
| 2006/0276771 A1 | 12/2006 | Galley et al. |
| 2007/0106510 A1 | 5/2007 | Hsing et al. |
| 2007/0255348 A1 | 11/2007 | Holtzclaw |
| 2007/0282299 A1 | 12/2007 | Hellwig |
| 2008/0031740 A1 | 2/2008 | Miyazaki et al. |
| 2008/0033360 A1 | 2/2008 | Evans et al. |
| 2008/0052704 A1 | 2/2008 | Wysocki |
| 2008/0106431 A1 | 5/2008 | Blomquist |
| 2008/0125700 A1 | 5/2008 | Moberg et al. |
| 2008/0133265 A1 | 6/2008 | Silkaitis et al. |
| 2008/0154187 A1 | 6/2008 | Krulevitch et al. |
| 2008/0159737 A1 | 7/2008 | Noble et al. |
| 2008/0167641 A1 | 7/2008 | Hansen et al. |
| 2008/0183060 A1 | 7/2008 | Steil et al. |
| 2008/0208113 A1 | 8/2008 | Damiano et al. |
| 2008/0269714 A1 | 10/2008 | Mastrototaro et al. |
| 2008/0300572 A1 | 12/2008 | Rankers et al. |
| 2008/0312512 A1 | 12/2008 | Brukalo et al. |
| 2008/0312585 A1 | 12/2008 | Brukalo et al. |
| 2008/0319384 A1 | 12/2008 | Yodfat et al. |
| 2009/0005724 A1 | 1/2009 | Regittnig et al. |
| 2009/0006061 A1 | 1/2009 | Thukral et al. |
| 2009/0036753 A1 | 2/2009 | King |
| 2009/0063187 A1 | 3/2009 | Johnson et al. |
| 2009/0063193 A1 | 3/2009 | Barton et al. |
| 2009/0069787 A1 | 3/2009 | Estes et al. |
| 2009/0105658 A1 | 4/2009 | Jennewine |
| 2009/0112169 A1 | 4/2009 | Krulevitch et al. |
| 2009/0156990 A1 | 6/2009 | Wenger et al. |
| 2009/0158274 A1 | 6/2009 | Roberts |
| 2009/0164239 A1 | 6/2009 | Hayter et al. |
| 2009/0177154 A1 | 7/2009 | Blomquist |
| 2009/0259216 A1 | 10/2009 | Drew et al. |
| 2009/0292340 A1 | 11/2009 | Mass et al. |
| 2010/0010646 A1 | 1/2010 | Drew et al. |
| 2010/0022988 A1 | 1/2010 | Wochner et al. |
| 2010/0057057 A1 | 3/2010 | Hayter et al. |
| 2010/0082167 A1 | 4/2010 | Haueter et al. |
| 2010/0125241 A1 | 5/2010 | Prud'homme et al. |
| 2010/0137788 A1 | 6/2010 | Braithwaite et al. |
| 2010/0145262 A1 | 6/2010 | Bengtsson et al. |
| 2010/0198143 A1 | 8/2010 | Estes et al. |
| 2010/0256466 A1 | 10/2010 | Shekalim et al. |
| 2010/0262117 A1 | 10/2010 | Magni et al. |
| 2010/0271213 A1 | 10/2010 | Krainz et al. |
| 2010/0292634 A1 | 11/2010 | Kircher, Jr. et al. |
| 2011/0009813 A1 | 1/2011 | Rankers |
| 2011/0021898 A1 | 1/2011 | Wei et al. |
| 2011/0040247 A1 | 2/2011 | Mandro et al. |
| 2011/0054391 A1 | 3/2011 | Ward et al. |
| 2011/0098638 A1 | 4/2011 | Chawla et al. |
| 2011/0152756 A1 | 6/2011 | Drew |
| 2011/0152770 A1 | 6/2011 | Di-Perna et al. |
| 2011/0208155 A1* | 8/2011 | Palerm .................. G16H 40/60 604/503 |
| 2011/0208156 A1 | 8/2011 | Doyle, III et al. |
| 2011/0218489 A1 | 9/2011 | Mastrototaro et al. |
| 2011/0289497 A1 | 11/2011 | Kiaie et al. |
| 2012/0065894 A1 | 3/2012 | Tubb et al. |
| 2012/0078067 A1 | 3/2012 | Kovatchev et al. |
| 2012/0116196 A1 | 5/2012 | Tubb |
| 2012/0182939 A1 | 7/2012 | Rajan et al. |
| 2012/0192951 A1 | 8/2012 | Yodfat et al. |
| 2012/0232520 A1 | 9/2012 | Sloan et al. |
| 2012/0245556 A1 | 9/2012 | Kovatchev et al. |
| 2012/0246106 A1 | 9/2012 | Atlas et al. |
| 2012/0265126 A1 | 10/2012 | Estes |
| 2012/0265722 A1 | 10/2012 | Blomquist |
| 2012/0266251 A1 | 10/2012 | Birtwhistle et al. |
| 2012/0277723 A1 | 11/2012 | Skladnev et al. |
| 2012/0283694 A1 | 11/2012 | Yodfat et al. |
| 2012/0330228 A1 | 12/2012 | Day et al. |
| 2013/0079708 A1 | 3/2013 | Wimpenny et al. |
| 2013/0082837 A1 | 4/2013 | Cosentino et al. |
| 2013/0102853 A1 | 4/2013 | Halvorson et al. |
| 2013/0104120 A1 | 4/2013 | Arrizza et al. |
| 2013/0108046 A1 | 5/2013 | Andersen |
| 2013/0138452 A1 | 5/2013 | Cork et al. |
| 2013/0151266 A1 | 6/2013 | Randall et al. |
| 2013/0190583 A1 | 7/2013 | Grosman et al. |
| 2013/0191513 A1 | 7/2013 | Kamen et al. |
| 2013/0226339 A1 | 8/2013 | Ervin |
| 2013/0229288 A1 | 9/2013 | Alexander et al. |
| 2013/0245604 A1 | 9/2013 | Kouyoumjian et al. |
| 2013/0253465 A1 | 9/2013 | Holtwick et al. |
| 2013/0274576 A1 | 10/2013 | Amirouche et al. |
| 2013/0283030 A1 | 10/2013 | Drew |
| 2013/0297330 A1 | 11/2013 | Kamen et al. |
| 2013/0317753 A1 | 11/2013 | Kamen et al. |
| 2014/0005603 A1 | 1/2014 | Holtwick et al. |
| 2014/0024907 A1 | 1/2014 | Howell et al. |
| 2014/0025392 A1 | 1/2014 | Chandrasenan |
| 2014/0031786 A1 | 1/2014 | Kircher, Jr. et al. |
| 2014/0039455 A1 | 2/2014 | Miller et al. |
| 2014/0046260 A1 | 2/2014 | Kamen et al. |
| 2014/0058349 A1 | 2/2014 | Bazargan et al. |
| 2014/0066892 A1 | 3/2014 | Keenan et al. |
| 2014/0113553 A1 | 4/2014 | Brukalo et al. |
| 2014/0125618 A1 | 5/2014 | Panther et al. |
| 2014/0155827 A1 | 6/2014 | Ostrander et al. |
| 2014/0161667 A1 | 6/2014 | Kokic et al. |
| 2014/0180241 A1 | 6/2014 | Imhof et al. |
| 2014/0221965 A1 | 8/2014 | Regittnig et al. |
| 2014/0276409 A1 | 9/2014 | Rosinko et al. |

(56) References Cited

U.S. PATENT DOCUMENTS

| | | |
|---|---|---|
| 2014/0276555 A1 | 9/2014 | Morales |
| 2014/0282003 A1 | 9/2014 | Gruber et al. |
| 2014/0288947 A1 | 9/2014 | Simpson et al. |
| 2015/0018633 A1 | 1/2015 | Kovachev et al. |
| 2015/0057518 A1 | 2/2015 | Lebel et al. |
| 2015/0095648 A1 | 4/2015 | Nix |
| 2015/0106121 A1 | 4/2015 | Muhsin et al. |
| 2015/0133886 A1 | 5/2015 | Morris et al. |
| 2015/0150519 A1 | 6/2015 | Glenn |
| 2015/0151050 A1 | 6/2015 | Estes |
| 2015/0157788 A1 | 6/2015 | Gescheit et al. |
| 2015/0165117 A1 | 6/2015 | Palerm et al. |
| 2015/0199192 A1 | 7/2015 | Borges et al. |
| 2015/0207626 A1 | 7/2015 | Neftel et al. |
| 2015/0207796 A1 | 7/2015 | Love et al. |
| 2015/0217052 A1 | 8/2015 | Keenan et al. |
| 2015/0217053 A1 | 8/2015 | Booth et al. |
| 2015/0230760 A1 | 8/2015 | Schneider |
| 2015/0343141 A1 | 12/2015 | Lindo et al. |
| 2016/0015911 A1 | 1/2016 | Bazargan et al. |
| 2016/0015957 A1 | 1/2016 | Tieck et al. |
| 2016/0030669 A1 | 2/2016 | Harris et al. |
| 2016/0063785 A1 | 3/2016 | Benkert et al. |
| 2016/0121047 A1 | 5/2016 | Kruse et al. |
| 2016/0175520 A1 | 6/2016 | Palerm et al. |
| 2016/0224751 A1 | 8/2016 | Bielawa et al. |
| 2016/0224756 A1 | 8/2016 | Berger et al. |
| 2016/0234022 A1 | 8/2016 | Motika et al. |
| 2016/0253471 A1 | 9/2016 | Volpe |
| 2016/0317744 A1 | 11/2016 | Rule |
| 2016/0324464 A1 | 11/2016 | Christensen et al. |
| 2016/0331310 A1 | 11/2016 | Kovatchev |
| 2016/0331898 A1 | 11/2016 | Damiano et al. |
| 2016/0342752 A1 | 11/2016 | Stueckemann et al. |
| 2016/0342761 A1 | 11/2016 | Whiting et al. |
| 2016/0350503 A1 | 12/2016 | Jun et al. |
| 2016/0381142 A1 | 12/2016 | Borges et al. |
| 2017/0000946 A1 | 1/2017 | Boyle et al. |
| 2017/0026421 A1 | 1/2017 | Oh et al. |
| 2017/0056590 A1 | 3/2017 | DiPerna et al. |
| 2017/0068533 A1 | 3/2017 | Kiaie et al. |
| 2017/0083713 A1 | 3/2017 | Simmons et al. |
| 2017/0095612 A1 | 4/2017 | El-Khatib et al. |
| 2017/0100538 A1 | 4/2017 | Mhatre et al. |
| 2017/0102846 A1 | 4/2017 | Ebler et al. |
| 2017/0136198 A1 | 5/2017 | Delangre et al. |
| 2017/0161439 A1 | 6/2017 | Raduchel et al. |
| 2017/0182248 A1 | 6/2017 | Rosinko |
| 2017/0189614 A1 | 7/2017 | Mazlish et al. |
| 2017/0203030 A1 | 7/2017 | Brewer et al. |
| 2017/0203038 A1 | 7/2017 | Desborough et al. |
| 2017/0203039 A1 | 7/2017 | Desborough et al. |
| 2017/0220751 A1 | 8/2017 | Davis et al. |
| 2017/0258986 A1 | 9/2017 | Tsoukalis |
| 2017/0259072 A1 | 9/2017 | Newham et al. |
| 2017/0286614 A1 | 10/2017 | Morris et al. |
| 2017/0296056 A1 | 10/2017 | Hresko et al. |
| 2017/0311903 A1 | 11/2017 | Davis et al. |
| 2017/0316178 A1 | 11/2017 | Riedel et al. |
| 2017/0345132 A1 | 11/2017 | Schlüter et al. |
| 2017/0355511 A1 | 12/2017 | Akdogan et al. |
| 2018/0021514 A1 | 1/2018 | Rosinko |
| 2018/0060529 A1 | 3/2018 | Crothall et al. |
| 2018/0064873 A1 | 3/2018 | Kruse et al. |
| 2018/0103030 A1 | 4/2018 | Einberg et al. |
| 2018/0103897 A1 | 4/2018 | Amirouche |
| 2018/0110921 A1 | 4/2018 | Saint et al. |
| 2018/0133398 A1 | 5/2018 | Blomquist |
| 2018/0169330 A1 | 6/2018 | Ludolph |
| 2018/0182491 A1 | 6/2018 | Belliveau et al. |
| 2018/0185587 A1 | 7/2018 | Brauker et al. |
| 2018/0197634 A1 | 7/2018 | Sjöstedt |
| 2018/0200434 A1 | 7/2018 | Mazlish et al. |
| 2018/0200435 A1 | 7/2018 | Mazlish et al. |
| 2018/0200440 A1 | 7/2018 | Mazlish et al. |
| 2018/0280245 A1 | 10/2018 | Khalid |
| 2018/0296757 A1* | 10/2018 | Finan ..................... G16H 20/17 |
| 2018/0323882 A1 | 11/2018 | Breton et al. |
| 2019/0009019 A1 | 1/2019 | Shor et al. |
| 2019/0019571 A1 | 1/2019 | Breton et al. |
| 2019/0019573 A1 | 1/2019 | Lake et al. |
| 2019/0036886 A1 | 1/2019 | Wu et al. |
| 2019/0054236 A1 | 2/2019 | Estes et al. |
| 2019/0121524 A1 | 4/2019 | Hakansson et al. |
| 2019/0125224 A1 | 5/2019 | Kamath et al. |
| 2019/0132801 A1 | 5/2019 | Kamath et al. |
| 2019/0147721 A1 | 5/2019 | Avitan et al. |
| 2019/0175823 A1 | 6/2019 | Rosinko |
| 2019/0180869 A1 | 6/2019 | Volpe |
| 2019/0206565 A1 | 7/2019 | Shelton, IV |
| 2019/0214124 A1 | 7/2019 | Mougiakakou et al. |
| 2019/0236465 A1 | 8/2019 | Vleugels |
| 2019/0247568 A1 | 8/2019 | Thatcher |
| 2019/0247578 A1 | 8/2019 | Desborough et al. |
| 2019/0336684 A1 | 11/2019 | Connor et al. |
| 2019/0344009 A1 | 11/2019 | Damiano et al. |
| 2019/0348165 A1 | 11/2019 | Saint et al. |
| 2019/0356482 A1 | 11/2019 | Nix |
| 2019/0362841 A1 | 11/2019 | Aysin et al. |
| 2020/0043588 A1 | 2/2020 | Mougiakakou et al. |
| 2020/0101223 A1* | 4/2020 | Lintereur ............. A61B 5/4839 |
| 2020/0114076 A1 | 4/2020 | Ulrich et al. |
| 2020/0155757 A1 | 5/2020 | Gregory et al. |
| 2020/0254240 A1 | 8/2020 | Windmiller et al. |
| 2020/0274782 A1 | 8/2020 | Balaiah et al. |
| 2020/0306445 A1 | 10/2020 | Michaud et al. |
| 2020/0342974 A1 | 10/2020 | Chen et al. |
| 2020/0384190 A1 | 12/2020 | Jacobi et al. |
| 2021/0016004 A1 | 1/2021 | El-Khatib et al. |
| 2021/0020306 A1 | 1/2021 | Hulan et al. |
| 2021/0030949 A1 | 2/2021 | Damiano et al. |
| 2021/0085861 A1 | 3/2021 | Patel et al. |
| 2021/0085866 A1 | 3/2021 | Rosinko et al. |
| 2021/0085869 A1 | 3/2021 | El-Khatib et al. |
| 2021/0090705 A1 | 3/2021 | Patel et al. |
| 2021/0090730 A1 | 3/2021 | Patel et al. |
| 2021/0098105 A1 | 4/2021 | Lee et al. |
| 2021/0213200 A1 | 7/2021 | Raskin et al. |
| 2021/0283332 A1 | 9/2021 | Damiano et al. |
| 2021/0299352 A1 | 9/2021 | El-Khatib et al. |
| 2021/0402090 A1 | 12/2021 | Damiano et al. |
| 2022/0054746 A1 | 2/2022 | Patel et al. |
| 2022/0058577 A1 | 2/2022 | Kimmel et al. |
| 2022/0077705 A1 | 3/2022 | Takahashi et al. |
| 2022/0080118 A1 | 3/2022 | Rosinko et al. |
| 2022/0080119 A1 | 3/2022 | Rosinko et al. |
| 2022/0080120 A1 | 3/2022 | Rosinko et al. |
| 2022/0080121 A1 | 3/2022 | Rosinko et al. |
| 2022/0096748 A1 | 3/2022 | El-Khatib et al. |
| 2022/0114646 A1 | 4/2022 | Nakashima et al. |
| 2022/0118179 A1 | 4/2022 | Rosinko et al. |
| 2022/0184300 A1 | 6/2022 | Lim et al. |
| 2022/0184305 A1 | 6/2022 | Rosinko et al. |
| 2022/0184308 A1 | 6/2022 | Patel et al. |
| 2022/0184309 A1 | 6/2022 | Rosinko et al. |
| 2022/0188388 A1 | 6/2022 | Rosinko et al. |
| 2022/0189602 A1 | 6/2022 | Rosinko et al. |
| 2022/0208331 A1 | 6/2022 | Rosinko et al. |
| 2022/0208370 A1 | 6/2022 | Rosinko et al. |
| 2022/0215943 A1 | 7/2022 | Rosinko et al. |
| 2022/0218904 A1 | 7/2022 | Rosinko et al. |
| 2022/0218905 A1 | 7/2022 | Rosinko et al. |
| 2022/0222734 A1 | 7/2022 | Rosinko et al. |
| 2022/0223251 A1 | 7/2022 | Rosinko et al. |
| 2022/0223273 A1 | 7/2022 | Rosinko et al. |
| 2022/0226571 A1 | 7/2022 | Rosinko et al. |
| 2022/0362466 A1 | 11/2022 | Rosinko et al. |
| 2023/0065458 A1 | 3/2023 | Abadi et al. |

FOREIGN PATENT DOCUMENTS

| | | |
|---|---|---|
| CN | 201186082 | 1/2009 |
| CN | 101795623 A | 8/2010 |
| CN | 102667787 A | 9/2012 |

(56) References Cited

FOREIGN PATENT DOCUMENTS

| | | | |
|---|---|---|---|
| CN | 103793048 A | 5/2014 | |
| CN | 104667368 A | 6/2015 | |
| CN | 104667379 A | 6/2015 | |
| EP | 1575656 A1 | 9/2005 | |
| EP | 3453414 A1 | 3/2019 | |
| JP | H03500129 A | 1/1991 | |
| JP | 2001204817 A | 7/2001 | |
| JP | 2003079723 A | 3/2003 | |
| JP | 2004502474 A | 1/2004 | |
| JP | 2007529241 A | 10/2007 | |
| JP | 2007312923 A | 12/2007 | |
| JP | 2012516735 A | 7/2012 | |
| JP | 2012519018 A | 8/2012 | |
| WO | 0028217 B1 | 8/2000 | |
| WO | 2004006982 A2 | 1/2004 | |
| WO | 2004084820 | 10/2004 | |
| WO | 2005044088 A2 | 5/2005 | |
| WO | WO-2006124716 A2 * | 11/2006 | ......... A61M 5/1723 |
| WO | 2008057384 A2 | 5/2008 | |
| WO | 2008094249 A1 | 8/2008 | |
| WO | 2008114254 A1 | 9/2008 | |
| WO | 2008150633 | 12/2008 | |
| WO | 2008154467 A1 | 12/2008 | |
| WO | 2008157780 A1 | 12/2008 | |
| WO | 2009001349 A1 | 12/2008 | |
| WO | 2012058694 A2 | 5/2012 | |
| WO | 2014100557 A2 | 6/2014 | |
| WO | 2014110541 A1 | 7/2014 | |
| WO | 15021041 | 2/2015 | |
| WO | 2015065922 | 5/2015 | |
| WO | 2019125932 A1 | 6/2019 | |

OTHER PUBLICATIONS

Chinese Application No. 202080084498.8, First Office Action, with translation mailed Jun. 28, 2024, 23 pages.
Parker et al., Feb. 1999, A Model-Based Algorithm for Blood Glucose Control in Type I DiabeticPatients, IEEE Trans. Biomed. Eng. 46(2): pp. 148-157.
Parker et al., Jan.-Feb. 2001, The Intravenous Route to Blood Glucose Control, IEEE Eng.Med. & Biol., 9 pages.
Parrish et al., Jun. 1997, Control of an Artificial Human Pancreas Using the SORE Method, Proc.American Control Conf., 2:pp. 1059-1060.
Russell et al., Nov. 2010, Efficacy Determinants of Subcutaneous Microdose Glucagon duringClosed-Loop Control, Journal of Diabetes Science and Technology, 4(6): pp. 1288-1304.
Russell, et al., Jun. 15, 2014, Outpatient Glycemic Control with a Bionic Pancreas in Type 1 Diabetes,The New England Journal of Medicine, 371 (4): pp. 313-325.
Russell, et al., Nov. 2012, Blood Glucose Control in Type 1 Diabetes With a Bi hormonal BionicEndocrine Pancreas, Diabetes Care, 35: pp. 2148-2155.
Senior Tech Club, Aug. 16, 2018, Sleep and Shutdown—How to Know the Difference on Your Iphone, https://www.seniortechclub.com/tech-recipe/sleep-shutdown-iphone-100, 8 pp.
Sifferlin, Apr. 1, 2016, The bionic pancreas is getting closer to reality, time.com, https://time.com/4278068/bionic-pancreas-company, 5 pp.
Sivaramakrishnan et al., 2017, Optimal model based control for blood glucose insulin system usingcontinuous glucose monitoring, J. Pharm. Sci & Res., 9(4):465469.
Smith, Mar. 10, 2017, "A BU Professor's Bionic Pancreas Could Change Diabetes Treatment", published on Mar. 10, 2017 to https://www.bostonmagazine.com/health/2017/03/10/bionic-pancreas-iLet/; 6 pages.
Steil et al., 2006, Metabolic modelling and the closed-loop insulin delivery problem, Diabetes Researchand Clinical Practice, 74:pp. S183-S186.
Steil et al., Dec. 2006, Feasibility of automating insulin delivery for the treatment of type 1diabetes, Diabetes, 55: pp. 3344-3350.

Stein, Jun. 16, 2014, "Father Devises a Bionic Pancreas to Help Son With Diabetes", published on Jun. 16, 2014 to https://www.npr.org/sections/healthshots/2014/06/16/320309856/father-devises-abionic-pancreas-to-help-son-with-diabetes; 7 pages.
Torgan, Jan. 10, 2017, "Bionic pancreas treats adults with type 1 diabetes", published on Jan. 10, 2017 to https://www.nih.gov/news-events/ nih-research-matters/bionic-pancreas-treats-adultstype-1-diabetes; 5 pages.
Trajanoski et al., Sep. 1998, Neural Predictive Controller for Insulin Delivery Using theSubcutaneous Route, Biomedical Engineering, 45(9): pp. 1122-1134.
University of California, San Francisco, Diabetes Education Online, Calculating Insulin Dose, https://dtc.ucsf.edu/types-of-diabetes/type2/treatment-of-type-2-diabetes/medications-andtherapies/ type-2-insulin-rx/calculating-insulin-dose/, downloaded Apr. 9, 2021, 11 pages.
Yang et al., Oct. 2010, Secure Method for Software Upgrades for Implantable Medical Devices,Tsinghua Science and Technology, 15(5):517-525.
Canadian Patent Application No. 3,146,965; "Office Action" mailed Feb. 10, 2023; 5 pages.
Admin, Aug. 25, 2016, "What's the latest with the bionic pancreas?", published on Aug. 25, 2016 tohttps://www.diabetes.co.uk/blog/2016/08/ whats-the-latest-with-the-bionic-pancreas/; 9 pages.
Albisser et al., May 1974, An Artificial Endocrine Pancreas, Diabetes, 23(5): pp. 389-396.
Bellazzi et al., 1995, Adaptive Controllers for Intelligent Monitoring, Artif. Intell. Med., 7:515540; 26 pages.
Bellomo et al., May 1982, Optimal Feedback Glycaemia Regulation in Diabetics, Med. & Biol. Eng. &Comp. 20: pp. 329-335.
Berian et al., 2019, A wearable closed-loop insulin delivery system based on low-power SoCs,Electronics, 8:612, 19 pages.
Boston University, Jan. 2014, Bionic Pancreas: Introducing the iLet 1294 1000,http://sites.bu.edu/bionicpacreas/introducing-the-ilet-1294-1000/, 3 pp.
Botz, May 1976, An Improved Control Algorithm for an Artificial .beta.-Cell, IEEE Trans. Biomed. Eng.,BME-23(3): pp. 252-255.
Brown et al., Apr. 1, 2016, "Introducing Beta Bionics: Bringing the iLet Bionic Pancreas to Market", published on Apr. 1, 2016 to https://diatribe.org/introducing-beta-bionics-bringing-iLet-bionic-pancreasmarket,3 DD.
Brunetti et al., 1993, A Simulation Study on a Self-Tuning Portable Controller of Blood Glucose, Int. J.Artif. Org., 16(1 ): pp. 51-57.
Candas et al., Feb. 1994, An Adaptive Plasma Glucose Controller Based on a NonlinearInsulin/Glucose Model, IEEE Trans. Biomed. Eng. 41 (2): pp. 116124.
Clarke et al., 2009, Statistical Tools to Analyze Continuous Glucose Monitor Data, Diabetes Technologyand Therapeutics, 11 :S45S54; 15 pages.
Clemens, 1979, Feedback Control Dynamics for Glucose Controlled Insulin Infusion Systems, Med.Prag. Technol. 6: pp. 91-98.
Close, Jun. 13, 2013, "The Bionic Pancreas", published on Jun. 13, 2013 to https://diatribe.org/bionicpancreas; 4 pages.
Damiano, Feb. 17, 2017, The Long and Winding Road to the Bionic Pancreas, presented on Feb. 17, 2017, published to https:// professional.diabetes .org/sites/professional.diabetes.org/files/media/ damiano the long and winding road to the bionic _pancreas final.pdf; 12 pages.
Diabetes Connections, May 2, 2017, The ilet Bionic Pancreas, youtube.com, retrieved Nov. 1, 2022,https://www.youtube.com/watch?v=mRAIXloa8AA, 1 p.
El-Khatib et al., Apr. 14, 2010, A Bi hormonal Closed-Loop Artificial Pancreas for Type 1 Diabetes,Science.Trans. Med., 2(27): pp. 1-12.
El-Khatib et al., Jul. 2009, A Feasibility Study of Bihormonal Closed-Loop Blood-Glucose Control Using Dual Subcutaneous Infusion of Insulin and Glucagon in Ambulatory Diabetic Swine, Journal of DiabetesScience and Technoloav, 3(4): pp. 789-803.
El-Khatib, et al., Mar. 2007, Adaptive Closed-Loop Control Provides Blood-Glucose Regulation Using Dual Subcutaneous Insulin and Glucagon Infusion in Diabetic Swine, Journal of Diabetes Science andTechnoloav, 1(2): pp. 181-192.

(56) References Cited

OTHER PUBLICATIONS

El-Khatib, et al., May 2014, Autonomous and Continuous Adaptation of a Bihormonal Bionic Pancreasin Adults and Adolescents Nilh Type 1 Diabetes, Journal of Clinical Endocrin. Melab., 99(5): pp. 1701-1711.
Faulkner, May 23, 2018, "Beta Bionics wins FDA nod for home-use trial of artificial pancreas tech", published on May 23, 2018 to https://www.drugdeliverybusiness.com/beta-bionics-wins-fda-nod-forhome-use-trial-of-artificial-Dancreas-tech/; 7 pages.
Femat et al., Aug. 22-27, 1999, Blood Glucose Regulation: An Output Feedback Approach, Proc.IEEE Int. Conf. Control App. pp. 1290-1293.
International Search Report and Written Opinion dated Dec. 24, 2020 in PCT/US2020/054025; 51 pages.
International Search Report and Written Opinion dated Mar. 30, 2022 in application No. PCT/US2021/072742; 26 pages.
International Search Report and Written Opinion dated May 31, 2022 in application No. PCT/US2022/017368.
International Search Report and Written Opinion dated Nov. 2, 2020 in PCT/US2020/042195; 54 pages.
International Search Report and Written Opinion dated Oct. 29, 2020 in PCT/US2020/042269; 23 page.
Jagannathan et al., May 1618, 2016, Self-authentication in medical device software: an approach to include cybersecurity in legacy medical devices, IEEE Symposium on Product Compliance Engineering, 5 pp.
Kan et al., 2000, Novel Control System for Blood Glucose Using a Model Predictive Method, ASAIOJournal, 4: pp. 657-662.
Krugman, Aug. 25, 2018, iLet Bionic Pancreas Interface, sarakrugman.com/ilet-interface, 3 pp.
Lal et al., Jul. 5, 2019, Realizing a closed-loop (artificial pancreas) system for the treatment of type 1diabetes, Endocrine reviews, 40(6): pp. 1521-1546.
Lauritzen et al., May 1983 Pharmacokinetics of Continuous Subcutaneous Insulin Infusion, Diabetologia, 24(5):326329; 4 pages.
Marliss et al., Jul 1977, Normalization of Glycemia in Diabetics DUring Meals with Insulin andGlucagon Delivery by the Artificial Pancreas, Diabetes, 26: pp. 663-672.
Medtronic, 2020, Minimed 670G Insulin Pump System, product brochure, https://www.medtronicdiabetes.com/products/minimed-670g-insulin-pump-system, 7 pp.
Melvin, May 25, 2018, "New iLet Bionic Pancreas Systems Begins Clinical Trial Testing", published on May 25, 2018 to https://beyondtype1.org/ new-iLet-bionic-pancreas-system-begins-clinical-trial-testing; 25 pages.
NEJM Group, Sep. 29, 2022, Bionic Pancreas, youtube.com, retrieved Nov. 1, 2022, https:/www.youtube.comwatch?v=hXkgZR4qJ9o. 1 p.
Pagurek et al., 1972, Adaptive Control of the Human Glucose Regulatory System, Med. Biol. Eng., 10: pp. 752-761.
Panasovskyi, May 29, 2019, three circle arrows, thenounproject.com, retrieved Nov. 1, 2022, https://thenounproject.com/icon/three-circle-arrows-2700549/, 1 p.
Panteleon et al., Jul. 2006, Evaluation of the effect of gain on the mean response of an automatedclosed-loop insulin delivery system, Diabetes, 55:19952000; 6 pages.
Parker et al., 1996, Model Predictive Control for Infusion Pump Insulin Delivery, Proceedings of the 18thAnnual International Conference of the IEEE, 6:1822-1823.
Canadian Patent Application No. 3,151,782; "Office Action" mailed Apr. 17, 2023; 5 pages.
Fischer et al., Aug. 1987, Does Physiological Blood Glucose Control Require an Adaptive ControlStrategy?, IEEE Trans. Biomed. Eng., BME-34:575582; 8 pages.
Fletcher et al., 2001, Feasibility of an Implanted, Closed-Loop, Blood-Glucose Control Device, Immunology 230, Stanford University, Spring 01, 31 pp.
Furler et al., Nov.-Dec. 1985, Blood Glucose Control by Intermittent Loop Closure in theBasal Mode: Computer Simulation Studies with a Diabetic Model, Diabetes Care, 8(6): pp. 553-561.
Gower, Jan. 24, 2018, "The Dawn of the Bionic Pancreas", published on Jan. 24, 2018 to protomag.com/articles/dawn-pancreas, retrieved on Jan. 27, 2021; 6 pages.
Hanna et al., Aug. 2011, Take Two Software Updates and See Me in the Morning The Case for Software Security Evaluations of Medical Devices, 2nd USENIX Workshop on Health Security and Privacy, 5 pages, [retrieved on May 11, 21], Retrieved from the Internet: https://dl.acm.org/doi/10.5555/2028026.2028032.
Harsch, May 3, 2016, "The Future of Diabetes: My 3 Weeks on a Bionic Pancreas", published on May 3, 2016 to https://onedrop.today/blogs/blog/3-weeks-on-a-bionic-pancreas; 8 pages.
Hein, Jun. 17, 2016, iOS 1 O's 'Raise to Wake' only works on new iPhones,https://www.cultofmac.com/433989/ios- 1Os-raise-to-wake-only-workers-on-new-iphones, 6 pp.
Hoskins, Oct. 2, 2018, iLet "Bionic Pancreas" making progress with gen 4 device, Healthline,https//www.healthline.com/diabetesmine/beta-bionics-ilet-update#1, 15 pp.
Idlebrook, Jul. 30, 2019, Beta Bionics secures funding for pivotal iLet bionic pancreas trials, https://t1 dexchange.org/welcome-glu-users/articles/beta-bionics-secures-funding-forpivotal-ilet-bionicpancreas-trials, 4 DD.; 4 pages.
International Search Report and Written Opinion dated Apr. 8, 2022 in application No. PCT/US2021/064228; 32 pages.
International Search Report and Written Opinion dated Dec. 14, 2020 in PCT/US2020/054130; 34 pages.

* cited by examiner

3700

3710
Provide, by a Medical Device, an Option to a User to Select between Receiving Medicament Using a Manual Delivery Component or an Automated Delivery System 3720
Receive, by the Automated Delivery System, Subjective Information Regarding the Activity or Action that may Alter the Glucose Level 3730
Receive, by the Manual Delivery Component, an Amount of the Medicament to be Infused 3740
Store a Time and the Amount of Medicament that is Infused into the Automated Delivery System that Controls Glucose Levels

FIG. 37

| 90 Days | Saturday, January 1, 2019-Monday, March 29, 2019 |

Backup Therapy

Your glucose control system has learned your insulin needs. If your glucose control system goes offline or is temporarily unavailable, the below protocol is recommended for use for up to 72 hours.

| Injections | |
|---|---|
| Usual Breakfast | 6 Units |
| Usual Lunch | 8 Units |
| Usual Dinner | 8 Units |
| Long Acting Insulin Units | 14 |
| Correction Factor mg/dL lowered per 1 Unit | 9mg/dL |

| Pump Settings | |
|---|---|
| Usual Breakfast Units | 6 Units |
| Usual Lunch Units | 8 Units |
| Usual Dinner Units | 8 Units |
| Basal Rate 12:00 A.M. - 6:00 A.M. | .6 units per hour |
| Basal Rate 6:00 A.M. - 12:00 P.M. | .5 units per hour |
| Basal Rate 12:00 P.M. - 6:00 P.M. | .6 units per hour |
| Basal Rate 6:00 P.M. - 12:00 A.M. | .5 units per hour |
| Correction Factor mg/dL lowered per 1 Unit | 9mg/dL |

Autonomous Control Summary

The autonomous control summary provides you key information about your glucose control performance during the specified time period.

| 152 mg/dL | ## % | #.# % | 4.2 | 45.2u | 98% |
|---|---|---|---|---|---|
| Mean Glucose (CGM) | Time in range 70-180 mg/dL | Time < 54 mg/dL | Mean Meal Announcements Per Day | Total Daily Insulin | CGM Connectivity Uptime |
| 6.9 % | ## % | #.# % | | 3.2μ | |
| Estimated A1C | >180 mg/dL | | | Total Daily Glucagon | |

| 5206 | 5208 |
|---|---|
| 90 Days | Saturday, January 1, 2019-Monday, March 29, 2019 |

Ambulatory Glucose Profile (AGP)

AGP is a summary of glucose values from the report, with median (50%) and other percentiles shown as if occurring in a single day.

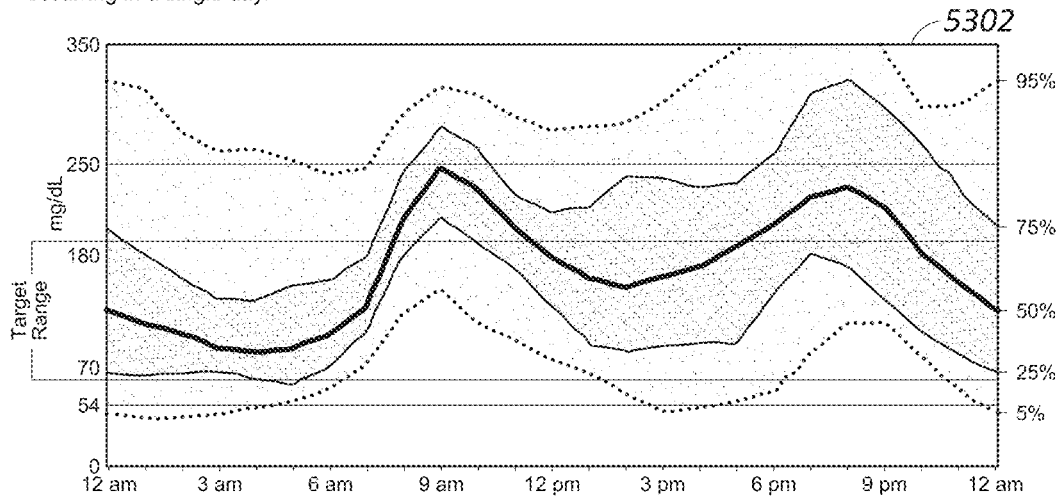

Adjustable Settings & Behavior

Settings

| | Current Entry | Previous Entry |
|---|---|---|
| Body Weight | ### pounds | ### pounds<br>last set on DD/MM/YYYY |

| Bionic Daytime Target | % time selected |
|---|---|
| Higher | ##% |
| Usual | ##% |
| Lower | ##% |

| Bionic Nightime Target | % time selected |
|---|---|
| Higher | ##% |
| Usual | ##% |
| Lower | ##% |

Bionic Temporary Targets: You set a temporary target ## times during the selected date range. — 5304
Pause Insulin: You paused insulin ## times during the selected date range. — 5306
— 5308

( 90 Days | Saturday, January 1, 2019-Monday, March 29, 2019 )
　　　　5206　　　　　　　　　　　　5208

Your Adjustable Behaviors

Meal Announcement

🍳 Breakfast　　　　　　　　　　　　　　　　5402

| Average Per Day # |  |  |  |
|---|---|---|---|
| Size | 🍜 Larger # | 🍜 Usual # | 🍜 Smaller # |

🍔 Lunch

| Average Per Day # |  |  |  |
|---|---|---|---|
| Size | 🍜 Larger # | 🍜 Usual # | 🍜 Smaller # |

🍽 Dinner

| Average Per Day # |  |  |  |
|---|---|---|---|
| Size | 🍜 Larger # | 🍜 Usual # | 🍜 Smaller # |

FIG. 54

EMERGENCY MEDICAMENT DOSE CONTROL

INCORPORATION BY REFERENCE

This application is a continuation of PCT Application No. PCT/US2022/071308, filed Mar. 24, 2022. PCT Application No. PCT/US2022/071308 claims priority to U.S. Provisional Application Nos.: 63/167,563, filed Mar. 29, 2021; 63/216,177, filed Jun. 29, 2021; 63/239,365, filed Aug. 31, 2021; 63/169,112, filed Mar. 31, 2021; 63/261,290, filed Sep. 16, 2021; 63/168,203, filed Mar. 30, 2021; 63/212,521, filed Jun. 18, 2021; 63/238,670, filed Aug. 30, 2021; 63/276,481, filed Nov. 5, 2021; 63/215,857, filed Jun. 28, 2021; 63/183,900, filed May 4, 2021; 63/249,975, filed Sep. 29, 2021; 63/194,126, filed May 27, 2021; 63/263,602, filed Nov. 5, 2021; 63/264,645, filed Nov. 29, 2021; 63/295,361, filed Dec. 30, 2021; 63/320,587, filed Mar. 16, 2022; 63/320,591, filed Mar. 16, 2022; and 63/321,514, filed Mar. 18, 2022. PCT Application No. PCT/US2022/071308 claims priority to PCT Application No. PCT/US2021/072742, filed Dec. 3, 2021; PCT Application No. PCT/US2021/064228, filed Dec. 17, 2021; PCT Application No. PCT/US2022/012795, filed Jan. 18, 2022; and PCT Application No. PCT/US2022/017368, filed Feb. 22, 2022. PCT Application No. PCT/US2022/071308 claims priority to U.S. application Ser. No. 17/212,984 filed on Mar. 25, 2021. The entire contents of each application referenced in this paragraph are hereby incorporated by reference herein for all purposes and made part of this specification. Any and all applications for which a foreign or domestic priority claim is identified in the Application Data Sheet as filed with the present application are hereby incorporated by reference under 37 CFR 1.57.

STATEMENT REGARDING FEDERALLY SPONSORED RESEARCH OR DEVELOPMENT

This invention was made with U.S. Government support under Contract No. W912CG20C0013, awarded by the Defense Advanced Research Projects Agency. The Government has certain rights in the invention.

BACKGROUND

Technical Field

This disclosure relates to glucose level control systems and to ambulatory medical devices (e.g., ambulatory medicament devices including ambulatory medicament pumps) that provide therapy (e.g., medicament) to a subject.

Description of Related Art

Sustained delivery, pump driven medicament injection devices generally include a delivery cannula mounted in a subcutaneous manner through the skin of the subject at an infusion site. The pump draws medicine from a reservoir and delivers it to the subject via the cannula. The injection device typically includes a channel that transmits a medicament from an inlet port to the delivery cannula, which results in delivery to the subcutaneous tissue layer where the delivery cannula terminates. Some infusion devices are configured to deliver one medicament to a subject while others are configured to deliver multiple medicaments to a subject.

SUMMARY

Glucose level control systems and ambulatory medical devices that provide therapy to a subject, such as glucose level control, are disclosed. Disclosed systems and devices can implement one or more features that improve the user experience, such as software update techniques that avoid interrupting delivery of therapy, gesture-based control of therapy delivery, automatic resumption of therapy after a user-initiated pause, improved alarm management, display of autonomously calculated dosing recommendations, wide area network connectivity, and security features, generating emergency dose control signals for commanding administration of modified glucose control therapy to the subject, tracking insulin therapy administered to the subject over a tracking period, storing indications of basal, correction boluses, or mealtime boluses of insulin delivered to the subject, generating backup injection therapy protocol with insulin therapy instructions based at least in part on the insulin therapy administered to the subject over the tracking period.

Some embodiments described herein pertain to glucose level control systems (GLCSes) for providing, managing, and facilitating glucose control therapy. In some cases, the disclosed GLCSes may include interconnected remote computing systems, mobile electronic devices, and medicament delivery devices that cooperatively improve the glucose control therapy provided to a subject by facilitating various tasks associated with glucose therapy delivery, such as generating emergency dose control signals, tracking insulin therapy administered to the subject, and generating backup injection therapy protocol with insulin therapy instructions. Additionally, or alternatively, the disclosed GLCSes may include automated systems that autonomously calculate dosing recommendations, generate emergency dose control signals, track insulin therapy administered to the subject, and generate backup injection therapy protocols.

BRIEF DESCRIPTION OF THE DRAWINGS

The systems, methods, and devices of this disclosure each have several innovative aspects, no single one of which is solely responsible for all of the desirable attributes disclosed herein. Details of one or more implementations of the subject matter described in this specification are set forth in the accompanying drawings and the description below.

FIG. 37 is a flow diagram of a process for providing options for meal dosage selection on an ambulatory device.

FIG. 52 illustrates an example backup therapy protocol in accordance with certain embodiments.

FIG. 53 illustrates an example control parameter modification report in accordance with certain embodiments.

FIG. 54 illustrates an example meal selection report that may be included as part of some implementations of the control parameter modification report of FIG. 53 in accordance with certain embodiments.

DETAILED DESCRIPTION

Figure 1A:
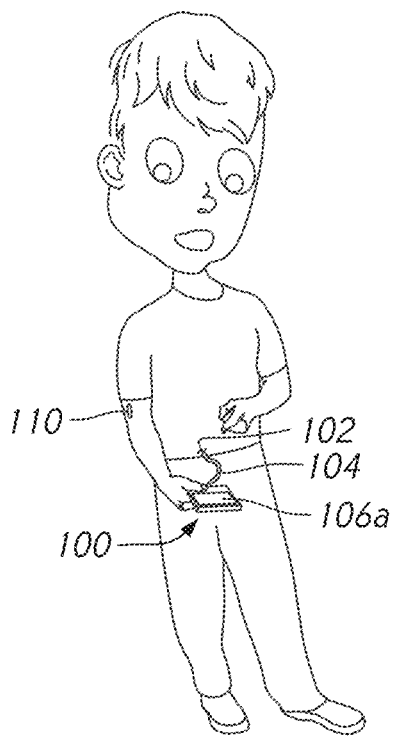
FIG. 1A illustrates an example glucose level control system that provides glucose control via an ambulatory medicament pump.

Some embodiments described herein pertain to medicament infusion systems for one or more medicaments and the components of such systems (e.g., infusion pumps, medicament cartridges, cartridge connectors, lumen assemblies, infusion connectors, infusion sets, etc.). Some embodiments pertain to methods of manufacturing infusion systems and components thereof. Some embodiments pertain to methods of using any of the foregoing systems or components for infusing one or more medicaments (e.g., pharmaceutical, hormone, etc.) to a subject. As an exemplary illustration, an infusion system may include an infusion pump, which can include one or more medicament cartridges or can have an integrated reservoir of medicament. An infusion system may include medicament cartridges and cartridge connectors, but not a pump. An infusion system may include cartridge connectors and an infusion pump, but not medicament cartridges. An infusion system may include infusion connectors, a lumen assembly, cartridge connectors, an infusion pump, but not medicament cartridges or an infusion set. A glucose level control system can operate in conjunction with an infusion system to infuse one or more medicaments, including at least one glucose control agent, into a subject. Any feature, structure, component, material, step, or method that is described and/or illustrated in any embodiment in this specification can be used with or instead of any feature, structure, component, material, step, or method that is described and/or illustrated in any other embodiment in this specification. Additionally, any feature, structure, component, material, step, or method that is described and/or illustrated in one embodiment may be absent from another embodiment.

Glucose Level Control System (GLCS) Overview

A glucose level control system (GLCS) is used to control the glucose level in a subject. In some cases, the glucose level may comprise a blood glucose level, or a glucose level in other fluids in a subject's body. In some examples, the glucose level may comprise a physiological glucose level of the subject that can be a concentration of glucose in the subject's blood (herein referred to as "blood glucose level") or in an interstitial fluid in part of the subject's body (e.g., expressed in milligram per deciliter (mg/dl or mg/dL)). In various implementations, a glucose level may comprise a measured or an estimated glucose level. In some cases, the measured glucose level can be correlated to the blood glucose level of the subject. In some cases, an estimated glucose level can be an estimated concentration of glucose in subject's blood. Glucose level control systems (GLCSes) can include a controller configured to generate dose control signals for one or more glucose control agents that can be infused into the subject. Glucose control agents can be delivered to a subject via subcutaneous injection, via intravenous injection, or via another suitable delivery method. Glucose control agents may include regulatory agents that tend to decrease glucose level (e.g., blood glucose level) of the subject, such as insulin and insulin analogs, and counter-regulatory agents that tend to increase glucose level, such as glucagon or dextrose. A glucose control system configured to be used with two or more glucose control agents can generate a dose control signal for each of the agents. In some embodiments, a glucose level control system can generate a dose control signal for an agent even though the agent may not be available for dosing via a medicament pump connected to the subject.

In some embodiments, a GLCS may include or can be connected to an ambulatory medicament pump. An ambulatory medicament pump (AMP) or a medicament pump is a type of ambulatory medical device ("AMD"), which is sometimes referred to herein as an ambulatory device, an ambulatory medicament device, a mobile ambulatory device. In various implementations, ambulatory medical devices may include ambulatory medicament pumps and other devices configured to be carried by a subject and to deliver therapy to the subject. Multiple embodiments of an AMD are described herein. It should be understood that one or more of the embodiments described herein with respect to one AMD may be applicable to one or more of the other AMDs described herein. In some cases, a GLCS can include a therapy administration system and an AMD that is in communication with the therapy administration system. In some cases, the AMD may comprise an AMP.

In some embodiments, a GLCS implements algorithms, and medicament or glucose control functionality discussed herein to provide medicament or glucose control therapy without being connected to an AMD. For example, the GLCS can provide instructions or dose outputs that direct a user to administer medicament to provide glucose control therapy. In some implementations, the user may use, for example, a medicament pen to manually administer, or self-administer, the medicament according the GLCS's dose outputs. In some implementations, the user may provide inputs such as glucose level readings into the GLCS, and the GLCS may provide or output an indication of medicament doses. The user inputs to the GLCS may be combined with inputs from other systems or devices such as sensors as discussed herein. In some implementations, the GLCS can provide glucose control therapy based on user inputs without other system or device inputs.

In some embodiments, the GLCS includes a memory that stores specific computer-executable instructions for generating a dose recommendation and/or a dose control signal. The dose recommendation and/or the dose control signal can assist with glucose level control of a subject via medicament therapy. The dose recommendation or dose output of the GLCS can direct a user to administer medicament to provide medicament therapy for glucose level control, including manual administration of medicament doses. In additional embodiments, the GLCS includes the memory and a delivery device for delivering at least a portion of the medicament therapy. In further embodiments, the GLCS includes the memory, the delivery device, and a sensor configured to generate a glucose level signal. The GLCS can generate the dose recommendation and/or the dose control signal based at least in part on the glucose level signal. In certain embodiments, the dose recommendation and/or the dose control signal can additionally be based at least in part on values of one or more control parameters. Control parameters can include subject-specific parameters, delivery device-specific parameters, glucose sensor-specific parameters, demographic parameters, physiological parameters, other parameters that can affect the glucose level of the subject, or any combination of one or more of the foregoing.

In some examples, the ambulatory medical device (AMD) is an electrical stimulation device, and therapy delivery includes providing electrical stimulation to a subject. An example of an electrical stimulation device is a cardiac pacemaker. A cardiac pacemaker generates electrical stimulation of the cardiac muscle to control heart rhythms. Another example of an electrical stimulation device is a deep brain stimulator to treat Parkinson's disease or movement disorders.

Figure 1B:
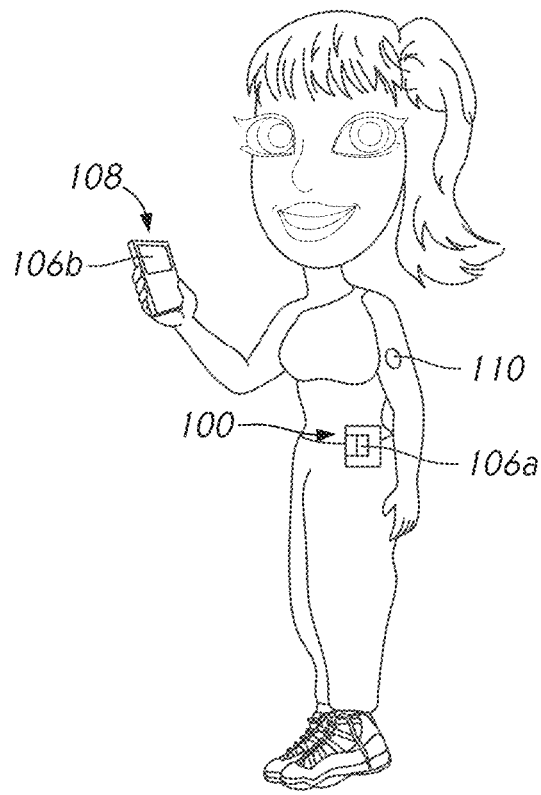
FIG. 1B illustrates another example glucose level control system that provides glucose control via an ambulatory medicament pump.
Figure 1C:
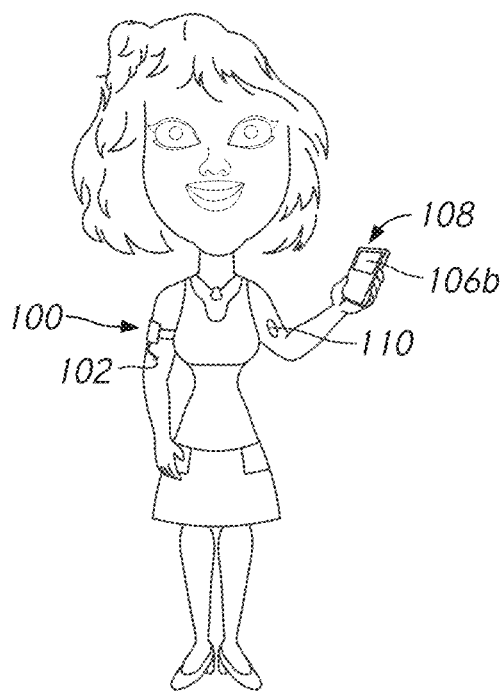
FIG. 1C illustrates a further example glucose level control system that provides glucose control via an ambulatory medicament pump.

FIG. 1A-FIG. 1C show examples of glucose level control systems that provide glucose level control therapy via an ambulatory medical device (AMD), such as an ambulatory medicament pump (AMP) connected to a subject.

In FIG. 1A, the AMD 100 may be connected to an infusion site 102 using an infusion set 104. The AMD 100 may include a medicament pump that may have integrated pump controls accessible via a user interface 106a. The user interface 106a may permit a user to view pump data and change therapy settings via user interaction with the pump controls via the user interface 106a. A glucose level sensor 110 can generate a glucose level signal that is received by the glucose level control system. Alternatively, or in addition, in some cases, the glucose level control system may receive an insulin level signal from an insulin level sensor. In some variants, the glucose level sensor 110 may include a continuous glucose monitor (CGM).

In FIG. 1B, the glucose level control system includes the AMD 100 (e.g., a medicament pump) that communicates with an external electronic device 108 (such as, for example, a smartphone) via a wireless data connection. At least some of the pump controls can be manipulated via user interaction with user interface elements in the user interface 106a or user interface 106b of the external electronic device 108. The glucose level sensor 110 can also communicate with the AMD 100 via a wireless data connection.

In FIG. 1C, the AMD 100 (e.g., a medicament pump) includes an integrated cannula that inserts into the infusion site 102 without a separate infusion set. At least some of the pump controls can be manipulated via user interaction with user interface elements of the user interface 106b of an external electronic device 108. In some instances, pump controls can be manipulated via user interaction with user interface elements generated by a remote computing environment (not shown), such as, for example, a cloud computing service, that connects to the AMD 100 via a direct or indirect electronic data connection.

Glucose level control systems typically include a user interface configured to provide one or more of therapy information, glucose level information, and/or therapy control elements capable of changing therapy settings via user interaction with interface controls. For example, the user can provide an indication of the amount of the manual bolus of medicament from an electronic device remote from the medicament pump. The user interface can be implemented via an electronic device that includes a display and one or more buttons, switches, dials, capacitive touch interfaces, touchscreen interfaces, or voice interfaces. In some embodiments, at least a portion of the user interface is integrated with an ambulatory medicament pump that can be tethered to a body of a subject via an infusion set configured to facilitate subcutaneous injection of one or more glucose level control agents. In certain embodiments, at least a portion of the user interface is implemented via an electronic device separate from the ambulatory medicament pump, such as a smartphone.

Figure 2A:
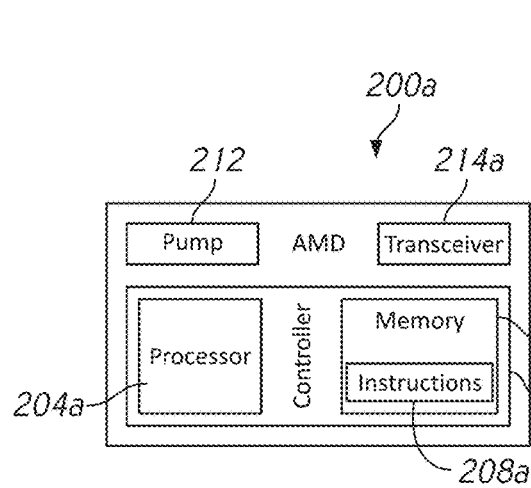
FIG. 2A shows a block diagram of an example glucose level control system.

FIG. 2A-FIG. 2D illustrate block diagrams showing example configurations of four different embodiments (200a/200b/200c/200d) of a glucose level control system. As shown in FIG. 2A, a glucose level control system 200a may comprise an ambulatory medical device (AMD) 100 that includes a controller 202a having an electronic processor 204a and a memory 210a that stores instructions 208a executable by the processor 204a. The controller 202a and a pump 212 can be integrated into AMD 100. In some cases, the pump 212 can be an infusion pump for administering regulatory agent and/or counter-regulatory agent. In some implementations, the AMD 100 can include at least one pump 212. In some implementations, the AMD 100 may include at least one pump and a wireless connection interface or a transceiver. The AMD 100 can include a wireless electronic communications interface (e.g., a transceiver 214a) for wireless data (e.g., digital data) communications with external electronic devices. When the instructions 208a stored in the memory 210a are executed by the electronic processor 204a, the controller 202a can implement at least a portion of a control algorithm that generates dose control signals for one or more glucose level control agents based on time-varying glucose levels of the subject (e.g., received from a glucose level sensor 110 that is in communication with the AMD 100) and one or more control parameters. The dose control signals, when delivered to the pump 212, result in dosing operations that control the glucose level of the subject. The pump 212 may be controlled by at least one pump controller. In some examples, the pump controller may be included in the pump 212. The pump controller receives the dose control signals and controls the operation of the pump 212 based on the received dose control signals. In some embodiments the pump controller may be integrated with the pump. In various implementations, the controller may be included in the AMD 100, or in an external electronic device 108 or a remote computer 206, that are connected to the AMD 100 via wired or wireless communication links.

As illustrated in FIGS. 2A-2D, in some embodiments, a glucose level control system may comprise an ambulatory medicament pump AMD 100 (also referred to as ambulatory medicament pump or AMP) that includes a medicament pump, and at least one controller that controls the medicament pump. In various implementations, the controller may be included in the AMD 100, or in an external electronic device 108 or a remote computer 206, that are connected to the AMD 100 via wired or wireless communication links.

Figure 2B:
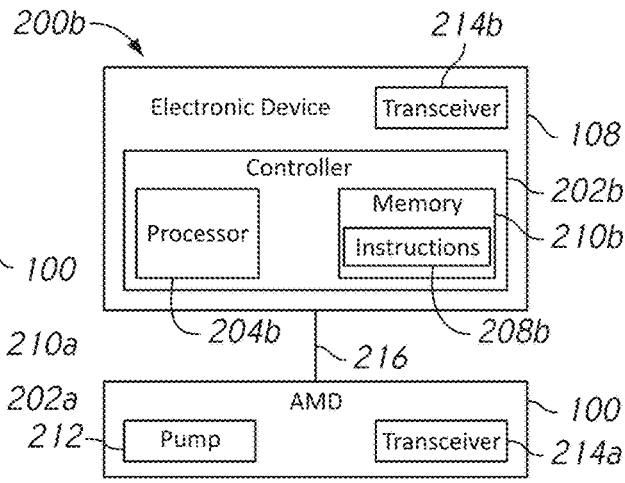
FIG. 2B shows a block diagram of another example glucose level control system.

As shown in FIG. 2B, a glucose level control system 200b can operate at least partially via execution of instructions 208b by an electronic processor 204b of an electronic device 108 (e.g., an external electronic device) separate from the AMD 100. The electronic device 108 can include a transceiver 214b capable of establishing a wireless data connection (e.g., digital data connection) to the AMD 100, and a controller 202b can implement at least a portion of a control algorithm via execution of instructions 208b stored in memory 210b. When the instructions 208b stored in memory 210b are executed by the electronic processor 204b, the controller 202b can implement at least a portion of a control algorithm that generates dose control signals for one or more glucose level control agents based on time-varying glucose levels of the subject and one or more control parameters. The dose control signals, when delivered to the pump 212 (e.g., to the pump controller of the pump 212), result in dosing operations that control the glucose level of a subject. In some embodiments, the dose control signals are transmitted from the transceiver 214b of the electronic device 108 to the transceiver 214a of the AMD 100 over a short-range wireless data connection 216. The AMD 100 receives the dose control signals and passes them to the pump 212 for dosing operations.

Figure 2C:
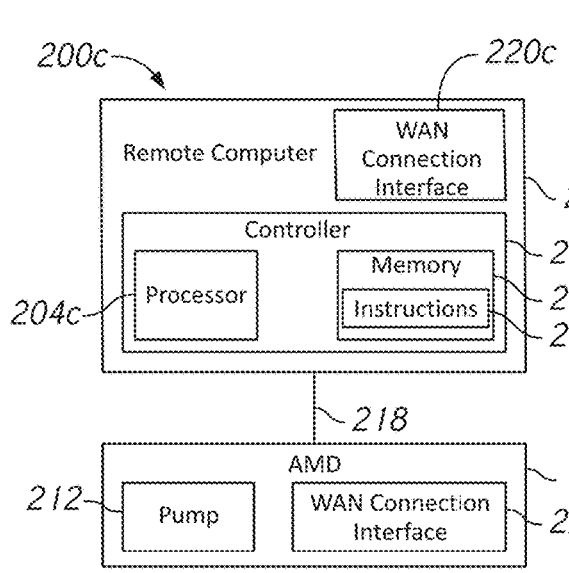
FIG. 2C shows a block diagram of another example glucose level control system.

As shown in FIG. 2C, a glucose level control system 200c may include a remote computer 206 that is in communication with the AMD 100 (e.g., an ambulatory medicament pump). In some cases, the glucose level control system 200c can operate at least partially via execution of instructions 208c on an electronic processor 204c integrated with a remote computer 206, such as, for example, a cloud service (e.g., remote computing environment). When the instructions 208c stored in memory 210c are executed by the electronic processor 204c, the controller 202c can implement at least a portion of a control algorithm that generates dose control signals for one or more glucose level control agents based on time-varying glucose levels of the subject and one or more control parameters. The dose control signals, when delivered to the pump controller of the pump 212 may result in dosing operations that control the glucose of a subject. In some embodiments, the dose control signals are transmitted from the remote computer 206 via WAN connection interface 220c to the AMD WAN connection interface 220a over an end-to-end wireless data connection 218. The AMD 100 receives the dose control signals and passes them to the pump 212 (or the pump controller of the pump 212) for dosing operations.

Figure 2D:
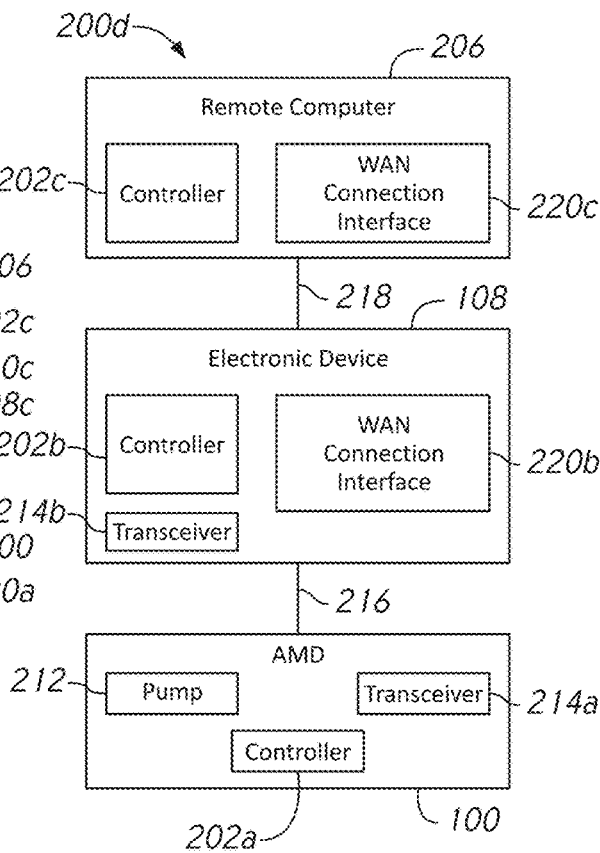
FIG. 2D shows a block diagram of another example glucose level control system.

As shown in FIG. 2D, a glucose level control system 200d may include a remote computer 206 that is in communication with an external electronic device 108 (e.g., an electronic device of the subject), and the AMD 100, which is in communication with the electronic device 108. In some implementations, the glucose level control system can have two or more controllers 202a, 202b, 202c (e.g., located in different subsystems) that cooperate to generate a dose control signal for dosing operations by the pump 212. For example, the remote computer 206 can transmit or receive data or instructions passed through a WAN connection interface 220c via a wireless data connection 218 to a WAN connection interface 220b of the external electronic device 108. The external electronic device 108 can transmit or receive data or instructions passed through a transceiver 214b via a short-range wireless data connection 216 to a transceiver 214a of an AMD 100. In some embodiments, the external electronic device 108 can be omitted, and the controllers 202a, 202c of the AMD 100 and the remote computer 206 cooperate to generate dose control signals that are passed to the pump 212 (or the pump controller that controls pump 212). In such embodiments, the AMD 100 may have its own WAN connection interface 220a to support a direct end-to-end wireless data connection to the remote computer 206.

Figure 3:
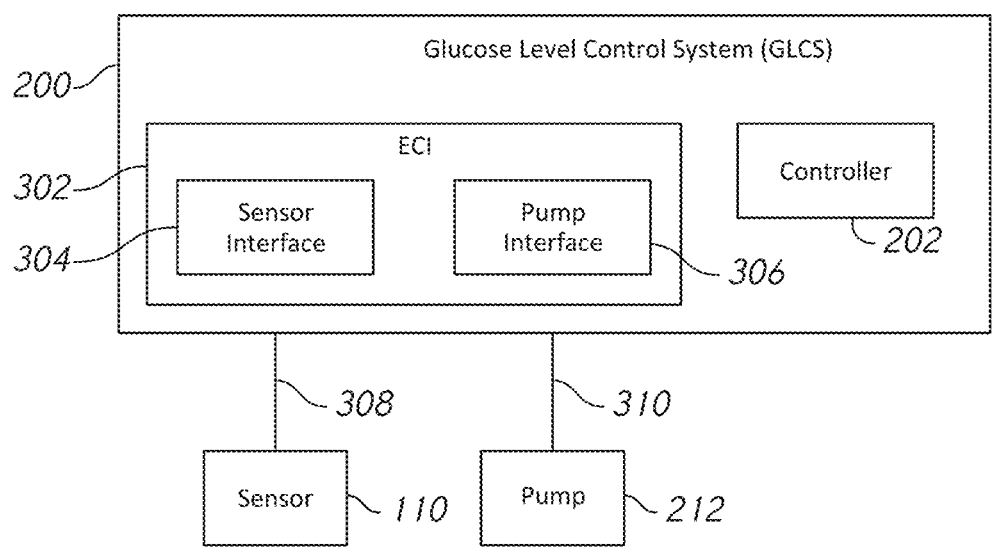
FIG. 3 is a schematic of an example glucose level control system that includes an electronic communications interface.

As shown in FIG. 3, in some embodiments, the glucose level control system (e.g., AMD 100), may include circuitry that implements an electronic communications interface (ECI) 302 configured to send and receive electronic data from one or more electronic devices. The ECI includes a sensor interface 304 configured to receive a glucose level signal from a sensor 110 such as a continuous glucose monitor (CGM). Some CGMs generate the glucose level signal at fixed measurement intervals, such as five-minute intervals. The sensor 110 can be operatively connected to a subject in order to generate a glucose level signal that corresponds to a glucose estimate or measurement of the subject. The glucose level signal can be used by the controller 202a to generate a dose control signal. The dose control signal can be provided to a pump 212 via a pump interface 306. In some embodiments, the sensor interface 304 connects to the sensor 110 via a short-range wireless connection 308. In some embodiments, the pump interface 306 connects to the pump 212 via a short-range wireless connection 310. In other embodiments, the pump interface 306 connects to the pump 212 via a local data bus, such as when the controller 202, the ECI 302, and the pump 212 are integrated into an AMD 100.

The controller 202a can be configured to generate the dose control signal using a control algorithm that generates at least one of a basal dose, a correction dose, and/or a meal dose. Examples of control algorithms that can be used to generate these doses are disclosed in U.S. Patent Application Publication Nos. 2008/0208113, 2013/0245547, 2016/0331898, 2018/0220942, and PCT Patent Application Publication No. WO 2021/067856 (referenced herein as the "Controller Disclosures"), the entire contents of which are incorporated by reference herein and made a part of this specification. The correction dose can include regulatory or counter-regulatory agent and can be generated using a model-predictive control (MPC) algorithm and/or other algorithms such as those disclosed in the Controller Disclosures. The basal dose can include regulatory agent and can be generated using a basal control algorithm such as disclosed in the Controller Disclosures. The meal dose can include regulatory agent and can be generated using a meal control algorithm such as disclosed in the Controller Disclosures. In some cases, a meal dose can be generated by the subject via a user interface of the glucose level control system 200a/200b/200c/200d. Additional aspects and improvements for at least some of these controllers are disclosed herein. The dose control signal can be transmitted to a pump interface 306 via the ECI 302 or can be transmitted to the pump interface 306 via an electrical conductor when the controller 202a is integrated in the same housing as the pump interface 306. Transmitting the dose control signal to the pump interface 306 may cause an infusion motor pump of an ambulatory medicament pump to administer medicament to the subject.

Figure 4A:
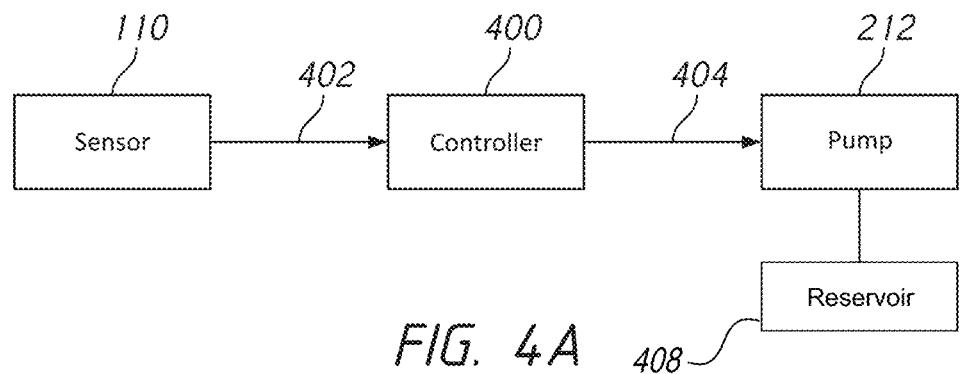
FIG. 4A shows a block diagram of an example glucose level control system in online operation mode.

FIG. 4A shows a block diagram of an example glucose level control system in online operation mode. In the example shown, the controller 400 can be configured to operate in "online mode" (or "automatic mode") during time periods when the controller 400 receives a glucose level signal 402 from the sensor 110 (e.g., a glucose level sensor). Alternatively or in addition, in some cases, the controller 400 may receive an insulin level signal from the sensor 110 or another sensor operatively connected to the subject. In online mode, the control algorithm generates a dose control signal 404 that implements regular correction doses based on values of the glucose level signal 402 (and/or an insulin level signal) and control parameters of the control algorithm. The pump 212 can be configured to deliver at least correction doses and basal doses to the subject without substantial user intervention while the controller 400 remains in online mode. In some examples, the ambulatory medicament pump 212 can include one or more medicament cartridges or can have an integrated reservoir 408 of medicament. The reservoir 408 may be integrated with the pump 212. A medicament stored in the reservoir 408 can be delivered to the subject by operation of the pump 212. In various embodiments, the operation of the pump 212 can be controlled by the controller 400.

Figure 4B:
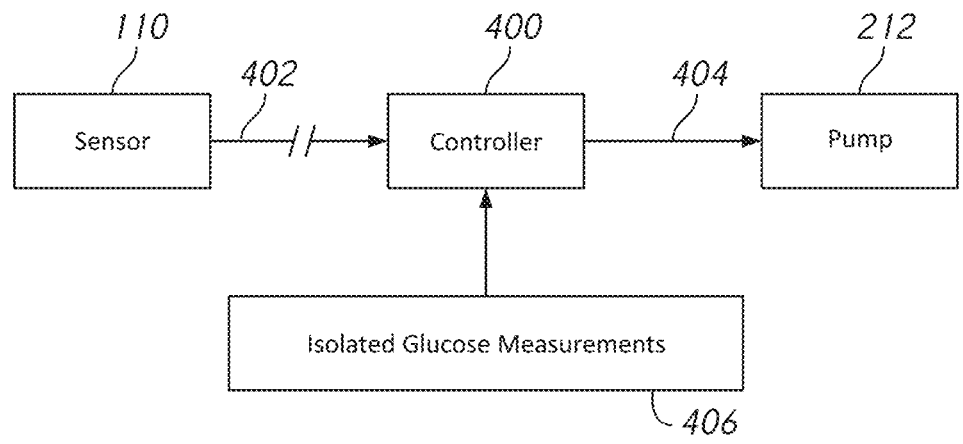
FIG. 4B shows a block diagram of an example glucose level control system in offline operation mode.

As shown in FIG. 4B, the controller 400 can be configured to operate in "offline mode" during time periods when the controller does not receive a glucose level signal 402 (and/or an insulin level signal) from a sensor 110, at least during periods when the glucose level signal 402 is expected but not received. In the offline mode, the controller may generate dose control signals as described in U.S. Pat. No. 10,543,313, the entire contents of which are hereby incorporated by reference in its entirety herein. In offline mode, the control algorithm generates a dose control signal 404 that implements correction doses in response to isolated glucose measurements 406 (such as, for example, measurements obtained from the subject using glucose test strips), and/or isolated insulin measurements, and based on control parameters of the control algorithm. The pump 212 is configured to deliver basal doses to the subject without substantial user intervention and can deliver correction doses to the subject in response to isolated glucose measurements 406 while the controller 400 remains in offline mode.

Example Ambulatory Medical Device (AMD)

In some embodiments, the ambulatory medical device (AMD) can be a portable or wearable device (e.g., an insulin or bi-hormonal medicament pump) such as an ambulatory medicament pump (AMP) that provides life-saving treatment to a subject by delivering one or more medicaments (e.g., insulin and/or glucagon) to a subject. Some AMDs may continuously monitor a health condition of a subject (e.g., glucose level, insulin level, heart rate, etc.) using a sensor (e.g., a glucose level sensor that can measure values corresponding to the glucose level, or an insulin level sensor that can measure values corresponding to the blood insulin level, etc.) and deliver therapy (e.g., one or more medicaments) to the subject based at least in part on the health condition of the subject and/or physiological characteristics of the subject. For example, an AMP (e.g., an insulin pump or a bi-hormonal pump) may monitor the glucose level in a subject using a Continuous Glucose Monitor (CGM) and adjust the dose or frequency of the medicament delivery (e.g., insulin or glucagon) accordingly. Certain AMDs may be worn by subjects constantly (e.g., all day), or for a large portion of the day (e.g., during waking hours, during sleep hours, when not swimming, etc.) to enable continuous monitoring of the health condition of the subject and to deliver medicament as necessary. In some embodiments, an AMD may be an ambulatory medicament device such as a medicament delivery pump. In some examples, an AMD may be a device that provides therapy in the form of electrical stimulation based on a health condition of a subject (e.g., heart rhythm or brain activity) determined using signals received from one or more sensors (e.g., heartbeat monitor or electrodes monitoring activity of the brain).

Figure 5A:
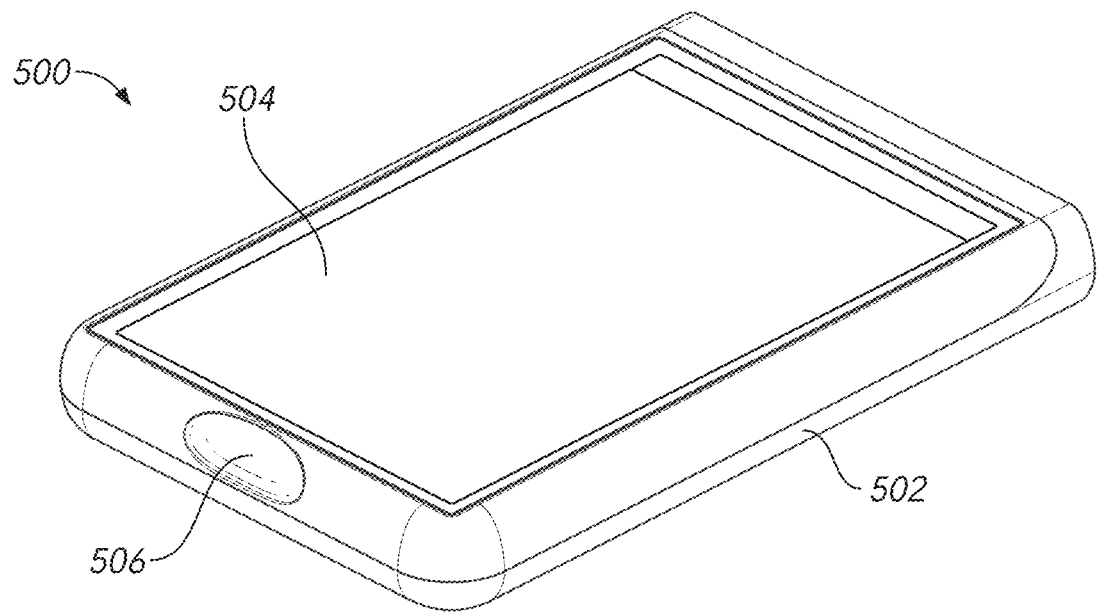
FIG. 5A illustrates a perspective view of an example ambulatory medical device.
Figure 5B:
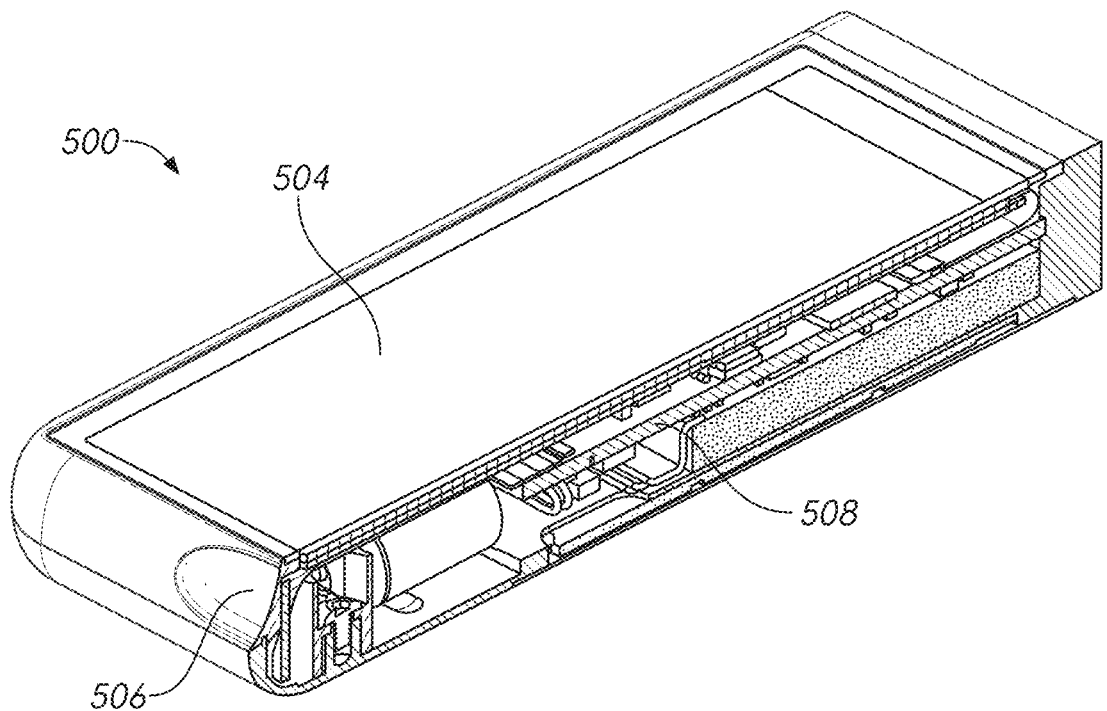
FIG. 5B illustrates a cross sectional view of the ambulatory medical device shown in FIG. 5A.

FIG. 5A illustrates a three-dimensional (3D) view of an example ambulatory medical device (AMD) 500 (such as an ambulatory medicament pump) comprising a housing 502 with a wake button 506 and a touchscreen display 504. FIG. 5B is an illustration of a cross sectional view of the ambulatory medical device 500 shown in FIG. 5A. In this example, all the electronic systems 508 are included inside the housing, for example, as a single integrated electronic board. The wake button 506 may be any type of button (e.g., capacitive, inductive, resistive, mechanical, etc.) that registers an input generated by user interaction with the wake button 506 to generate a wake signal. A wake signal may be a signal that activates a user interface of the AMP (e.g., a touchscreen display). The wake button 506, if touched, pressed, or held for a period, may generate the wake signal that activates the touchscreen display 504. In some embodiments, the wake signal is generated by a sensor (e.g., a biometric sensor such as a fingerprint reader or a retinal scanner, an optical or RF proximity sensor, and the like). In various embodiments, the wake signal may be generated by user interaction with the touch screen display 504 or with an alphanumeric pad (not shown). In some examples, wake signal may be generated based on facial recognition or other biometric indicia. In some examples, the wake signal may be generated by a wireless signal such as a signal generated by an RFID system or Bluetooth signals received from an electronic device, or by detection of movement using one or more motion sensors such as an accelerometer. The wake button 506, if touched, pressed, or held for a certain period of time, may generate a wake signal that activates the touchscreen display 504. In some examples, touches on the touchscreen display 504 are not registered until the wake button activates the touchscreen display. In some such examples, the AMD remains locked from accepting at least certain types of user interaction or settings modification until a gesture (such as, for example, any of the gesture interactions described with reference to any of the embodiments disclosed herein) is received after the touchscreen display 504 is activated by the wake button 506. In some examples, after the touchscreen display 504 has been activated by the wake signal, a passcode may be required to unlock the touchscreen display. In some examples, the AMD 500 includes a microphone and a speaker for receiving a sound (e.g., user's voice) and outputting a sound, respectively. In this case, a user can wake up the touchscreen by a voice input.

Figure 6:
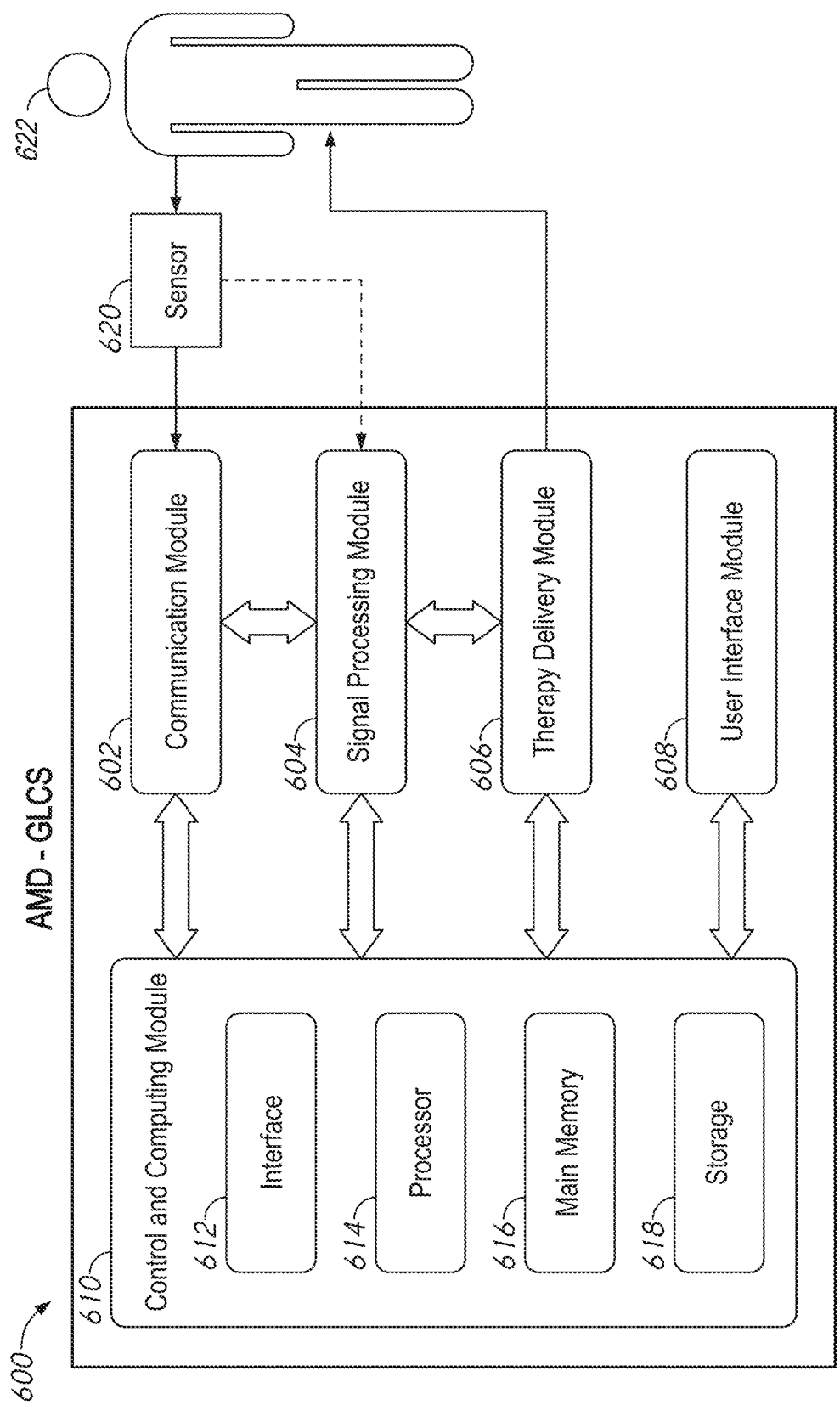
FIG. 6 illustrates an example ambulatory medical device or glucose level control system.

FIG. 6 illustrates different modules or systems that may be included in an example glucose control system (GLCS) or an AMD (e.g., AMD 500). As mentioned above, the AMD (or GLCS) 600 may comprise a complete glucose level control system (e.g., glucose level control system 200a/200b/200c/200d), or can include one or more components of a complete glucose level control system (e.g., a medicament pump, a transceiver, and/or a controller). In some implementations, the AMD 600 may include one or more modules or systems that can facilitate monitoring a subject's glucose level (e.g., glucose level in an interstitial fluid of the subject, or subject's glucose level), monitoring a subject's insulin level, managing the subject's diabetes, tracking a condition of the AMD 600, tracking usage of infusion sets, tracking usage of analyte sensors, and/or communicating with one or more computing systems (e.g., remote computing systems). For example, the AMD (or GLCS) 600 may include a mono-hormonal or bi-hormonal medicament pump configured to administer one or more types of insulin and, in some cases, counter-regulatory agent (e.g., Glucagon or other medicament that can reduce or address hypoglycemia). As another example, the AMD 600 may include one or more alarm generators, transceivers, touchscreen controllers, display controllers, encryption modules, etc. In some examples, two or more of the modules or systems may be integrated together inside a single housing 502 (as shown in FIGS. 5A and 5B). In some examples, one or more modules may be individual modules contained in separate housings that communicate with other modules or systems, and/or with the main unit via a wired or wireless communication links (e.g., Bluetooth). The modules included in the AMD 600 may include a communication module 602, signal processing module 604, a therapy (or medicament) therapy delivery module 606, a user interface module 608, and a control and computing module (CCM) 610.

In some cases, the control and computing module 610 can be the same or similar in at least some respects to the other glucose control system controllers described herein, including, for example, the controllers 202a-c, and 400 described with reference to FIGS. 2A-D and 4A-B. In some embodiments, one or more modules may comprise one or more single purpose or multipurpose electronic systems. In some such examples, one or more electronic systems may perform procedures associated with different features of the AMD 600. In some embodiments, one or more modules or systems may comprise a non-transitory memory that stores machine readable instructions and a processor that executes instructions stored in the memory. The memory may be a non-volatile memory, such as flash memory, a hard disk, magnetic disk memory, optical disk memory, or any other type of non-volatile memory. Further, types of memory may include but are not limited to random access memory ("RAM") and read-only memory ("ROM"). In some such examples, a system can be programed to perform different procedures each implemented based on a different set of instructions.

In some embodiments, the therapy delivery module 606 may be an external medicament delivery system that is in communication with the control and computing module 610, e.g., via the communication module 602 (e.g., via a wired or wireless link). In some embodiments, the therapy delivery module 606 may be included in the same housing as other systems and subsystems of the AMD 600. In some cases, AMD 600 may include a therapy delivery interface configured to transmit dose control signals to the external therapy delivery system and receive signals indicating the status of the external therapy delivery system and/or medicament delivery. In some case, the therapy delivery interface may be included in the communication module 602. In some cases, the external therapy delivery module may communicate with the AMD 600 using a wireless transceiver included in the external therapy delivery module.

The control and computing module (CCM) 610 may include one or more processors 614, a main memory 616, a storage 618 that may comprise one or more non-transitory memories and an interface 612 that enables data and signal communication among the components within the control and computing module 610 as well as communication between the control and computing module 610 and all other modules of the AMD. The main memory 616 and the storage 618 each may be divided into two or more memory locations or segments. The main memory 616 may communicate with the other components of the control and computing module 610 as well as other modules through the interface 612. Instructions may be transmitted to the main memory (e.g., from the storage) and the processor 614 may execute instructions that are communicated to the processor via the main memory 616. The storage 618 may store data while the control and computing module 610 is powered or unpowered. The storage 618 may exchange data with sub-systems within the control and computing module 610 as well as other systems (e.g., via the interface 612). In some cases, the. In some cases, the storage 618 may exchange data with the main memory directly or through the interface 612. The main memory 616 can be any type of memory that can store instructions and communicate them to the processor 614 and receive executed instructions from the processor 614. Types of main memory include but are not limited to random access memory ("RAM") and read-only memory ("ROM"). The processor 614 may be any type of general-purpose central processing unit ("CPU"). In some embodiments, the control and computing module may include more than one processor of any type including, but not limited to complex programmable logic devices ("CPLDs"), field programmable gate arrays ("FPGAs"), application-specific integrated circuits ("ASICs") or the like. The storage 618 can be any type of computer storage that can receive data, store data, and transmit data to the main memory 616 and possibly other modules of AMD 600. Types of storage 618 that can be used in the control and computing module 610 include, but are not limited to, magnetic disk memory, optical disk memory, flash memory and the like. The interface 612 may include data transfer buses and electronic circuits configured to support data exchange among different components within the control and computing module 610. In some embodiments, in addition to the data exchange between any of the systems of the control and computing module 610, the interface 612 may also support data and signal exchange with other systems as well as data exchange between any of the systems of the control and computing module 610.

The signal processing module 604 may include a plurality of interconnected electronic modules for signal conditioning and signal conversion (e.g., for A-to-D or ADC conversion and/or D-to-A or DAC conversion) configured to support communication and data exchange between different modules. For example, the signal processing module 604 may convert an analog signal received from the communication module 602 and convert it to a digital signal that can be transmitted to the control and computing module 610 (e.g., via the interface 612). In some cases, the control and computing module 610 may further process the digital signal and control one or more modules based on the processed signal. As another example, the signal processing module 604 may receive a digital control signal from the control and computing module 610 and convert it to a dose control signal (e.g., an analog dose control signal) that can be transmitted to the therapy delivery module 606, for example, to control one or more infusion pumps included in the therapy delivery module.

In some embodiments, the therapy delivery module 606 may comprise one or more infusion pumps configured to deliver one or more medicaments (e.g., insulin, glucagon, etc.) to a subject 622 and a pump controller that may activate the infusion pumps upon receiving dose control signals. In some examples, the medicaments may be stored in one or more medicament cartridges housed in the therapy delivery module 606. In some examples, medicaments may be stored in a cavity of the therapy delivery module 606. In some examples, the therapy delivery module 606 may include electronic and mechanical components configured to control the infusion pumps based on the signals received from control and computing module 610 (e.g., via the signal processing module 604 or the interface 612). In some examples, the therapy delivery module 606 may include a pump controller that controls the infusion pumps upon receiving dose control signals from the control and computing module 610.

The user interface module 608 may include a display to show various information about the AMD 600, for example, medicament type and delivery schedule, software status, and the like. The display may show graphical images and text using any display technology including, but not limited to OLED, LCD, or e-ink. In some embodiments, the AMD 600, may include a user interface (e.g., an alphanumeric pad) that lets a user enter information or interact with the AMD 600 to modify the settings of the AMD 600, respond or submit to request(s) for certain actions (e.g., modifying control parameters, entering manual meal doses, ordering infusion sets, sensors, transmitters, replacement components). In some cases, the user interface module 608 may include a user interface that allows a user to install or update a software. The alphanumeric pad may include a multitude of keys with numerical, alphabetical, and symbol characters. In certain embodiments, the keys of the alphanumeric pad may be capacitive or mechanical. The user may be a subject 622 receiving medicament or therapy, or may be another user, such as a clinician or healthcare provider, or a parent or guardian of the subject 622. In some embodiments, the AMD 600 may include a touchscreen display that produces output and accepts input enabling a two-way interaction between the user and the AMD 600. The touchscreen display may be any input surface that shows graphic images and text and registers the position of touches on the input surface. The touchscreen display may accept input via capacitive touch, resistive touch, or other touch technology. The input surface of the touchscreen display can register the position of touches on the surface. In some examples, the touchscreen display can register multiple touches at once. In some embodiments, the user interface may be a digital keypad displayed on a user interface screen. For example, an alphanumeric pad comprising user-selectable letters, numbers, and symbols may be displayed on the touchscreen display. In some examples, the touchscreen may present one or more user-interface screens (e.g. as described in reference to FIGS. 20, 26, and 28) to a user enabling the user to modify one or more therapy settings of the ambulatory medicament device, order additional infusion sets, order additional analyte sensors, order a replacement AMD, etc. In some examples, a user-interface screen may comprise one or more parameter control elements. Further, a user-interface screen may include one or more user input elements displayed on the screen that enable a user to interact with the AMD 600. In some examples, a user-interface screen may comprise one or more therapy control elements (e.g., displayed on the touchscreen display) enabling a user or the subject to access therapy change controls and modify therapy settings by interacting with these control elements. For example, the user can modify the therapy settings by changing one or more control parameters using the corresponding therapy control elements. In some embodiments, a therapy control parameter may include any parameter that controls or affects the volume, duration and/or the frequency of medicament doses delivered to the subject.

In some embodiments, the user interface module 608 may include an audio or auditory sensor and system such as a speaker and a microphone for voice recognition. In this case, a user can verbally interact with the AMD 600 without physically touching the device. In addition, the verbal interaction may reduce gesture motion of the user for controlling the AMD 600. In various embodiments, "voice recognition" may refer to identifying the speaking user and/or the speech of the user. Recognizing the user who is speaking can simplify the task of translating speech in systems that have been trained on a specific user's voice or it can be used to authenticate or verify the identity of a speaker as part of a security process.

In some embodiments, the communication module 602, may include one or more wireless transceivers, one or more antennas and one or more electronic systems (e.g., front end modules, antenna switch modules, digital signal processors, power amplifier modules, etc.) that support communication over one or more communication links and/or networks. In some examples, each transceiver may be configured to receive or transmit different types of signals based on different wireless standards via the antenna (e.g., an antenna chip). The transceiver may support communication using a low power wide area network (LPWAN) communication standard. In some examples, the transceiver may support communication with wide area networks (WANS) such as a cellular network transceiver that enables 3G, 4G, 4G-LTE, or 5G. Further, the transceiver may support communication via a Narrowband Long-Term Evolution (NB-LTE), a Narrowband Internet-of-Things (NB-IoT), or a Long-Term Evolution Machine Type Communication (LTE-MTC) communication connection with the wireless wide area network. In some cases, the transceiver may support Wi-Fi® communication. In some cases, one or more transceivers may support data communication via Bluetooth or Bluetooth Low Energy (BLE). In some examples, the transceiver may be capable of down-converting and up-converting a baseband or data signal from and to a wireless carrier signal. In some examples, the communication module may wirelessly exchange data between other components of the GLCS or AMD 600 (e.g., an analyte sensor such as a glucose level sensor or insulin level), a mobile device (e.g., smart phone, a laptop, a tablet, and the like), a Wi-Fi network, WLAN, a wireless router, a cellular tower, a Bluetooth device and the like. The antenna may be capable of sending and receiving various types of wireless signals including, but not limited to, Bluetooth, LTE, or 3G. In some examples, the communication module 602 may support direct communication between the AMD 600 and a server or a cloud network. In some examples the AMD 600 may communicate with an intermediary device (e.g., a smart phone). In some embodiments, the AMD 600 may include an eSIM card that stores the information that may be used to identify and authenticate a mobile subscriber. The eSIM card may enable the AMD 600 to function as an IOT device that can communicate over a network that supports communication with IoT devices. In other embodiments, the AMD 600 may be configured to transmit data using a narrowband communication protocol such as 2G or EDGE. Using the cellular connection, the ambulatory medical device may be paired with the mobile device at inception and permit real-time data access to the ambulatory medical device by a healthcare provider. In certain implementations, the ambulatory medical device may include a geolocation receiver or transceiver, such as a global positioning system (GPS) receiver.

In some embodiments, the communication module 602 may include a Near Field Communication (NFC) subsystem that enables contactless data exchange between the AMD 600 and an electronic device located in the vicinity of the AMD 600. In some cases, a glucose sensor interface in the communication module 602 may be configured to receive glucose level signals from an analyte sensor, a glucose level sensor, and/or insulin level sensor, hereinafter referred to as "subject sensor" 620. In some cases, the subject sensor 620 can be a wearable continuous glucose monitor (CGM) that is operatively connected to the subject 622. For example, the subject sensor 620 may be attached to a site on subject's body using adhesive patch holds and may include a cannula that penetrates the subject's skin allowing the sensor to take glucose readings in interstitial fluid and generate glucose level signals that indicate the level of glucose in subject's blood. In some cases, the glucose sensor interface may receive the glucose level signals from the subject sensor 620 via a wired or wireless link. As previously stated, each of the AMDs described herein may include one or more of the embodiments described with respect to the other AMDs unless specifically stated otherwise.

Example Operation of the AMD or GLCS

In some embodiments, an AMD or GLCS (e.g., the AMD or GLCS 600) may continuously, periodically (e.g., every 5 minutes, every 10 minutes, etc.), or intermittently receive information associated with one or more parameters (e.g., parameter values) that are correlated with a health condition of the subject 622 (e.g., glucose level, glucose level trend, insulin level, insulin level trend, heart rate, body movement indicia, etc.). This information may be encoded to a signal provided to AMD 600 by a subject sensor 620 (e.g., a glucose level sensor or an insulin sensor) that is connected to the AMD 600 via a wired or wireless link (e.g., Bluetooth). In some cases, the subject sensor 620 can be a wearable sensor. In some cases, the subject sensor 620 may measure an analyte in the interstitial fluid of the subject 622).

In some implementations, AMD 600 may receive glucose level signals that carry encoded glucose level data usable to determine a glucose level of the subject 622, from a continuous glucose monitor (CGM). In some examples, a CGM may be a wearable biomedical sensor that measures a glucose level in an interstitial fluid of the subject. A glucose level signal may comprise an electronic signal indicative of a measured glucose level of the subject 622. In some cases, the measured glucose level associated with a glucose level signal may be correlated with a physiological glucose level of the subject. The physiological glucose level of the subject can be a concentration of glucose in subject's blood or an interstitial fluid in part of the subject's body (e.g., expressed in milligram per deciliter (mg/dl)). In some cases, the concentration of glucose in the interstitial fluid of the subject's body may be correlated to a blood glucose level of the subject.

In some examples, the AMD (or GLCS) 600 may receive glucose level signals from the subject sensor 620 via a glucose sensor interface (e.g., via a wired or a wireless data connection). In some cases, the glucose sensor interface may be included in the communication module 602. In some cases, the glucose sensor interface may be separate from the communication module 602. In some examples, the glucose level signal sent by the subject sensor 620 may be received by the communication module 602 and transmitted to the control and computing module (CCM) 610 where it is analyzed to determine whether medicament should be delivered to the subject. In some cases, the communication module 602 may transmit the glucose level signal to a signal processing module 604 that converts the glucose level signal to a machine-readable signal (e.g., a digital signal) and transmits the converted signal to the CCM 610. In some examples, a second communication system may be included in the AMD (or GLCS) 600 to communicate with the subject sensor 620.

If it is determined that medicament should administered to the subject 622, the CCM 610 may determine the dosage and type of medicament to administer based at least in part on the information received from the subject sensor 620. Subsequently, the control and computing module 610 may send a signal to the therapy delivery module to initiate the medicament delivery the subject.

In some cases, the control and computing module 610 may determine a dose and a delivery time of a medicament (e.g., insulin or glucagon) based at least in part on the glucose levels of the subject 622 decoded from the received glucose level signals. Subsequently, the control and computing module 610 may generate a dose control signal and transmit the dose control signal to the therapy delivery module 606 of the AMD 600, to cause the delivery of the determined dose of medicament at the determined delivery time to the subject 622. In some examples, the dose control signal may be received by the pump controller that controls the operation of the infusion pump. In some embodiments, the control and computing module 610 may generate the dose control signal using a control algorithm. In some cases, the control algorithm may comprise a model-predictive control (MPC) algorithm and/or a basal control algorithm.

In some embodiments, the CCM 610 may perform one or more procedures by using the processor 614 (or a plurality of processors) that executes the instructions stored in the CCM 610 (e.g., in the main memory 616). In some embodiments, one or more procedures within the control and computing module 610 may be executed by the processor 614 (or a plurality of processors) based on instructions provided by one or more software applications installed in one of the memories (e.g., the main memory 616) of control and computing module 610. These procedures include, but are not limited to, determining the need for delivering medicament, determining the type of medicament and the required dose, determining the rate of delivery during a therapy session, providing information (e.g., device status, infusion set usage, infusion set status, subject sensor usage, transmitter status, transmitter usage, subject sensor 620 status, next delivery time, level of certain analytes in the subject's blood and the like) via the user interface module 608, processing the data received from the subject sensor 620, managing access to control parameters (e.g., by controlling one or more therapy change controls that may be provided by the user interface module 608), and the like.

In some cases, an amplitude of the glucose level signal (e.g., an analog electronic signal) may be proportional to or correlated to the glucose level of the subject. In some cases, a glucose level signal may carry glucose level data (e.g., measured glucose level values or information usable to determine glucose level values). Further, the glucose level signal, generated by the glucose sensor (e.g., subject sensor 620), may include encoded glucose level data. In some examples, the glucose level signal may comprise glucose level data encoded onto a carrier signal, for example, using amplitude modulation, frequency modulation, and/or phase modulation. In some examples, the glucose level signal can be an analog signal encoded with data associated with the glucose level data. The glucose level signal can be transmitted via a wireless link (e.g., a Bluetooth link, a Wi-Fi link, a cellular data link, and/or other wireless network infrastructure) and received by a wireless receiver included in a glucose sensor interface. In some cases, the glucose sensor interface can be included in the communication module 602. In some cases, the glucose sensor interface can a separate module or system in the AMD 600. Subsequently, the glucose sensor interface may direct the glucose level signal to the control and computing module 610. In some examples, the control and computing module 610 may decode the glucose level data from the glucose level signal. In some embodiments, the glucose level data may be decoded by the glucose sensor interface. In other embodiments, the glucose level signal sent by the subject sensor 620 may be received by the communication module 602 and transmitted to the control and computing module 610.

In some embodiments, a first software application may control the AMD 600 and may be installed on the main memory 616 while a second software application (e.g., a different version of the first software application or an alternative control application) may be stored in the storage 618. In some cases, the first and second software applications may be both installed in the main memory 616 but in different locations or segments. In some such cases, the control of the device can be switched from the first software application to the second software application in response to a trigger (e.g., a command, an error, receipt of an authorization indication, etc.).

In some embodiments, the AMD 600 may deliver multiple types of therapies that are selectable by a user or the control and computing module 610. For example, the AMD 600 may deliver the therapy of infusing insulin into a user and may also deliver the therapy of infusing glucagon into a user. In some examples, the user interface may include an option for the user to select an infusion of insulin, glucagon, or both insulin and glucagon. In other embodiments, other hormones, liquids or therapies may be delivered. In some examples, the software application executed by the control and computing module 610, may determine the type of hormone that needs to be delivered, at least partly based on the information received from the sensor 620.

In some embodiments, the AMD 600 may provide the user or the subject 622 a user interface (e.g., via a touch screen display) that allows delivery of glucose therapy to the subject 622 upon request. For example, upon the user's request via a menu, the user interface module 608 may generate a medicament bolus or medicament burst user interface on a touch screen display that allows the user to enter a dose of a medicament for immediate delivery. In some cases, a regulatory medicament bolus can be a meal bolus requested and delivered in anticipation of food intake. In some cases, a counter-regulatory medicament bolus can be delivered in anticipation of physical activity (e.g., swimming or running), or similar to how a meal bolus can be delivered in anticipation of food intake. In some embodiments, a medicament bolus may be requested and delivered to maintain the glucose level of the subject 622 within a set range during a period of time when the subject 622 does not receive therapy from the AMDs 600. For example, the subject 622 may request a medicament bolus via the medicament burst user interface when he or she expects to be disconnected from the AMDs 600 for a period.

Communication and Networking

Figure 7:
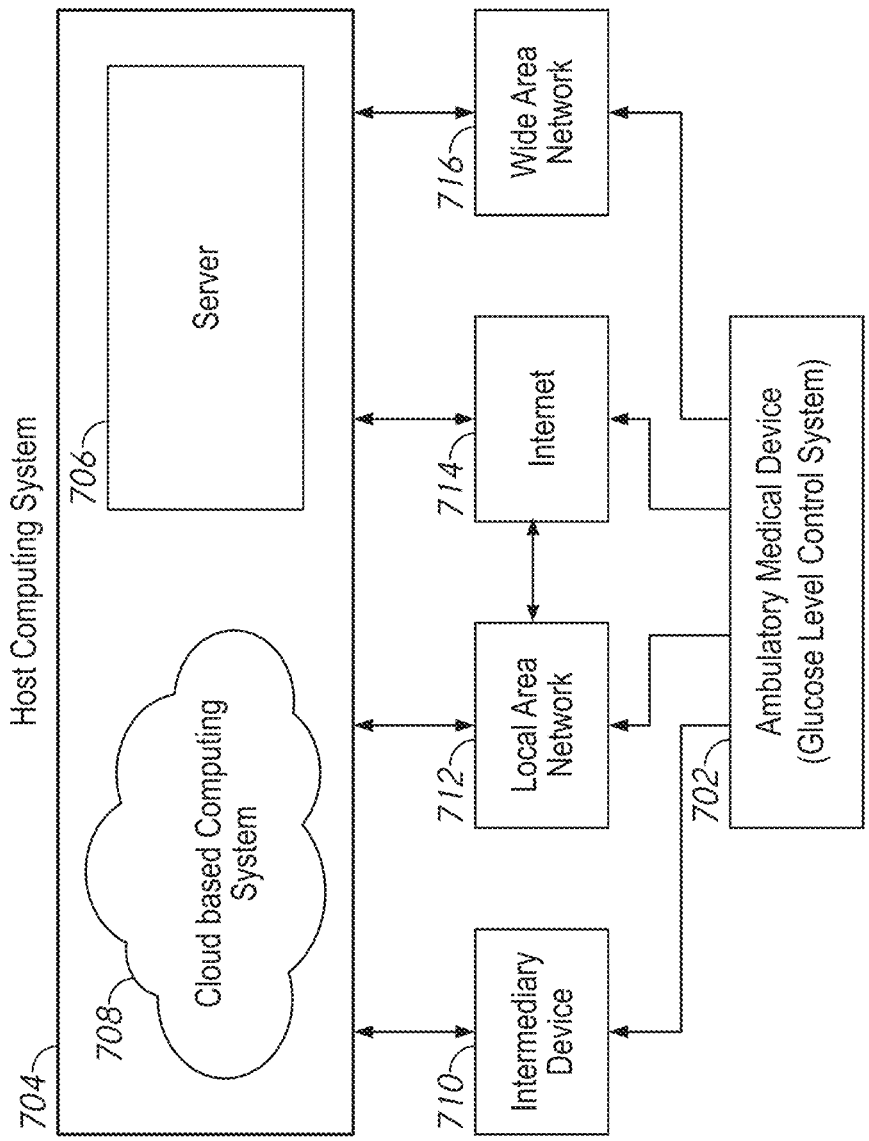
FIG. 7 illustrates various methods and links that AMD may establish a connection with a host computing system.

FIG. 7 illustrates various methods and links or communication paths that an AMD (or GLCS) 702 may use to communicate (e.g., by establishing a connection) with a host computing system 704 (e.g., a remote computing environment), for example, to obtain an application update, send and/or receive therapy reports, facilitate ordering of infusion sets, analyte sensors, transmitters, and/or a new AMD, receive passcodes, send and receive electronic requests, receive values of control parameters, send or receive aggregate reports, and the like. In some examples, the host computing system 704 may be a server 706 or a computing system within a cloud based computing system 708 or other networked computing environments, that provide networking computing services (e.g., network storage, application hosting, and/or network processing services). In some examples, the host computing system 704 may be part of a data center (e.g., the data center of a health care provider).

In some cases, the host computing system 704 may be a computing system of a healthcare provider, a healthcare professional, a manufacturer, or a payer (e.g., an insurance company). In some examples, the host computing system 704 may be part of a patient data network or be connected to a patient data network. The patient data network may comprise a local storage of patient data or a cloud storage. In some cases, the host computing system 704 may be in communication with a data center of a healthcare provider, a health institute, or a payer.

In some embodiments, the AMD (or GLCS) 702 may establish a connection (e.g., using its communication module) with the host computing system 704 through an intermediary device 710, such as a desktop computer, a mobile device (e.g., a smart phone, a laptop, and the like). In some cases, the server 706 can be an electronic device can be a desktop computer, a mobile phone, a notebook, or any electronic device capable of establishing a data connection with the AMD 702 and receiving data from the AMD 702.

In some examples, the AMD (or GLCS) 702 may establish a connection (e.g., using its communication module)

with the host computing system 704 to obtain the application update. In some such examples, the AMD may receive the application update from an intermediary device 710 of a user (e.g., a clinical computer, a subject's home computer, a smartphone, etc.) that has obtained a copy of the application update from the host computing system directly or via internet 714. In some examples, the AMD 702 may communicate with the host computing system 704 through a local area network (LAN) 712 through a Wi-Fi connection. Alternatively, or in addition, the AMD 702 may establish a communication connection to the host computing system 704 via a wide area network (WAN) 716. In some examples, the communication between the ambulatory medical device and the cloud computing system 704 may be encrypted.

In some embodiments, the AMD 702 may establish a direct end-to-end communication connection over a wide area network (WAN) 716 (e.g., a cellular network) with the host computing system 704. In some cases, a direct-end-to-end communication connection may be a connection that does not involve a local device, a device that is accessible by the user or the subject (besides the AMD 702), a Wi-Fi network, a short range wireless link (e.g., Bluetooth), or the like. In some such cases, the direct end-to-end communication may pass through one or more wireless systems (e.g., receivers, transmitters or antenna) of a WAN.

In some examples, the host computing system 704 may establish the end-to-end connection by receiving a public key from the AMD 702. In some examples, the public key and a private key stored in the host computing system 704 can be used to permit the host computing system 704 to decrypt data communications transmitted by the AMD 702. In some examples, the host computing system 704 may send a public key to the AMD 702 that allows the AMD 702 to encrypt data (e.g., therapy data). Up on receiving the encrypted data from the AMD 702 the host computing system 704 may use a private key stored in its memory, to decrypt the data.

In some implementations, the host computing system 704 may establish a direct end-to-end data connection with the AMD 702 based on receiving a device identifier associated with the AMD 702. The device identifier may be a unique identifier specific to the AMD 702. In some implementations, establishing the direct end-to-end data connection may include determining that the ambulatory medical device is permitted to communicate with the computing system 704 based at least in part on the device identifier. In some examples, the device identifier may be initially provided to the networked computing environment prior to provisioning of the ambulatory medical device to the subject. For example, the device identifier may be initially provided to the networked-computing environment as part of a manufacturing process for manufacturing the AMD 702. In some examples, the device identifier may include or may be based on one or more of an Internet Protocol (IP) address, a Media Access Control (MAC) address, a serial number, or a subject identifier of a subject that receives therapy from the AMD 702. In some cases, the subject or a user may establish (or initiate) the direct end-to-end data connection with the computing system. In some cases, the direct end-to-end data connection may be initiated or established without action by the subject or the user. For example, the direct end-to-end data connection may occur automatically at particular times or when the AMD 702 is in particular locations. This automatic connection may occur using information supplied to the AMD 702 at a time of manufacture, shipment, sale, or prescription to the subject. In some cases, the wide area network may include, or may communicate with, the internet 714.

In some embodiments, the AMD 702 may be configured to communicate via the wide area network during manufacture or prior to being provisioned to the subject. For example, a manufacturer can register the AMD 702 with a wireless wide-area network provider (e.g., T-Mobile or Verizon) and provide an International Mobile Equipment Identity (IMEI) number or serial number for the AMD 702 to the network provider. Moreover, any fees can be negotiated or paid between the manufacturer and the network provider or between the subject's health insurance and the network provider. Thus, AMD 702 may be configured to communicate via the network of the network provider without any action by the subject.

In some other examples, the AMD 702 may be pre-registered or authenticated with a computing network of the cloud services provider as part of the manufacturing process or before the AMD 702 is provided to the subject. This enables the AMD 702 to communicate over the wide area network with the computing system of the cloud services provider from day one without any or with minimal configuration by the subject. In some cases, a user, such as a healthcare provider may register or associate the AMD 702 with the subject at the computing network of the cloud services provider.

To enhance security, in some cases, the AMD 702 may use a whitelist that identifies via a unique identifier (e.g., via an IP address, a MAC address, or a URL) permitted cloud servers or computing system of the cloud computing system. Further, the cloud computing service may have a whitelist that uses unique identifiers to specify AMD 702s and/or other computing systems (e.g., remote display systems) that are permitted to communicate with the cloud computing system. The whitelist may be stored in a memory of the AMD 702. Further, the whitelist may be configured during manufacture of the AMD 702. For example, the whitelist may be configured with connection information to establish communication with one or more computing systems of a networked-computing environment. Further, the AMD 702 may be configured to execute the specific computer-executable instructions to at least obtain an address of the computing system from the whitelist and to establish a direct end-to-end data connection to the computing system of the networked-computing environment via a wireless wide area network using the address. Moreover, the AMD 702 may be configured to execute the specific computer-executable instructions to at least receive a public key from the computing system of the networked-computing environment.

Alternatively or in addition, the AMD 702 may include a blacklist, or restricted list, that identifies systems the AMD 702 is not permitted to access. The blacklist may be updated as more restricted or unsafe websites, network accessible systems, or computing systems are identified. Similarly, the whitelist may be updated over time if approved systems are added or removed. Further, the cloud based computing system 708 service may have a whitelist, or approved list, that uses unique identifiers to specify AMD 702 and/or other computing systems (e.g., remote display systems) that are permitted to communicate with the cloud based computing system 708. Moreover, as with the AMD 702, the cloud based computing system 708 may have a blacklist or restricted list that identifies AMDs, or other computing devices, that are not permitted to access the cloud computing services. An AMD may be added to the restricted list if it is decommissioned, damaged, or is no longer in possession of the subject. It may be desirable to remove an AMD's access to the cloud computing service to help protect private or personal data of a subject. Advantageously, establishing a connection based on a whitelist may enhance the security of the communication link established between AMD 702 and the cloud based computing system 708 or other computing systems. In addition to the identifiers that identify permitted computing systems for access by the AMD 702 and/or permitted AMDs for access by a cloud or networked computing service, the whitelist may include any information that may facilitate access to the systems identified on the whitelist. For example, the whitelist may include access information (e.g., usernames, passwords, access codes, account identifiers, port identifiers, a shared secret, public keys, etc.). It should be understood that the whitelist may include different information depending on whether the whitelist is publicly accessible, accessible by only the AMD, accessible by authorized users or devices, etc. For example, a publicly accessible whitelist or a whitelist accessible by more than one authorized system or user may not include passwords or access codes.

Software Update of Ambulatory Medical Device

It is often the case that a computer application is updated after it is released. In some cases, the application is updated to patch bugs or vulnerabilities. In some cases, the application is updated or replaced with a new version to introduce new features or improve existing features. Regardless of the reason, it is often the case that an application is shutdown or is not executing while the application is updated. For most applications, there is minimal to no harm in shutting down or not executing an application while it is updated or otherwise replaced. For example, it is inconsequential that a video game, word processing, or edutainment application is not executing while it is updated.

However, it can be inconvenient, harmful, or, in some cases, life-threatening to cause an application on an ambulatory medical device to cease executing while it is updated or replaced by a new version of the application. If a subject or subject that is receiving therapy from the ambulatory medical device enters a state where therapy is desired or needed while an application or control software of the ambulatory medical device is being updated or replaced, harm may occur to the subject. For example, suppose the ambulatory medical device is an insulin pump, such as those that may be used by a type-1 diabetic. If the insulin pump becomes inoperative due to a software update process occurring at a time when a subject's glucose level exceeds a set-point or target range, the user may not receive a necessary insulin bolus from the ambulatory medical device. Thus, it is desirable to modify reduce or eliminate disruption to subject care or therapy when updating applications, such as control software, of an ambulatory medical device.

In some embodiments, an ambulatory medical device includes a computer-implemented method of updating an application executing on the ambulatory medical device without interrupting, or while causing minimal interruption, to therapy provided by the ambulatory medical device to a subject or subject. The method may generally be performed by a hardware processor, (e.g., a controller, and the like), included in an ambulatory medical device and based on a set of instructions that may be stored, for example, in a non-transitory memory of the AMD. The application update may be a new version of the application, a replacement or substitute application, or an application patch. In some examples, the application may be an older version of the application that has been used by instances of the ambulatory medical device for more than a threshold period of time and has experienced less than a threshold number of faults. The application update may be stored in one or more host computing systems. The application update may be pushed to the host computing systems by a company that manages or manufactured the ambulatory medical device or other software company that is authorized by the manufacturer or licensee of the device.

Figure 8:
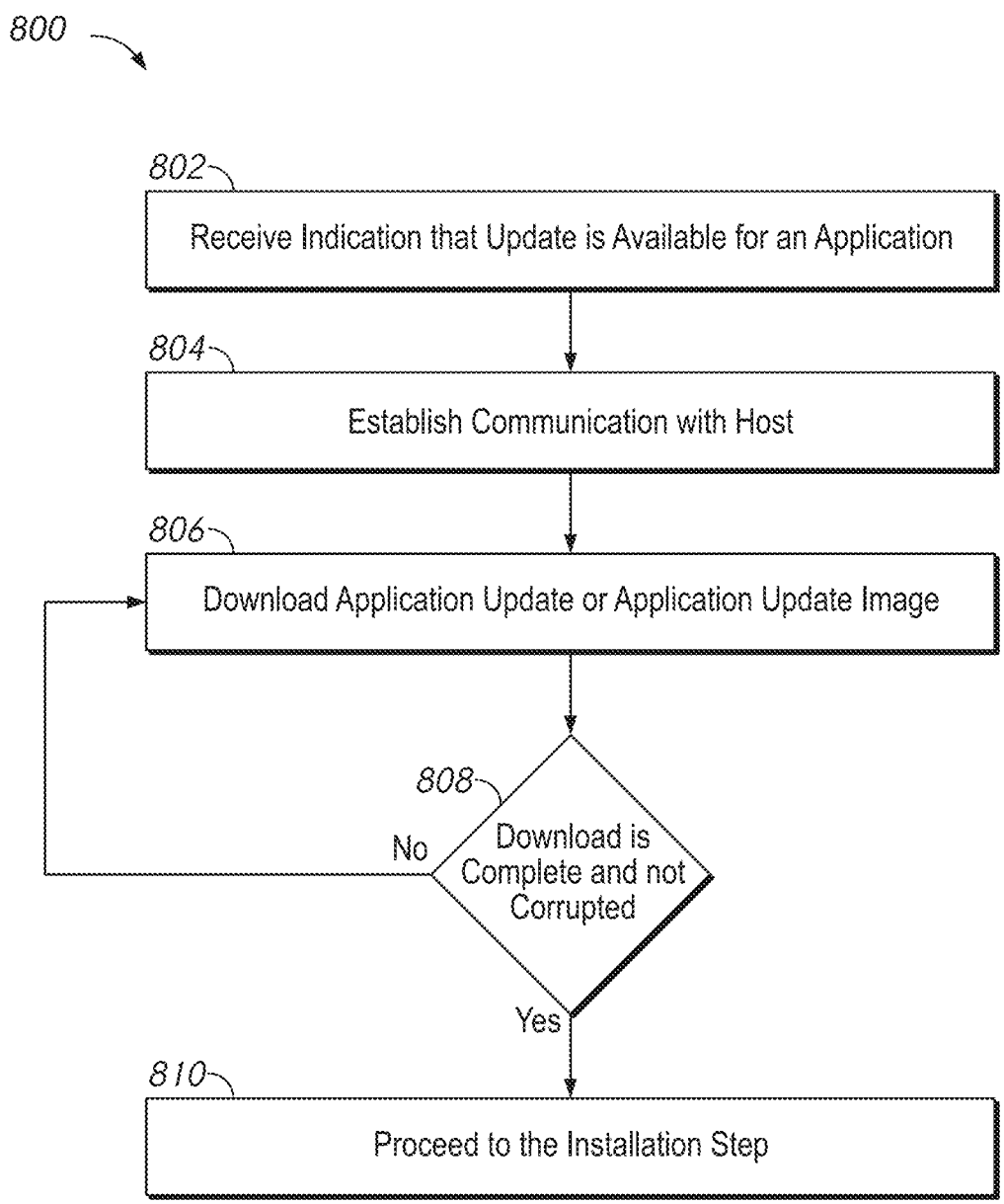
FIG. 8 is a flow diagram showing an example of a computer-implemented method that may be used by an AMD in order to detect and download an application update.

FIG. 8 is a flow diagram showing an example of a computer-implemented method or process 800 that may be used by the AMD in order to detect and download an application update from a host computing system or other computer readable media in which a copy of the application update is stored. In certain aspects, an ambulatory medical device, such as a medicament delivery device or a medicament pump may receive an indication 802 that an update is available for an application, such as control software or other software that controls or facilitates the operation of the ambulatory medical device. The software update may include a binary executable file for various processors of the ambulatory medical device. In some embodiments, the indication may be a determination made by a software or hardware module included in an ambulatory medical device of AMD. For example, the AMD may access a particular host computing system (e.g., using its communication module) to determine whether an update is available, based on set of update trigger conditions stored in a memory of AMD. The set of update trigger conditions may be defined/changed by a user and/or received by AMD from a host computing system. For example, a trigger condition may push the AMD to periodically search for an update at time intervals set by the user or received from a host computing system. Alternatively, or in addition, in response to a trigger (such as a user command, the replacement of medicament within the ambulatory medical device, the connecting to a particular network, or the connecting to a network using a particular communication transceiver (e.g., Wi-Fi) or the like), the ambulatory medical device may access a particular host computing system to determine whether an update is available to an application installed on the AMD. The software to be updated on the AMD may be currently executing on the ambulatory medical device or may be executed in future.

In some embodiments, the indication may a query received from the host computing system that may access the AMD to read and compare the software versions and the hardware configuration (and warranty) to determine the eligibility of the ambulatory medical device for a software upgrade. The serial number, the model number, and/or the software version may be used to determine software upgrade eligibility. In some embodiments, the eligibility may be determined based on the geoposition of the device and/or whether the device is connected to a local area network 712 (such as for example, a Wi-Fi network) or a wide area network (such as, for example, a cellular network). In various embodiments, the ambulatory medical device may have an antenna that provides the device with GPS, text or picture messaging, telephone calling, and data transfer capabilities. Software update may be provided on a limited release with test groups of varying sizes, e.g., 1-100 or 1-1000 or 1-10000. There may be a phase rollout of the software updates. In some embodiments, the AMD may respond to an upgrade eligibility request with a version of the first software or a model identification information of the ambulatory medical device or a manufacturing date of the ambulatory medical device.

If it is determined that an update is available to the application executing on the ambulatory medical device, the ambulatory medical device may establish a connection 804 to a host computing system that hosts the update to the application. Such connection may be established via one or more links or methods discussed above with reference to FIG. 7.

Once a connection is established, the ambulatory medical device may download the application update or application update from the host computing system over the connection 806. In some examples, the ambulatory medical device may download an image of the application update from the host computing system. While the application update is being downloaded, an existing version of the application on the ambulatory medical device may continue to execute. Thus, there is little or no interruption to therapy provided by the ambulatory medical device while the application update is being obtained by the ambulatory medical device.

Once the application update is obtained, the ambulatory medical device (using its control and computing module) may perform one or more operations to confirm that the application update was successfully downloaded from the application host system and that the download was not corrupted 808. For example, the ambulatory medical device may calculate a hash or checksum value from the downloaded application update. This hash or checksum value may be compared with one received from the application host system. If the calculated hash or checksum value matches the received hash or checksum value, then it may be determined that the download is both complete and not corrupt. Further, the ambulatory medical device may use the checksum, a tag, a payload size, or any other method to confirm that the download of the application update is complete and not corrupt. If it is determined that the download is corrupt, the AMD discards the corrupt copy and downloads another copy of the update. If it is determined that the download is complete and not corrupt, the AMD may proceed 810 to the installation step wherein the application update may be installed on the AMD without interrupting the ongoing or upcoming therapy sessions.

Figure 9:
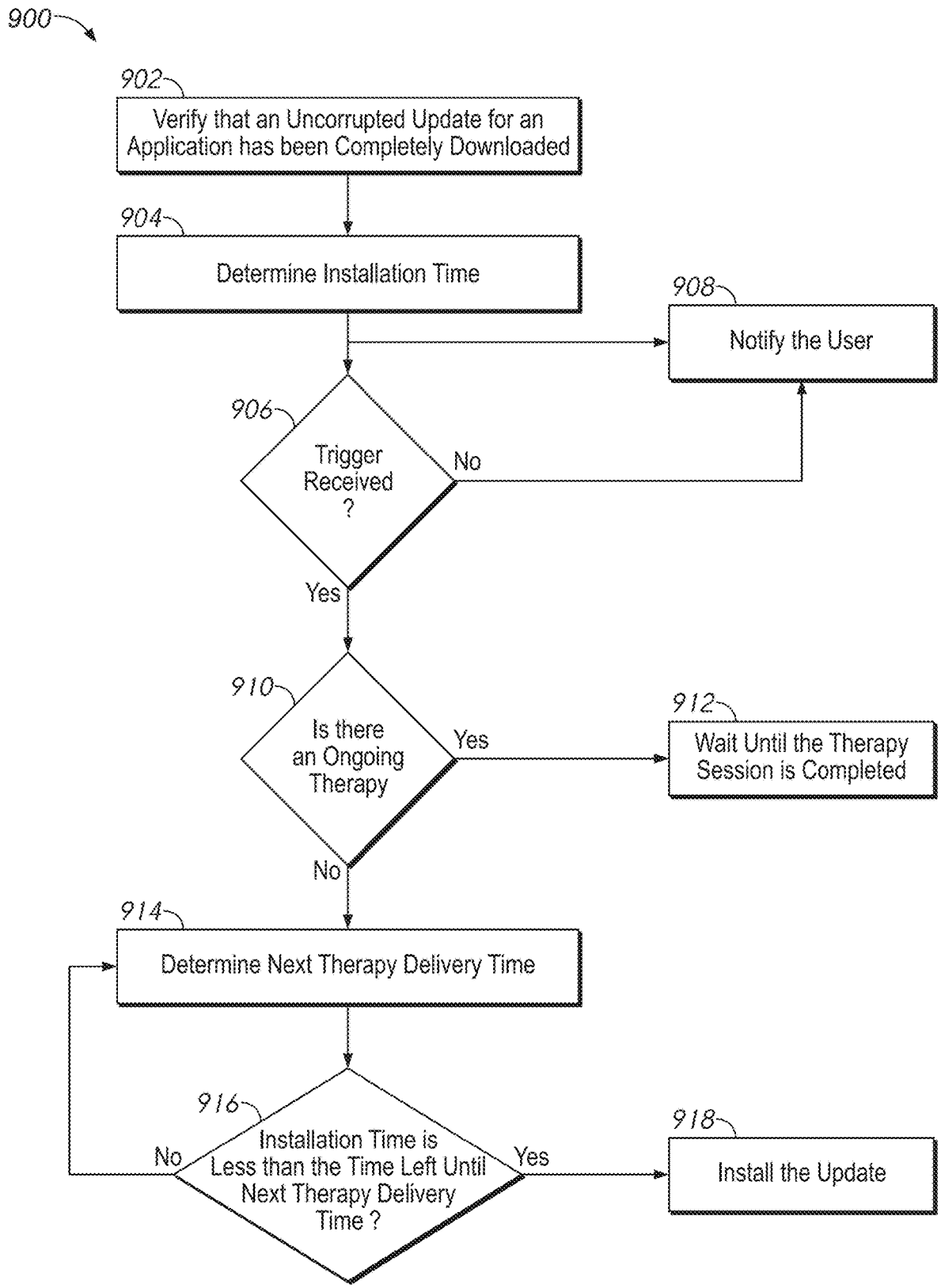
FIG. 9 is a flow diagram showing an example of a computer-implemented method that may be used by an AMD to install a down-loaded application update without interrupting the therapy provided to a subject.
Figure 10:
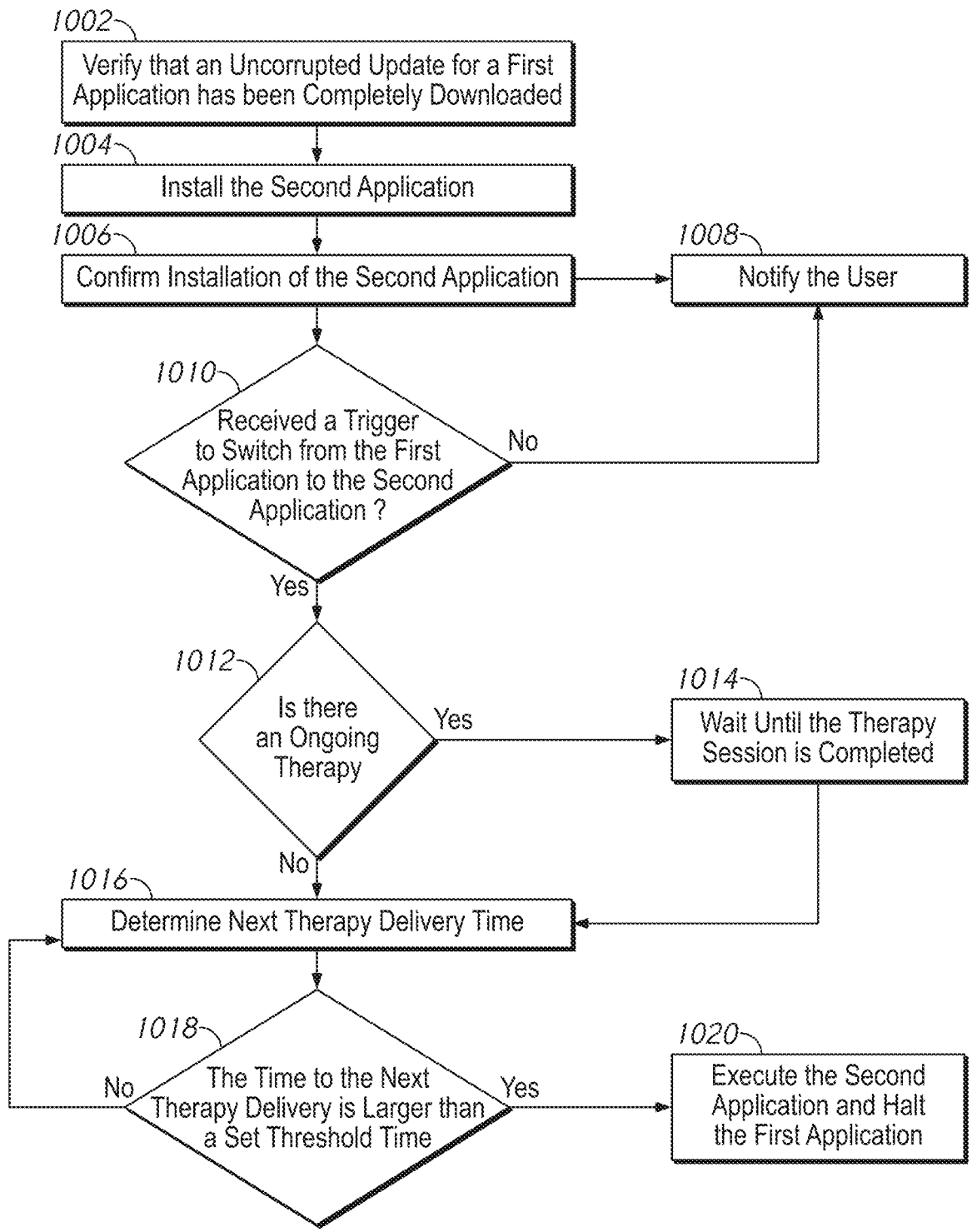
FIG. 10 is a flow diagram showing an example of a computer-implemented method that may be used by an AMD to install a second update downloaded from a host computing system and switch control of the AMD from a first application to the second application without interrupting the therapy provided to a subject.
Figure 11:
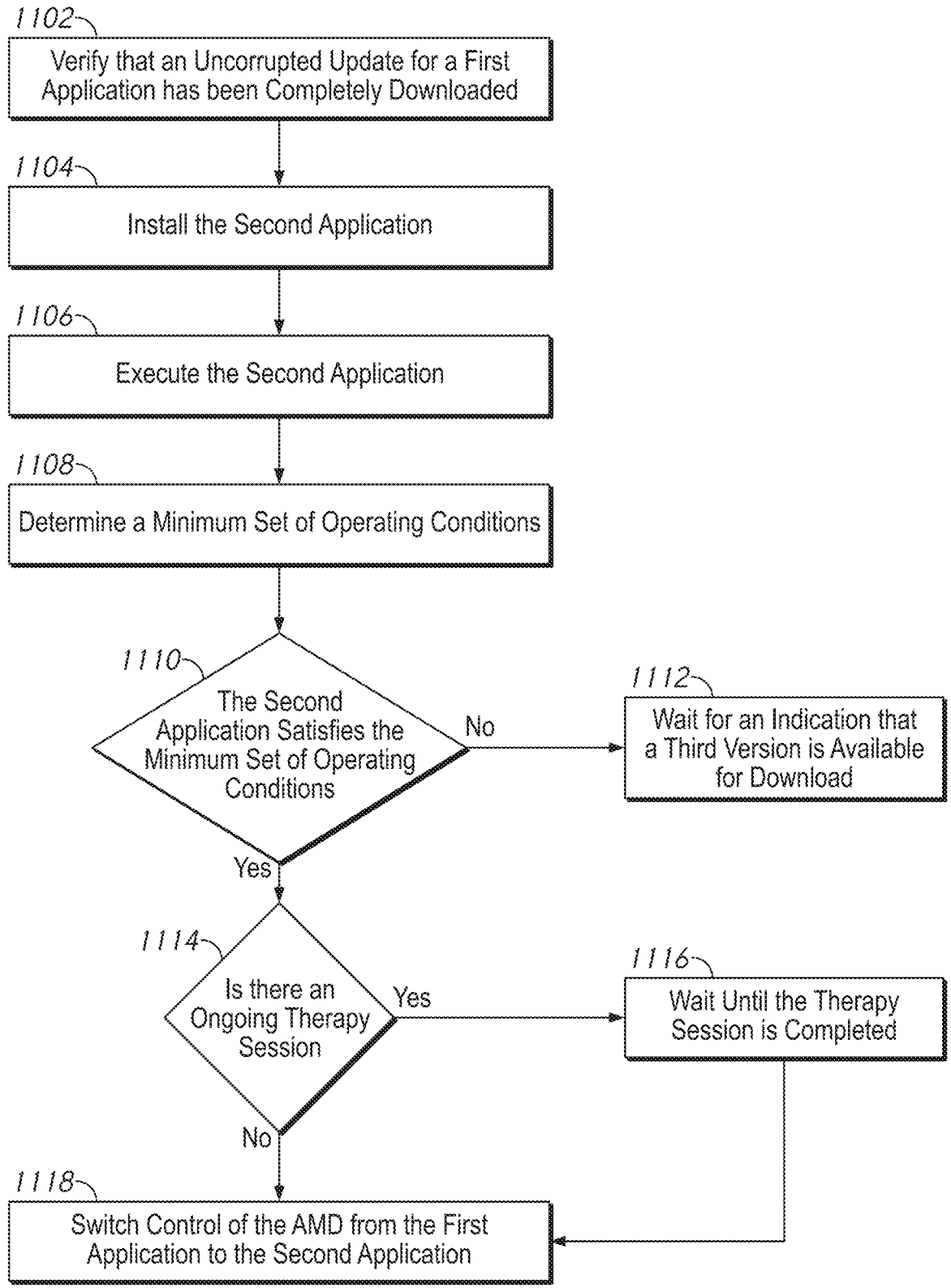
FIG. 11 is a flow diagram showing an example of a computer-implemented method that may be used by an AMD to install a second application downloaded from a host computing system, and verify and switch control of the AMD from a first application to the second application without interrupting the therapy provided to a subject, if the second application satisfies a minimum set of operation conditions.

FIG. 9-11 are flow diagrams illustrating examples of computer-implemented methods that may be used by the AMD to install a downloaded application update without disrupting the therapy provided to a subject.

In the example process 900 illustrated in FIG. 9, if it is verified that an uncorrupted copy of the update for an application is successfully downloaded 902 (e.g., using the procedure described above with reference to FIG. 8), the control and computing module (CCM) of the AMD may determine the amount of time required to install the application update 904 and wait for a trigger signal 906 to initiate installation process. In some examples, the CCM may notify to the user 908 through a user interface (e.g., a touchscreen display), that an update is ready for installation. The notification may include the installation time and information about the update. In such examples, if a trigger is not received, CCM may send one or more notifications to the user indicating that a new update is ready for installation. In some examples, the trigger may be the confirmation that the application was successfully downloaded. Alternatively, or in addition, the trigger may be a user command received based on an interaction by a user or subject with a user interface that is part of or that communicates with the ambulatory medical device.

The installation time may be determined by the CCM based on data or metadata provided with the downloaded application update. For example, the application update may include a file (e.g., a text file or configuration file) that includes the install time. The installation time may be determined by the manufacturer of the ambulatory medical device or the publisher of the application update. For example, the developer of the software update may average the install time across several test devices to determine the install time metadata that is provided with the software update. General purpose computers have a wide variety of configurations and the performance of a general purpose computer may vary depending on the applications executing at a particular time. Thus, the determination of install time for an application based on the measurement of install time on a test device is typically unreliable. However, as an ambulatory medical device is often a special-purpose device that is designed to perform a specific function (e.g., provide insulin to a subject), an install time determined during testing by a manufacturer may in many cases be a reliable determination of install time on an ambulatory medical device of a subject. Alternatively, or in addition, to determining the install time based on testing by a manufacturer, the install time of an application update may be determined or estimated based on a size of the application update. In some cases, the provided or estimated install time may include a buffer. In other words, an additional amount of time may be added to the install time to account for variances in operating condition of the ambulatory medical device or inaccuracies in the estimated install time.

If a trigger is received 906, the CCM may check for any ongoing therapy session 910. If the no therapy is currently being administered, the CCM determines the next therapy time 914 (or the time left until the next therapy session). If therapy is currently being administered the installation will be delayed 912 until the therapy session is compete. Once the current therapy session is complete, the CCM may determine the time remaining until next therapy session 914 (e.g., during which medicament, such as insulin is delivered to a subject).

In some cases, the determination of the next time that therapy is to be delivered may be an estimate based on historical delivery of therapy, a present condition of the subject (e.g., when a glucose level is of a subject is at the center of a desired range, the next therapy delivery time may be estimated to be further off than when the glucose level is at the edge of the desired range), and/or an indication provided by a user or subject (e.g., an indication that the user is planning to have a meal, to exercise, or to go to sleep). Alternatively, or in addition, the determination of the next time that therapy is to be delivered may be based on a scheduled delivery of therapy (e.g., every 5 minutes or every hour).

As previously described, it is desirable to prevent disruption to therapy during the application update process. Thus, after the next therapy time is determined 914, the estimated install time may be compared 916 to the determined or estimated next therapy delivery time to determine whether the installation of the application update can be completed before the next therapy delivery to the subject. If it is determined that the time left until the next therapy session is sufficiently longer than the determined time for completing the installation, installation of the application updated may be initiated 918. In some examples, the determined time to the next therapy session has to be longer than the determined installation time by a threshold value. Such threshold value may be different for different application updates and/or the type of next therapy session. If it is determined that the application installation cannot be completed before the next therapy delivery (or the time left until the next therapy is not larger than that estimated installation time by a threshold value), the installation of the application may be delayed, regardless of receipt of the trigger. In this case, the CCM may wait for the next therapy to be completed and then determine a new therapy time at block 914. This process may be repeated until CCM determines that the update can be installed without interrupting an expected or scheduled therapy by the ambulatory medical device. In some examples, a new determination may be made before completion of the next therapy, to determine whether installation may be completed prior to a subsequent therapy time after the next therapy time.

In some cases, a time when the application can be installed without interrupting therapy may not be identified. In some such cases, a user (e.g., a clinician or other medical provider, or a subject) may be provided with an alert that an application update is available and/or that the application update cannot be installed without interrupting therapy. The user may be provided with an option as to whether to permit the update and/or when to install the application update. The option may include presenting the user with the estimated install time enabling the user to schedule the application update at a time when interruptions to therapy may be minimal or when an alternative source of therapy (e.g., injection therapy) can be utilized.

In some embodiments, once it is verified that an uncorrupted copy of the update for an application is successfully downloaded 902, the AMD's control and computing module (CCM) may notify the user and wait for a trigger signal before determining the installation time. Once the trigger has been received, the CCM initiates the installation process of the downloaded copy of the application update without interrupting therapy provided by the ambulatory medical device to the subject. In such embodiments, the application update may be installed in a different memory location than the memory location where the original application is installed and executed.

FIG. 10 is flow diagram illustrating an example of a computer-implemented method that may be used by the AMD in order to install a second application that is an update to a first application executing on the ambulatory medical device, without disrupting the therapy provided to a subject. In this example, once the control and computing module (CCM) of the AMD verifies that an uncorrupted copy of the second application is successfully downloaded 1002 (e.g., using the procedure described above with reference to FIG. 8), the CCM may initiate the installation process of the second application 1004 without interrupting the execution of the first application. The CCM may confirm 1006 the successful installation of the second application and wait for a trigger signal 1010 to initiate the execution of the second application in place of the first application. In some examples, the installation of the second application may be confirmed by sending a notification the user 1008 via a user interface of the AMD. In some examples, the CCM may determine the amount of time required for switching the control of AMD to from the first application to the second application. The notification may include information about the update and the time required for switching between the applications. In some examples, the trigger may be a user command received based on an interaction by a user or subject with a user interface that is part of or that communicates with the ambulatory medical device. In such examples, if a trigger is not received the AMD may send one or more notifications to the user indicating that a new update is ready for installation. If a trigger is received, the CCM may check for any ongoing therapy session 1012. If the no therapy is currently being administered, the CCM determines the next therapy time 1016 (or the time left until the next therapy session). If therapy is currently being administered the installation will be delayed 1014 until the therapy session is compete. Once the current therapy session is complete, the CCM may determine the time remaining until next therapy session 1016. The estimated next therapy delivery time may be compared to a set threshold time to determine whether the switching from the first application to the second application can be performed without interfering with the next therapy session. If it is determined that the time left until the next therapy session is longer than the set threshold time, the execution of the second application will be initiated and the execution of the first application will be halted 1020. In some examples, the set threshold time may be determined by the CCM at least partly based on the time required to execute of the second application and halt the first application. In some other examples, the set threshold time may be received from a host computing system.

In some embodiments, the performance of an application update may be tested before switching control of the AMD to the application update. FIG. 11 illustrate an example method that may be used by such embodiment. First the AMD verifies that an uncorrupted copy of the update for a first application is successfully downloaded 1102 (e.g., using the procedure described above with reference to FIG. 8). Next the AMD may install 1104 and execute 1106 the downloaded copy of the second application without interrupting the execution of the first application and therefore the therapy that might be provided by the ambulatory medical device to the subject. In some examples, the second application update may be installed to a separate portion (e.g., a separate execution space or separate memory) from the portion where the first application is installed and is being executed. The Control and computing module (CCM) of the AMD may determine that a minimum set of operating conditions 1108 and check whether the minimum set of operating conditions are satisfied by the second application 1110, wherein the minimum set of operating conditions relate to maintaining therapy provided by the ambulatory medical device to the subject. If it is determined that the minimum set of operating conditions are not satisfied by the second application, the AMD may wait for an indication that a third application is available for download 1112 and repeat the procedure described above to evaluate the performance of the third application. If it is determined that the minimum set of operating conditions are satisfied by the second application, the AMD may check for an ongoing therapy session 1114. If it is determined that currently no therapy is provided to a subject, CCM may switch the control of the ambulatory medical device from the first application to the second application 1118. If currently therapy is provided to a subject, the CCM may wait until the therapy session is competed 1116 and then switch the control of the AMD from the first application to the second application.

In some cases, the ambulatory medical device may be updated (or downgraded) to add (or remove) features from the ambulatory medical device. For example, the ambulatory medical device may initially provide only insulin therapy. At some point in time, the ambulatory medical device may be upgraded to include bi-hormonal control (e.g., to provide both insulin therapy and counter-regulatory agent (e.g., Glucagon) therapy). The upgrade may be based on newly available features and/or based on a decision by a user to purchase or otherwise obtain additional features. Similarly, a user may opt to downgrade therapy from bi-hormonal to insulin-only therapy. Alternatively, the upgrade or downgrade may be made based on the availability of medicament. In some examples, a first update can be a first application version comprising a first feature set (e.g., providing insulin therapy) and a second update can be a second application version comprising a second feature set (e.g., provide both insulin therapy and Glucagon therapy). In some such examples the first feature set may comprise a subset of the second feature set. In some other examples, the first feature set may comprise a partially overlapping set of features with the second feature set.

In some examples a computer-implemented method that may be used by the AMD in order to detect, download and install an update to an application executing on the ambulatory medical device wherein the application comprises one of a first application version comprising a first feature set or a second application version comprising a second feature set. In some examples, the first feature set may comprise partially overlapping set of features with the second feature set. In some other examples, the first feature set may comprise partially overlapping set of features with the second feature set. The AMD may receive an indication of availability of the application update, download the application update and verify that an uncorrupted image of the application update is successfully downloaded (e.g., using the procedure described above with reference to FIG. 8). Next, the control and computing module (CMM) of the AMD may initiate the installation process of the application update image without interrupting the execution of the application. In some examples, the indication received by the AMD (with reference to block 802 in FIG. 8), may include information about application update being an update to the first application version or to the second application version. In some such examples, the CCM may determine the version of the application update and download the application update image based on the determined version In some embodiments, any downloaded application update may be installed to a separate portion (e.g., a separate execution space or separate memory) from a currently executing version of the application. Once installation of the application is complete and the application is verified as being successfully installed, the active version of the application can be switched. For example, control of the ambulatory medical device can be provided to the updated application, the previously executing application can be ceased or halted. The old application can then be removed, or kept as backup. Determining when to switch which version of the application is active may follow a similar process as previously described for identifying a next therapy delivery time and selecting a time to switch active versions of the application when there will not be an interruption to the therapy provided by the ambulatory medical device.

In some embodiments, the ambulatory medical device may be configured to store multiple instances of an application (e.g., ambulatory medical device control software). For example, the ambulatory medical device may have a current, or first, version of the application that it is installed in a first memory location (e.g., in the main memory 616) and is executing to, for example, control therapy provided by a subject. Further, the ambulatory medical device may include an updated, or second version of the application installed in a second memory location (e.g., in the main memory 616). The update of the second version may have been downloaded and installed (e.g., in a prior to detection of the fault). In such embodiments, when a fault is detected during execution of the first version of the application, the ambulatory medical device may initiate the execution of the second version of the application and then switch control of the AMD to the second version of the application to maintain therapy to the subject.

Figure 12:
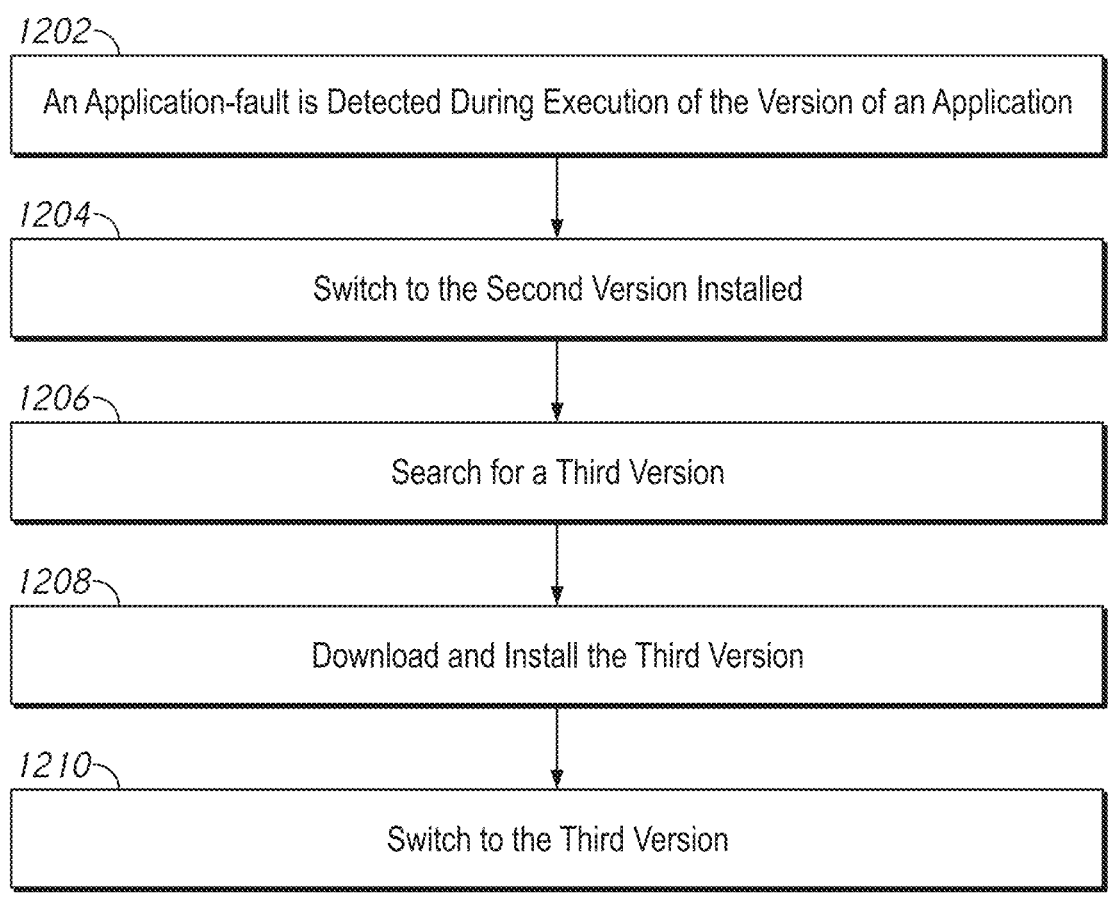
FIG. 12 is a flow diagram showing an example of a computer-implemented method that may be used to respond to detection of an application fault during the execution of a first version of an application and switching control of the AMD to a second version an application installed on the AMD.

In some examples, the second version of the application installed on the AMD may be a version older than the first version, or version that may not have track a record of stability and reliability. FIG. 12 is a flow diagram for such examples. Once an application-fault is detected during execution of the first version 1202, the control and computing module (CMM) of the AMD may switch the control of the AMD to the second version of the application 1204 while establishing a connection with a host computing system configured to host a third update and download the third update 1206. The third version of the application may be a new version, a version prior to the first version, an update to the first application that addresses the detected application-fault or an older version that satisfies the conditions to be classified as a "safe version" (e.g., less than a threshold number or rate of faults over a minimum period of time). The second version (installed in the device) may control the AMD while the third version is being downloaded and installed 1208 without interrupting the therapy. Once the download of the third version is complete, the CCM may initiate the installation process of the downloaded copy of the third application and switch control of the ambulatory medical device form the second application to the third application 1210 without interrupting therapy provided by the ambulatory medical device to the subject In yet other embodiments, a "safe version" of the application may have been installed on the ambulatory medical device prior to detection of a fault. The safe version of the application may include a version of the application that has been used by instances of the ambulatory medical device for more than a threshold period of time and has experienced less than a threshold number of faults. For example, the safe version of the application may be a two-year old version of the application that has demonstrably had less than a threshold number of faults occur over the period of two years. This safe version of the application may have less features than the first or second version of the application. However, when a fault is detected during execution of the first or second version of the application, the ambulatory medical device may switch control of the device to the safe version of the application to maintain therapy to the subject.

In some cases, if there is an issue installing an updated version of the application, the ambulatory medical device may revert to the current version or a safe version installed on the AMD.

In some other examples, the AMD may be triggered to establish a connection with the host computing system and search for the second version once a fault is detected during execution of the first version. In these examples, the ambulatory medical device may revert to the safe version (installed in the device) while downloading and installing the second version without interrupting the therapy.

Figure 13:
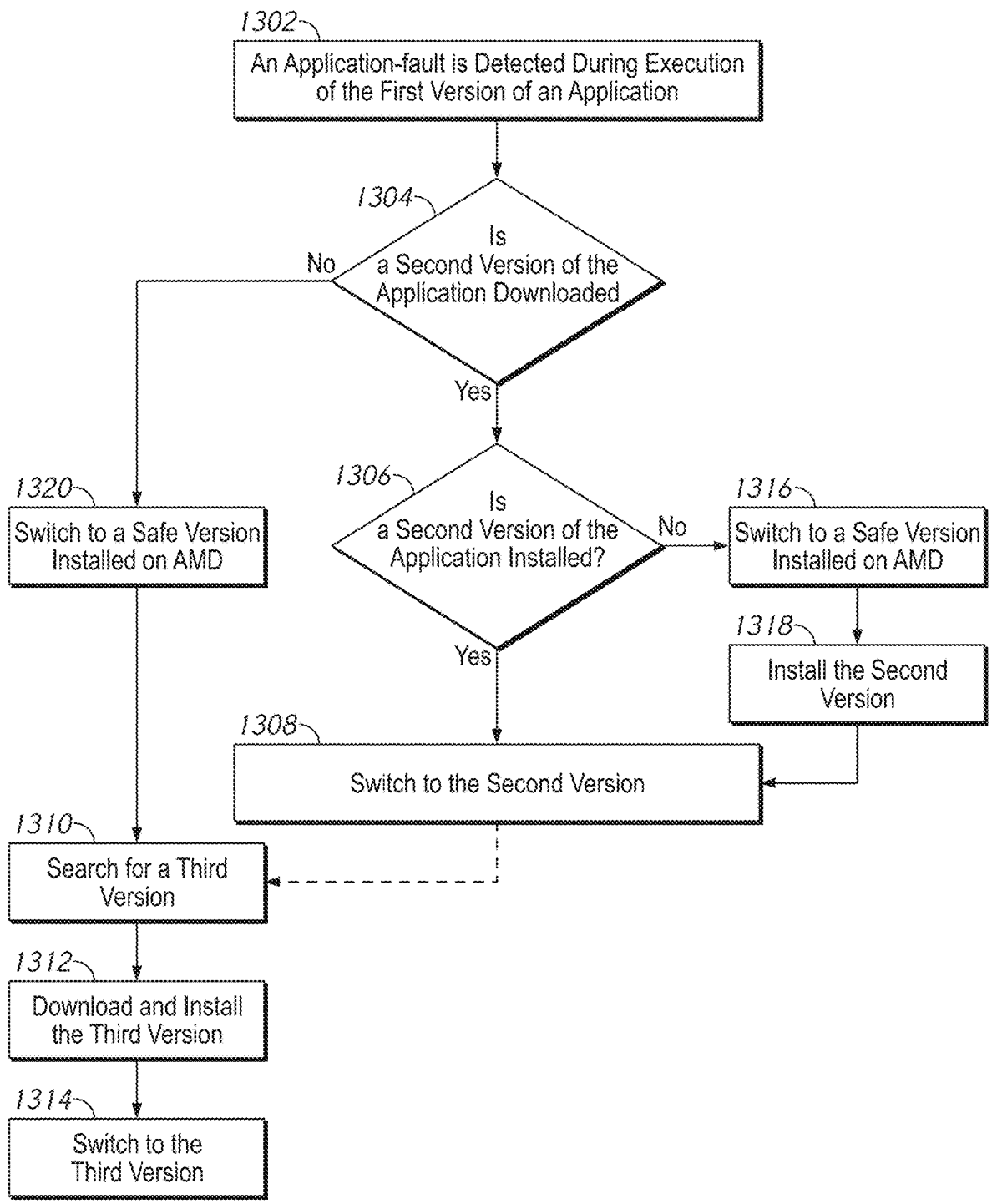
FIG. 13 is a flow diagram showing an example of a computer-implemented method that may be used to respond to detection of an application fault during the execution of a first version of an application and switching control of the AMD to a second version an application installed on the AMD and/or downloading a third version of the application.

FIG. 13 is a flow diagram illustrating yet another example of a method of responding to a fault detection by the AMD. In this example, once an application-fault is detected during execution of the first version of an application 1302, the control and computing module (CMM) of the AMD may look for a second version of the application 1304 in the main memory or the storage. If it is determined that the second version has been already downloaded, the CCM will determine 1306 whether the second version of the application is installed in a memory location and is ready to be executed. If it is determined that the second version of the application is installed, the control of the AMD will be switch to the second version of the application 1308. With reference to block 1306, if CCM determines that the second version exists in the memory but it is not installed, it will switch the control of the AMD to a safe version 1316 that may be already installed and then initiates the installation 1318 of the second version. Once the installation of the second version is complete, the CCM may switch control of the AMD from the safe version of the application to the second version of the application. In some embodiments, after the control of the AMD is switched to the second version of the application, the CCM may search for a third version of the application 1310 that may be an update to the previously downloaded second version. If a third version is found, the CCM may download and install the third version 1312 and switch the control of the AMD to the third version 1314. With reference to block 1304, if the CCM cannot find a second version of the application in a memory or storage location, it will switch the control of the AMD to a safe version of the application 1320 that may be installed in a memory location (e.g., in the main memory or in the storage) and then search for a third version of the application 1310. If a third version is found, the system may download and install the third version 1312 and switch the control of the device to the third version 1314.

In some embodiments, when an application-fault of an application executing on the ambulatory medical device is detected, the AMD may transmit an indication of the application-fault to the host computing system of a manufacturer or maintenance service of the ambulatory medical device. In some other embodiments, the AMD may notify the user when an application-fault occurs through a user interface of the AMD or user interface communicating with the AMD.

Direct Network-Connected Medical Device Communication and Remote Viewing

An ambulatory medical device, such as an ambulatory medicament device (e.g., glucose level control system (e.g., an insulin pump or a bi-hormonal pump that includes insulin and a counter-regulatory agent), a pacemaker, or any type of medical device that may be connected to a subject to provide therapy to the subject, can generate a significant amount of data related to therapy provided to a subject (therapy data). This therapy data may be useful for the subject, a healthcare provider, or other users (e.g., parent or guardian) to actively manage the subject's health condition. For example, the therapy data may be useful to determine whether a modification to therapy may be desirable or to confirm that intended therapy is being delivered at the right time. In other examples the data may be used to generate an alert about the health condition of the subject when therapy data indicates that immediate attention is needed or advised with regards to subject' health condition.

It is desirable to manage therapy data, or other types of data stored in a memory of the AMD, to facilitate uninterrupted, secure and easy access to authorized users. As described above, the procedures and task performed by an AMD, including those associated with data transfer management, may be associated with certain computer-executable instructions stored and executed by the control and computing module 610 of the AMD 600. As such, different AMD configurations used for various data transfer management tasks, may be configurations of the control and computing module 610 of the AMD 600.

Accessing the data from the ambulatory medical device can be problematic in some cases. For example, accessing the data may require a user to connect the ambulatory medical device to a computer to upload the data. This places a burden on the user to remember to connect the ambulatory medical device. Further, during the period when the device is connected to the computer, the subject may not be receiving therapy from the ambulatory medical device. In some cases, the subject may not be capable of connecting the device to the computer (e.g., when the AMD is not within range of the local device) and may not have someone available to assist the subject. Thus, a direct end-to-end connection to a computing system that (e.g., computing system of a healthcare provider) can safely share data (e.g., therapy data) with authorized users may facilitate data management and access.

Figure 14:
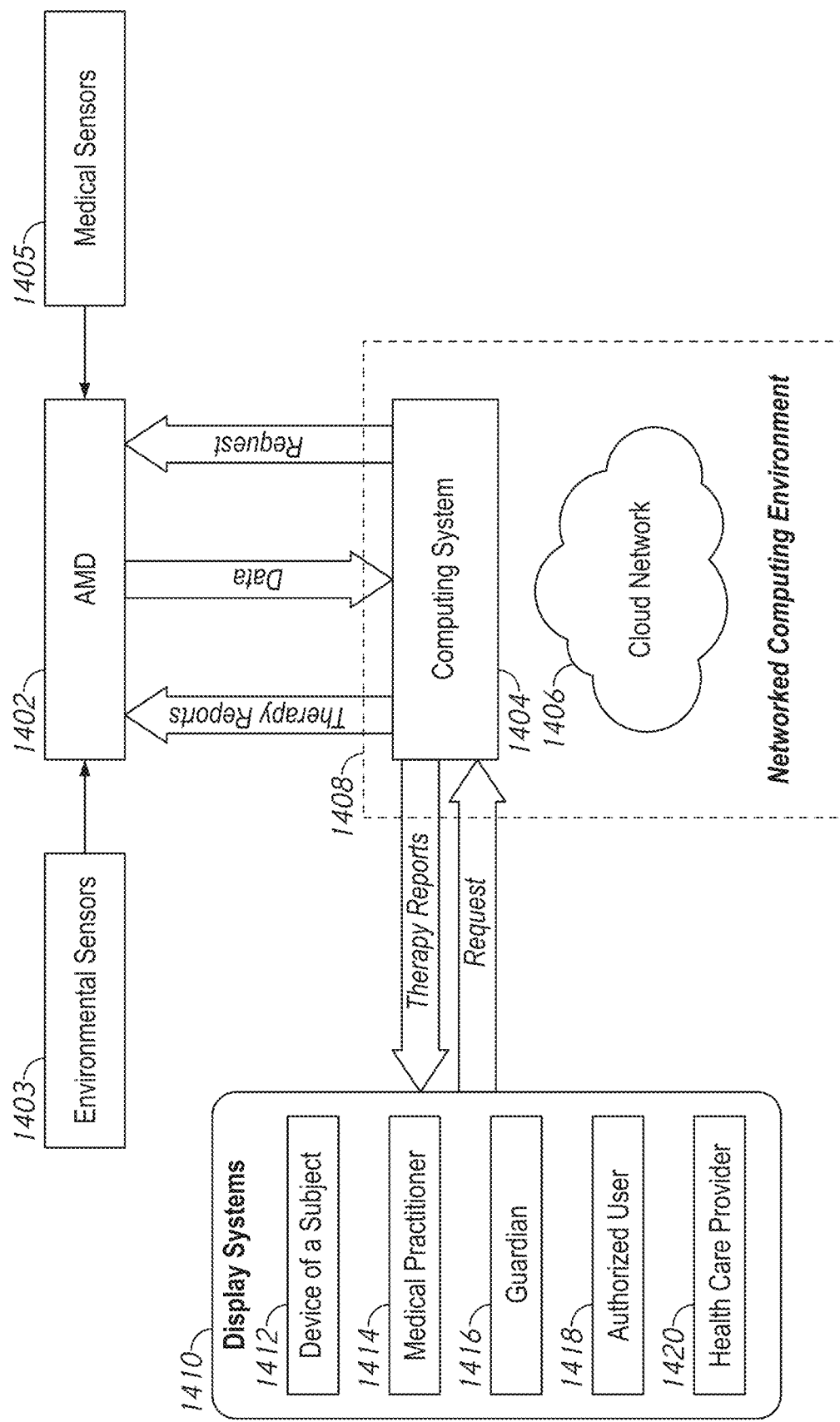
FIG. 14. is a block diagram, illustrating an example network configuration wherein the AMD is directly connected to a computing system and the computing system shares the therapy reports with one or more display systems and the AMD.

FIG. 14 is a block diagram illustrating an example network configuration wherein the AMD 1402 is directly connected to a computing system 1404. The computing system 1404 may be part of networked computing environment 1408 (e.g., a data center, networked computing system), or cloud network 1406 or cloud computing system of a cloud service provider. The computing system may include one or more non-transitional memories and one or more hardware processors configured to execute the computer-executable instructions stored in one or more non-transitional memories. In some such examples, the procedures performed by the computing system may be associated with the execution of certain computer-executable instructions stored in a memory of the computing system by a hardware processor of the computing system. The AMD 1402 may receive data from one or more medical sensors 1405 (e.g., analyte sensor, temperature sensor, heartbeat sensor, and the like) and/or one or more environmental sensors 1403 (e.g., geolocation receiver, motions sensor, accelerometer and the like).

In some examples, the direct end-to-end data connection may be supported by one or more transceivers in AMD's communication module 602. For examples, a direct connection may be established between the AMD 1402 and the computing system 1404 over a wide area network (e.g., a cellular network) without using an intermediary system using various wireless standards and technologies (e.g., 4G, 5G and the like). In some examples, the transceiver may support communication via communication standards, including but not limited to, low power wide area network (LPWAN), Narrowband Long-Term Evolution (NB-LTE), Narrowband Internet-of-Things (NB-IoT), or Long-Term Evolution Machine Type Communication (LTE-MTC). In some cases, the transceiver is always on, and in some cases, the transceiver may be activated when a data transfer is scheduled, requested or activated. In some cases, the capability of the ambulatory medical device 1402 to communicate with the computing system may be activated during manufacture or before providing the device to a subject.

In some cases, the subject or a user establishes or initiates establishing the direct end-to-end data connection with the computing system. For example, the subject may interact with a user interface to cause the ambulatory medical device to communicate with the cloud computing service. In some cases, the direct end-to-end data connection may be initiated or established without action by the subject or the user. For example, the direct end-to-end data connection may occur automatically at particular times or when the ambulatory medical device is in particular locations. This automatic connection may occur using information supplied to the ambulatory medical device at a time of manufacture, shipment, sale, or prescription to the subject. Further, in some cases, the ambulatory medical device can communicate with the computing system without having access to a Wi-Fi network or a local area network (LAN). For example, the ambulatory medical device may communicate using a cellular or other wide area network. Further, in some cases, the interaction by the user with the ambulatory medical device may be relatively minimal or simple compared to traditional network communication. For example, a user may push a single button (e.g., an "upload" button) to trigger establishing of a connection with the cloud computing service and causing data to be provided from the ambulatory medical device to the cloud computing service.

In some cases, the ambulatory medical device may be turned on and paired with the wireless wide area network (e.g., a cellular network) at the time of manufacture, or prior to being provided to a subject. Further, the ambulatory medical device may be authenticated with the networked-computing environment as part of the manufacturing process Further, establishing the direct end-to-end data connection may include determining that the ambulatory medical device is permitted to communicate with the computing system based at least in part on the device identifier.

In some implementations, establishing the direct end-to-end data connection may include determining that the ambulatory medical device is permitted to communicate with the computing system based at least in part on a device identifier associated with the ambulatory medical device. The device identifier may be a unique identifier specific to the ambulatory medical device. The device identifier may include or may be based on one or more of an Internet Protocol (IP) address, a Media Access Control (MAC) address, a serial number, or a subject identifier of a subject that receives therapy from the ambulatory medical device.

Further, establishing the direct end-to-end data connection may include determining that the ambulatory medical device is permitted to communicate with the computing system based at least in part on the device identifier. The device identifier may be initially provided to the networked-computing environment prior to provisioning of the ambulatory medical device to the subject. For example, the device identifier may be initially provided to the networked-computing environment as part of a manufacturing process for manufacturing the ambulatory medical device. The request may include a device identifier associated with the ambulatory medical device.

The ambulatory medical device may be configured to at least identify a computing system 1404 of a networked-computing environment 1408 based on a whitelist of one or more approved computing systems. The whitelist may be stored in a memory of the ambulatory medical device 1402 (e.g., a memory in the control and computing module of the AMD). Further, the whitelist may be configured during manufacture of the ambulatory medical device. For example, the whitelist may be configured with connection information to establish communication with one or more computing systems of a networked-computing environment. Further, the ambulatory medical device may be configured to at least obtain an address of the computing system from the whitelist and to establish a direct end-to-end data connection to the computing system of the networked-computing environment via a wireless wide area network using the address. The whitelist may include unique identifiers, such as MAC addresses or static IP addresses that are associated with computing systems of the cloud services provider.

To enhance security, the ambulatory medical device may use a whitelist that identifies via a unique identifier (e.g., via an IP address, a MAC address, or a URL) permitted cloud servers or computing systems in networked computing environment. Further, the cloud computing service may have a whitelist that uses unique identifiers to specify ambulatory medical devices and/or other computing systems (e.g., remote display systems) that are permitted to communicate with the cloud computing system.

When the AMD communicates data over a network, there is a risk of a data breach. Thus, to improve security, all communication between the ambulatory medical device and the computing may be based on a secure data transmission method. For example, the ambulatory medical device may encrypt all data using an asymmetric key.

In some examples, the therapy data may be encrypted before being transferred to the computing system. In these examples, AMD may have a public key and a private key stored in one of its memories permitting the AMD to encrypt data communications transmitted by the ambulatory medical device to the computing system. In these examples, AMD may transmit the public key along with the therapy data to the computing system. The public key provided by the AMD and a private key stored on the computing system may permit the computing system to decrypt the data received from the ambulatory medical device. In some such cases, the public key may timeout and a new public key may be obtained from the ambulatory medical device to facilitate decrypting subsequent communications from the ambulatory medical device. In some cases, the public key may be associated with a time-to-live (TTL) value. In some such cases, the public key may timeout and a new public key may be obtained from the ambulatory medical device to facilitate decrypting subsequent communications from the ambulatory medical device.

Moreover, the secure data transmission may include generating a shared secret based at least in part on the public key and the private key. In some such cases, decrypting the encrypted data comprises using the shared secret to decrypt the encrypted data. In some examples, shared secret may be established using public key exchange algorithm (e.g., Diffie-Hellman key exchange algorithm).

In some cases, the computing system may be configured to transfer the data after receiving a request to transfer data stored on the ambulatory medical device to the computing system over the direct end-to-end data connection via the wireless wide area network. Responsive to receiving the request to transfer data stored on the ambulatory medical device to the computing system, the computing system may be configured to receive, via the direct end-to-end data connection.

Once a connection is established and the therapy data is transferred to the computing system, the computing system may analyze the therapy data received from the ambulatory medical device and generate a therapy report. Further, the computing system may detect an alarm condition, based on therapy data analysis, and generate an alarm that may be provided to the subject, authorized user (e.g., healthcare provider). In some cases, the therapy data may trigger an automatic response by the computing system. For example, the AMD may determine that a medicament or another disposable is running low based on the received data and may automatically reorder the medicament or the disposable.

In some cases, the computing system may periodically receive data from the ambulatory medical device based on a regular schedule. Alternatively, or in addition, the data may be received in response to a command or when the ambulatory medical device determines it is within a certain location. For example, when the ambulatory medical device determines it is within a subject's home or at a healthcare provider's office based on a local area network connection or based on a geolocation system (e.g., a global positioning system (GPS)). In some implementations, additional encrypted data is received from the ambulatory medical device on an intermittent basis. Alternatively, or in addition, additional encrypted data is received from the ambulatory medical device on a continuous basis for at least a time period. The ambulatory medical device may be configured to transmit data as it is generated, or shortly thereafter, (e.g., in real or near real-time (e.g., within a few milliseconds, seconds, or minutes of the data being generated)), or in bulk at specified periods of time. Transmitting the data in bulk at particular time periods may extend battery life but may provide for less up-to-date analysis. Data can be made available on-demand by keeping the transceiver always on, but this may consume more power. Thus, the scheduling of data transfer may be balanced based on different considerations, such as: (1) power consumption and (2) need to share information with authorized users or systems.

In some cases, the computing system may be used as a backup for the ambulatory medical device. For example, the ambulatory medical device can backup data to the computing system every night, or every night that a successful communication connection is established; when it is charging; or when it is in proximity to home or a physician's office (e.g., when subject is in waiting room, the device may upload data that the physician can then access). Moreover, if the ambulatory medical device is replaced (e.g., for a new model or to replace a damaged device), the device can automatically synchronize with the computing system to obtain subject-specific configuration or therapy control data.

Therapy Data and Therapy Report

In some examples, the therapy data comprises dose or dosage data corresponding to one or more doses of medicament provided by the ambulatory medical device to the subject. Further, the therapy data may comprise subject data corresponding to a medical or physiological state of the subject as determined by the ambulatory medical device.

In other examples, the data provided to computing system may include any type of data that may be measured or obtained by the ambulatory medical device and may include a record of therapy provided by the ambulatory medical device. For example, the data may include a time that therapy was provided, an amount of medicament provided as part of the therapy, a measure of one or more vital signs of the subject, a measure of glucose levels at different times for the subject, a location of the subject, and the like.

In some cases, the therapy data may be used to track the use of disposables, such as insulin or other medicament, or insulin pump site kits. In some cases, the computing system may automatically order or reorder disposables at a particular time based on tracking the use of the disposable. Alternatively, or in addition, the reordering of the disposables may be initiated or performed from the ambulatory medical device (e.g., via a wireless wide area network or via a local connection through a separate electronic device).

In some cases, the data transferred to the computing systems may comprise operation data corresponding to operation of the ambulatory medical device. Alternatively, or in addition, the data may further comprise error data corresponding to an error in operation of the ambulatory medical device.

In some examples, the data, therapy data and/or the therapy report may be stored in a memory of the computing system and/or at a storage of the networked-computing environment.

In some cases, the method may include converting the therapy data from one format to another format. For example, the method may include converting the therapy data from a format used to store and/or present data on ambulatory medical device to a format that can be stored or processed on the computing system. In some cases, the therapy data is converted from a machine-readable format to a human-readable format. The data may be stored in a more easily interpreted format that can be understood by different types of users. For example, the data may be presented in one format for a healthcare provider (e.g., sensor readings), a simplified format for a subject or parent of a subject, other data formats for displaying data to different types of users.

In some examples, the therapy data collected from different AMDs associated with plurality of subjects may be aggregated for a group of subjects based on their association with an institution or organization (e.g., a clinic, an insurance company, and the like)

In some other examples, a therapy report based at least in part on the therapy data may be generated by the computing system. The therapy report may comprise time-series therapy data relating to the therapy delivered by the ambulatory medical device over a particular time period.

In some examples, the therapy report may be sent to AMD wherein the subject can see the report via a user interface (e.g., a touchscreen display).

In some cases, the ambulatory device data and/or data generated by the computing system based on the ambulatory device data can be viewed on a secondary display system from the computing system. For example, a clinician or parent can access the data from their personal device. The communication between the computing systems and the viewing device may be encrypted. Moreover, permission for sharing of end user data with a 'follower' (e.g., family member) or clinician may be granted or controlled by the end user (e.g., the subject or a guardian).

An association between a subject, a clinic, and/or an ambulatory medical device may be performed by association of a device serial number of the ambulatory medical device with the subject and/or clinic. Further, a user (e.g., a subject, clinician, or parent) can access therapeutic recommendations through the cloud in case either the ambulatory medical device (e.g., an insulin pump) or the CGM sensor fails to function.

In some cases, the computing system 1404 may be configured to at least receive a request from one or more display systems 1410 that are separate from the networked computing environment to access the therapy report, therapy data or other data received by or stored in the AMD. In some cases, the display system may be a computing system of a medical practitioner 1414 (e.g., such as a doctor, nurse, . . . ), a guardian of the subject 1416 (e.g., subject's parents), an authorized user 1418 (e.g., a user authorized by the subject such as spouse, relative, friend, and the like), a healthcare provides 1410, or a device of the subject 1412 (e.g., cell phone, personal computer, tablet and the like).

In some examples, the display system can be a therapy data management system that analyses a therapy data associated with a specific type health problem (e.g., data associated with managing diabetes) and provides useful information to the subject or an authorized user to monitor and manage the corresponding ailment.

The request may comprise an account identifier associated with a user that generated the request. In some examples, the account identifier may comprise a unique identifier associated with the subject. Alternatively, or in addition, the account identifier comprises a unique identifier associated with a user that is authorized to access the therapy report. The user may or may not be the subject. In some aspects of the present disclosure, the method may further include associating the therapy data with the account identifier at a storage of the networked-computing environment. Further, the computing system may be configured to determine whether an account associated with the account identifier is permitted to view the therapy report. In some examples, account permissions may be granted and/or modified by the subject. For example, the subject can access an account at a networked computing environment 1408, for example, a cloud service provider associated with the subject, and provide one or more identifiers associated with one or more other users to give them permission to access the subject's therapy data or report stored on the computing system.

Responsive to determining that the account is permitted to view the therapy report, the hardware processor may be configured to transmit the therapy report to the display system over an encrypted communication channel.

In some cases, the method may include receiving an identity or identification information of one or more users that are authorized to access therapy data stored at the networked-computing environment. For example, a user or subject may authorize a clinician or other healthcare provider, a parent or guardian, or other users that the subject desires to have access to the therapy data. The identity information of the one or more users may include any type of information that may identify the user or enable the user to be authenticated. For example, the identity information may include a name, unique identifier (e.g., social security number), an email, an address, a phone number, account information for the user at the networked-computing environment, or any other identifying information.

Figure 15:
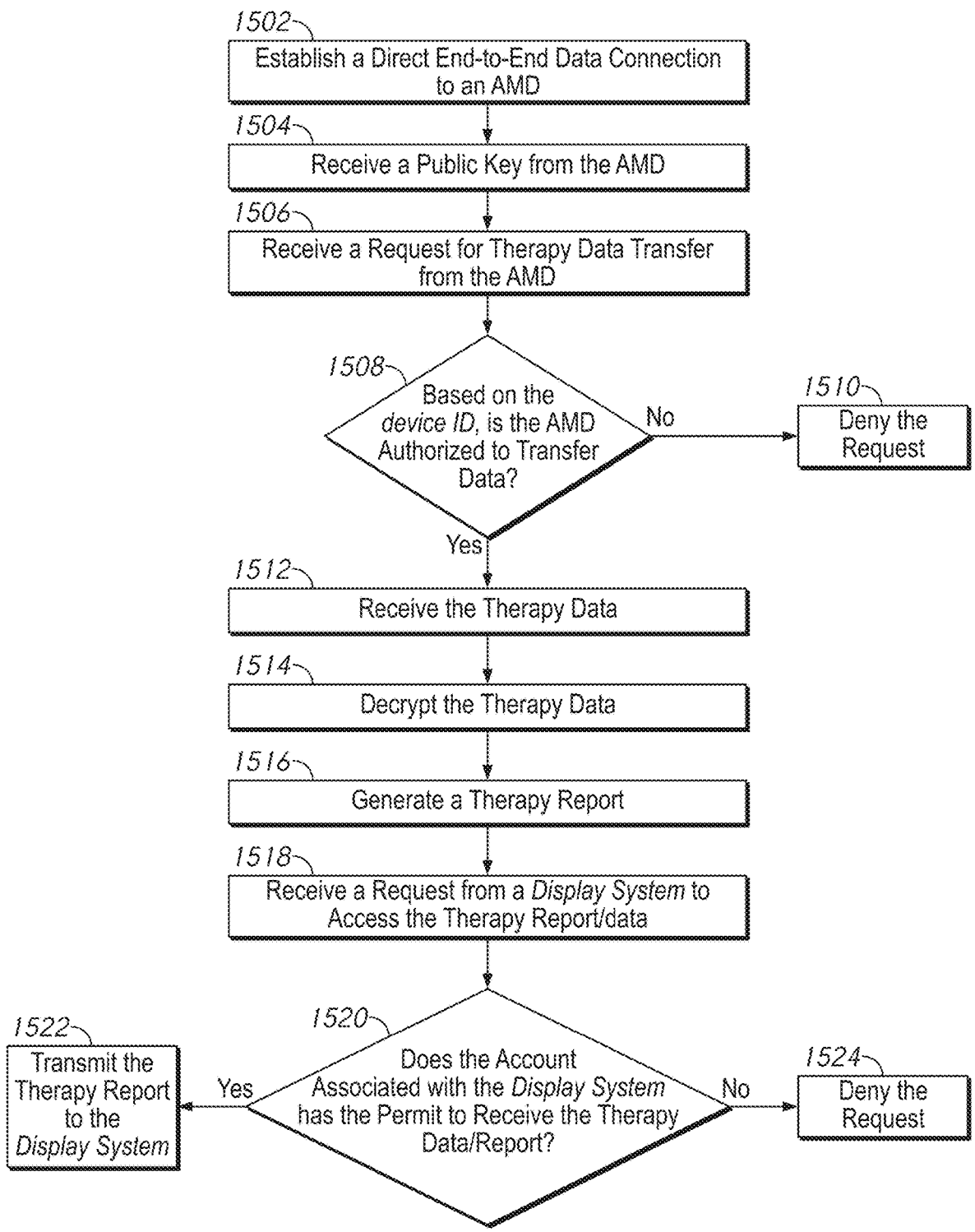
FIG. 15 is a flow diagram illustrating an example method that may be used by a computing system, to generate and share a therapy report based on encrypted therapy data received from an AMD.

FIG. 15 is a flow diagram that illustrates an example method that may be used by computing system 1404, to generate and share a therapy report based on encrypted therapy data received from an AMD 1402. In some examples, the AMD 1402 may generate the encrypted therapy data using a public key and a private key. The method may include establishing a direct end-to-end data connection 1502 to an ambulatory medical device, for example, via a wireless wide area network (WAN) using a Narrowband Long-Term Evolution (NB-LTE) transceiver included in the AMD 1402. Once a direct end-to-end data connection between the AMD 1402 and the computing system 1404 is established, the computing system may receive a public key 1504 (e.g., associated with encrypted data), from the AMD 1402 over the established connection. Next, the computing system may receive a request from the AMD 1506 to transfer data (e.g., therapy data) stored on the ambulatory medical device 1402 to the computing system 1404 over the direct end-to-end data connection. In some examples, the computing system 1404 may use the device ID associated with the AMD 1402 to determine whether the AMD 1402 is authorized to transfer data 1508 to the computing system 1404. If, based on the device ID, it is determined that the AMD 1402 is authorized to transfer data to the computing system, the encrypted therapy data may be transferred 1512 to the computing system. If, based on the device ID, it is determined that the AMD 1402 is not authorized to transfer data to the computing system, the request may be denied 1510. The computing system may decrypt the encrypted therapy data 1514 using a private key (e.g., stored in a memory of the computing system) and a public key received from the AMD 1402. In some examples, the therapy data may be used to generate a therapy report 1516. In some examples, the decrypted therapy data and/or therapy report may be stored in a memory of the computing system 1404.

The example method may further include receiving a request from a display system 1410 that is separate from the networked computing environment, to access the therapy report 1518. The request may comprise an account identifier associated with a user that generated the request. The method may include determining, using the account identifier, whether the account associated with the account identifier is permitted to view the therapy report 1520. If the computing system determines that the account associated with the received account identifier does not have the required permissions, the request will be denied 1524. Responsive to determining that the account is permitted to view the therapy report, the method may include transmitting the therapy report to the display system 1522 over an encrypted communication channel.

In certain implementations, the method may further include determining that the therapy data or other data received from the AMD satisfy an alert threshold condition. In these implementations, it is determined that the therapy data or other data received from the AMD satisfy an alert threshold condition, the computing system may send an alert to one or more display systems designated to receive alerts from the computing system.

In some examples, alert threshold condition may be associated with the health condition of the subject. For example, alert threshold condition may include subject's glucose level (e.g., blood glucose level) is above or below a set value (hyperglycemia or hypoglycemia). In some other examples the alert threshold condition may be associated with the operation of the AMD. For example, alert threshold condition may include the rate of therapy (e.g., the rate at which insulin is provided to a subject) being above or below a set value.

In some other examples, alert threshold condition may be associated with the temporal behavior of therapy data over a period of time. For example, the alert threshold condition may include the fluctuations or variations of the subject's glucose level being above a set value.

In some examples, the alert threshold condition may be defined or set by health provider. In some such examples, the health provider may change one or more alert threshold conditions based on the health condition of the subject.

Figure 16:
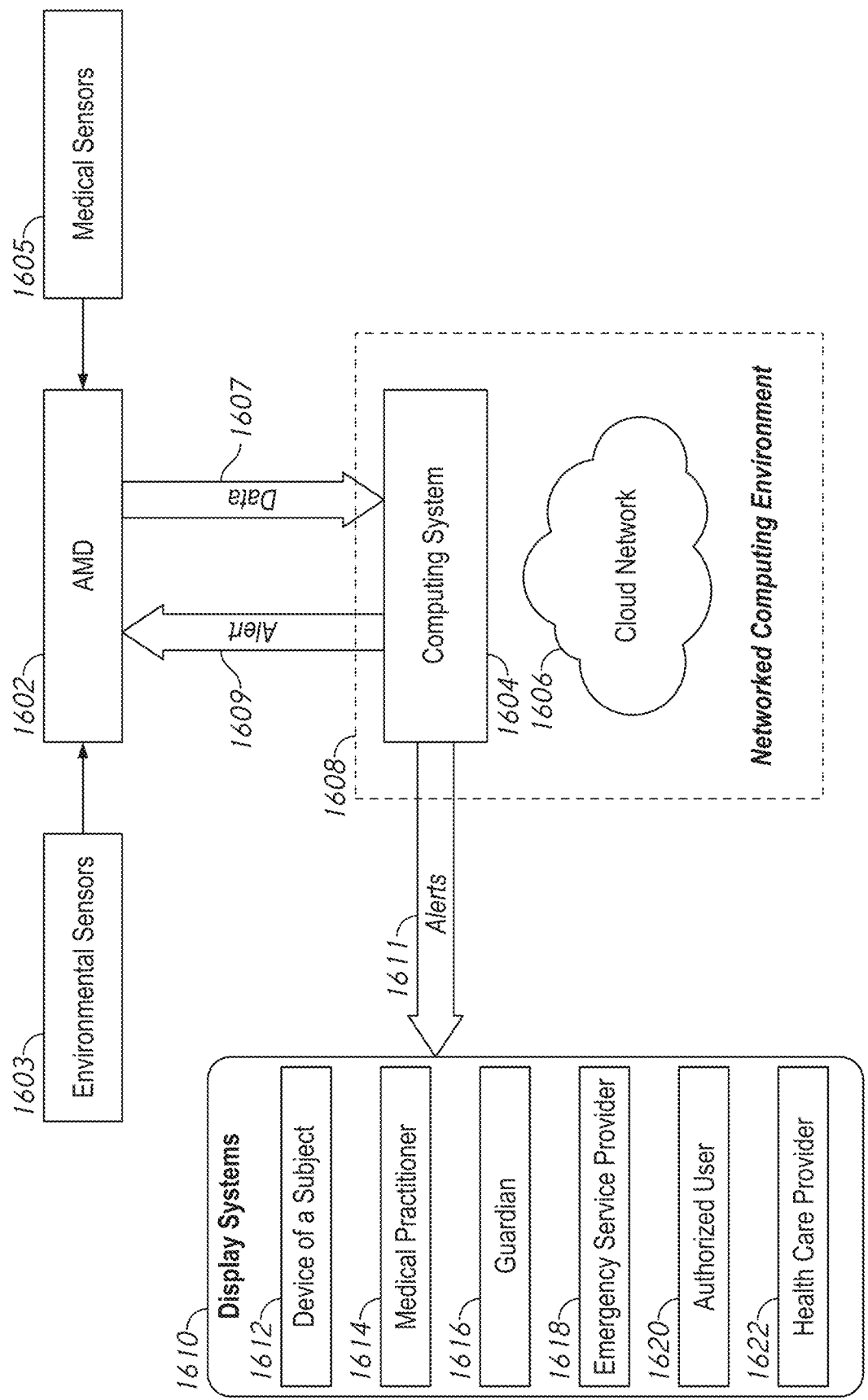
FIG. 16. is a block diagram, illustrating an example network and data flow configuration wherein the AMD is directly connected to a computing system and the computing system generates and sends alerts to one or more display systems and the AMD.

FIG. 16 is block diagram, illustrating an example network and data flow configuration where an AMD 1602, which is directly connected to a computing system 1604 (e.g., computing system within a cloud network 1606), may generate and send alerts 1609 (e.g., alert messages, alert signals and the like) upon determining that data received from the AMD 1607 satisfies a threshold condition. The computing system 1604 may be part of networked computing environment 1608 (e.g., a data center, networked computing system), or cloud network 1606 or cloud computing system of a cloud service provider. The computing system may include one or more non-transitional memories and one or more hardware processors configured to execute the computer-executable instructions stored in one or more non-transitional memories. The AMD may receive data from one or more medical sensors 1605 (e.g., analyte sensor, temperature sensor, heartbeat sensor, and the like) and/or one or more environmental sensors 1603 (e.g., geolocation receiver, motions sensor, accelerometer and the like). These sensors may be included in the AMD unit or may be connected to the AMD via a wired or wireless link.

In some cases, the display systems receiving the alert 1611, may be display systems that have already received therapy reports from the computing system 1604. In other examples, a group of display systems may be selected and authorized by the subject, who is receiving therapy from the AMD, to receive alerts 1611. The display systems that may receive alerts 1611 from the AMD may include: a medical practitioner 1614 (e.g., such as a doctor, nurse, . . . ), a guardian of the subject 1616 (e.g., subject's parents), an emergency service provider 1618, an authorized user 1620 (e.g., a user authorized by the subject such as spouse, relative, friend, and the like), a healthcare provider 1622, or a device of the subject 1612 (e.g., cell phone, personal computer, tablet and the like). In some examples, when it is determined that received data the AMD 1607 satisfies a threshold condition, in addition to sending an alert to one or more display systems 1610, the computing system 1604 may send an alert 1609 to the AMD 1602.

In some examples, the AMD 1602 may be configured to establish a connection to support continuous data transfer to the computing system 1604 for a given period of time (e.g., provided to the AMD by the subject), in order to capture any data that is generated over that period and satisfies an alert threshold condition. For example, the subject may request a continuous connection between AMD and the computing system when going for hike alone to make sure that if his/her health condition deteriorate during the hike, an alert is sent to authorized display systems.

In some examples, a geolocation sensor (e.g., a Global Positioning System (GPS) receiver) and/or a proximity sensor can be used to enable location-activated features such as automatic upload of data at certain locations.

In some cases, the ambulatory medical device may include or be connected to an accelerometer or a geolocation system. This velocity of the ambulatory medical device may be determined based at least in part on the accelerometer or geolocation system. Using the data obtained 1607 from the ambulatory medical device 1602 including the location and/or velocity information, the computing system 1604 can provide intelligent alerts. For example, if the data indicates that a user is travelling at a high rate of speed (e.g., likely in a car) and the user's glucose level is low (e.g., below 55 mg/dl), the computing system may automatically alert an emergency service provider 1618 that a subject is at risk of hypoglycemia and may be driving. Further, the computing system can provide a location of the subject to the emergency services provider 1618.

In some examples, the computing system can generate alerts based on a trend of the aggregated therapy data or based on therapy data that is an outlier to the aggregate therapy data or an outlier to a time-based average of the therapy data.

Further, the geolocation sensor and/or a motion sensor (e.g., an accelerometer) can be used to detect velocity of a subject to enable intelligent motion-sensitive alerts. For example, if the subject is moving at 60 mph and experiences low glucose level, the system may enable a set of driving alerts and schedule possibly therapy in the future. The driving alerts may inform the subject to pull over immediately due to a risk of a hypoglycemic event. Further, an emergency responder may be informed of a subject location using based on information obtained from the geolocation sensor. If the subject is moving at 6-7 mph, exercise alerts may be enabled to, for example, alert the user to pause exercising and attend to low blood glucose. If the subject hasn't moved for 3 hours and has low blood glucose, the system can enable automatic notification to emergency services. Further, a determination of the subject's motion can be used to automatically adjust setpoint (e.g., raise setpoint during exercise). The activity level of the subject can be sensed and use to improve alerts and therapy.

Additionally, the cloud server can send a text message or call to a follower's and/or end user's phone or smart device in case the therapy data satisfies an alert threshold. These messages may be provided from the cloud computing system to a third-party device in case roaming or disabling of the data plan on the ambulatory medical device occurs (e.g., no TCP/IP available). Further, the cloud computing service may send a text message or call 911 in case of a detected emergency. The cloud server can track, for example, via GPS, the end user's most recent location and share that information with a follower and/or emergency personnel. Moreover, the cloud computing system may enable an end user to order and reorder medical supplies directly from the viewing device.

Moreover, the computing system can generate notifications (e.g., generate a message when there is a risk of hypoglycemia). Further, more detailed processing in the cloud can result in improved recommendations (e.g., Tmax, setpoint, or other control parameters)

Figure 17:
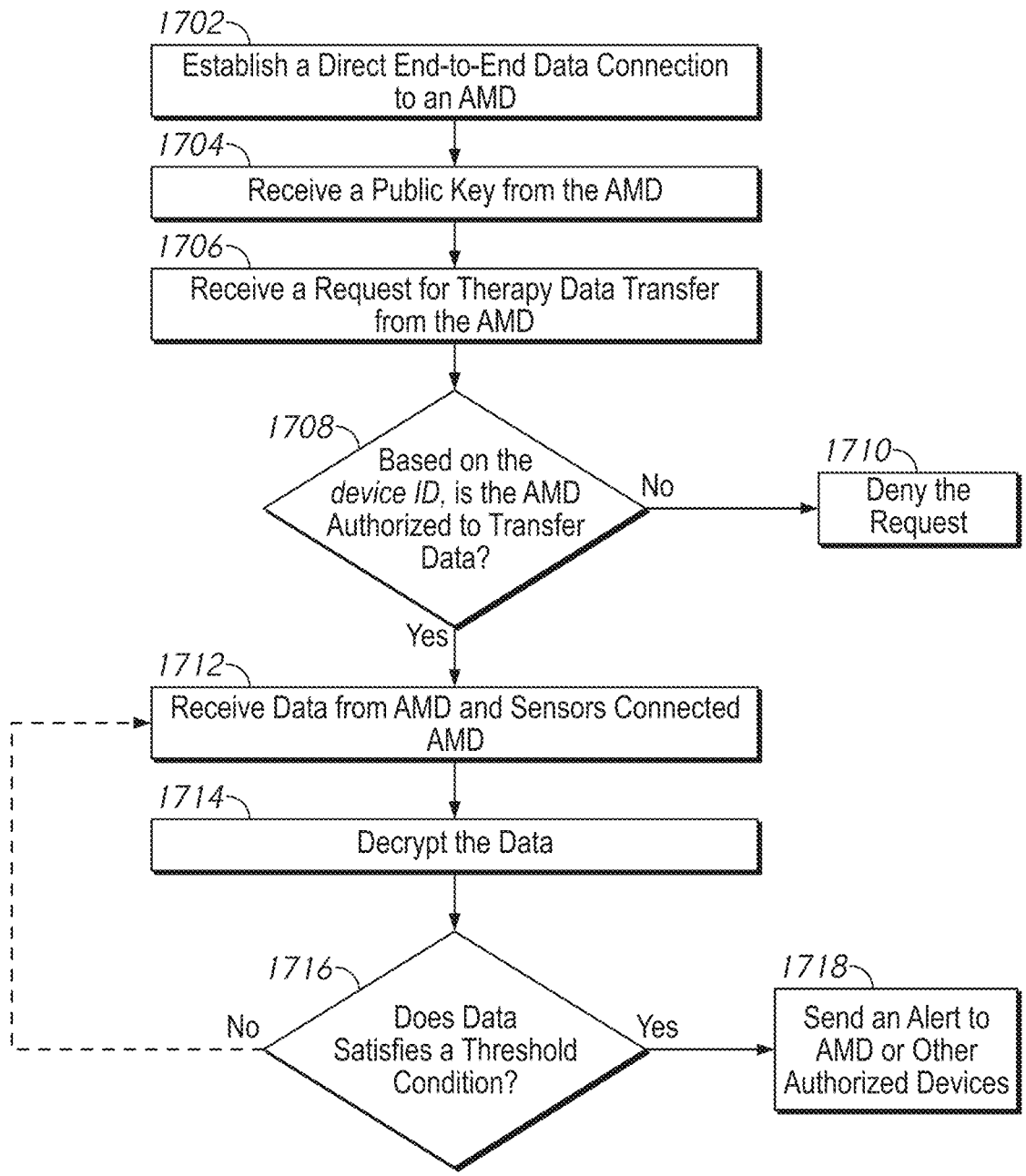
FIG. 17 is a flow diagram illustrating an example method that may be used by a computing system, to generate and send an alert to one or more authorized devices.

FIG. 17 is a flow diagram illustrating an example method that may be used by computing system 1604, to generate and send alerts (e.g., alert messages, alert signals and the like) to one or more authorized devices and to the AMD. The method may include establishing a direct end-to-end data connection 1702 to an ambulatory medical device, for example, via a wireless wide area network (WAN) using a Narrowband Long-Term Evolution (NB-LTE) transceiver included in the AMD 1602. In some examples, the direct end-to-end connection may be established for a given period of time set by the subject or an authorized user (e.g., a guardian of the subject). Once a direct end-to-end data connection between the AMD 1602 and the computing system 1604 is established, the computing system may receive a public key 1704, from the AMD 1602 over the established connection. Next, the computing system may receive a request from the AMD 1706 to transfer data (e.g., therapy data, medical sensor data or environmental sensor data) generated by the ambulatory medical device 1602 to the computing system 1604 over the direct end-to-end data connection. In some cases, the request may include a time period during which AMD continuously transmits any data generated by the AMD 1602 or obtained from one or more sensors (e.g., medical sensors 1605 or environmental sensors 1605), to the computing system 1604. In some such cases, the time period for continuous data transfer from the AMD 1602 to the computing system 1604, may be provided by the subject or a guardian of eth subject to the AMD. In some examples, the computing system 1604 may use the device ID associated with the AMD 1602 to determine 1708 whether the AMD 1602 is authorized to transfer data to the computing system 1604. If, based on the device ID, it is determined that the AMD 1602 is authorized to transfer data to the computing system 1604, the encrypted therapy data may be transferred 1712 to the computing system 1604. If based on the device ID, it is determined that the AMD 1602 is not authorized to transfer data to the computing system, the request may be denied 1710. The computing system 1604 may decrypt the received data 1714 using a private key (e.g., stored in a memory of the computing system 1604) and a public key received 1702 from the AMD 1602. In some examples, the computing system 1604 may determine whether the received data (e.g., therapy data, medical sensor data or the environmental sensor data), satisfies a threshold condition 1716. In some cases, the threshold condition may be provided to the AMD by the subject or an authorized user (e.g., a guardian of the subject). In some other examples, the threshold condition may be provided by a healthcare provider. In some such examples, the threshold condition may be stored in a memory of the AMD. If it is determined that the data satisfies a threshold condition, an alert may be generated and sent 1718 to one or more display systems 1610 that are authorized (e.g., by the subject or a guardian of the subject) to receive alerts. In some examples, the subject or the guardian may authorize one or more display systems 1610 to receive alerts by providing the account IDs of the one or more displays systems to the computing system 1604 or the networked computing environment 1608.

Preventing Inadvertent Therapy Changes

As described above, the ambulatory medicament device may include a user interface (e.g., touchscreen interface or a non-touchscreen interface) that may present one or more user-interface screens to a user enabling the user to modify one or more therapy settings of the ambulatory medicament device, such as a quantity of medicament delivered when a condition is met or the condition that triggers the delivery of medicament to a subject. The user may be a subject receiving medicament or therapy, or may be another user, such as a clinician or healthcare provider, or a parent or guardian. For ambulatory medicament devices that include a user interface, there is a risk that a setting is accidentally modified or is modified (intentionally or unintentionally) by a user that does not fully comprehend his or her action (e.g., a child or a user with a reduced mental capacity). Further, ambulatory medicament devices may accidentally have settings modified by inadvertent interactions with a user interface, such as may occur when an ambulatory medicament device is worn against the body of a subject.

This section relates to an ambulatory medicament device (AMD) to prevent an inadvertent modification in medicament deliver, for example, in the event of a setting of the AMD being accidentally modified by a user or inadvertent interactions with a user interface.

As mentioned above, in some embodiments the user may modify the control or configuration the AMD using a user interface. There is a possibility that the control or configuration of the AMD is accidentally modified through the user interface. For example, as the user may transport the ambulatory medical device, there is a danger that the user will inadvertently activate input in the ambulatory medical device that initiates a therapy change input (e.g., by applying pressure on the ambulatory medical device that may be placed in the jacket pocket of the user).

Figure 18:
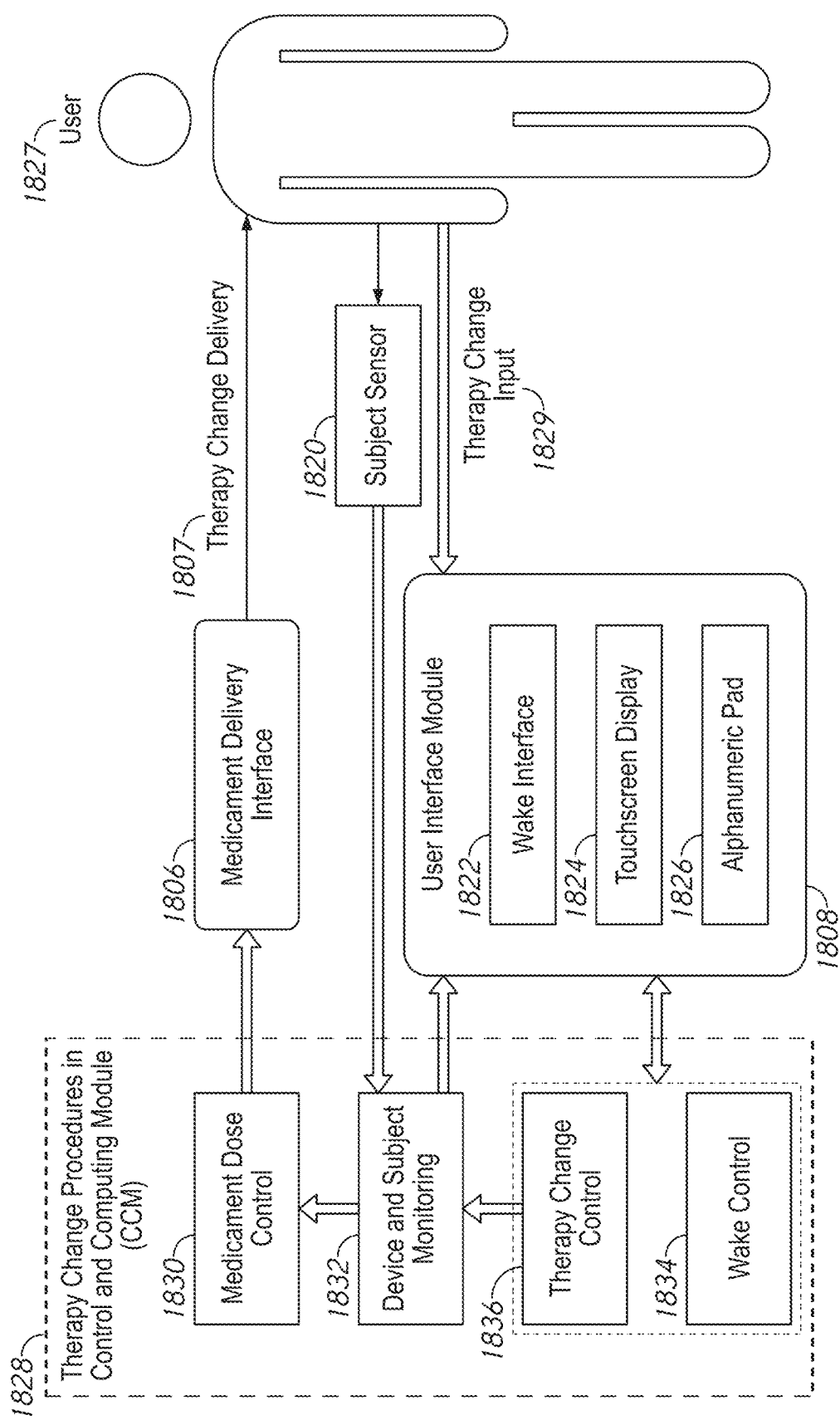
FIG. 18 illustrates the interconnection among modules and procedures in AMD involved in receiving, accepting and/or canceling therapy change request.

With reference to FIG. 18, in some such embodiments, the control and computing module (CCM) of the AMD may include a set of therapy change procedures 1828 implemented to prevent therapy change inputs 1829 that are inadvertent. The therapy change procedures 1828 may be implemented as instructions stored in a memory of CCM (e.g., the main memory 616) and executed by the processor 614. The therapy change input 1829, received from a user 1827, may be verified by the therapy change procedures 1828 before the ambulatory medical device 600 provides the therapy change delivery 1807. Some or all the user interactions with the user interface module 1808 may be controlled and analyzed by the control and computing module (CCM) 610 via one or more therapy change procedures 1828.

In these embodiments, the user 1827 may wake or unlock the AMD by interacting with a wake interface 1822. The wake interface 1822 can be any of the additional user interfaces mentioned above, configured to generate a wake input to the CCM when detecting a pre-set user interaction.

The therapy change input 1829 can be an input provided by the user 1827 to change a therapy that is currently being delivered to the user 1827. In some embodiments, the therapy change input 1829 may cause the insulin or glucagon infusion pump to start infusing an amount of insulin or glucagon into the user 1827. Alternatively, the therapy change input 1829 may modify the rate of insulin or glucagon infusion into the user 1827. The therapy change input 1829 may also cancel insulin or glucagon infusion into the user 1827 from the insulin or glucagon infusion pump.

When a wake action is detected by the wake interface 1822, a wake input is sent to the control and computing module 610 wherein it imitates a wake control procedure 1834 that generates a wake signal to wake/unlock the user interface (e.g., a touch screen display).

When in the wake and/or unlocked state, a user may interact with the touchscreen display 1824, alphanumeric pad 1826 or other types of user interfaces that may be included in the user interface module 1808, to obtain access to therapy change user interface.

The therapy change user interface may be activated by a first user interaction with the user interface (e.g., touchscreen display 1824). When the first user interaction is detected, the user interface module 1808 sends an input signal to the control and computing module 610 wherein it is analyzed by a therapy change control procedure 1836. If it is determined that the first user interaction satisfies a set of predefined conditions, the therapy change control procedure 1836 generates a signal to the user interface module 1808 to activate the therapy change user interface.

In some embodiments, the therapy change user interface may be limited based on the first user interaction. For example, the therapy change control procedure 1836 may send one of two signals to the user interface module 1808. The therapy change user interface may then unlock one of two different therapy change user interfaces that result in different options of therapy change selections for the user 1827. In an implementation of this example, a therapy change selection to make a significant therapy change, such as dramatically increase the rate of insulin or glucagon infusion rate, requires a first user interaction that is different from the first user interaction that would be required for an insulin or glucagon infusion at a normal or prescribed rate. In some examples, the first user interaction may be a simple interaction (e.g., a simple gesture) that unlocks a therapy change user interface with therapy change selections that are limited. Another first user interaction may be a complicated interaction (e.g., a series of complex gestures) that unlocks a therapy change user interface with therapy change selections that have no limits. An example of this implementation may be useful for child users. The child user may perform the first gesture that is made up of a series of simple inputs to unlock therapy change selections that are limited. An adult user may perform the first gesture that is made up of a series of complex inputs to unlock the therapy change user interface with therapy change selections that have no limits.

Once activated, the therapy change user interface that may provide one or more control or configuration elements that enable the user to modify the control or configuration of the ambulatory medicament device. The control or configuration element may include any type of user interface screen on the touchscreen, or other type of user interface in the non-touchscreen context, that enables or permits a user to change a configuration of the ambulatory medicament device. This change in configuration of the ambulatory medicament device may relate to a change in the therapy provided or in the detection of a triggering event that causes therapy (e.g., medicament) to be provided to a subject. For example, the change in configuration may include a selection between one or more hormones that regulate blood glucose level (e.g., insulin or glucagon) of a user, an amount of the one or more hormones that regulate blood glucose level of the user.

In some cases, a change to the configuration of the ambulatory medicament device is automatically and/or instantly recognized or implemented by the ambulatory medicament device, and/or transmitted to the ambulatory medicament device. In some cases, a confirmation of the change may be required before the change is implemented by or transmitted to the ambulatory medicament device.

This confirmation may be entered based on a second user interaction with a user interface (e.g., touchscreen display 1824). When the second user interaction is detected, the user interface module 1808 sends an input signal to the control and computing module 2110 wherein it is analyzed by a therapy change control procedure 1836. If it is determined that the second user interaction satisfies a set of predefined conditions, the therapy change control procedure 1836 implements the change to the configuration of the AMD.

The first and/or second user interactions may include the selection of an icon, a series of taps or inputs, one or more gestures (e.g., a linear swipe, an arcuate swipe, a circular swipe, or other simple or complex movement across the touchscreen), performing a pattern or sequence on the touchscreen (e.g., drawing an image), a multi-touch or multi-input interaction, a combination of the foregoing, or any other type of interaction with a touchscreen, or portion thereof. The series of inputs may be any combination of touch movements, touch points, numerical characters, alphabetical characters, and other symbols. Gesture interactions can be guided by visual indicia displayed or printed on the AMD. In some embodiments, the visual indicia can include animations that suggest or guide user interactions with a touchscreen. For example, the first user interaction can include an arcuate swipe around at least a portion of a generally circular icon or logo. In some examples, the first and/or second user interactions may include a predetermined sequence of numerical or alphabetical inputs. In some examples, a series of multiple inputs, the range of parameters for an input may be dependent on other inputs in the series. For example, required start position of a touch movement may be dependent on the position of the previous touch movement. The amount of time that the series of inputs are to be entered may also be a part of the range of parameters. For example, a series of inputs may need to be entered within 3 seconds, 5 seconds, or 15 seconds, etc. to successfully complete an input process.

Further, one or more of the interactions may include interacting with a sensor as an optical sensor (e.g., visible light or IR sensor), biometric sensor (e.g., a fingerprint or retinal scanner), a proximity sensor, a gyroscope, or a combination of accelerometer and gyroscope, and the like. Also, in some exemplary embodiments, the second user interaction may be made through a wireless signal such as RFID or Bluetooth. In some embodiments, the second user interaction may include receiving a selection of an indicator box that correspond to either insulin or glucagon and receiving a predetermined sequence of numerical inputs in order to deliver the therapy change selection.

The type of user interaction that unlocks the touchscreen, provides access to a configuration screen, and/or confirms a change to the configuration of the ambulatory medicament device may be the same or may differ.

In an exemplary embodiment, the system may have a time-out such that if no interaction occurs for a set period of time, the user interface will turn off and the therapy change request process has to start again. In one implementation of the time-out, if no interaction occurs for more than 30 seconds after the system is waked/unlocked before the second user interaction is received by the user interface, the user interface will be deactivated.

Once the configuration change is confirmed, implemented, or transmitted, the ambulatory medicament device may begin operating with the changed configuration.

This operation may include triggering therapy based on the new configuration or providing therapy based on the new configuration. For example, the ambulatory medicament device may generate a dose control signal based at least in part on the modified configuration or control parameter, or may detect a trigger based at least in part on the modified configuration or control parameter that leads to the provisioning of therapy.

With reference to FIG. 18, in some embodiments, the changes made through the therapy change user interface are sent to CCM wherein the therapy control change procedure 1836 in CCM transfers the changes to the device and subject monitoring procedure 1832. The device and subject monitoring procedure 1832 may be implemented in the CCM 610 to monitor the status of the AMD (e.g., therapy delivery configuration) and the health condition of the user 1827 (or a subject). For example, the subject monitoring procedure 1832 may receive information about a therapy change requested by a user 1827 through a user interface (a touchscreen display 1824 or alphanumeric pad 1826) or information about glucose level in subject's blood from the subject sensor 1820. Subsequently, the device and subject monitoring procedure 1832 may transmit the information pertaining a health condition of the subject and/or the AMD configuration, to the medicament dose control procedure 1830. In some examples, the parameters in the medicament dose control procedure 1830 may be adjusted based on the changes and/or information captured by the device and subject monitoring procedure 1832. The medicament dose control procedure 1830, controls the medicament delivery interface 1806 by providing a medicament dose signal. The medicament does control may be generated based on detected conditions or physiological characteristics of the subject (e.g., provided by the readings of the subject sensor 1820) and according to parameter values received from the therapy change control procedure 1836. The medicament delivery interface 1806 may provide a therapy change delivery to the user according to the information received by device and subject monitoring procedure 1832.

In some examples, the dose control signals may be produced based on time (e.g., medicament may be delivered on a periodic basis), one or more a command, indication that the subject is planning to engage or is engaging in a particular activity (e.g., eating a meal, exercising, sleeping, fasting, etc.), or any other factor that may relate to or cause the triggering of therapy (e.g., medicament delivery).

Figure 19:
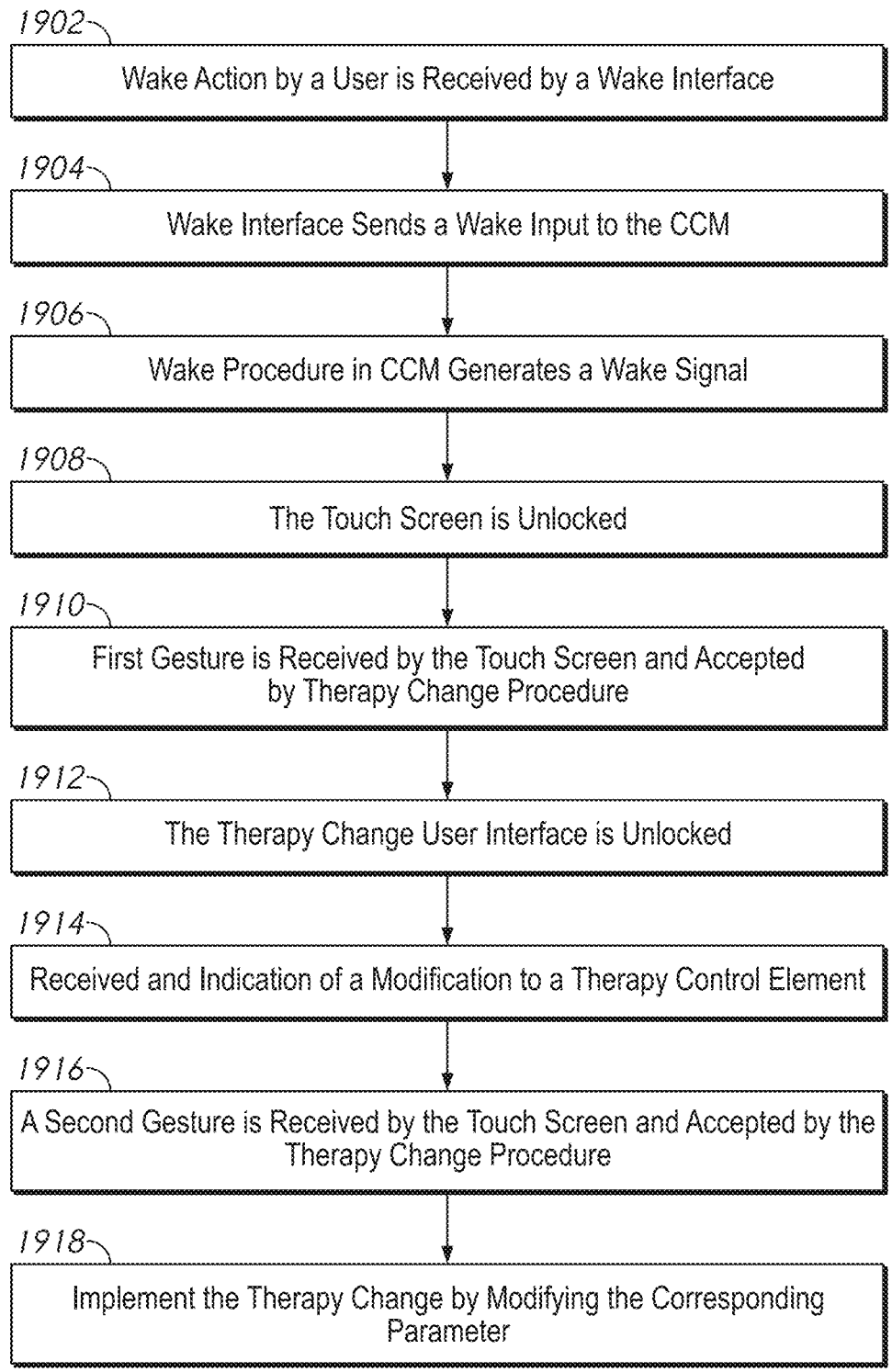
FIG. 19 is a flow diagram illustrating an example method that may be used by an AMD to allow a user to change the configuration of the ambulatory medicament device using a touch screen user interface.

FIG. 19 is a flow diagram illustrating an example method that may be used by an AMD to allow a user to change the configuration of the ambulatory medicament device using a touch screen user interface. The user may initiate the configuration change process by waking/unlocking the touch screen using a wake action. Once the wake action is received by the wake interface 1902, the wake interface sends a wake input to CCM 1904. Within CCM, the wake procedure generates a wake signal 1906 that unlocks the touch screen 1908. Next, in response to receiving a first gesture by the user 1910, the therapy change user interface is unlocked 1912. Using one or more therapy control or configuration elements provided in the therapy change user interface, the user may change the therapy configuration 1914. The user may confirm the changes made, by providing a second gesture on the touch screen 1916. Once the confirmation is received 1916 the requested changes will be implemented 1918, and the ambulatory medicament device may begin operating with the changed configuration. In some examples, once the user confirms the changes made, a dose control signal may be sent to the medicament delivery interface 1806 that triggers a therapy change delivery to the subject.

In some cases, the ambulatory medicament device, or a control device that enables a user to modify a configuration of the ambulatory medicament device, may have a timeout feature. The timeout feature may cause the ambulatory medicament device or the control device to enter a sleep or locked state after a period of time of inactivity by the user. In some cases, the timeout feature may cause the ambulatory medicament device or the control device to enter a sleep or locked state after a particular period of time regardless of whether the user is interacting with the ambulatory medicament device or control device. Thus, a user may have a limited period of time to modify the configuration of the ambulatory medicament device.

In some examples, the therapy change made by a user may trigger the delivery of a medicament according to the therapy change received and confirmed by a user. This therapy change delivery may occur after a set time from period from receiving the confirmation.

In some embodiments of the AMD, an alarm status indicator may be presented to the user via the user interface. The alarm status indicator can be an alert message or an alert symbol. The alarm status indicator may be related to a configuration change made by a user, a change in the status of the AMD not related to a user input, or the condition of the subject (e.g., detected by the subject sensor).

Figure 20A:
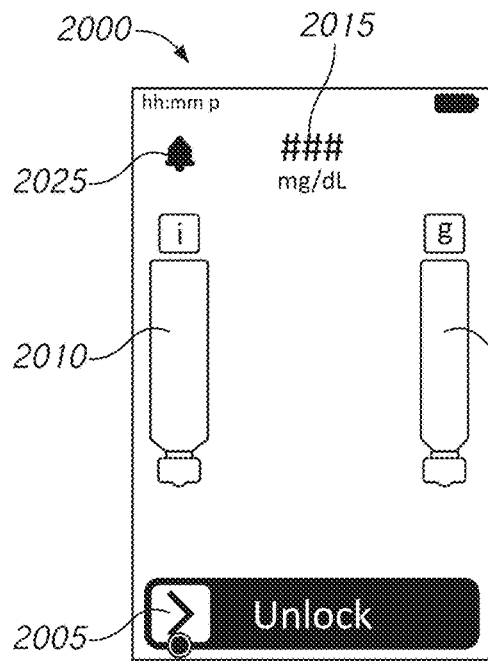
FIG. 20A is an illustration of the touchscreen display of an example AMD after the touch screen is waked/unlocked by a wake action of a user and before the first user gesture is received.

FIG. 20A is an illustration of the touchscreen display 2000 of an example AMD after the touch screen is waked/unlocked by a wake action of a user and before the first user gesture is received. Even while the touchscreen display is locked, the touchscreen display 2000 may display any images, animations, text, or other graphics. The first gesture prompt 2005 displays to the user 1827 the input required to unlock the therapy change user interface. Here, the first gesture prompt 2005 shows the user 1827 that a touch movement that begins at the greater-than symbol and moves right across the "Unlock" text is the acceptable first gesture. In addition to the first gesture prompt, the refill status of the ambulatory medical device 600 is shown in a graphic representation 2010. Here, the graphic representation 2010 shows that the insulin cartridge in the ambulatory medical device 600 is almost full. A current glucose level 2015 is shown at the top of the touchscreen display 2000, which can inform the user 1827 of the need for a hormone that regulates blood glucose levels. The touchscreen display 2000 also shows a graphic representation 2020 of a cartridge of glucagon. The graphic representation of an alarm 2025 in the touchscreen display 2000 shows that an alert is set on the ambulatory medical device 600.

Figure 20B:
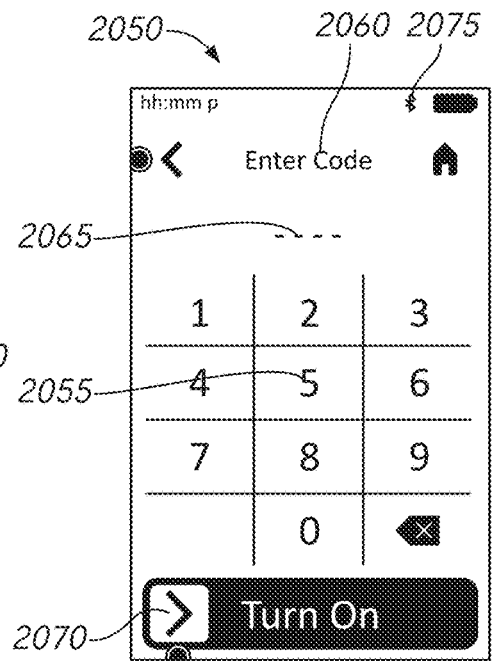
FIG. 20B is an illustration of an example touchscreen display that may prompt the user to enter a predetermined series of inputs for the first gesture or second gesture.

FIG. 20B is an illustration of an example touchscreen display 2050 that may prompt the user to enter a predetermined series of inputs for the first gesture or second gesture. In various embodiments, such as the embodiment shown in FIG. 20B, the touchscreen display 2050 may display touchable number keys 2055. In various embodiments, the touchscreen display 2050 prompts the user 1827 to enter the series of inputs that complete the first gesture or second gesture. The text Enter Code 2060 prompts the user 1827 to enter a predetermined or preselected numerical sequence as part of the first gesture or second gesture. The numerical sequence being typed by the user 1827 is displayed in field 2065 as it is entered as an aid to the user 1827. The input 2070 of the touchscreen display 2050 shows that a touch movement of a swipe right across the bottom of the screen is required to complete the predetermined series of inputs for the first gesture or second gesture. A Bluetooth connection symbol 2075 shows that the ambulatory medical device 600 is paired or can be paired to another electronic device.

Figure 20C:
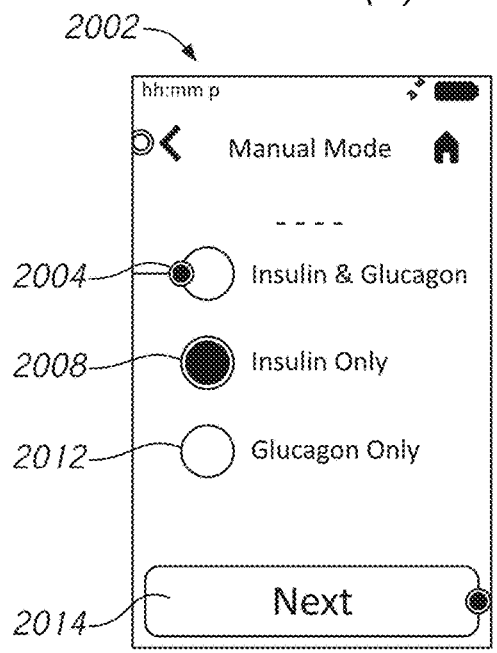
FIG. 20C is an illustration of an example therapy change user interface.

FIG. 20C is an illustration of an example therapy change user interface (in this case a touchscreen display 2002). The touch screen display may the user 1827 prompt to select a hormone that regulates blood glucose level. The touchscreen display 2002 presents the user 1827 with an option to select between two hormones. The touchscreen display 2002 aids the user 1827 by showing the selection 2008 for the user 1827. The selected hormone is "insulin Only" 2008. The user 1827 is also given the options of selecting the hormone glucagon only button 2012 or both insulin & glucagon button 2004 to regulate blood glucose level. Once the user 1827 selects between the one or more hormones that regulate glucose level. The Next button 2014 may be selected to complete the therapy change selection or select more options. In one embodiment, to select more options, the therapy change user interface prompts the user 1827 to select an amount of the one or more hormones that regulate glucose level of the user 1827. In other embodiments, the user 1827 may be prompted to select a glucose level and the ambulatory medical device or the glucose level control system (e.g., AMD 100, or AMD 600) may choose the hormone and the amount of the hormone.

Figure 20D:
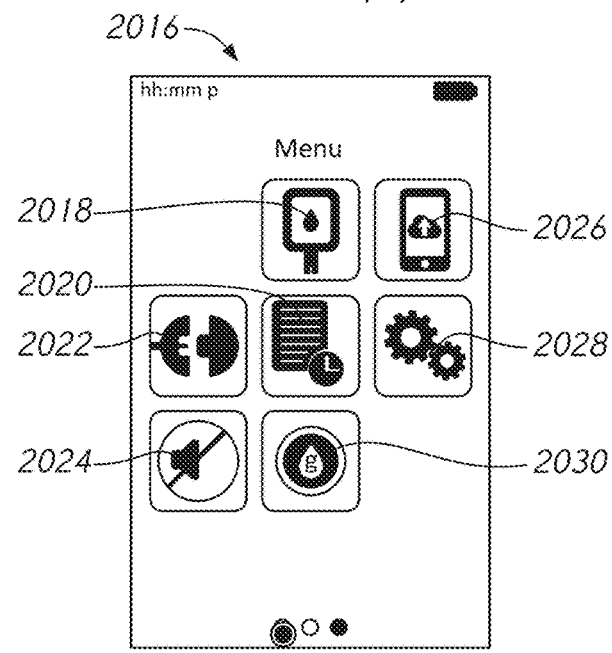
FIG. 20D is an illustration of another therapy change user interface on a touchscreen display.

FIG. 20D is an illustration of another therapy change user interface on a touchscreen display 2016. Here, the user 1827 is given a multitude of options. One or more options in the therapy change user interface allow the user 1827 to make a therapy change selection. Other options are related to the therapy change selection. A Deliver Hormone Button 2030 allows the user 1827 to select a therapy change that delivers a hormone that regulates blood glucose to the user 1827. A Test Blood glucose Button 2018 allows the user 1827 to test the glucose level of the user 1827. A Generate Report Button 2020 generates a document that reports the therapy changes that have been delivered to the user 1827. A Refill Cartridge Button 2022 allows the user 1827 to fill a cartridge in the ambulatory medical device 600 with medicament. An Upload to Cloud Button 2026 allows the user 1827 to transmit therapy change information to a cloud-based server. A Sound Control Button 2024 allows the user 1827 to control the sounds emitted by the ambulatory medical device 600. A Settings Button 2028 allows the user 1827 to manipulate other settings of the ambulatory medical device 600.

As mentioned above, in some embodiments of the AMD, an alarm status indicator may be presented to the user via the user interface to alert the user about a change made or occurred in the AMD configuration.

For example, with reference to FIG. 18, the user 1827 may make a therapy change, e.g., by providing a therapy change input 1829 to the using the user interface module 1808 and based on the procedure illustrated in FIG. 19. Once therapy change procedure 1836 implements the therapy change, the AMD may alert the user that a therapy change is implemented. The alert message or symbol may be presented on a user interface (e.g., touch screen display) before and/or during the therapy change delivery 1807. For example, alarm indicator may inform the user 1827 that a therapy change is about to occur. Any number of details of the therapy change may be displayed as part of the alert message or symbol. In some cases the alarm status indicator may appear after the user unlocks or wakes the user interface using a wake action.

Figure 21:
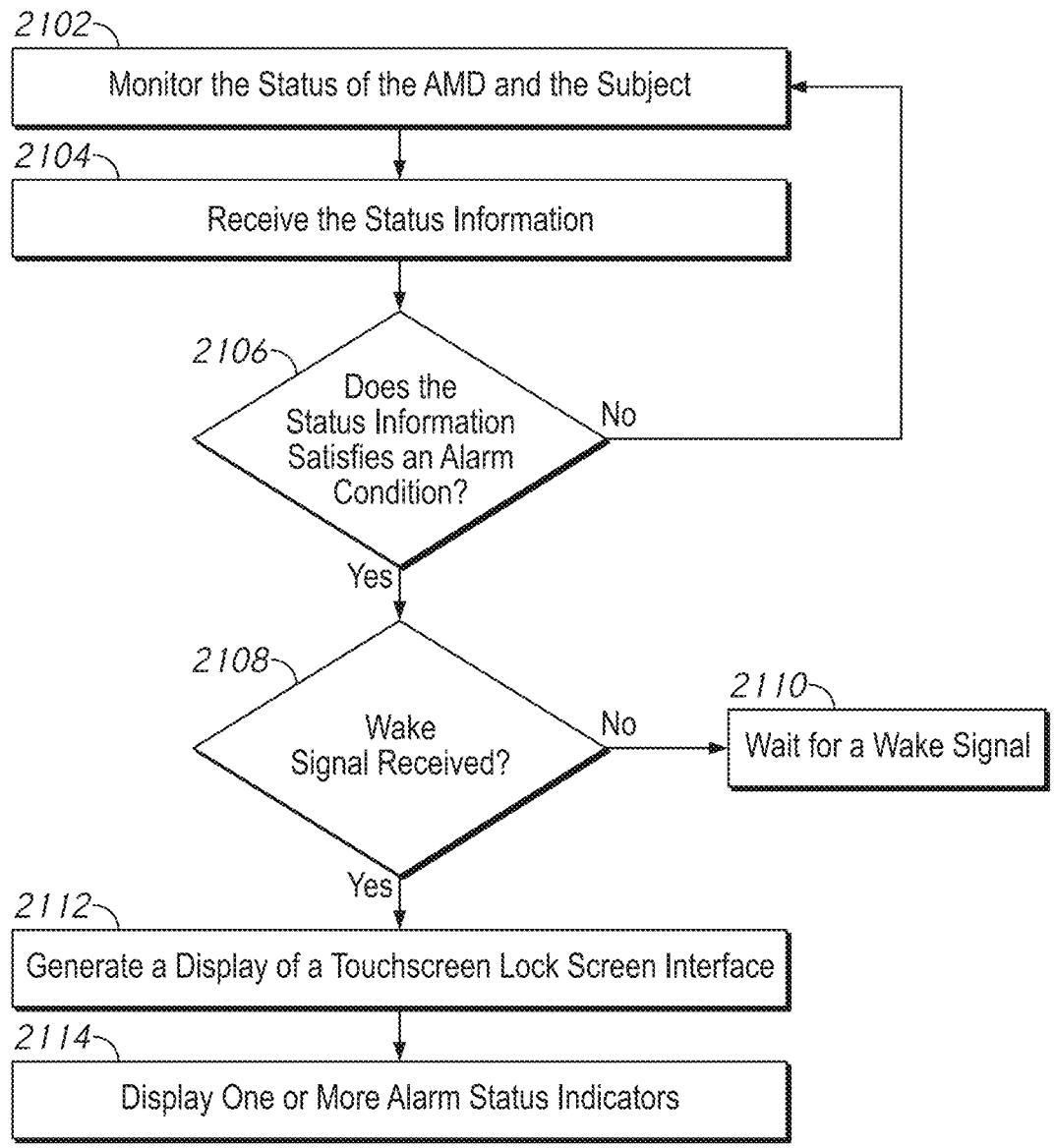
FIG. 21 is a flow diagram illustrating an example method that may be used by an AMD to generate an alarm status indicator.

FIG. 21 is a flow diagram illustrating an example method that may be used by an AMD to generate an alarm status indicator. In some embodiments the device and subject monitoring procedure (excused within CCM), may continuously monitor the status of the AMD 2102 (e.g., the user interface, different modules of the AMD and the like) as well as the health condition of a subject (e.g., using various subject sensors such as analyte sensors). Once a status information is received 2104, the device and subject monitoring procedure may determine whether the received status information satisfies an alarm condition 2106. If the received status information does not satisfy an alarm condition, no cation will be taken and device and subject monitoring procedure continuous monitoring the AMD and the subject. If it is determined that the received status information satisfies an alarm condition, the system searches for a wake signal 2108. If no wake signal is detected, the system waits for a wake signal to be received 2110. Once a wake signal is received via one or more user interfaces or sensors, the CCM may generate a display of a touchscreen lock screen interface 2112 and display one or more alarm status indicators 2114, corresponding to the detected alarm condition, on the lock screen.

Figure 22:
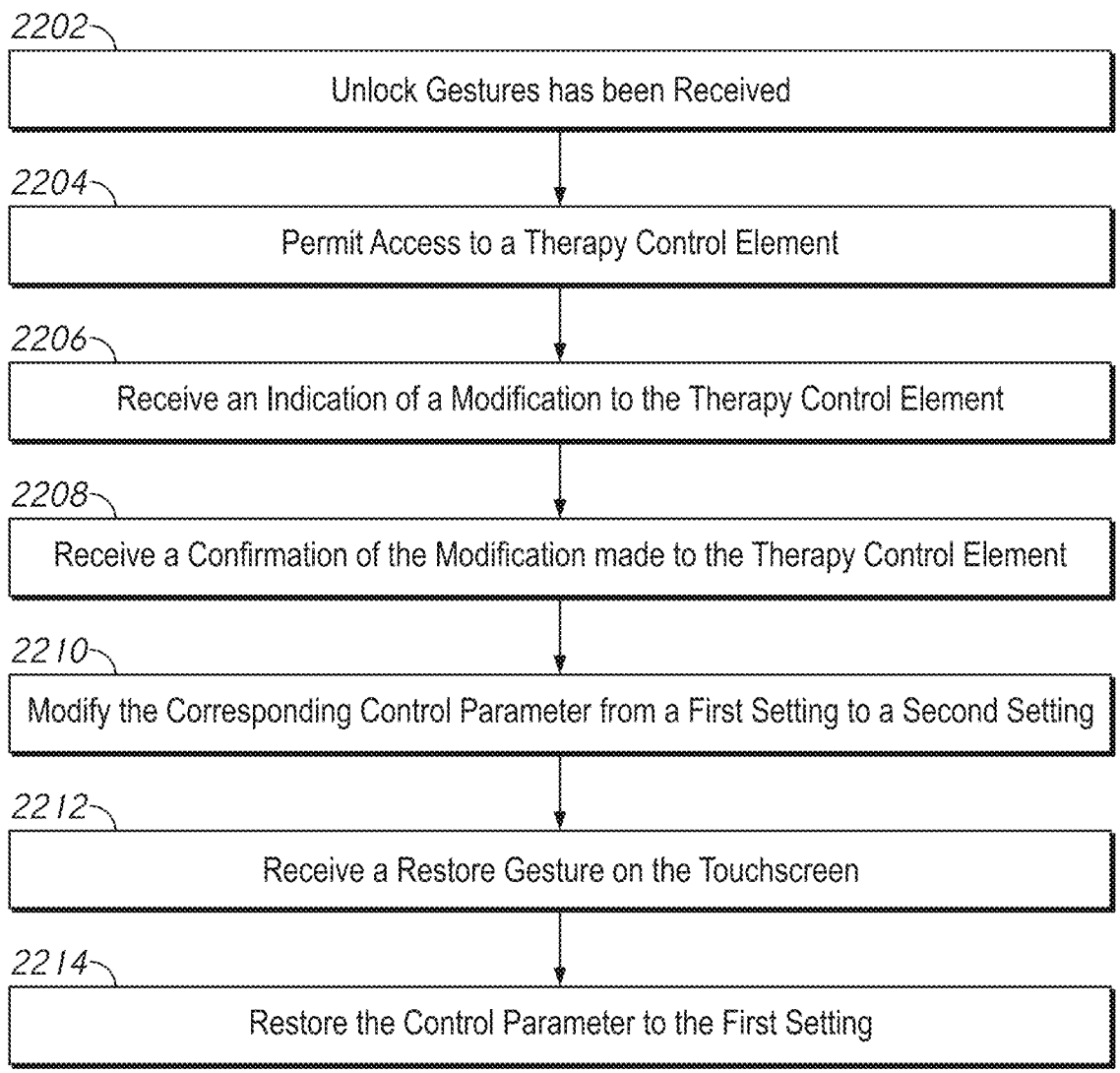
FIG. 22 is a flow diagram illustrating an example method that may be used to cancel a therapy change using a touchscreen interface.

In some embodiments, the AMD may allow the user to provide a therapy change and then cancel the therapy change. FIG. 22 is a flow diagram illustrating an example method that may be used to cancel a therapy change using a touchscreen interface. The user may unlock the touchscreen display 2202 using a wake action and get access to a therapy change user interface 2204 (e.g., using a first gesture), where one or more therapy control elements may be displayed. Next, an indication of a modification to a therapy control element may be received 2206 by the user interface followed by a confirmation of the modification made 2208 (e.g., a second gesture). In response to receiving an indication and confirmation of a modification to a therapy control element, the corresponding control parameter may be changes from a first setting to a second setting 2210. In some examples, once the change is implemented 2210, the user may decide to cancel it, for example, after realizing that requested change is erroneous. In these examples the user may provide a third gesture 2212 on the touch screen. In response to receiving the third gesture from the user interface the therapy change procedure may restore the modified control parameter to the first setting 2214. In some examples the third gesture may a restore gesture. In some cases, the restore gesture may be a swipe gesture. In some examples the swipe gesture may be performed near or in a region of the therapy change user interface that is occupied by the therapy control element. An example of a restore swipe gesture may be performed from a starting swipe position to an ending swipe position located closer to a left edge of the touchscreen than the starting swipe position. In some embodiments, the restore gesture is received on a different user interface screen than a therapy change user interface wherein one or more therapy control element are provided. In various examples, the restore gesture is performed in the opposite direction from a therapy change confirmation gesture that confirms the modification to the therapy control element.

In some examples, in order to cancel a therapy change request, the restore gesture has to be provided within a set time period after the confirmation gesture is received by the user interface. In some such examples, during the set time period one or more dose control signals may be provided to the medicament delivery interface resulting in one or more therapy change deliveries.

In some cases, the system may allow the user, to modify a therapy change before confirmation. In these cases, the user may modify a therapy control element for a second time to change the corresponding control parameter from a second setting to a third setting.

In some examples, the third setting may be the same as the first setting. In some cases, the first setting or the third setting may be a default setting. In some cases, the first setting or the third setting may be a restore setting.

Figures 23A, 23B:
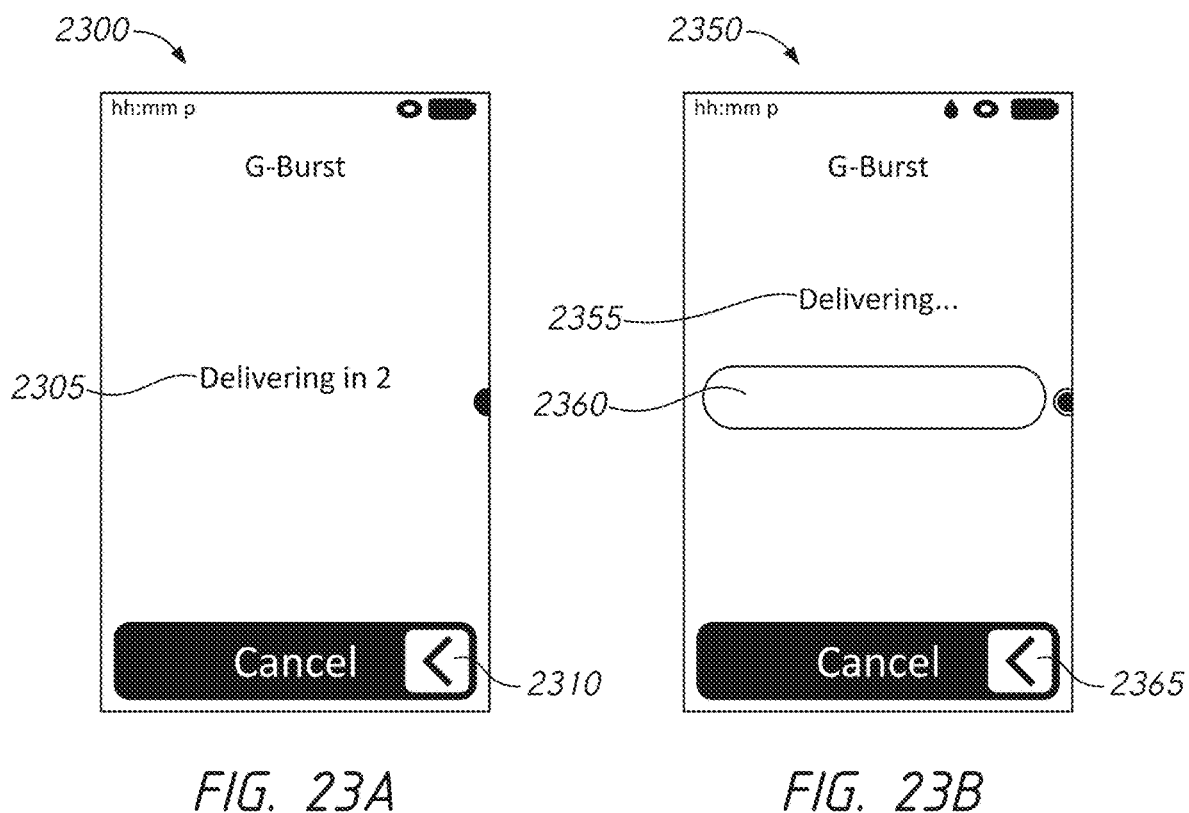
FIG. 23A is an illustration of a touchscreen display alerting the user that the delivery of one or more medicaments will occur.
FIG. 23B is an illustration of a touchscreen display showing that a medicament is being delivered to the user.

FIG. 23A is an illustration of a touchscreen display 2300 alerting the user that the delivery of one or more medicaments will occur. The alert may be accompanied by sound or vibration effects. Here, the alert informs the user 1827 a delivery of medicament will occur in 2 seconds 2305. The touchscreen display 2300 is further allowing the user 1827 to perform a gesture to cancel the therapy change. The gesture to cancel the delivery is a touch movement that starts at the less-than symbol 2310 and swipes left across the "Cancel" text. In the embodiment shown in FIG. 23A, a single gesture by the user 1827 may cancel the therapy change. In some exemplary embodiments, input of the wake signal, the first gesture, the therapy change selection, and the second gesture may all be required to cancel a therapy that is being delivered.

In some examples, the user may be able to cancel a therapy change delivery triggered based on therapy change made by the user. In these examples, the user may get access to the user interface using a wake action and provide a gesture to cancel the ongoing therapy corresponding to a therapy change delivery.

FIG. 23B is an illustration of a touchscreen display 2350 showing that a medicament is being delivered to the user 1827. The text Delivering 2355 informs the user 1827 that a medicament is currently being delivered to the user 1827. The progress bar 2360 is a graphic representation of the progress of the delivery. As shown in FIG. 23B, the delivery is only starting and zero progress has been completed. The touchscreen display 2350 is allowing the user 1827 to perform a gesture to cancel the delivery, which includes interrupting and discontinuing the delivery if it had already begun but has not yet been completed. The gesture to cancel the delivery is a touch movement that starts at the less-than symbol 2365 and swipes left across the "Cancel" text. In an exemplary embodiment that is shown in FIG. 23B, the therapy change delivery 1807 may be canceled by an input by the user 1827. The input to cancel a therapy change delivery 1807 may be any input such as a wake signal input or a series of touch inputs such as a gesture.

Additional embodiments relating to interacting with an ambulatory medicament device that can be combined with one or more embodiments of the present disclosure are described in U.S. Provisional Application No. 62/874,950, which was filed on Jul. 16, 2019 and is titled "PREVENTING INADVERTENT THERAPY CHANGES ON AN AMBULATORY MEDICAL DEVICE," the disclosure of which is hereby incorporated by reference in its entirety herein for all purposes, and in U.S. Provisional Application No. 62/874,954, which was filed on Jul. 16, 2019 and is titled "CAPACITIVE TOUCH WAKE BUTTON FOR AN AMBULATORY MEDICAL DEVICE," the disclosure of which is hereby incorporated by reference in its entirety herein for all purposes.

Automatic Resumption of Medicament Delivery Following Manual Suspension

In some cases, it may be desirable to suspend operation of the ambulatory medicament device or to suspend at least the delivery of medicament by the ambulatory medicament device for a period of time. For example, it may be desirable to suspend an operation associated with the delivery of medicament when the medicament reservoir or cartridge in the ambulatory medicament device is empty or needs replacing. As another example, it may be desirable to suspend delivery of medicament when the ambulatory medicament device is removed or is being moved to another site on the subject. In yet another example, it may be desirable to suspend delivery of the medicament when the subject is taking or ingesting another medicament that may produce a contraindication with the medicament provided by the ambulatory medicament device. In some cases, when a subject suspends the treatment delivered by a medical device, the subject may forget to resume the treatment delivered by the medical device. In some cases, the health condition of the subject may deteriorate during the suspension period requiring therapy delivery prior to end of the suspension period. As such, there is a need for AMDs that allows subjects to safely suspend treatment for temporary amounts of time.

In some embodiments, the AMD may support a therapy suspension and resumption procedure allowing a user to suspend all therapies or a subset of therapies for a period of time defined by the user as well as automatic resumption of one or more therapies at the end of the requested suspension period or when a threshold condition is met (e.g., a threshold condition associated with the health condition of the subject).

In AMDs that support therapy suspension, inadvertent activation and/or resumption of therapy delivery can be dangerous (e.g., when the AMD is an insulin and/or glucagon infusion device). In some examples to mitigate this risk, the AMD may be configured to avoid inadvertent suspension or resumption of therapies. For example, inadvertent activations of suspensions of medicament delivery may be prevented by requiring a user to perform gestures to activate suspension on the ambulatory medical device. The gestures may be entered at a particular prompt to activate a therapy suspension.

One application of the therapy suspension with automatic resumption feature in an AMD can be in the field of diabetes drug delivery. For example, the user may desire to suspend delivery of insulin when exercising, which may have a glucose lowering effect. Suspension of insulin delivery can prevent a subject from entering a hypoglycemic state (extreme low blood glucose level), which carries severe complications. Once the therapy is suspended the user may be at the risk of entering a hyperglycemic state (high glucose that may result in complications such as diabetic ketoacidosis or neurovascular complications), if the user forgets to reactivate the drug delivery after exercise. Further, the subject's glucose level may rise above or below a dangerous level during the period of exercise. In these situations, the automatic medicament delivery resumption may improve the health of the subject.

In certain cases, the AMD may suspend one or more therapy deliveries when the AMD receives an indication that therapy (e.g., delivery of medicament) is to be suspended. The indication that therapy is to be suspended may be a command from a user. Often the user is the subject, but the user may also include other users that may have a say or interest in the care of the subject. For example, the user may be a clinician or other healthcare provider, or a parent or guardian.

In some examples, the indication that the therapy or medicament delivery is to be suspended may be a command received via an interface of the ambulatory medicament device or from another device that provides the user with an interface to request that medicament delivery be suspended. For example, the device may be a smartwatch, smartphone, laptop or desktop, or other control device that can communicate via a wired or wireless connection with the ambulatory medical device.

In some cases, the indication that the therapy or medicament delivery is to be suspended may be received from the ambulatory medicament device itself. For example, if the quantity of medicament available to the ambulatory medicament device drops below a threshold (e.g., the cartridge or reservoir is empty or below a minimum dosage amount), a signal may be generated to suspend medicament delivery. In some embodiments, suspension of therapy occurs based on a loss of a sensor signal, such as the loss of a glucose level signal.

Figure 24:
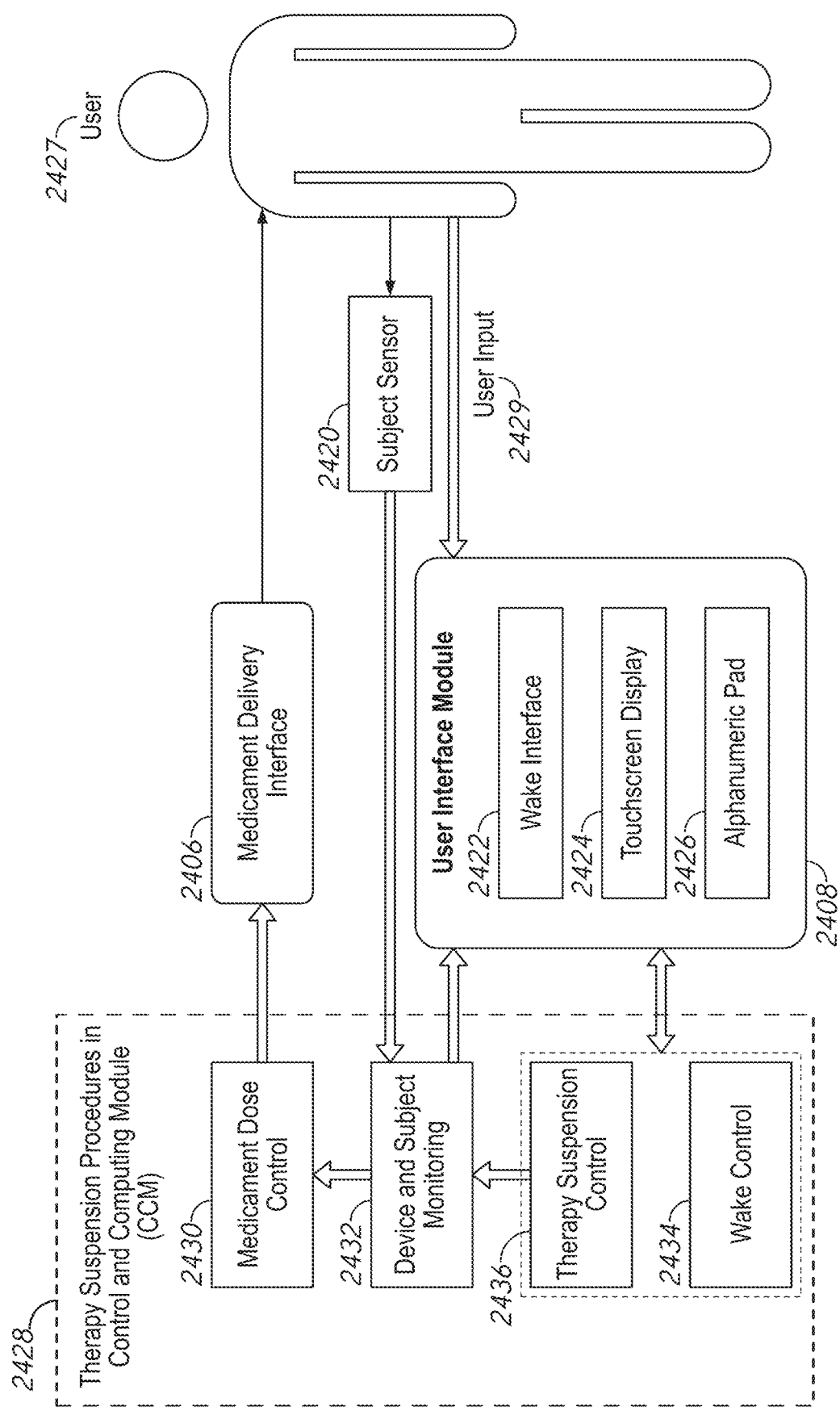
FIG. 24 is a block diagram illustrating the interconnection among modules and procedures in AMD involved in receiving, accepting and/or canceling a therapy suspension request.

FIG. 24 illustrates the interconnection among modules and procedures 2428 involved in receiving, accepting and/or canceling a therapy suspension request, in an example GLCS or AMD. In some embodiments, a request for suspending one or more therapies (e.g., delivery of one or more medicament to the subject) can be made by a user 2427 by providing an input 2429 (e.g., the start and stop time for therapy suspension, selecting the type of therapy that should be suspended, and the like), through a therapy suspension user interface provided by the user interface module 2408. In some cases, the user 2427 may be the subject and the input 2429 may be provided by the subject. The therapy suspension user interface sends the suspension request along with the corresponding information to CCM wherein the therapy suspension control procedure 2436, implemented in CCM, processes and sends a therapy suspension signal to the device and subject monitoring procedure 2432. To prevent therapy suspension request inputs 2429 that are inadvertent, the therapy suspension control procedure may include a therapy suspension request verification procedure to verify the therapy suspension request.

The device and subject monitoring procedure 2432 may be implemented in the CCM 610 to monitor the status of the AMD (e.g., therapy delivery configuration) and the health condition of the user 2427 (or a subject). For example, when the device and subject monitoring procedure 2432 receives the request for therapy suspension, it may send a signal to the medicament dose control procedure 2430 indicating that no dose control signal should be send to the medicament delivery interface 2406 during the period request by the user 2427. In some cases, if during the suspension period, certain pre-set conditions are satisfied, the device and subject monitoring procedure 2432 automatically resumes the therapy delivery by sending a signal to the medicament dose control procedure 2430. For example, if during the suspension period the subject sensor 2420 detects an elevation of the level of one or more analytes in subject's blood and/or interstitial fluid beyond a set threshold, it may resume the medicament delivery to the user 2427 by a sending a dose control signal to the medicament delivery interface 2406.

In order to prevent inadvertent activation of a suspension, the user may initiate a therapy suspension request starting with a wake action (e.g., received by the wake interface 2422 and processed by the wake control procedure 2434), that activates the user interface module 2408. Using a first interaction with a user interface (e.g., a touchscreen display) the user may unlock a therapy suspension user interface where the information pertaining therapy suspension is provided. Next, the user may confirm the requested therapy suspension using a second interaction with the user interface. In some examples, the system may allow access to the therapy suspension user interface and accept the suspension request, if the first and second interaction with the user interface are verified by the therapy suspension control procedure 2436.

In some examples, the therapy suspension control procedure 2436 may receive the request for suspension and suspension information from another device connected to the ambulatory medical device 600 (e.g., through the communication module).

The suspension information provided by the user may include a set of parameters evaluated for suspending therapy. For example, the suspension information may include the dates and/or times for starting and ending the therapy suspension, threshold values associated with a threshold condition that may trigger an early resumption of the therapy delivery, and the like. In some other examples, suspension information may indicate that the suspension of therapy should happen at a particular time or after a particular event (e.g., after the next dose of medicament is delivered or after the condition of the subject reaches a particular state, such as the middle of a desired glucose level range). In some examples, the threshold values may be associated with input provided by the subject sensor 2420 or other types of sensors that may be used to monitor one or more parameters associated with the health condition of the user 2427.

The parameters for a suspension may include the start and stop conditions for a suspension. The start condition for a suspension may be a condition that, when met, activates a suspension. In some such examples, the start condition is met when a timer runs out. Similarly, the stop condition is a condition that, when met, ends the suspension. In one example, the stop condition is met when a timer runs out. In another example, the stop condition is met when a threshold is met. A threshold may be related to a measurement taken by ambulatory medical device (e.g., by a subject sensor 2420), such as a glucose concentration of the blood of a user. The threshold may be met if the glucose concentration goes above, goes below, or matches a set concentration. Multiple conditions may be set by the suspension request interface component. For example, a time condition and a threshold condition may be set simultaneously. A user may specify that a suspension will end after a set time. However, the suspension may end sooner than the set time if the glucose concentration of the user meets a threshold.

In some cases, the request to suspend therapy may include an indefinite suspension period. In other words, the request may not include a time period specified by a user or an identity of a resumption condition. In some cases, the indication may include a request to temporarily suspend delivery of therapy for a defined period of time or until a further interaction or event occurs. Thus, the resumption condition can include an expiration of time or an active event (e.g., a command or a determined condition of a subject). Further, the therapy to be suspended may include any type of therapy. For example, the therapy to be suspended may be the suspension of the delivery of medicament, which may include insulin, counter-regulatory agent (e.g., Glucagon), or both insulin and a counter-regulatory agent. In some cases, the ambulatory medicament device may be capable of and/or configured to administer multiple medicaments (e.g., both insulin and a counter-regulatory agent). In some such cases, the request to suspend therapy may include a request to suspend one (e.g., insulin or the counter-regulatory agent) or both of the medicaments.

The interactions with the user interface may include the selection of an icon, a series of taps or inputs, one or more gestures (e.g., a swipe or other simple or complex movement across the touchscreen), performing a pattern or sequence on the touchscreen (e.g., drawing an image), a multi-touch or multi-input interaction, a combination of the foregoing, or any other type of interaction with a touchscreen, or portion thereof. The series of inputs may be any combination of touch movements, touch points, numerical characters, alphabetical characters, and other symbols. In some examples, the first and/or second user interactions may include a predetermined sequence of numerical or alphabetical inputs. In some examples, a series of multiple inputs, the range of parameters for an input may be dependent on other inputs in the series. For example, required start position of a touch movement may be dependent on the position of the previous touch movement. The time that the series of inputs are entered may also be a part of the range of parameters. For example, a series of inputs may need to be entered in no less than 3 seconds or more than 3 seconds, and no more than 15 seconds or less than 15 seconds. In some cases, a visual guide may assist the user in generating the user interaction. For example, one or more arrows or images may be presented to the user to guide the user in providing the command to suspend the delivery of therapy.

Further, one or more of the interactions may include interacting with a sensor as an optical sensor (e.g., visible light or IR sensor), biometric sensor (e.g., a fingerprint or retinal scanner), a proximity sensor, a gyroscope, or a combination of accelerometer and gyroscope, and the like. I In some exemplary embodiments, the second user interaction may be made through a wireless signal such as RFID or Bluetooth. In some embodiments, the second user interaction may include receiving a selection of an indicator box that correspond to either insulin or glucagon and receiving a predetermined sequence of numerical inputs in order to deliver the therapy change selection.

The type of user interaction that unlocks the touchscreen, provides access to a therapy suspension user interface or confirms a suspension request may be the same or may differ.

In some exemplary embodiments, the system may have a time-out such that if no interaction occurs for a set period of time at a step during the therapy suspension request process, the user interface may turn off. In some such cases, the therapy suspension request process may need to restart if therapy suspension is desired. In one implementation of the time-out, if no interaction occurs for more than 30 seconds after the system is waked/unlocked before the second user interaction is received by the user interface, the user interface will be deactivated.

Figure 25:
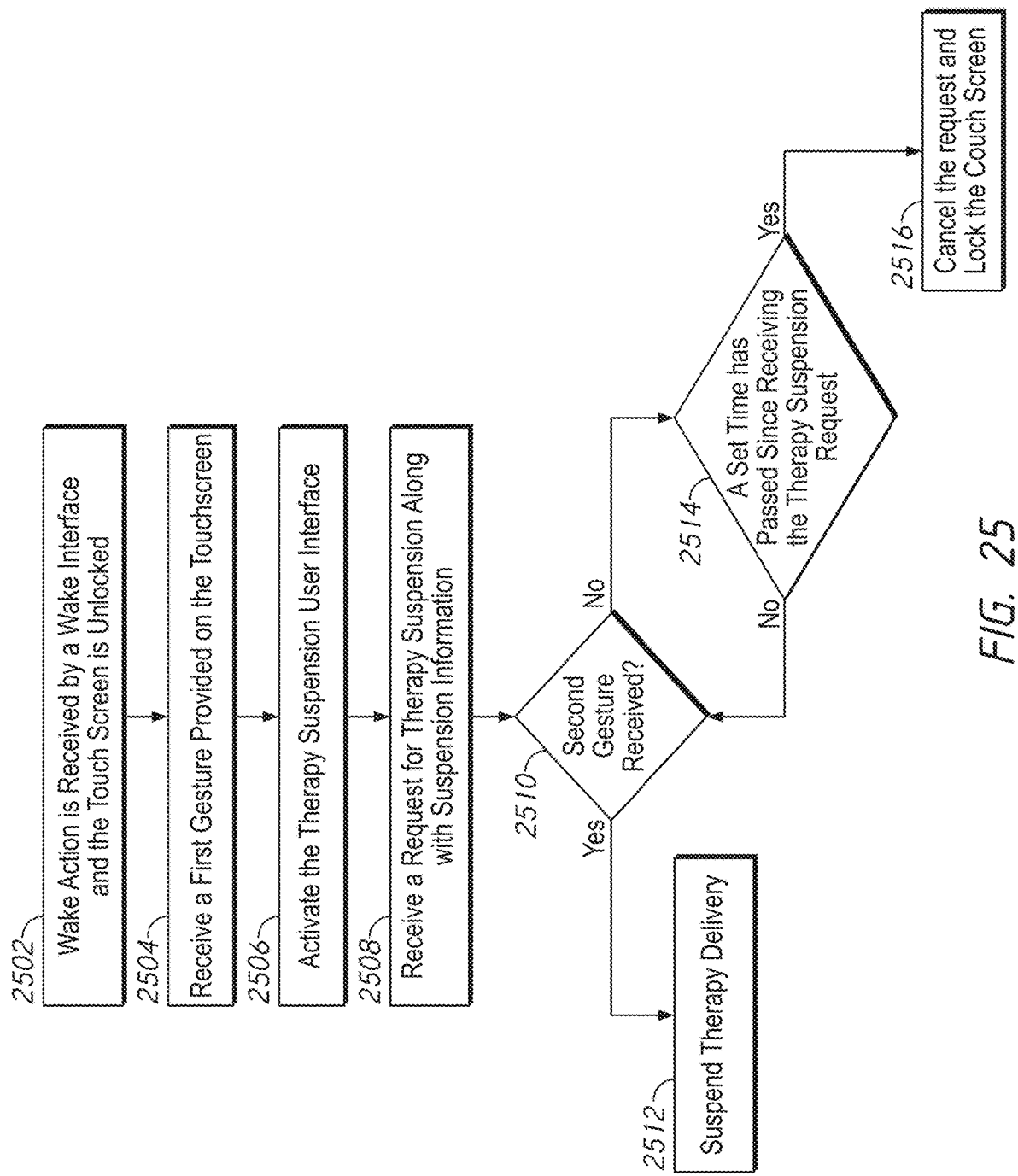
FIG. 25 is a flow diagram illustrating an example method for receiving and implementing a suspension request, which may be implemented by an AMD

FIG. 25 is a flow diagram illustrating an example method for receiving and implementing a suspension request, which may be implemented by an AMD. In this example the user may use a touchscreen interface to request and confirm a therapy suspension. Once the user activates the touchscreen using a wake action 2502, the AMD may wait for a first gesture on the touchscreen. After the user provides the first gesture and the gesture is verified by the therapy suspension control procedure 2436, a therapy user interface may be activated 2506 where the user can request a therapy suspension and provide 2508 the suspension information (e.g., a start day/time and stop day/time and/or a resumption condition). Next, the AMD may wait for second gesture on the user interface 2510. If the second gesture is received and verified by the therapy suspension control procedure 2436, the therapy delivery will be suspended 2512. If the second gesture is not received or not verified by the therapy suspension control procedure 2436, the therapy suspension control procedure 2436, may determine if a set time has passed since receiving the therapy suspension request 2514. If it is determined that a set time has passed since receiving the therapy suspension request, the request may be canceled and the touch screen may be locked 2516. If it is determined that time from receiving the therapy suspension is less than a set time the AMD may wait for the second gesture to be received.

In some examples, once a wake action is received 2502, the AMD may automatically activate a therapy suspension user interface 2506, without the first gesture 2504. In these examples, once the request for therapy suspension is received 2508, a gesture (e.g., a first gesture) may be required to verify the request. In some such examples, once the therapy delivery is suspended, a second gesture may stop a suspension before any of the conditions of the stop parameter are met. This allows the user the versatility of being able to modify a suspension that has been activated.

Figure 26:
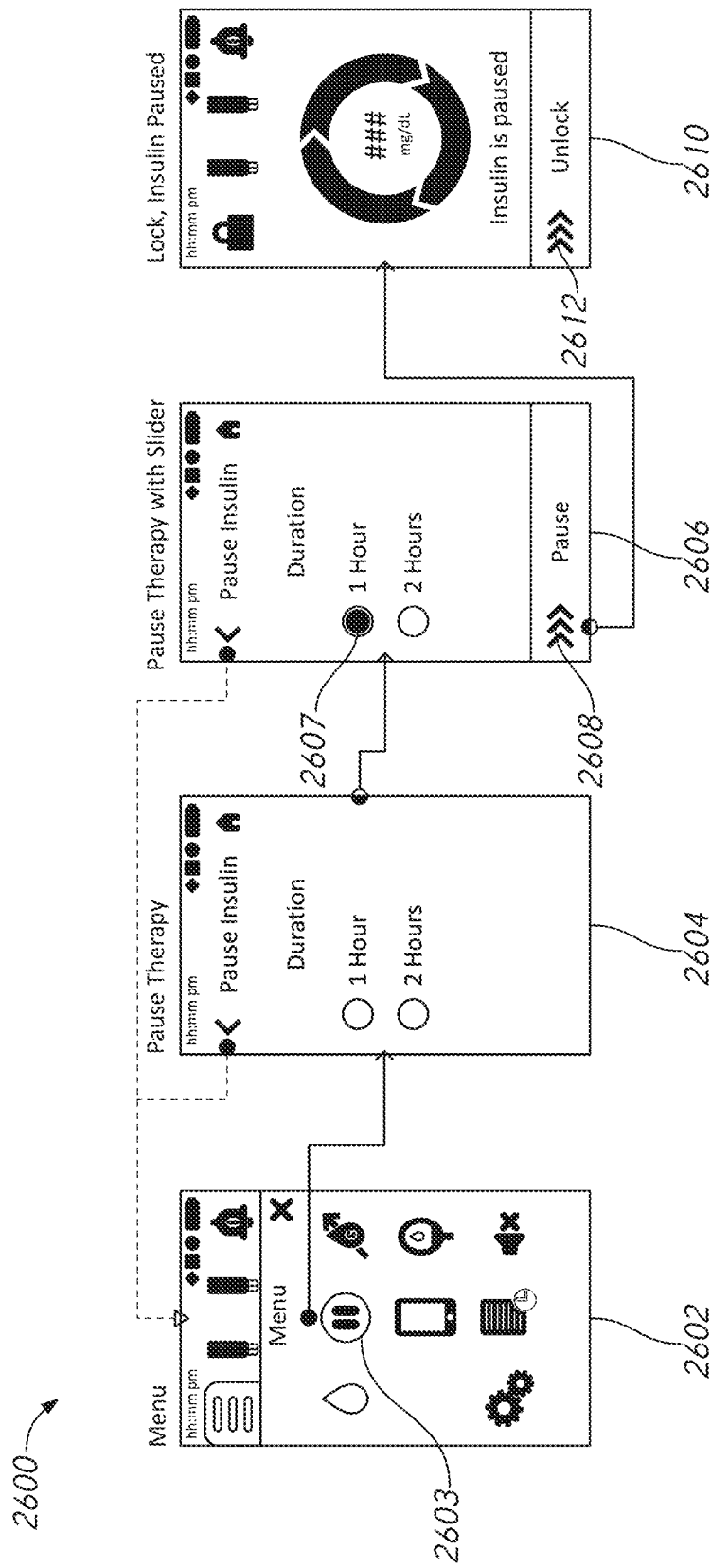
FIG. 26 illustrates a plurality of screens that the ambulatory medical device may display when a user pauses therapy.

FIG. 26 is an illustration 2600 of a plurality of screens that the ambulatory medical device may display when a user activates a therapy suspension user interface. Screen 2602 shows a user interface that an ambulatory medical device may display to a user 2427. The display may be a touch-screen display 2424 that can accept input that includes the first and second gestures. The therapy suspension system shown in FIG. 24 is not limited to the displays shown in FIG. 26. Various displays may communicate to the user 2427 the same information shown in FIG. 26. The screen 2602 allows the user 2427 to select various functions. The pause button 2603, shown on screen 2602 is a function that suspends the delivery of a medicament to the user 2427. When the pause button 2603 is selected, the user 2427 is treated to the pause screen 2604. The pause screen 2604 allows the user 2427 to select a duration of the medicament suspension. The ambulatory medical device 600 may display various interfaces to allow the user 2427 to select a duration of the medicament suspension. The pause screen 2604 shows a simple interface, giving the user 2427 one of two duration options.

When the user 2427 has made a duration selection on the pause screen 2604, the pause screen 2606 shows the user 2427 the duration 2607 that the user 2427 selected (e.g., in the figure the user 2427 selected 1 hour and thus, the medicament delivery is suspended for 1 hour after the suspension begins). The pause screen 2606 has a prompt 2608 for the user to make a gesture to confirm the requested suspension before the medicament suspension begins. As shown by the prompt 2608, the user 2427 is being prompted to swipe right across the bottom of the screen. Once the user 2427 performs the gesture to begin the medicament suspension, the suspension screen 2610 is displayed on the touchscreen. The suspension screen 2610 informs the user 2427 that the medicament is paused. The user 2427 has the option of performing another gesture to unlock the ambulatory medical device. The prompt 2612 for the user 2427 to unlock the device forces the user to perform another swipe to execute more functions on the ambulatory medical device 600.

Suspending the medicament delivery may occur by not generating a dose control signal to deliver a dose of medicament. Alternatively, or in addition, suspending the medicament delivery may occur by sending a signal to the medicament pump to cease providing therapy or medicament to the subject.

In some cases, the ambulatory medicament device may not immediately suspend therapy upon receiving a command to suspend therapy. For example, if the ambulatory medicament device is in the process of delivering medicament or determines that a condition of the subject indicates that medicament may soon be required to maintain the subject's condition (e.g., glucose level) within a particular state (e.g., within a desired glucose level range), the suspension of therapy may be delayed until at least such time that medicament is not being delivered, is predicted to not be required during the suspension period, or the next therapy has been delivered. In some such cases, the ambulatory medicament device may inform that user that the suspension of therapy is being delayed. Further, the ambulatory medicament device may indicate the reason for the delay. In some cases, the user may be able to override the delay and request immediate suspension of therapy. For example, if the user is replacing the medicament cartridge, the user may override an indication that the suspension of therapy should be delayed. In some cases, the requested start time may be overridden by a determined condition of the subject.

The suspension of therapy or the suspension of the delivery of medicament may continue until a resumption condition occurs. In certain cases, when a resumption condition is met, the suspension period may automatically end without action by the user or subject.

The resumption condition may include the expiration of a time period, a command from a user (e.g., the subject), detection that the ambulatory medicament devise satisfies a condition (e.g., that medicament has been refilled), that the condition of the subject meets certain criteria (e.g., the subject's glucose level drops below a threshold range or rises above a threshold range), or any other condition that may satisfy the reason for suspension of therapy or that overrides the request for suspension of therapy. For example, the drug delivery device may be configured to automatically resume drug delivery when a glucose threshold is reached or exceeded. This threshold could be set to 300 mg/dl for example. The resumption condition may include detection of an impending risk of hypoglycemia or hyperglycemia, or a hypoglycemia or hyperglycemia event. Further, the resumption condition may include a meal announcement, or an "exercise concluded announcement," a motion sensing event, a pause of other administered medicament, a conclusion of an undefined suspension length (e.g., during cartridge change), a speed-based resumption event, a location-based resumption, a remote resumption in case of an emergency (e.g., commanded from caregiver admin software or clinician), or any other type of resumption event. In some cases, the resumption condition can include a combination of criteria.

In some cases, automatically resuming therapy may include discontinuing the suspension of therapy before the expiration of the suspension period. For example, if a condition that caused therapy to be suspended is resolved prior to the expiration of the suspension period, therapy may be resumed.

In some cases, when a resumption condition (provided by the user) is met, the ambulatory medicament device may confirm that one or more additional conditions of the ambulatory medicament device are satisfied before therapy is resumed. For example, if the ambulatory medicament device determines that medicament has not been refilled or if there is a problem with the refill (e.g., cartridge is incorrectly installed), the ambulatory medicament device may continue to maintain the suspension of therapy despite the trigger to resume therapy.

In some examples, a therapy suspension may be ended if a third interaction with a user interface (e.g., a gesture) is detected. The third user interface interaction may be detected by the user interface module 2408 and sent to the therapy suspension control procedure 2436. If the therapy suspension control procedure 2436 verifies that third interaction with the user interface is a predetermined third user interface interaction, it may send a signal to the device and subject monitoring procedure 2432 to activate the medicament dose control procedure 2430. This allows the user the versatility of being able to end a suspension that has been activated, during the suspension period set by the user before the confirmation (second interface with the user interface). In some cases, a user may decide to end a therapy suspension to modify one or more suspension conditions set prior to activation of the current therapy suspension. In some other examples, user may decide to end a therapy suspension due to change in user's health condition not included in one or more therapy resumption conditions provided before activating the current therapy suspension.

Figure 27:
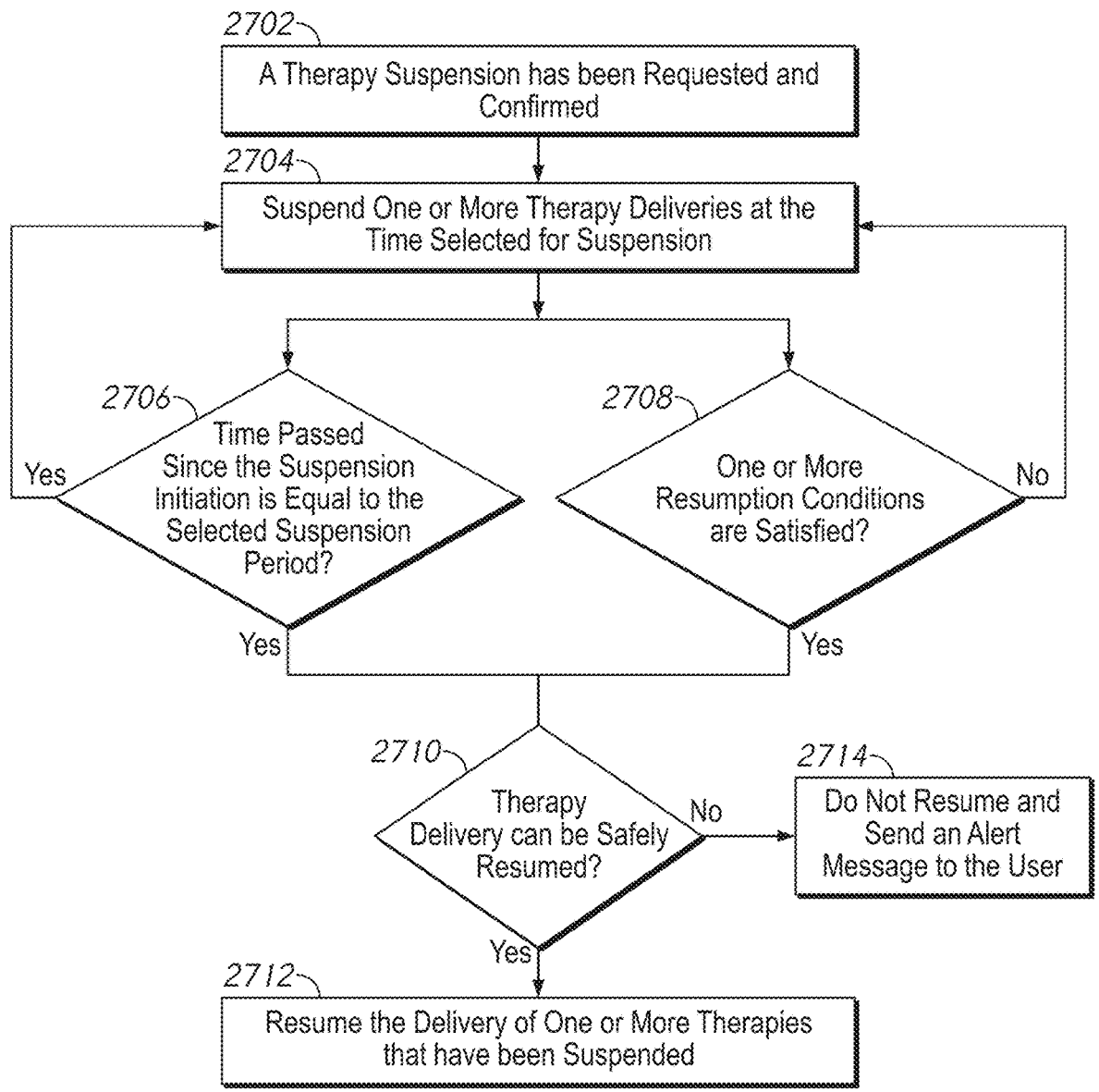
FIG. 27 is a flow diagram illustrating an example method of resuming a suspended therapy that may be implemented by an AMD.

FIG. 27 is a flow diagram illustrating an example method of resuming a suspended therapy that may be implemented by an AMD. Once a therapy suspension has been requested and confirmed by a user 2702 (e.g., using the procedure illustrated in FIG. 10), the AMD suspends 2704 one or more therapies selected for suspension at suspension initiation time received as part of the suspension information. For example, therapy suspension control procedure 2436 deactivates the medicament dose control procedure 2430 using the device and subject monitoring procedure 2432. During the suspension period, the therapy suspension control procedure 2436 continuously monitors the system clock and the subject and device condition (e.g., using medicament dose control procedure 2430).

If the therapy suspension control procedure 2436 determines that the time passed since the suspension initiation is less than the requested suspension time period 2706 and none of condition for resumption has been met 2708, the therapy suspension continues.

If the therapy suspension control procedure 2436 determines that the time passed since the suspension initiation is equal to the requested suspension time period 2706, or one or more resumption conditions have been met 2708, it may check other AMD or subject conditions (not included in the therapy suspension information), in order to determine whether the therapy delivery can be safely resumed 2710. If it is determined that the therapy delivery cannot be safely resumed, an alert message 2714 will be send to the user interface to inform the about the reason for such determination. If it is determined that the therapy delivery can be safely resumed, the one or more suspended therapies will be resumed 2712.

Figure 28:
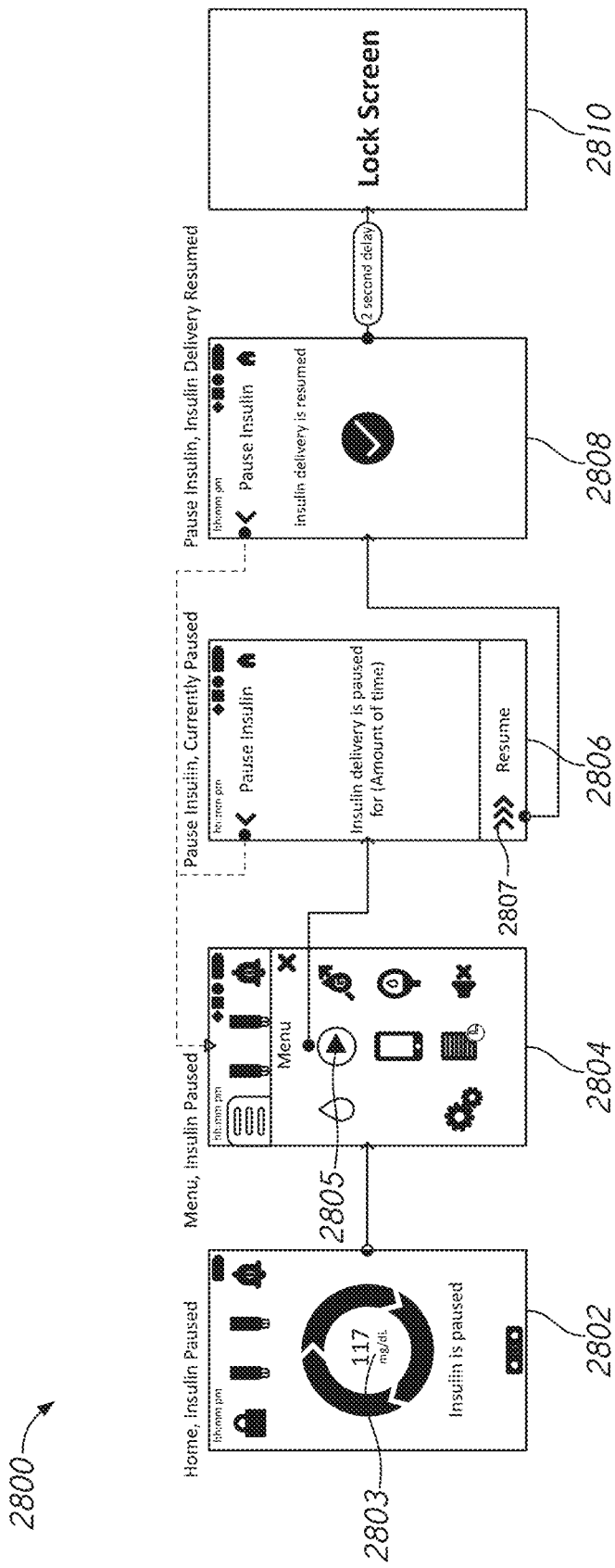
FIG. 28 illustrates a plurality of screens that the ambulatory medical device may display when a user resumes therapy.

FIG. 28 is an illustration 2800 of a plurality of screens that may be displayed, for example, on a touchscreen display when a user 2427 resumes a suspended therapy. Screen 2802 informs the user that the delivery of medicament is currently in a suspended mode. The screen 2803 also shows the user 2427 the current glucose concentration of the blood of the user 2427. The ambulatory medical device 600 may display various vital measurements that are useful to the user 2427. In one implementation, the medicament suspension ends if the glucose concentration of the blood of the user meets or passes a threshold.

The interface screen 2804 allows the user 2427 to select and execute various functions on the ambulatory medical device 600. The resume button 2805 is a function that ends a medicament suspension. When the resume button 2805 is selected, the ambulatory medical device 600 displays a resume screen 2806. The resume screen 2806 has a prompt 2807 that prompts the user 2427 to perform a gesture. In the examples shown, the user 2427 is being prompted in the resume screen (e.g., by the prompt 2807) to swipe right across the bottom of the resume screen 2806. The requirement to perform the gesture to resume medicament delivery prevents the user 2427 from inadvertently resuming medicament delivery in the ambulatory medical device 600.

Once the user 2427 performs the gesture to resume medicament delivery, the medicament suspension ends. The resumption screen 2808 shows the user 2427 that the regular medicament delivery has resumed. Once the resumption screen 2808 has been displayed to the user 2427 for a sufficient amount of time to inform the user 2427 that the suspension is ending, the ambulatory medical device 600 may display a lock screen 2810. The lock screen 2810 prevents the user 2427 from inadvertently executing more functions on the ambulatory medical device 600.

In some embodiments, the ambulatory medical device 600 may end the suspension before the one or more conditions to end the suspension are met in response to a second gesture performed on a user interface (e.g., the interface screen 2804). Advantageously, the second gesture may be used to ensure that the user 2427 does not inadvertently end the suspension of medicament delivery. Like the first gesture, the second gesture may be relatively simple (e.g., a single swipe) or complex (e.g., a multi-swipe gesture, a touch gesture of a circle, or a swipe to the left and then up on a touchscreen beginning from a lower right corner).

With reference to FIG. 24, once the AMD device is instructed to resume therapy and/or determines that therapy is to be resumed, the ambulatory medicament device may determine whether a dose of medicament should be supplied to the user based on a control algorithm used by the ambulatory medicament device to control the provisioning of medicament to the subject. For example, the therapy suspension control procedure 2436 may determine a resumption condition has been satisfied or receive a user input from the user interface module 2408 (a third interaction with a user interface) indicating that therapy suspension should be ended. Subsequently the therapy suspension control procedure 2436 may send a signal to the device and subject monitoring procedure 2432 to activate the medicament dose procedure 2430. If medicament is to be supplied, the Medicament does control may generate and send a dose control signal to the medicament delivery interface 2406.

In some cases, the ambulatory medicament device may alert the user and/or the subject that therapy is being resumed. This alert may occur before generating a dose control signal and/or after a resumption condition is satisfied (e.g., a suspension time expires). In some cases, the user may request that the suspension of therapy end early. The user may request the early resumption of therapy be interacting with the aforementioned user interface using one or more of the previously described interaction methods (e.g., gestures or taps).

Additional embodiments relating to suspending medicament delivery to a subject that can be combined with one or more embodiments of the present disclosure are described in U.S. Provisional Application No. 62/910,970, which was filed on Oct. 4, 2019 and is titled "METHOD FOR SUSPENDING DELIVERY OF A DRUG INFUSION DEVICE WITH AUTOMATIC RESUMPTION OF DELIVERY," the disclosure of which is hereby incorporated by reference in its entirety herein for all purposes.

AMD with Security Functionality

An ambulatory medicament device (AMD), such as, but not limited to, an insulin pump, that provides life-saving treatment to subjects or subjects based on the condition of the subject, may include a user interface (e.g., a touchscreen display) that lets a user to modify the settings of the ambulatory medicament device. The setting may include, but not limited to, a condition that triggers the delivery of medicament to a subject, the quantity of medicament delivered when a condition is met, type of the medicament and the like. The setting may also include features of the AMD that may not be directly related to the medicament delivery (e.g., the screen brightness, an alarm sound, and the like). In some examples, it is desirable to manage access to various settings of the AMD in order to avoid inadvertent changes while enabling changes that may be necessary or preferred for uninterrupted and proper operation of the AMD. For example, it may be desirable to limit the access to some settings to certain authorized users (e.g., a healthcare provider) while enable access to some other settings other authorized users (e.g., the subject, a guardian or parent of the subject).

In many cases, a healthcare provider can modify the settings of the ambulatory medicament device. However, it is often desirable that a non-healthcare provider modify at least some settings of the ambulatory medicament device. For example, when the ambulatory medicament device runs out of or has below a threshold amount of medicament, it is often desirable that a user be able to refill or change a medicament cartridge without visiting a healthcare provider. In some cases, changing the medicament cartridge may include interacting with a user interface and/or one or more settings of the ambulatory medicament device. Another example of when it is desirable for a non-healthcare user (e.g., a subject, parent, or guardian) to modify settings of the ambulatory medicament device is when the initial settings of the ambulatory medicament device are not providing the desired effect (e.g., sufficient medicament, too much medicament, providing the medicament too slowly or too fast, etc.). In some cases, normal maintenance of the ambulatory medicament device and/or subject may require interaction with the ambulatory medicament device settings and/or controls. For example, negative consequences may begin to occur when an ambulatory medicament device remains connected to a subject at the same site for more than a threshold period of time (e.g., for more than 2-3 days, more than 5 days, more than a week, etc.). Thus, the ambulatory medicament device may need to be periodically moved from one site on the subject to another site on the subject (e.g., from left-side to right-side, from arm to leg, from stomach to back, etc.). The change in site location may require interaction with settings of the ambulatory medicament device (e.g., pausing operation until the site change is completed).

Although, as explained above, there are a number of reasons it is desirable to enable a user other than a healthcare provider (e.g., the subject receiving therapy, a parent, or a guardian) to have access to at least some user settings of an ambulatory medicament device, it is also desirable to regulate access to at least some of the ambulatory medicament device settings. For example, it is generally undesirable that a child (subject or otherwise), or a user below a particular age, have access to ambulatory medicament device settings that could cause harm to the subject if modified. Further, it may be undesirable for certain subjects who have diminished mental capacity regardless of age to have access to at least some ambulatory medicament settings.

The user may be a subject receiving medicament or therapy, or may be another user, such as a clinician or healthcare provider, or a parent or guardian of the subject. In some examples, the passcode required for changing one or more setting via an intermediary device may be different than the passcode required for changing the same settings directly using the AMD's user interface.

One solution to regulating access to settings of the ambulatory medicament device is to implement a lock feature to require that a user provide a passcode, a passcode, or other information before the user is permitted to modify a setting of the AMD, such as a control parameter. To simplify discussion, the disclosure will describe using a passcode. However, it should be understood that the passcode can be substituted for a passcode or any other type of secret or semi-secret information. In some examples, when the AMD is in the locked state, it may continue delivering therapy to the subject at the same rate as unlocked state.

The lock feature may be activated by default, or may be activated by a user. In some examples, the lock feature can be enabled through a setting in a control menu of the AMD device provided on a user interface (i.e., touchscreen display). The setting may include an on/off toggle (e.g., a software interface element or a hardware interface element) so when the toggle is on, a passcode (e.g., 4 to 8 numeric digits) may be required. In some cases, if the lock feature is on, the passcode (e.g., a 4 to 8 numeric digit code) may be required to turn the lock feature off. When the lock feature is activated, the user may program the ambulatory medicament device with a user passcode selected by the user. Alternatively, or in addition, the user passcode may be set in response to a passcode change request. In some cases, a user passcode may expire. In such cases, a user may be required to generate a new passcode after the previous passcode expires or before the previous passcode is permitted to expire. In some cases, the ambulatory medicament device may periodically generate a new passcode (e.g., an override passcode), or may generate the passcode at a time when a user supplies the passcode.

In some cases, the user interface element used for accessing a user interface that enable changing one or more settings of the AMD may differ from a user interface for modifying the control parameters associated with that setting. For example, a keypad may be used to enter a passcode for unlocking a user interface for changing a control parameter and a touchscreen may be used to modify the control parameter.

When the lock feature is enabled, the user interface screen may look and function the same as if the lock feature were not enabled. If the lock feature is enabled, when a visual guide for unlocking the device (such as, for example, a linear unlock slider, an arcuate unlock slider, or another unlock user interface element) is activated, a passcode entry interface (e.g., a keypad user interface element) may be displayed. If either the user passcode or the global override passcode is entered, the user interface may proceed as normal. Otherwise, the user interface may revert back to the original lock screen.

In some examples, the user action that permits a user to change one or more settings of the AMD may be different from the wake action that activates a user interface. For example, a wake action may be used to activate a touchscreen display that may display a plurality of user selectable elements some of which may be accessible without a passcode. In such examples, a subset of the user selectable elements, for example those allowing the user to change therapy control parameters, may require a passcode. In some cases, access to each user parameter control element, or at least some of the user parameter control elements, may require a different passcode. In some other examples, providing a passcode to an AMD in a locked state may directly enable access to a subset of control parameter elements.

To help recall the passcode, the passcode may be set by the user enabling the user to select a passcode the user is more likely to remember. However, regardless of who sets the passcode, there is a risk that the user will not remember the passcode. Due to the nature of the device (e.g., a device that may provide life-saving treatment), it is desirable that certain users not be restricted from accessing particular settings of the ambulatory medicament device, and be able to quickly (e.g., within seconds, minutes, prior to a next therapy event, or before harm may occur to the subject) obtain access to the particular settings when required. Thus, while some non-medical devices may implement lockout periods or other restrictions to prevent a malicious user from trying to brute-force determine a passcode for a device, such features are generally undesirable for an ambulatory medicament device. Accordingly, embodiments disclosed herein include an ambulatory medicament device that can include an override passcode that enables access to the ambulatory medicament device (or control settings thereof) regardless of whether the user passcode is provided.

In some examples the passcode or the override passcode can be a series of taps, series of inputs, a complex or a simple gesture (e.g., a swipe or other movement across the touchscreen). The series of inputs may be any combination of touch movements, touch points, numerical characters, alphabetical characters, or other symbols. In some examples, the time that the series of inputs are entered may also be a part of the range of parameters. For example, a series of inputs may need to be entered in no less than 3 seconds or more than 3 seconds, and no more than 15 seconds or less than 15 seconds. One example of the complex gesture is a swipe that forms a letter or shape. In contrast, in some cases, a simple gesture may be a unidirectional swipe.

In some other examples the passcode or the override passcode can be a complex or a simple gesture (e.g., a swipe or other movement across the touchscreen), performing a pattern or sequence on the touchscreen (e.g., drawing an image), a multi-touch interaction, a combination of the foregoing, or any other type of interaction with a touchscreen, or portion thereof. Another example of a complex gesture is entering a predetermined sequence of touches. In some cases, the passcode may include a quiz or set of questions. Advantageously, using a quiz to override the passcode can be used to ensure a minimum level of competency before overriding the passcode.

In some examples, the ambulatory medicament device may be configured to receive therapy settings or modifications to therapy settings from an intermediary device via a communication connection. In some cases, this feature may be supported in addition to providing the user with option of modifying one or more settings with a user interface of the AMD. The communication connection between the intermediary device and the AMD may be a direct connection via, for example, Bluetooth®, or a connection via a network, such as over a local area network or a wide area network. In some such cases, the ambulatory medicament device may include a wireless transceiver, such as an NB-LTE transceiver, a Wi-Fi transceiver, or a Bluetooth transceiver. The intermediary device, that provides the user with a user interface to modify settings of the AMD, include any type of device (e.g., a computing device) that can communicate with an ambulatory medicament device. For example, the intermediary device may be a laptop or desktop computer, a smartwatch, a smartphone, or a hardware control device that may be configured to interact with the ambulatory medicament device. Embodiments disclosed herein may be applicable regardless of whether the user interface for modifying therapy settings or the configuration of the ambulatory medicament device is generated or presented by the ambulatory medicament device to the user or via another device. In some such cases, a user may provide a user-generated passcode or an override passcode via an interface of the computing device. The computing device may then provide the user-generated passcode or the override passcode to the ambulatory medicament device via the network connection between the devices.

In some examples, even if the AMD is in locked state, certain intermediary devices may have access to user interfaces that may be used to change one or more settings (e.g., therapy settings) of the AMD. For example, the smart phone of a guardian or a parent of the subject may be used to change one or more settings of the AMD while the AMD is in the locked state.

In some examples, the AMD may be configured to receive a passcode from or via a computing system (e.g., a cloud computing system). In these examples, the AMD may receive passcode through a direct end-to-end connection (e.g., a wireless connection over a wide area network) stablished with the computing system. In some such examples, another computing device (e.g., a smartphone, a laptop, a personal computer, and the like) connected to the computing system, may send a passcode to the AMD and be able to change one or more settings of the AMD if the passcode is validated by the AMD.

In cases where the user cannot recall the user passcode, the user can obtain access to the user interface that permits modification of the control parameter by supplying an override passcode. In some examples, the override passcode may be a universal fixed passcode (e.g., an 8-digit override passcode) that can be used instead of the user set passcode. The override passcode can be stored in the ambulatory medicament device at the time of manufacture and may be shared among multiple ambulatory medicament devices (e.g., a global override passcode), or may be unique to a particular ambulatory medicament device. The override passcode may be managed by the manufacturer or by a third-party service. To obtain the override passcode, the user may contact the manufacturer or passcode managing service. Generally, enabling the passcode may exist to prevent a user with a diminished mental capacity (e.g., a child) from modifying settings of the ambulatory medicament device. Thus, security may be less of a concern and any user can contact the manufacturer or passcode managing service to obtain the override passcode. In some such cases, a single global override may be used for all devices produced by the manufacturer. However, in some cases, a level of security may be desired. In some such cases, it may be necessary for the user to authenticate him or herself. Further, the user may be required to provide a serial number of the ambulatory medicament device. In some cases, each model or each unit of the ambulatory medicament device may have a different override passcode. The user may provide authorization information and a serial number of the ambulatory medicament device to the manufacturer or passcode managing service to obtain the override passcode.

In some examples, may periodically generate a new override passcode or may generate an override passcode at a time when a user supplies the passcode. In these examples, the ambulatory medicament device may use the same parametric values to generate the override passcode as another device may use thereby ensuring a match between the override passcodes. Advantageously, in some cases, by using an algorithm to generate the override passcode, the override passcode can be obtained regardless of whether a user is able to contact a manufacturer or other passcode managing service. In some cases, the user may generate the override passcode without access to a network or phone using, for example, a computing device that can access a common parameter value as the ambulatory medicament device.

In some cases, the override passcode may change over time or be a rotating passcode. For example, in some cases, the override passcode may change every thirty seconds, every minute, every hour, etc. In some such cases, the override passcode may be determined from an algorithm executed by an application. The ambulatory medicament device may store a copy of the algorithm in a memory of the ambulatory medicament device and may execute the algorithm to determine the override passcode that is currently valid. A copy of the algorithm may be executed by another computing device accessible by the user. The output of the algorithm may be based on a value that is commonly accessible by the ambulatory medicament device and the copy of the algorithm accessible by the computing device. For example, the output of the algorithm may be generated based on a time, a user identifier, a provided value, or any other factor that may be used to repeatedly generate the same output. In some cases, the override passcode may be calculated based on a combination of factors. For example, the override passcode may be calculated based on a portion of a serial number or model number for the ambulatory medicament device and the time. The determination of the override passcode may be calculated by the ambulatory medicament device, a computer server, and/or an application on a user device.

In some cases, the override code can be automatically received by the ambulatory medicament device. Thus, a user may not need to see or enter the override code. In some cases, the override code may be transmitted to another device of the user (e.g., a smartphone or laptop). For example, the override code can be texted to a user's smartphone. In some cases, the override code may be received in a coded manner that may not be understandable by a child or user with diminished mental capacity.

In some cases, the override passcode may be linked to a location. For example, the override passcode may only be enterable at a healthcare provider's office, at the subject's place of residence, or at some defined set of locations. The determination of the location of the ambulatory medicament device may be based on a geolocation system (e.g., a Global positioning System (GPS)) available to the ambulatory medicament device.

In some examples, at least for a subset of therapy settings, the passcode may provide a second level of security in addition to other interactions with the user interface (e.g., a first and a second gesture on a touchscreen display) that may be used to change the therapy settings and/or accept the change made to a therapy setting. In some other examples, at least for a subset of settings, the passcode may be used instead of other interactions with the user interface (described above).

As mentioned above, interacting with the user interface may cause the ambulatory medicament device, or other device that can modify a control of the ambulatory medicament device, to present a passcode input screen to the user. The user may enter the passcode to unlock additional user interface features including, for example, a user interface that enables the user to modify at least one control parameter of the ambulatory medicament device. The control parameter can be modified based on an interaction with a parameter control element of the user interface. Further, modification of the control parameter may cause modification of the generation of a dose control signal that is generated by a control algorithm based at least in part on the control parameter.

In some embodiments, the ambulatory medicament device may have an advanced therapy screen, or other user interface, that permits a healthcare provider, or other user, to obtain additional details relating to therapy provided by the ambulatory medicament device. Although the advanced therapy screen may generally be intended for a knowledgeable user, such as a clinician, in some cases, any user may obtain access to the advanced therapy screen. The advanced therapy screen may permit the healthcare provider to modify control parameters that may not be modifiable by other users. For example, the healthcare provider may be able to control parameters that relate to the calculation of a rate of insulin accumulation, the rate the insulin diminishes within the blood of the subject, the setting of a glucose setpoint, an aggression level or factor of therapy relating to an amount of insulin provided when the subject's glucose level is outside the setpoint range, or when the insulin reaches a point of maximum concentration within the blood of the subject (e.g., $T_{max}$).

Access to the advanced therapy screen may be limited or restricted by requirement of a passcode, which may be referred to as a clinician passcode to distinguish it from the user-generated passcode and/or the override passcode. This clinician passcode may or may not be user-generated. However, the clinician passcode may be a separate passcode from the user-generated passcode that permits access to the non-advanced therapy screen interface. Further, the clinician passcode may be separate from the override passcode that permits a user to override the user-generated passcode to obtain access to the non-advanced therapy screen interface. In some cases, the clinician passcode may be used as an override passcode. In some examples, the clinician passcode can be valid for period of time (e.g., set by a subject or another authorized user such as the guardian or apparent of the subject). For example, the clinician passcode may be valid for a day, a week or a month. In some examples, the AMD may allow certain authorized users to terminate the clinician access at any time.

In some cases, access to the advanced therapy screen may be limited to a particular period of time. After the time period expires, the ambulatory medicament device may automatically restrict access to the advanced therapy screen. In some cases, the window of access may be extended. For example, if the healthcare provider is continuing to interact with the advanced therapy screen, the screen may remain accessible.

In some cases, the advanced therapy screen may provide additional features. For example, while a user may be able to indicate that an amount of insulin provided for a meal or as a correction factor should be higher or lower, the healthcare provider may be able to specifically adjust the amount of insulin. Moreover, while a user's direction may or may not be followed depending, for example, if the request exceeds a threshold or may cause glucose to not satisfy a setpoint range, an indication provided via the advanced therapy screen may be followed regardless, or may have a wider range or different threshold that may control whether the instruction is followed. Further, the advanced therapy screen may be used to temporarily pause therapy and/or may prevent subject access.

In some cases, the manufacturer of the ambulatory medicament device may provide a remote unlock signal that can be used to unlock access to the ambulatory medicament device and/or to an advanced therapy screen of the ambulatory medicament device.

As described above, the passcode may be desired to prevent particular users from inadvertently changing certain control parameters of the ambulatory medicament device. However, features of the ambulatory medicament device that do not affect therapy may remain accessible to a user when the ambulatory medicament device is in a locked state. For example, a user may be able to access therapy history, screen brightness settings or colors, or any other feature that is unlikely to harm a subject if modified in a particular manner. Further, as the passcode feature is generally to prevent control parameter changes, the ambulatory medicament device may provide therapy and continue to provide therapy at the same rate and under the same condition, whether or not the ambulatory medicament device is locked or unlocked.

When the ambulatory medicament device receives the user passcode or the override passcode, the ambulatory medicament device validates the passcode. The passcode may be validated by comparing the received passcode to a passcode stored in a memory of the ambulatory medicament device or generated by the ambulatory medicament device. If the passcode received from the user is successfully validated, the user may be granted access to a user interface to modify one or more control parameters. In some cases, the user may be requested to re-enter a passcode to confirm a change to a control parameter. In some other examples, the user may be requested to provide a gesture on a touchscreen to confirm a change to a control parameter.

If the passcode is not validated, the ambulatory medicament device, or other control device that can provide access to control parameters of the ambulatory medicament device, may prevent access to the user interface to modify the one or more control parameters. In some cases, the user interface that presents the user with the ability to enter the passcode may permit the user a particular number of tries or a particular number of tries within a particular time period to enter the user passcode. If the correct user passcode is not entered within the provided number of tries or within the particular time period, the user interface may enter a lock state (e.g., the screen will be turned off) and prevent further attempts to enter a passcode for at least a period of time. In some cases, the user passcode option may be indefinitely locked or blocked. In some such cases, the control parameters of the ambulatory medical device may only be accessible if the override passcode is provided. Alternatively, or in addition, a user passcode of a different user may be used to provide access to the control parameters of the ambulatory medical device. In some examples, if the correct override passcode is not entered within the provided number of tries or within the particular time period, the user interface may block any attempt to change the override passcode for at least a period of time.

In some cases, once the passcode is successfully entered or validated, a user may deactivate the passcode feature of the ambulatory medicament device. Deactivating the passcode feature may require use of a separate passcode or the override passcode in addition to the user passcode.

In some cases, the passcode may be optional or omitted based on the computing device connected to the ambulatory medicament device. For example, if the end-to-end connection is established between a smartphone registered to a particular user (e.g., a parent of the subject), the ambulatory medicament device may unlock automatically without requiring a passcode. In some cases, the smartphone, or other computing device, may automatically provide the user-generated passcode or the override passcode to the ambulatory medicament device upon establishing a connection. In some cases, the ambulatory medicament device may automatically be unlocked when connected to a charger or when in a particular geographic area. For example, a geofence may be configured in one or more locations, such as the subject's house or the clinician's office. When the ambulatory medicament device determines it is within the geo-fence, the ambulatory medicament device may automatically be unlocked. Similarly, when the ambulatory medicament device determines that it is not within the geo-fenced region, it may automatically be locked. The determination of the location of the ambulatory medicament device may be made based on a geo-location system, such as the Global Positioning System (GPS).

Figure 29:
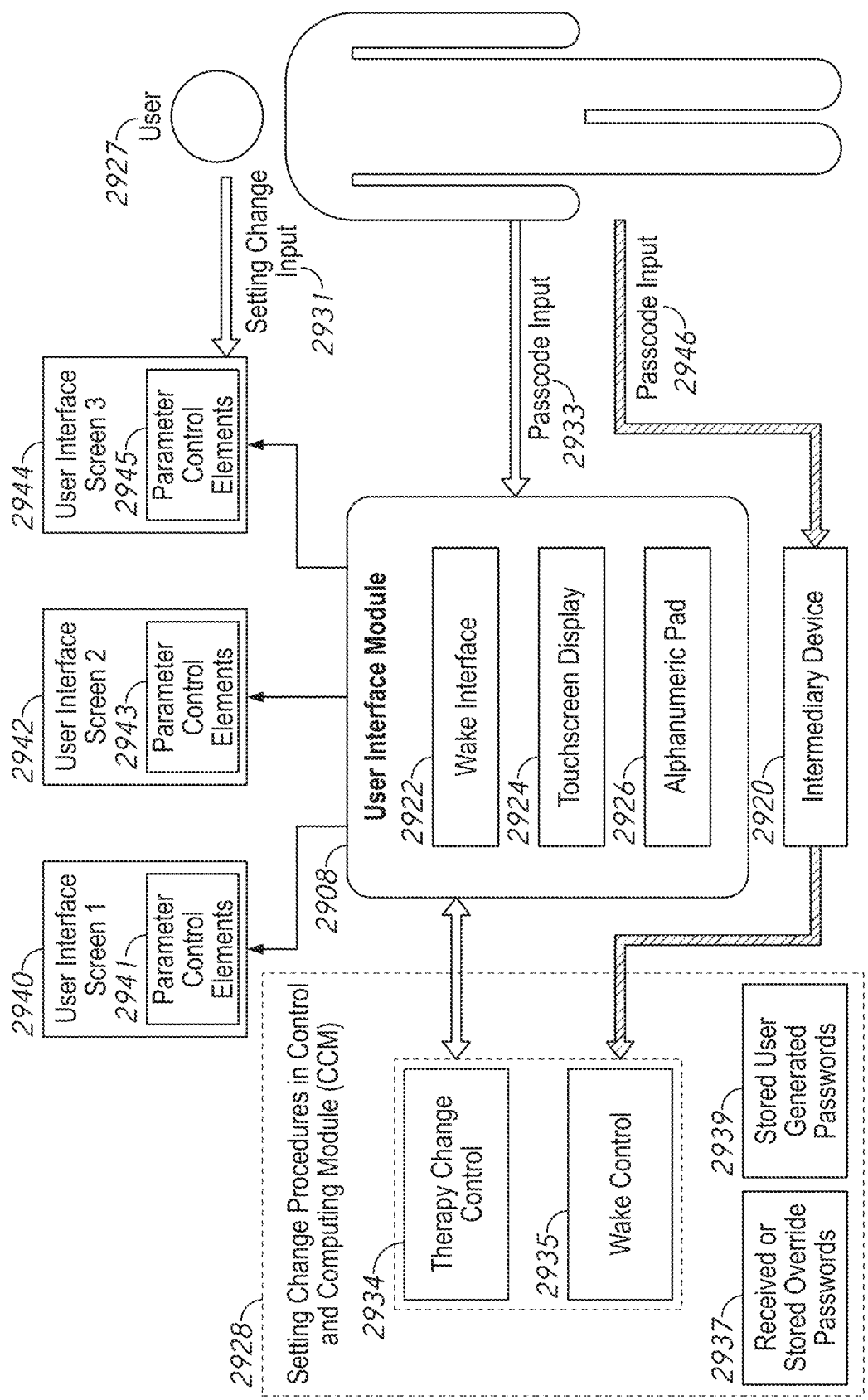
FIG. 29 is a block diagram illustrating the interconnection among modules and procedures in AMD involved in changing the settings of the AMD.

In some cases, after a certain number of incorrect passcodes are entered (e.g., after 5 tries), the user interface screen may be turned off or may accept only the global override passcode Example AMD with Security Codes FIG. 29 is a block diagram illustrating the interconnection among modules and procedures in AMD involved in changing the settings of the AMD. In some cases, a user 2927 may change one or more settings of the AMD may by providing a setting change input 2931 using one more parameter control elements 2941/2943/2945 presented on one or more setting control screens 2940/2942/2944 provided by the user interface module 2908. In some examples, when the lock feature is activated, access to one or more setting control screens 2940/2942/2944 and/or one or more parameter control elements 2941/2943/2945, may be protected by a passcode. In order to a control parameter 2941/2943/2945, the user may provide a passcode 2933 (e.g., a user generated passcode or an override passcode), via the user interface module 2908 (e.g., using a touchscreen display 2924 or alphanumeric pad 2926). Alternatively, or in addition, the user 2927 may provide a passcode 2946 using an intermediary device (e.g., a laptop, a smart phone and the like) that is connected to the AMD (e.g., via a wireless link). In some examples, the access to one or more setting control screens 2940/2942/2944 and/or parameter control elements 2941/2943/2945, may be managed by setting change procedures 2928 stored in a memory in the CCM of the AMD. A hard processor may execute the machine-readable instructions associated with the setting change procedures 2928.

In some examples, the option to provide a passcode may become available when the user 2927 performs a wake action on a wake interface 2922. In these examples if the wake control module 2934 of the CCM determines that a valid wake action is performed, it may present selectable elements associated with the setting control screens 2940/2942/2944, for example, on a touchscreen display. In some other examples, the first screen presented on the touchscreen display may provide other selectable elements including an element to change the settings of the AMD. In such examples, selecting element associated with settings change may activate a second screen that presents selectable elements associated with the setting control screens 2940/2942/2944. When the lock feature is activated, access to any of the setting control screens 2940/2942/2944 and/or parameter control elements 2941/2943/2945 may require a passcode. In some examples, each one of the control screens 2940/

2942/2944 and/or parameter control elements 2941/2943/2945 may require a different passcode. In some other examples, one or more control screens 2940/2942/2944 and/or parameter control elements 2941/2943/2945 may not require a passcode. For example, access to the first screen 2940 may require a first passcode, the access to the second screen 2942 may require a second passcode and the access to the third screen 2944 may not need a passcode. In yet other examples, all the control screens 2940/2942/2944 may be presented without the need for providing a passcode, but access (read, write, or read and write access) to one or more control elements of a control screen may require a passcode. For example, the user may select the second screen 2942 without entering a passcode but in order to select one or more parameter control elements 2943 on that screen, the user may need to enter one or more passcodes.

In some examples, once a passcode or override passcode received from the intermediary device 2920 or the interface module 2908, the passcode may be transmitted to the control and computing unit of the AMD where the setting change control procedure 2928 determines the validity of the passcode by comparing it to the one or more user generated passcodes 2939 or override passcodes 2937 stored in a memory of the CCM.

Figure 30:
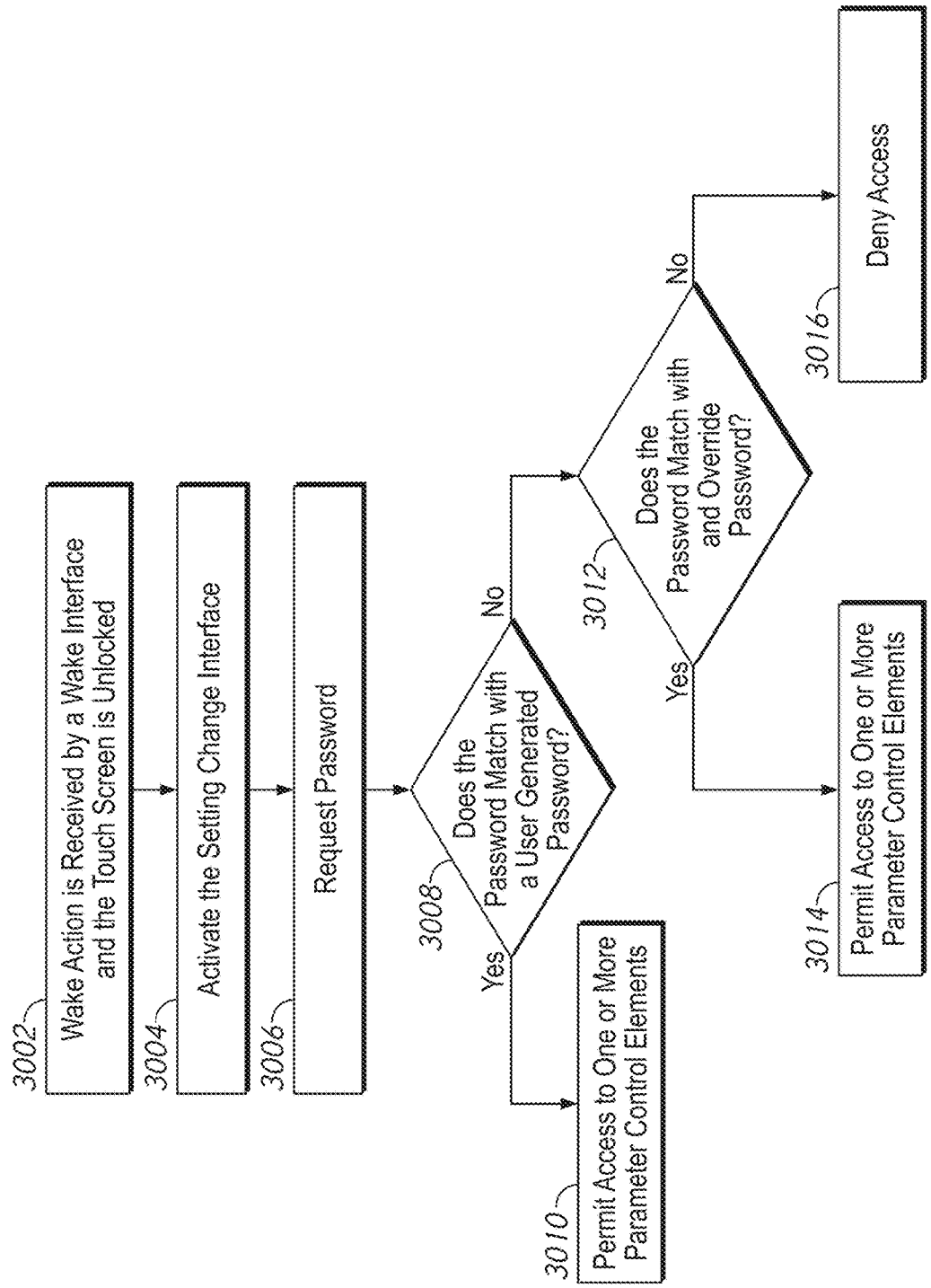
FIG. 30 is a flow diagram illustrating an example method that may be used by an AMD to allow a user to change a setting of the AMD using a user generated passcode or an override passcode.

FIG. 30 is a flow diagram illustrating an example method that may be used by an AMD to allow a user to change a setting of the AMD using a user generated passcode or an override passcode. Once the AMD (e.g., the wake action procedure in the CCM) receives a valid wake action 3002, a user interface may be activated. In some examples, the wake action may directly activate a setting change interface 3004 (e.g., a setting change screen presented on a touchscreen display). In some examples, a specific wake action may activate the setting change interface. On the setting change interface 3006, the AMD (e.g., the setting change procedure in the CCM) may request a passcode (e.g., by presenting a window to enter a passcode). Once a passcode is received, the AMD (e.g., the setting change procedure in the CCM) may determine whether the passcode matches a user generated passcode 3008. If it is determined the passcode matches with a user generated passcode, the AMD may provide access 3010 to one or more control parameter elements associated with the received passcode. If the received passcode dose not match with any of the stored user generated passcode, the AMD may determine whether the passcode matches with an override passcode 3012. If it is determined the passcode matches an override passcode stored in a memory of AMD or a memory of an authorized computing device, the AMD may provide access 3014 to one or more control parameter elements associated with the received override passcode. If it is determined the passcode does not match an override passcode, the AMD denies access 3016 to one or more passcode protected control elements.

Figure 31:
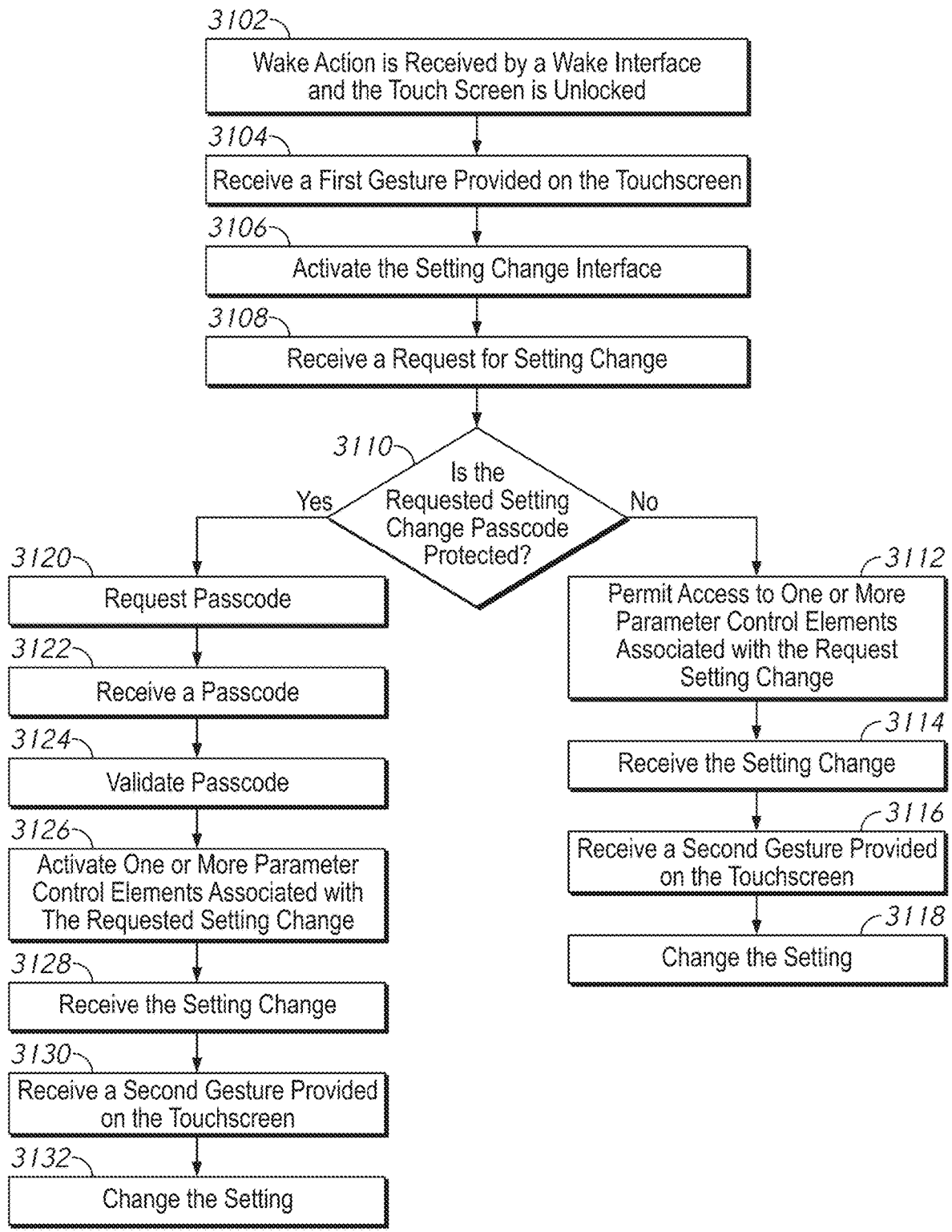
FIG. 31 is a flow diagram illustrating an example method that may be used by an AMD to allow a user to change a setting of the AMD using a user generated passcode or an override passcode.

FIG. 31 is a flow diagram illustrating another example method that may be used by an AMD to allow a user to change a setting of the AMD using a user generated passcode or an override passcode. Once the AMD (e.g., the wake action procedure in the CCM) receives a valid wake action 3102, the AMD may provide a user interface (e.g., a touchscreen display) on which the user can provide a first gesture to activate a setting change interface or screen. When a first gesture is received from a user or subject 3104, the AMD may activate a setting change interface or a screen 3106. In some examples, the setting change interface or a screen may include one or more parameter control elements associated with one or more settings of the AMD. In some other examples, the setting change interface or a screen may include one or more selectable elements, with at least some of the one or more selectable elements associated with its own setting change screen (e.g., a screen provided on a touchscreen display) or a common setting change screen that may include one or more control parameters. When a request for setting change is received 3108, the AMD may determine whether the requested setting change is passcode protected or not 3110. In some examples, the request for setting change may include selecting a parameter control element. In some other examples, the request for setting change may include selecting a list of parameter control elements (e.g., included in a separate screen provided on a touchscreen display).

If the AMD determines that the requested setting change is not protected by a passcode, it may permit access to one or more parameter control elements associated with the requested setting change 3112. In some examples, once the changes are received via parameter control elements 3114, the user may need to provide a second gesture on the user interface (e.g., touchscreen display) to confirm the changes made. In response to receiving the second gesture 3116, the AMD may change one or more settings 3118 according to the requested and confirmed changes.

If the AMD determines that the requested setting change is protected by a passcode, it may request a passcode 3120 via a passcode display (e.g., provided on a touchscreen display). In some examples, the request for the passcode may be presented on a display but the passcode may be received via a physical keypad. Once a passcode is received 3122 from the user or subject, the AMD may validate the passcode 3124 by comparing it with one or more user generated passcodes or an override passcode. If it is determined that the passcode matches with a user generated passcode or an override passcode, the AMD may activate 3126 one or more parameter control elements associated with the requested setting change. Subsequently, the AMD may receive a setting change via the selected control parameter element 3128. In some examples, the user may need to provide a second gesture on the user interface (e.g., touchscreen display) to confirm the changes made. In response to receiving the second gesture 3130, the AMD may change one or more settings according to the requested and confirmed changes 3132.

AMD with Alarm System

In some cases, a condition may occur that impacts the operation of the ambulatory medicament device. This condition may be associated with the ability of the ambulatory medicament device to operate as intended by the manufacturer, a subject receiving therapy from the ambulatory medicament device, and/or user (e.g., healthcare provider, parent, or guardian of the subject). In some cases, the ambulatory medicament device may be operating as intended, but the condition of the subject may not satisfy a desired level of health. In either case, it is generally desirable to generate an alarm to inform the subject and/or one or more users of the condition of the ambulatory medicament device and/or the subject. Moreover, it is desirable to track the alarm until the condition that caused the alarm is resolved. Further, it is desirable to issue different types of alarms for different conditions to enable a subject or user to easily distinguish the severity of the condition that triggered the alarm. The user may be a subject receiving medicament or therapy, or may be another user, such as a clinician or healthcare provider, or a parent or guardian.

This section of the disclosure relates to an ambulatory medicament device, such as an insulin pump or a combined insulin and counter-regulatory agent (e.g., Glucagon) pump, configured to generate a dose control signal configured to cause a medicament pump to infuse medicament into a subject. Moreover, the present disclosure relates to an ambulatory medicament device configured to detect a condition of the ambulatory medicament device and/or the subject, and to generate an alarm when it is determined that the detected condition satisfies an alarm condition.

As mentioned above, an ambulatory medicament device may include an alarm system configured to monitor the ambulatory medicament device and/or the subject, and to generate an alarm when it is determined that a condition has been detected that satisfies an alarm condition. In some examples, the alarm system that may organize a list of alarms, notifying a user of these alarms, and allowing the user to acknowledge alarms.

In some embodiments, the alarm system may comprise a plurality of sensors that monitor the AMD or the subject, a monitoring system interface that receives the data from sensors, and alarm generation module that process the received data and generate alarms if an alarm condition is met. In some examples, the monitoring system interface and the alarm generation module are implemented using one or more hardware processors and machine readable. In some examples, the monitoring system interface and the alarm generation module are separate hardware modules.

Figure 32:
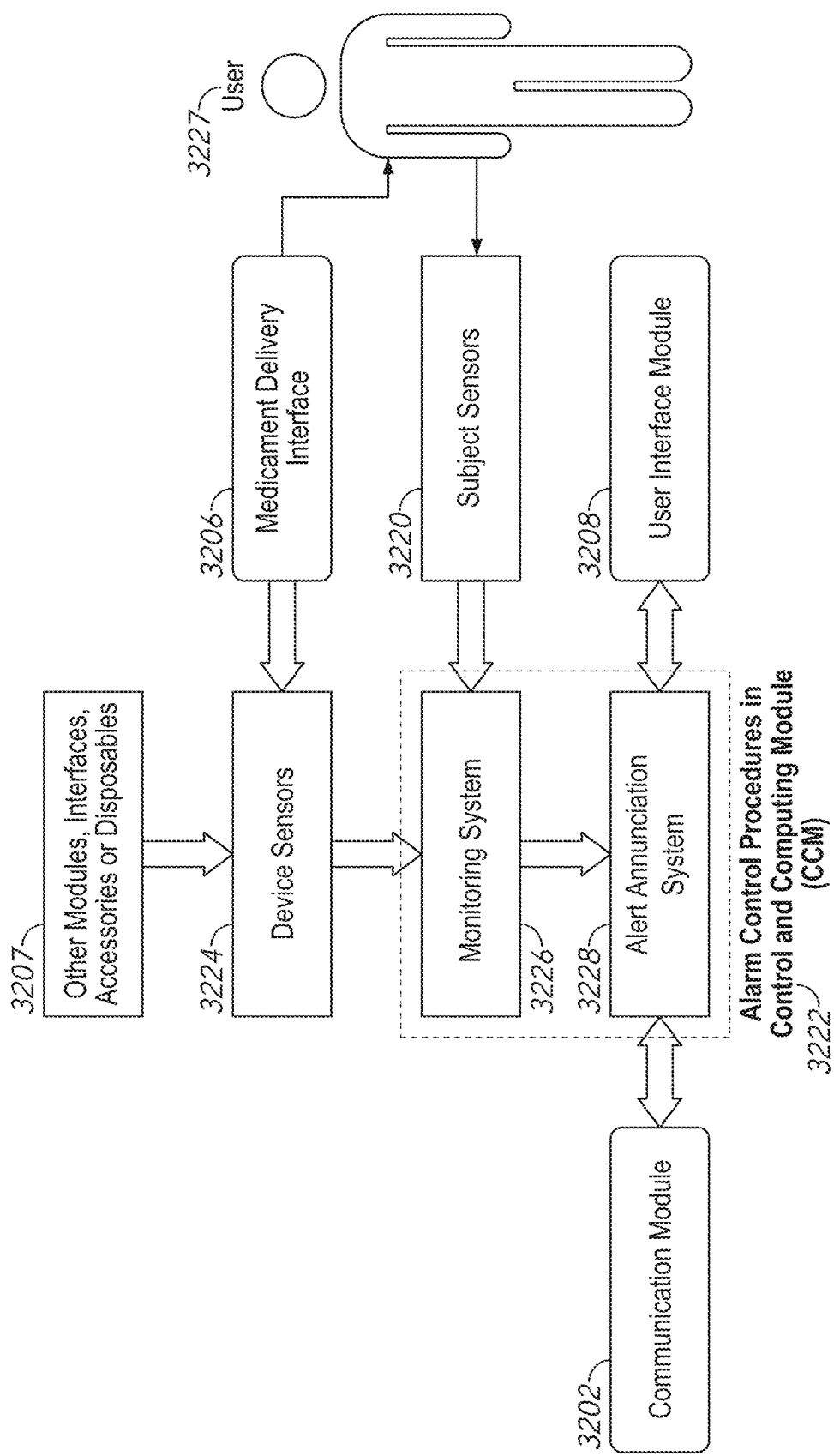
FIG. 32 is a schematic diagram illustrating the interconnection among modules and procedures in AMD involved in monitoring the status of the AMD and/or the subject and generate alarms when an alarm condition is met.

With reference to FIG. 32, in some embodiments, an alarm control system 3222 implements alarm control procedures in the control and computing module 610 (CCM) of the AMD. The alarm control system 3222 can be implemented as instructions stored in a memory of the CCM (e.g., the main memory 616) and executed by a hardware processor 614 to generate an alarm upon detection of a condition of the ambulatory medicament device and/or the subject. In some cases, the hardware processor of the monitoring system is a hardware processor of the ambulatory medicament device that controls medicament delivery. In some cases, the hardware processor of the monitoring system may be a separate hardware processor.

In some examples, the alarm control system 3222 includes a monitoring system 3226 and an alarm annunciation system 3228. The monitoring system 3226 monitors the condition or status of the AMD and/or the subject at least partially based on signals or status values received form a set of device sensors 3224 and a set of subject sensors 3220. In some examples, the device sensors may be configured to track the status of the components or the elements of the ambulatory medicament device, and the subject sensors can be configured to obtain measurements of one or more physiological characteristics of the subject In some examples, a device sensor 3224 is a sensor that generates a signal or status value associated with the condition of modules, interfaces, accessories, disposables 3207 of the AMD. In some examples, a device sensor 3224 may generate a signal that corresponds to a parameter associated with a component in a module or interface. For example, one device sensor may record the voltage of a battery and another device sensor may record the follow rate of a pump the medicament delivery interface 3206.

In some examples, a subject sensor 3220 may be any sensor that generates a signal or status value associated with one or more physiological indicators (or parameters) of a subject (e.g., heart rate, blood pressure, body temperature, level of blood glucose, serum levels of various hormones or other analytes). The device and subject monitoring system 3226 can include continuously receiving and analyzing signals received from device sensors 3224 and subject sensors 3220 to determine the condition of the ambulatory medicament device, the subject, a sensor, and/or other accessories.

In some cases, a single sensor may be used to monitor both the condition of the subject and the ambulatory medicament device or accessories and sensors connected to the AMD. For example, a continuous glucose monitoring CGM sensor may be used to monitor the condition of the subject, and may be monitored to determine whether the condition of the CGM satisfies an alarm condition (e.g., to alarm a user that the CGM should be replaced).

Although described as sensors of the ambulatory medicament device, one or more of the sensors may be accessories that may or may not be part of the ambulatory medicament device, but that may communicate with the ambulatory medicament device.

In some examples, alarm control system 3222 implements procedures for allowing a user 3227 or the subject to change the alarm settings and/or acknowledging an alarm annunciation via the user interface module 3208. In some examples, the user 3227 may be able to see one or more alarms annunciated on a user interface (e.g., as a list of alarms), even if the AMD is in locked state. In these examples, the user 3227 may not be able to acknowledge or respond to alarm when the AMD is in locked state.

In some such examples, a user 3227 or the subject may get access to an alarm setting screen or acknowledge an alarm annunciation by providing a wake signal and a first gesture (e.g., on a touchscreen display). In some cases, the first gesture may be created by entering predetermined characters on the alphanumeric pad. In some such examples, the alarm control system 3222 distinguishes inadvertent alarm control inputs from intentional alarm control inputs. An inadvertent alarm control input is an alarm acknowledgment input that was made without the intent of the user 3227 to acknowledge the alarm that the ambulatory medical device 600 is delivering to the user 3227.

In some examples, the alarm control system 3222 implements processes for determination and categorization of an alarm condition based on its severity level (e.g., a severity level between 0 and 5), according to the information received through the monitoring system 3226.

In some other examples, the alarm control system 3222 implements procedures for controlling the annunciation of alarm conditions via the user interface module 3208, at least partially, based on their severity level. In some such examples, a user interface (e.g., a touchscreen display) may be configured to allow the user 3227 to navigate directly to the issue or fault for which an alarm is being delivered. This capability provides the user with access to address the fault causing the alarm so that it could be corrected thereby stopping the alarm.

Alarm Conditions

In some examples, the device and subject monitoring system 3226 may provide the status information received from the device sensors 3224 and/or subject sensors 3220 to the alarm annunciation system 3228. In some examples, the status information may comprise one or more status values. In some such examples, the alarm annunciation system 3228 is configured to determine based at least in part on the status information received from the subject monitoring system 3226, whether an alarm condition is satisfied.

Determining whether the alarm condition is satisfied may include comparing one or more status values associated with the ambulatory medicament device and/or the subject to one or more alarm thresholds or alarm conditions. In some cases, at least some of the alarm thresholds or alarm conditions may be associated with an alarm profile. In some such cases, determining whether the alarm condition is satisfied may include comparing the status information to one or more alarm thresholds or alarm conditions included in one or more alarm profiles. In some examples, the alarm profile may be stored in the storage 618 of the CCM 610. In some such examples, at least some of the alarm profiles may be provided to the CCM by an authorized user or the subject via a user interface or directly transferred from another device to the storage (e.g., from USB drive, a laptop, smart phone, PC and the like). In some other examples, at least some of the alarm profiles may be stored in the storage 618 at the time of manufacture, At least some of the alarm profiles may indicate the characteristics or status of the ambulatory medicament device and/or subject that triggers an alarm corresponding to the alarm profile. For example, at least some alarm profiles may indicate the threshold status values below or above which an alarm should be triggered. For example, one alarm profile may indicate that when a glucose level of the subject exceeds a particular threshold, a particular alarm is to be generated and/or annunciated. As another example, an alarm profile may indicate that when an available amount of medicament is below a particular threshold, a particular alarm is to be generated and/or annunciated. The type of alarm and/or the alarm frequency or intensity associated with the medicament level may differ from the alarm triggered based on the glucose level. Although the previous examples, described a single condition associated with a single alarm profile, it should be understood that multiple conditions may be associated with an alarm profile. For example, a glucose level that exceeds an upper threshold or is below a lower threshold may be associated with different alarm profiles or the same alarm profile. As another example, a glucose level that is above an upper threshold or a medicament pump that is unable to supply insulin may be associated with the same alarm profile. On the other hand, a medicament pump that is unable to supply insulin due to an empty insulin cartridge may be associated with a different alarm profile than if the medicament pump is unable to supply insulin due to damage to the medicament pump.

Some non-limiting examples of conditions of the ambulatory medicament device or of the subject that may be associated with an alarm profile include conditions relating to a battery capacity (e.g., below a threshold charge capacity or below a capacity associated with a particular amount of operating time (e.g., one day)), a battery condition (e.g., high temperature or low voltage), a medicament or drug delivery condition (e.g., medicament is empty or below a threshold, motor is stalled, catheter is occluded, etc.), subject sensor condition (e.g., glucose sensor is expiring, or signal was not received from sensor), calibration failure, high or low glucose levels, network (e.g., Bluetooth® or BN-LTE) communication errors, haptic interface errors (e.g., motor non-responsive), speaker errors (e.g., noise or low volume), medicament cartridge errors (e.g., empty cartridge, cartridge detection error, etc.), and the like. As explained below, at least some of these errors or conditions may be associated with different severity levels that cause the annunciation of different alarms.

In some cases, an alarm profile may be associated with a severity level of the alarm. The severity level may be associated with how urgently the condition that triggered the alarm should be addressed or resolved. Further, the severity level may be associated with an amount of harm that may be caused to a subject if the condition that triggered the alarm is not resolved or is not resolved within a particular time period. The number of severity levels may vary based on the type of ambulatory medicament device. Generally, there is no limit to the number of severity levels. However, there may be a point of diminishing returns as the number of severity levels exceeds a particular number because, for example, it may be difficult for a user to distinguish between the different numbers of severity levels or to identify with which severity level a particular alarm is associated. Thus, the number of severity levels may be limited to a particular number, such as 3, 5, 6, 9, or some number in between. However, it is possible for there to be more than 9 severity levels.

There may be multiple alarm profiles associated with the severity level. Or each condition of the ambulatory medicament device and/or subject that is associated with the same severity level may be associated with the same alarm profile.

The ambulatory medicament device may determine a severity of an alarm condition based on the condition of the ambulatory medicament device and/or the subject that triggered the alarm condition. In some cases, the ambulatory medicament device may determine the severity of the alarm condition based at least in part on an alarm profile associated with the alarm condition.

Generally, if the alarm condition does not prevent the ambulatory medicament device from providing therapy, the ambulatory medicament device may continue to provide therapy. However, if the alarm condition interferes with the delivery of therapy, operation of the ambulatory medicament device may be suspended or partially suspended. Generally, alarm conditions that interfere with the provisioning of therapy may be associated with a higher severity level. However, some alarm conditions that interfere with the provisioning of therapy may be associated with lower severity levels. For example, a determination that the ambulatory medicament device cannot supply insulin may normally be associated with a highest severity alarm. But if a user indicates that the site location is currently in process of being changed, the alarm condition may be associated with a lower severity level (e.g., an informational alarm reminding the user that insulin cannot be delivered during site change).

Alarm Annunciation

The alarm annunciation system 3228 can implement an annunciation pattern selected based at least in part on the status information generated by and received from the monitoring system 3226, whether an alarm condition is satisfied. Determining whether the alarm condition is satisfied may include comparing one or more status values associated with the ambulatory medicament device and/or the subject to one or more alarm thresholds or alarm conditions associated with an alarm profile.

Upon verifying that an alarm condition associate with an alarm profile is satisfied, the alarm annunciation system 3228 annunciates the alarm condition.

In some examples, the alarm system may generate a list of pending alarm conditions and store it in a memory of the AMD (e.g., storage 618 in CCM 610). In these examples, any time an alarm condition associated with an alarm profile is satisfied, the alarm system may update the list of pending alarm condition by adding the new alarm condition to the list of pending alarm conditions.

In some examples, the list of pending alarm conditions may be sorted according to the severity level associated with the alarm conditions.

In some examples, the alarm system may annunciate the alarm conditions via the user interface module 3208 of the AMD 600. For example, the alarm condition may be annunciated via one or more user interfaces (e.g., a display, a speaker, and the like). In some such examples, an alarm may comprise an audio alarm, a text message, a graphical message, a text or graphical message with audio, vibrations, flashing light and any combination of these.

In some other examples, the alarm conditions may be transmitted to other devices, via the communication module 3202 of the AMD where, for example, an authorized user (e.g., guardians or parents of the subject), the subject or an emergency provider can view the alarm condition. In yet other examples, the alarm annunciation system 3228, may establish a direct end-to-end connection with a computing system (e.g., a cloud computing system) using the communication module 3202 and send the alarm condition to the computing system through the end-to-end connection.

Based on the severity of the alarm condition and/or the alarm profile corresponding to the alarm condition, an alarm may be generated and/or annunciated that is associated with the severity of the alarm condition and/or the type of alarm condition. Different alarm conditions and/or alarm profiles may result in different types of alarms or different annunciations of the alarm. For example, an alarm associated with the highest severity level may include an audible alarm with a loudness that exceeds a particular decibel level (e.g., above 70 or 80 decibels), a visible alarm (e.g., a flashing or steady light) with a luminance above a particular luminance value (e.g., a luminance between $10^5$ or $10^6$ candelas per square meter), and/or a vibrational alarm. Further, the alarm associated with the highest severity level may not be snoozed or dismissed. Alternatively, the alarm associated with the highest severity level may be snoozed for a shorter time period than alarms of lower severity levels (e.g., for 5 minutes, for 10 minutes, etc.). An alarm associated with a different severity level than the highest severity level may include a different combination of audible, visible, and vibrational alarms. Not only may the existence of audible, visible, and vibrational alarms differ for different severity levels, but so may the characteristics of each of the alarm types. For example, audible alarms may have different sound patterns, loudness, frequencies, etc. Visible alarm may be of different intensity, color, pattern, etc. Vibrational alarms may be of different patterns or intensity, and/or may be combined with other types of alarms (e.g., visual or auditory alarms). Further, an alarm with a different severity level than the highest severity level may be permitted to be snoozed or dismissed, or snoozed for a longer period of time. In some examples, the severity of the alarm condition may determine the type of type of the alarm generated (e.g., audio, text, graphical, or any combination of the aforementioned).

Further, the display of alarm conditions on the user interface may include an icon for each type of alarm condition. The user interface may display the number of alarm conditions and/or the number of alarm conditions of a particular type or severity level. In some cases, a duplicate alarm may be omitted from the list of alarms. In some cases, a count of the occurrence of alarms may be increased to reflect the duplicate alarm. In some cases, a duplicate alarm may result in the annunciation of the duplicate alarm. In some cases, the duplicate alarm is ignored. In some cases, the occurrence of a duplicate alarm may cause an escalation of the existing alarm. For example, if an alarm condition that causes an annunciation of an alarm with a first severity level is detected as occurring a second time, the alarm may be annunciated with a second severity level that indicates a greater degree of severity that the first severity level. It should be understood that an alarm occurring after an alarm condition is resolved may not be considered a duplicate alarm, but instead may be a reoccurrence of the alarm condition and/or an indicator that the resolution for the alarm condition failed (e.g., an insulin cartridge replacement is faulty or is empty).

In some cases, the list of alarms may be accessed when the ambulatory medicament device is locked. Further, details about the alarms may be accessible when the ambulatory medicament device is locked.

Each of the alarm conditions, or information associated therewith, may be added to an indicator or user interface (e.g., a list, or other data structure or user interface element) that may be accessed by a user. This user interface may maintain the alarm condition on the user interface until the alarm condition is resolved. Further, the alarm conditions may be sorted or ranked based on the severity level of the alarm condition, the time that the alarm condition occurred, whether the alarm condition relates to the subject or the ambulatory medicament device, any combination of the foregoing, or any other factor for sorting or ranking the alarm conditions.

In some cases wherein the alarm is presented on a display, the displayed information may include details about what caused the alarm, the severity of the alarm, how to respond to or address the alarm, or any other information that may be informative regarding why the alarm was generated and/or how to respond to the alarm. In some cases, the information may provide a workflow or instructions on how to respond to the alarm. The instructions may include a link to a workflow provided by a manufacturer of the ambulatory medicament device or of another entity, such as an entity that provides medicament or site changing kits.

In some cases, different views of an alarm or different information associated with the alarm may be provided based on an identity of the user, or a role of the user, viewing the alarm. For example, a child may be instructed to contact a parent to address an alarm. But a parent may be provided with information to resolve the alarm. The parent may receive simplified information (e.g., glucose level is high) about what caused the alarm, but a healthcare provider may receive more detailed information regarding the alarm (e.g., internal control parameter values, insulin flow rates, curvature of insulin diminishment predictions, etc.) that facilitates the healthcare provider caring for the subject.

The alarm conditions may be displayed on a display of the ambulatory medicament device. Alternatively, or in addition, the alarm conditions may be displayed on a remote display that is separate from the ambulatory medicament device. The remote display may be a display that is authenticated or associated with a computing device that is authenticated to access data, such as alarm conditions, from the ambulatory medicament device. In some cases, the list of alarms may be presented on a mobile device (e.g., a smartwatch or smartphone) or on a computing device (e.g., a laptop or desktop) that can obtain data directly or indirectly from the ambulatory medicament device.

In some cases, annunciating the alarm may include contacting a manufacturer and/or user (e.g., a healthcare worker, a parent or guardian, or other registered user). Further, the alarm may include instructions on repairing the ambulatory medicament device and/or on addressing the alarm condition. For example, the alarm may provide a user with instructions to replace the insulin cartridge and how to replace the insulin cartridge. As another example, the alarm may provide instructions on how to change the battery of the device or on how to change a site where the insulin pump connects to the subject. In some cases, the alarm may include one or more operations associated with the alarm.

For example, the alarm may trigger reordering of insulin or may request that the user confirm a reorder request to reorder insulin.

A user may be able to acknowledge and/or snooze alarms. Certain alarms, such as informational alarms, may be dismissible. However, generally the alarm may remain on the alarm list until the condition that caused the alarm is resolved.

Resolving the alarm may include any action that addresses the condition that caused the alarm to be generated. For example, resolving the alarm may include replacing an insulin cartridge, changing a site where the ambulatory medicament device is connected to the subject, charging a battery of the ambulatory medicament device, providing insulin or a counter-regulatory agent to the subject and/or the ambulatory medicament device, or any other action that may be performed to address an alarm condition. In some cases, the resolution action may be acknowledging the alarm. For example, if the alarm is informational (e.g., to inform the user that more insulin has been ordered), acknowledging the alarm may be a sufficient resolution action.

In some cases, whether the alarm condition is resolved may depend on an identity of the user. For example, if a child interacts with an alarm related to reordering of insulin, the alarm may remain until a parent or guardian acknowledges the alarm. However, the child may be able to snooze the alarm. In some cases, a user interface that displays alarms may differ based on who is viewing the alarm. For example, a child may view the alarms, but may not be able to interact with the alarms. However, a parent or guardian may be able to snooze or dismiss an alarm. Further, a child may be instructed to bring the device to a parent or adult to address an alarm. In some cases, the child may be informed of how urgently to contact the parent (e.g., contact a parent immediately, within a day, within a week, etc.). Moreover, a designated adult may separately be alarmed (e.g., via a text or email alarm). The parent or guardian may receive additional information not provided to the child or subject (e.g., a link to repair instructions or a workflow to address the alarm condition).

In some cases, certain conditions may self-resolve over time. For example, a low battery alarm may resolve as the battery is charged. In such cases, the alarm may be cancelled automatically as the battery charge level exceeds a particular threshold. Further, in some cases, one or more alarms and/or the alarm list can be viewed and/or accessed on a home screen, a main screen, or other non-alarm based user interface screen in addition to a user-interface screen designated for display alarms. The alarm list may be accessed from the ambulatory medicament device and/or a computing system in communication with the ambulatory medicament device.

However, in some cases, the alarm condition may or may not be resolvable when the ambulatory medicament device is locked.

A user may interact with the alarms generated based on the alarm condition. In some cases, the user can only interact with the alarms when the ambulatory medicament device is unlocked. In some cases, the user can interact with the alarms to snooze them or to obtain further information. However, the user may not be able to dismiss the alarm without unlocking the ambulatory medicament device. Interacting with the alarms may include providing information associated with the alarm to a user in response to the user interacting with the alarm, or an indicator representative of the alarm.

Example AMD with Alarm Management System

Figure 33:
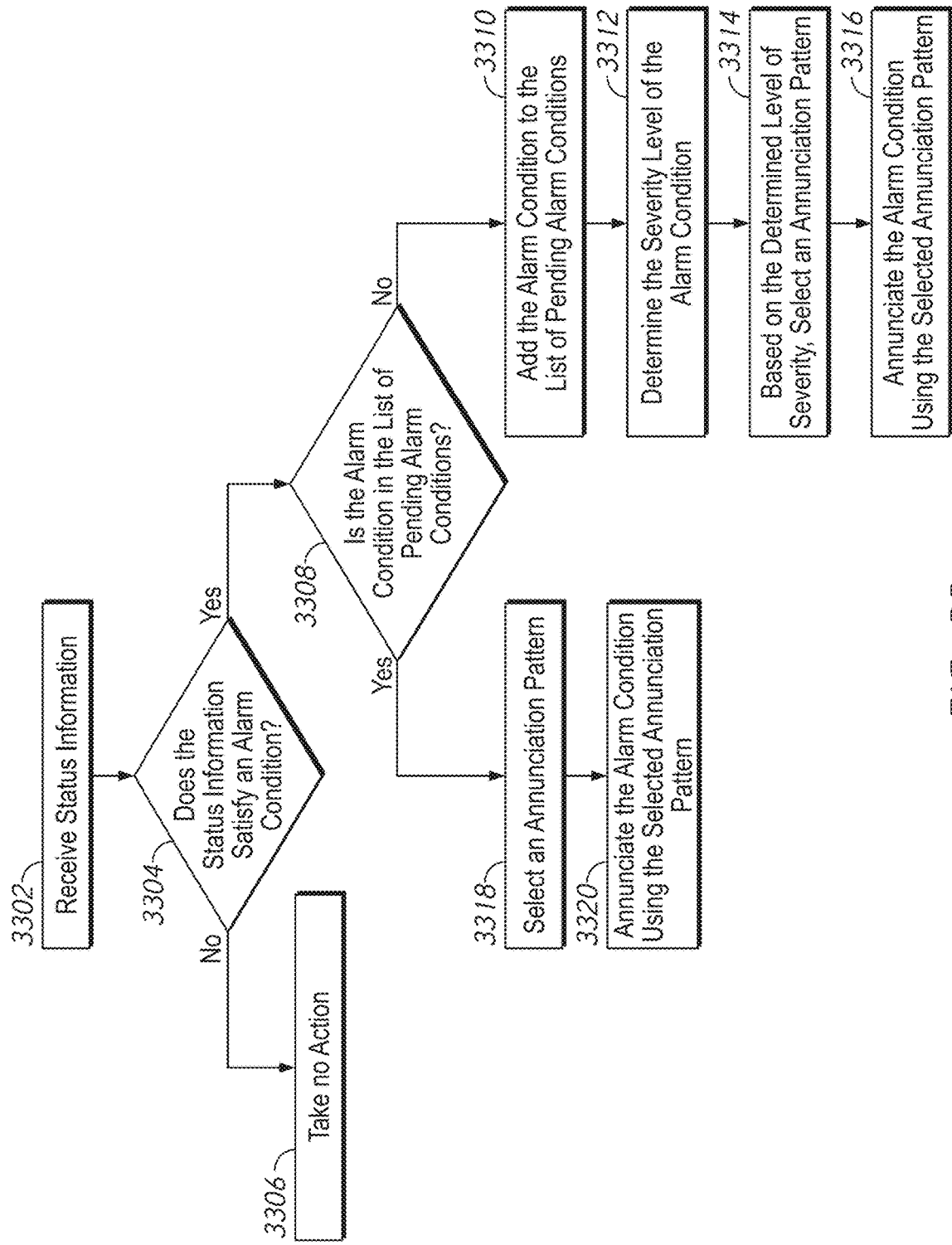
FIG. 33 is a flow diagram illustrating an example procedure that may be used by the alarm system of an AMD to annunciate an alarm condition upon receiving a status information that satisfies an alarm condition.

FIG. 33 shows a flow diagram illustrating an example procedure that may be used by the alarm system of an AMD to annunciate an alarm condition upon receiving a status information that satisfies an alarm condition. In some examples, the alarm annunciation system 3228 implements an annunciation process by execution of instructions by a processor in CCM of the AMD, where the instructions can be stored in the main memory, storage of the AMD, or in a memory of a connected electronic device or computing system.

The alarm system may receive status information 3302 using the device and subject monitoring system 3226, one or more device sensors and/or one or more subject sensors. In some examples, the alarm annunciation system 3228 determines whether the received status information satisfies an alarm condition 3304. In some examples, the alarm condition may be an alarm condition in an alarm profile. If the received status information does not satisfy an alarm condition, no action may be taken 3306. If the received status information satisfies an alarm condition, the alarm system may determine whether the alarm condition is already present in the list of pending alarm conditions or not 3308. If the alarm condition is not present in the list of pending alarm conditions, the alarm system may add the alarm condition to the list of pending alarm conditions 3310. Next the alarm system, may determine the severity of the alarm condition 3312. Based on the determined level of severity, the alarm annunciation system 3228 can select an annunciation pattern 3314 and annunciate 3314 the alarm condition using the selected annunciation pattern. If the alarm condition is present in the list of pending alarm conditions, the alarm system may select an annunciation pattern 3318 and annunciate 3320 the alarm condition using the selected annunciation pattern. In some examples, the annunciation pattern selected at block 3318, may be an annunciation pattern that is different than the previously used annunciation patterns for the alarm condition. In some such examples, the annunciation pattern selected at block 3318, may be selected based on number of times that the same alarm condition is satisfied by a received status information. The process of the alarm detection and control function may repeat each processing cycle so long as the ambulatory medical device is in use. In some examples, after an alarm is annunciated, the alarm system may wait for user acknowledgment of the alarm. If the user acknowledges the alarm, the system proceeds to perform alarm processing. However, if the user fails to acknowledge the alarm, the annunciation continues and may escalate depending on the level of the alarm.

As mentioned above, the alarm conditions may be categorized based and annunciated based on their severity level. In some examples, the alarms are categorized numerically in descending order with the highest priority fault displayed at the top of the list.

In some examples, a level 0 severity, may be for a trivial fault that does not require any action by the user thus not warranting an alarm notification. In some other examples, a level 1 severity may be an informational type notification that repeats at a certain frequency (e.g., every 30 minutes) until acknowledged by user which results in it being reset. The annunciation may include a brief vibration and a beep, for example. In some examples, a level 2 severity, may be one relating to an imminent loss of system function. Thus, such an annunciation may include two brief vibrations and two beeps, for example, and repeating at a certain frequency (e.g., every 30 minutes). Thus, the user may still need to address the situation creating the fault to completely stop the annunciation. In some other examples, a level 3 fault may be for when the system is no longer fully functional thus requiring user intervention to correct the issue. The annunciation may begin with a base level intensity with three brief vibrations and three audio beeps, for example, and repeating at a certain frequency (e.g., every 5 minutes). The annunciation escalates at a second frequency, e.g., every 30 minutes, up to a maximum intensity level. The escalation may be a change in vibration intensity and/or audio level, for example. The escalation may be cleared to base level when the user acknowledges the fault; however, the base alarm remains if underlying condition persists. Thus, the user would still need to address the situation creating the fault to completely stop the annunciation. In some examples, a level 4 severity, may be for when the system is no longer functional and not correctable by the user. The annunciation may begin with a base level intensity with three audio beeps, for example, and repeating at a certain frequency (e.g., every 5 minutes). The annunciation escalates at a second frequency, e.g., every 30 minutes, up to a maximum intensity level. The escalation may be a change in audio level, for example. The escalation may be cleared when the user acknowledges the fault; however, the base alarm remains because the underlying condition persists. In some other examples, a level 5 severity, may be for high priority alarms per IEC 60601-1-8. The annunciation when activated may be cleared only when the underlying issue is resolved, e.g., glucose level is raised.

Additional embodiments relating to determining a severity of an alarm condition and annunciating the alarm based at least in part on the severity of the alarm condition that can be combined with one or more embodiments of the present disclosure are described in U.S. Provisional Application No. 62/911,017, which was filed on Oct. 4, 2019 and is titled "ALARM SYSTEM AND METHOD IN A DRUG INFUSION DEVICE," the disclosure of which is hereby incorporated by reference in its entirety herein for all purposes.

Non-Critical AMD Condition Management

In some cases, a condition may occur that impacts the operation of the ambulatory medicament device. This condition may be associated with the ability of the ambulatory medicament device to operate as intended by the manufacturer, a subject receiving therapy from the ambulatory medicament device, and/or user (e.g., healthcare provider, parent, or guardian of the subject). In some cases, the condition or malfunction of the ambulatory medical device may prevent the ambulatory medical device from providing therapy to the subject. In some cases, the condition or malfunction may permit, at least for a period of time, the ambulatory medical device to continue providing at least partial therapy to the subject. In either case, it is generally desirable to generate an alert to inform the subject and/or one or more users of the condition of the ambulatory medical device and/or the subject. Moreover, it is desirable to track the alert until the condition that caused the alert is resolved. Further, it is desirable to issue different types of alerts for different conditions to enable a subject or user to easily distinguish the severity of the condition that triggered the alert.

In many cases, if the nature of the alert is non-critical, it may be safer to continue the underlying therapy and notify the user of the condition than to cease therapy. In some such cases, the best or most desirable response to a problem with the device for a subject is to notify the device manufacturer, or other user that can address the problem, while the subject continues to receive therapy until a replacement device can be obtained or a repair can be made.

Additionally, alert fatigue can be an issue with medical devices due to excessive alerts which do not necessarily require user interaction. Alert fatigue can be dangerous because it can lead users to ignore serious alerts or alerts that require action in the short term.

The method described herein may be performed by an AMD (e.g., by one or more processor of the AMD) to detect device malfunctions for the AMD and that can generate alerts corresponding to the ambulatory medical device and prioritize the alerts to enable the subject or user to quickly and easily determine whether the device malfunction will impact therapy, should be addressed in the short-term (e.g., immediately, in 1-2 hours, within the day, etc.), and/or can be addressed at the subject's convenience (e.g., within a month, or more). In some cases, the method may be used by other systems.

In certain embodiments, the system disclosed herein can detect a condition in which the ambulatory medical device does not meet a manufacturer's specification (e.g., a failure of a haptic annunciator, a Bluetooth® radio malfunction, glucagon or insulin runs out, there is a medicament delivery malfunction, a touchscreen failure, etc.). In some cases, there can be several tiers of critical and/or non-critical faults. If it is determined that the underlying condition is not sufficient to stop therapy (e.g., delivery of insulin is not stopped), the fault may be deemed non-critical. In some cases, the fault may not be a fault of the device, but may be indicative of required maintenance (e.g., recharge battery indicator, order more medicament indicator, etc.). The condition may be annunciated to the user with appropriate instructions (e.g., call manufacturer for replacement medicament or parts) for addressing the fault or issue.

After the annunciation is acknowledged, the alert may be re-annunciated as a reminder at some later period in time (e.g., the alert may be re-annunciated daily at 4:00 PM or on Saturdays at noon). The length of time between annunciations may depend on the severity of the fault. In some cases, the re-annunciation cannot be stopped by the user, but may only cease if the underlying condition is resolved.

The method may include detecting a condition of the ambulatory medical device. The condition of the ambulatory medical device may be determined by one or more sensors of the ambulatory medical device. Further, the condition of the ambulatory medical device may be determined by the presence or absence of one or more errors when performing one or more functions of the ambulatory medical device. For example, if the ambulatory medical device fails to establish a communication connection with a control system or a data storage system, it may be determined that there is a possible malfunction with the ambulatory medical device. As another example, if the ambulatory medical device fails to deliver medicament or detects an error when attempting to deliver medicament, there may be a malfunction with the medicament pump. In some cases, the condition of the ambulatory medical device may be determined based on one or more configuration values being outside a normal operating range. For example, if the speed of delivery of medicament is faster or slower than a configured operating range, then it may be determined that there is a malfunction with the medicament pump or a connection with a medicament delivery tube (e.g., a catheter).

The method may include comparing the detected condition of the ambulatory medical device to a set of normal operating parameters. The set of normal operating parameters may be the specifications set by the manufacturer for when the ambulatory medical device is operating as intended by the manufacturer. In some cases, the normal operating parameters may be associated with a range of values. For example, the operating parameter for a speed of medicament delivery may be associated with a range of speeds, which may vary based on user settings, medicament type, site location of medicament delivery, or manufacturing tolerances, among other parameters. Comparing the detected condition of the ambulatory medical device to the set of normal operating parameters may include comparing each operating parameter in the specification to a corresponding detected operating parameter of the ambulatory medical device. The ambulatory medical device may generate a user alert based on the determined condition of the ambulatory medical device. For example, the AMD may generate an alert when the detected condition of the ambulatory medical device does not satisfy a set of normal operating parameters.

The method may further include determining whether the detected condition satisfies a minimum set of operating parameters. In some cases, the minimum set of operating parameters may match the normal operating parameters. However, typically the minimum set of operating parameters differ from the normal operating parameters. The minimum operating parameters may include the minimum specifications, minimum parameters, or minimum condition required by the ambulatory medical device to maintain or continue providing therapy to the subject. In other words, the minimum operating parameters are the operating parameters sufficient to provide therapy. However, the minimum operating parameters may not be sufficient to enable all features of the ambulatory medical device. For example, the minimum operating parameters may permit the ambulatory medical device to deliver insulin to the subject, but may not be sufficient to deliver the insulin at a normal delivery speed for the particular ambulatory medical device. As another example, the minimum operating parameters may permit the delivery of therapy, but may not be sufficient to track a log of therapy or to transmit a therapy log to another computing system. In some cases, the normal operating parameters and/or minimum operating parameters may be specified by a subject or healthcare provider (e.g., the minimum amount of medicament that is to be provided in each bolus may be specified by a healthcare provider). In some cases, the normal or minimum operating parameters may be modified.

When it is determined that the condition of the ambulatory medical device satisfies at least the minimum operating parameters, the ambulatory medical device may be configured to maintain delivery of therapy to the subject. Maintaining delivery of therapy may include maintaining therapy at the same rate, at a reduced rate (e.g., providing only basal therapy and therapy responsive to a meal announcement), or at a minimum maintenance rate (e.g., providing only basal insulin). Advantageously, the ability of the ambulatory medical device to distinguish between a minimum set of operating parameters and a normal set of operating parameters enables an ambulatory medical device with a malfunction to continue providing therapy, which sometimes includes life-saving treatment, to a subject until the ambulatory medical device can be repaired or until the condition of the device worsens to a point where the minimum operating parameters cannot be maintained. In some cases, the ambulatory medical device may temporarily maintain delivery of therapy. Temporarily maintaining therapy may provide a subject time to address the issue that caused the ambulatory medical device to not satisfy the normal operating parameters before the subject loses access to therapy. In some cases, the ambulatory medical device temporarily maintains therapy until the device condition makes it no longer possible to maintain therapy.

Figure 34:
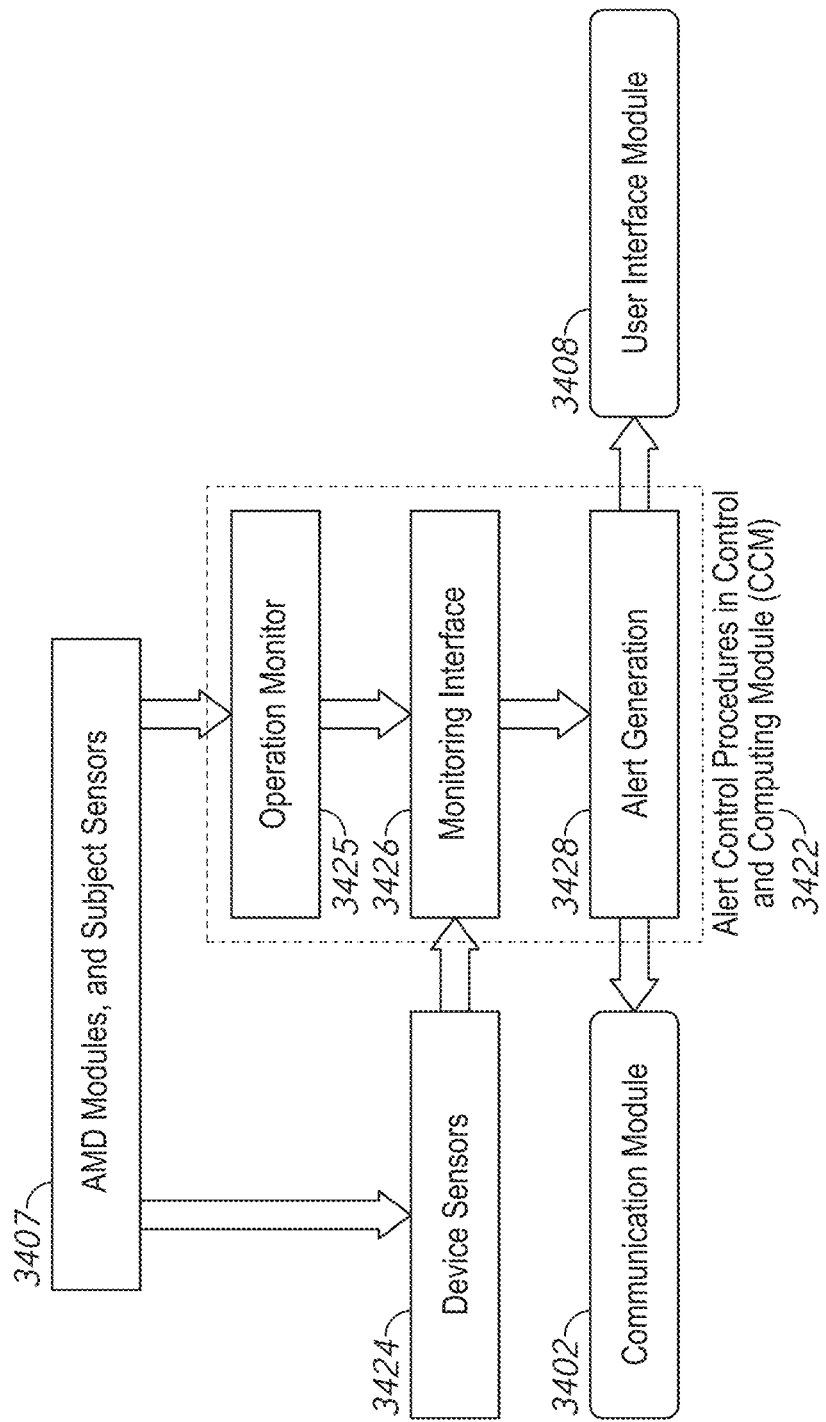
FIG. 34 is a block diagram illustrating the interconnection among modules and procedures in AMD involved in monitoring the condition of the AMD and generating alerts when a device malfunction is detected.

FIG. 34 is a block diagram illustrating the interconnection among modules and procedures in AMD involved in monitoring the condition of the AMD and generating an alert when a device malfunction is detected. In some examples, the condition of AMD may include the status of the modules and components of the AMD and/or operation of modules and procedures of the AMD, such as AMD modules and sensors 3407. In some embodiments, the alert system may be implemented as a set of alert control procedures 3422 in the control and computing module 610 (CCM) of the AMD. The alert control procedures 3422, may be implemented as instructions stored in a memory of CCM (e.g., the main memory 616) and executed by a hardware processor 614 to generate an alert upon detection of a malfunction of the AMD. In some cases, the hardware processor may be a hardware processor of the AMD that controls medicament delivery. In some cases, the hardware processor of the monitoring system may be a separate hardware processor.

In some examples, the alert control procedures 3422 may include a monitoring interface 3426, an operation monitoring procedure 3425 and alert generation procedure 3428. The monitoring interface 3426 may monitor and evaluate the condition of the AMD and/or the subject at least partially based on the information received from the operation monitoring procedure 3425 and device sensors 3424. In some examples, the device sensors may be configured to track the status of the components or the modules of the ambulatory medicament device and the operation monitoring procedure 3425 may be configured to monitor the operation of the AMD modules and subject sensors (e.g., sensors such a CGM that may be used to monitor one or more parameters associated with the health condition of the subject). In some examples, the detected of the AMD may be provided to the alert generation procedure monitoring interface. The alert generation procedure 3428 may compare the detected condition of the AMD with a set of normal operating parameter. In some examples, the alert generation procedure may also determine whether the detected condition of the AMD satisfies a minimum set of operating parameters. In some examples, if it is determined that the detection condition of the AMD does not satisfy the normal operating parameters, the alert generation procedure may generate an alert. In some examples, the alert may be transmitted to the user interface module 3408 and displayed on a display of the AMD (e.g., a touchscreen display). In some examples, once an alert is generated the AMD may establish a connection (e.g., a wireless connection) with another device. This other device may include a local device (e.g., a laptop, smartphone or smartwatch of the user) or a computing system of a cloud-based service. In some such examples, the alert may be transmitted by the communication module 3402 to the computing systems where it may be displayed on user interface associated with the computing system. In some cases, the additional device may receive data from the ambulatory medical device enabling it to monitor the condition of the ambulatory medical device.

The type of the alert, and the frequency at which the alert is repeated, or whether an alert is dismissible or not, may be determined by the alert generation procedure based on the detected condition of the AMD and the alert information stored in a memory of the AMD. In some examples, the alert information may be provided by the subject, an authorized user or a healthcare provider. In some other examples, the alert information may be stored in the AMD at time of manufacturing.

In some examples, upon determination that the detected AMD condition does not satisfy a set of normal operating parameters, the alert generation procedure may cause the therapy delivery module 606 to stop therapy delivery or modify one or more delivery parameters (e.g., therapy delivery rate). In some examples, upon determination that the detected AMD condition does not satisfy a set of normal operating parameters, but satisfies a set of minimum operating parameters, the therapy delivery may be maintained at a normal rate.

The alert may include any type of alert. For example, the alert may be a visual alert (e.g., a light or changing light), an audible alert (e.g., a beep or series of beeps), a haptic or vibration alert, an email alert, a text alert, or any other type of alert. Different device conditions may be associated with or may trigger different alerts. Thus, the user alert may enable the user to determine the device condition of the ambulatory medical device based on the alert. For example, an indication that the ambulatory medical device failed to deliver a medicament may trigger one type of alert while an indication that the ambulatory medical device has below a particular level of medicament available may trigger a different alert. In some cases, the user alert is dismissible and/or may be snoozed by the user. In some cases, such as when the ambulatory medical device fails to satisfy a set of minimum operating parameters, the user alert may not be dismissible or cannot be snoozed.

A dismissible alert may be scheduled to repeat on a particular schedule until an alert modification condition occurs. The frequency with which the dismissible alert repeats may depend on the severity of the condition or the particular operating parameters that do not satisfy normal or minimum operating parameters. More urgent device conditions may result in alerts that repeat more frequently. Further, alerts may vary based on when the condition was detected, the time of day, or the detected activity of a subject (e.g., sleep, abnormal activity, or elevated activity, such as exercise). Similarly, the snooze options may vary for different alerts or any of the aforementioned conditions. In some cases, the ambulatory medical device may escalate an alert if it detects that the condition of the ambulatory medical device has become more critical.

The alert frequency may be for a static time period (e.g., every 5 hours) or may ramp towards more frequency (e.g., every 5 hours for 1 to 3 reminders, every 4 hours for 3 to 6 reminders, etc.), or may change based on time of day (e.g., snooze alerts during sleeping hours for non-urgent alerts), etc.

The alert modification condition may include any action that causes the operating parameters of the ambulatory medical device to return to normal operating parameters. For example, the alert modification condition may be a repair or replacement of a faulty component. In some cases, the alert modification condition may include an acknowledgement of the alert. In some cases, the alert modification condition may include a worsening of the ambulatory medical device condition. In such cases, the modification to the alert may include the substitution of the alert to a different alert that indicates a different or more serious condition of the ambulatory medical device. For example, an urgent condition may become critical if the detected malfunction is addressed after generating certain number of alerts. When an urgent condition becomes critical, it may trigger a different alert type (e.g., a louder sound, or brighter image) and/or escalation in the alert frequency. For example, the audible alert may become louder and may be combined with a vibration alert from a haptic annunciator. Moreover, if the condition reaches a critical state, the ambulatory medical device may cease providing therapy to the subject.

In some cases, generating the alert may further include contacting a manufacturer and/or healthcare provider (e.g., clinician). Further, generating the alert may include ordering replacement parts. In some cases, the alert may instruct a subject or user on how to repair the ambulatory medical device.

Once the malfunction is addressed, the ambulatory medical device is repaired, or the condition that caused the alert is resolved, a user may permanently (or until the next time a device condition triggers the alert) dismiss the alert. Alternatively, or in addition, the ambulatory medical device may automatically dismiss the alert if it senses that the device condition that caused the alert has been resolved. In some cases, the ambulatory medical device may periodically recheck the device condition to determine whether the alert condition has been resolved.

In some cases, the manufacturer or healthcare provider may remotely clear or stop an alert using, for example, an NB-LTE connection. In some cases, only the manufacturer and/or healthcare provider can clear or stop the alert. Further, in some cases, a manufacturer and/or a healthcare provider may notify a user (e.g., a subject, or parent or guardian) of an issue or impending issue with the ambulatory medical device. The notification may be received by the ambulatory medical device via the NB-LTE connection. Alternatively, or in addition, the notification may be received via a computing device, such as a smartphone or laptop.

Figure 35:
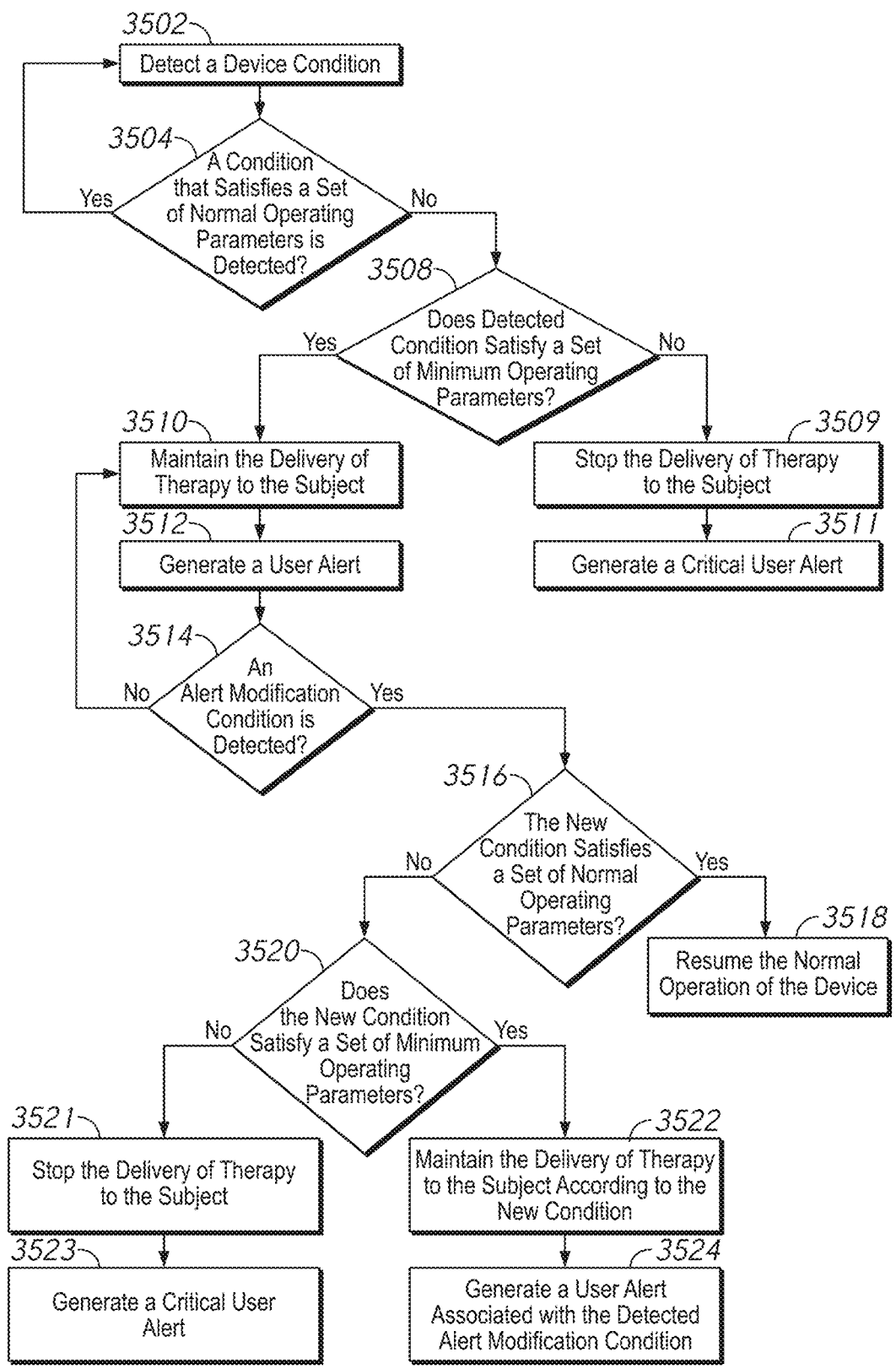
FIG. 35 is a flow diagram illustrating an example procedure that may be used by the alert system of an AMD to monitor the operation of an AMD and generate alerts when a device malfunction is detected.

FIG. 35 is a flow diagram illustrating an example procedure that may be used by the alert system of an AMD to monitor the operation of an AMD and generate alerts when a device malfunction is detected. In some examples, the alert system continuously monitors the status of all modules and components associated with AMD as well as the operation of all modules and procedures of the AMD. When a device condition is detected 3502, the alert system may determine whether the detected device condition satisfies a set of normal operating parameters 3504. If it is determined that the detected device condition satisfies a set of normal operating parameters, the alert system takes no action and continuous monitoring the AMD. If it is determined that the device condition does not satisfy a set of normal operating parameters, the alert system determines whether the detected device condition satisfies a set of minimum operating parameters. If, at block 3508, it is determined that the device condition does not satisfy a set of minimum operating parameters, the alert system may send a signal to the therapy delivery module to stop delivery of therapy to the subject 3509, and immediately generate a critical user alert 3511 indicating that immediate action is required. In some examples, upon generation of a critical alert the alarm system of the AMD, may contact a healthcare provider or certified user (e.g., parent or guardian of the subject) and/or may send the critical alert to one or more computing devices (e.g., laptop, cell phone, personal computer, and the like) of the healthcare provider or certified user. If, at block 3508, it is determined that the device condition satisfies a set of minimum operating parameters, the alert system may maintain the delivery of therapy to the subject 3510 and generate a user alert 3512. In some such examples, the alert system may maintain the delivery of the therapy at rate associated with the detected condition of the AMD (e.g., normal rate or minimum maintenance rate) until an alert modification condition is detected 3514. Upon detection of an alert modification condition 3514, the alert system may determine whether the new device condition satisfies a set of normal parameters 3516. If, at block 3516, it is determined that the new device condition satisfies a set of normal operating parameters, the alert system may resume the normal operation of the AMD 3518 (e.g., deliver the therapy at a normal rate). If at block 3516, it is determined that the new device condition does not satisfy a set of normal operating parameters, the alert system may determine whether the new device condition satisfies a set of minimum operating parameters 3520. If, at block 3520, it is determined that the new device condition satisfy a set of minimum operating parameters, the alert system may maintain or modify the rate of therapy delivery according to the new device condition 3522 and generate a user alert 3524 according to the according to the new device condition. If, at block 3520, it is determined that the new device condition does not satisfy a set of minimum operating parameters, the alert system may send a signal to the therapy delivery module to stop delivery of therapy to the subject 3521, and immediately generate a critical user alert 3523 indicating that immediate action is required. In some examples, upon generation of a critical alert the alarm system of the AMD, may contact a healthcare provider or certified user (e.g., parent or guardian of the subject) and also send the critical alert to one or more computing devices (e.g., laptop, cell phone, personal computer, and the like) of the healthcare provider or certified user.

Managing Doses of Glucose Level Control Agents

Ambulatory medical devices allow subjects the freedom to treat themselves while being mobile. Self-managed medical treatment comes with inherent risks to the subject.

An automated glucose level control system may automatically provide insulin and/or a counter-regulatory agent (e.g., Glucagon) to a subject to help control the glucose level of the subject. Generally, a control algorithm is implemented by an automated GLCS to determine when to deliver one or more glucose level control agents and how much agent to provide to the subject. Further, the control algorithm may control both an ongoing or periodic delivery of insulin (e.g., a basal dose), and a correction bolus that may be provided to adjust a subject's glucose level to within a desired range. The control algorithm may use glucose level readings obtained from a sensor, such as a continuous glucose monitoring (CGM) sensor, that obtained automated glucose measurements from the subject. Moreover, in some cases, the control algorithm may deliver a bolus of insulin in response to an indication of a meal to be consumed or being consumed by the subject.

Insulin may be administered subcutaneously to a subject. There is often a delay between when the insulin is provided and when the amount of insulin in the subject's blood plasma reaches maximum concentration. This amount of time may vary based on the type of insulin and on the physiology of the particular subject. For example, with a fast-acting insulin, it may take approximately 65 minutes for a bolus of insulin to reach maximum concentration in the blood plasma of the subject. For some other types of insulin, it may take anywhere from 3-5 hours to reach maximum concentration in the blood plasma of the subject. Accordingly, the GLCS may implement a predictive algorithm that implements a bi-exponential pharmacokinetic (PK) model that models the accumulation of insulin doses in the blood plasma of the subject. The GLCS may modify its predictions based on the type of insulin, one or more glucose readings, and/or characteristics of the subject.

In some cases, a subject may receive a manual bolus of insulin or medicament. For example, a user (e.g., healthcare provider, parent, or guardian) or subject may inject a dose of insulin into the subject. As another example, the user or subject may manually direct the automated GLCS to provide a bolus of insulin to the subject.

It is generally undesirable to have too much insulin. An excess of insulin can lead to Hypoglycemia. As described above, it may take time for insulin to reach maximum concentration in the blood plasma of the subject. Thus, a glucose level reading from a sensor may not immediately, or even after a particular period of time, reflect the amount of insulin within a subject. Thus, a manual bolus of insulin may not be detected by the automated GLCS. As a result, if the automated GLCS is operating during delivery of a manual bolus, or is configured to operate on the subject prior to glucose level readings reflecting the effect of the manual bolus on the subject, the automated GLCS may unnecessarily administer additional insulin to the subject potentially leading to hypoglycemia.

The present disclosure relates to an automated GLCS configured to provide automatic delivery of glucose level control therapy to a subject and receive information about manual glucose level control therapy provided to the subject. Using the received information about the manual glucose therapy, the automated GLCS can adjust the glucose control algorithm to account for the manual dosing of insulin (or counter-therapy agents). The manual glucose level control therapy may be provided by injection therapy, or it may be provided by an insulin pump.

In some cases, the automated GLCS may receive an indication of insulin or medicament to administer to a subject in place of an automatically calculated dose of insulin. For example, the automated GLCS may receive an indication that a subject is consuming or will consume a meal. The indication may include a type of meal to be consumed (e.g., breakfast, lunch, or dinner) and an estimate of the quantity of food or carbohydrates to be consumed (e.g., less than usual, a usual amount, more than usual, 30-40 grams of carbohydrates, 45-60 grams of carbohydrates, etc.). Based on the indication, or meal announcement, the automated GLCS may calculate an amount of insulin to administer to the subject. The calculation may be based on an insulin to carbohydrate ratio provided by a clinician and/or determined by the automated GLCS. Moreover, the calculation may be based at least in part on a history of glucose level measurements for the subject when consuming particular meals.

The calculated amount of insulin for the meal announced by the user may be presented to the user. The user (e.g., the subject) may modify the amount of insulin to administer. For example, the user may determine that for the size meal the subject is consuming or planning to consume, more or less insulin should be administered. In such cases, the user may modify the calculated insulin dosage to match the user's determination of the amount of insulin to administer. In some cases, the automated GLCS may modify its control algorithm based on the user's input. Thus, future meal announcements may result in a calculation of insulin that satisfies the subject's insulin needs and/or preferences.

In some cases, the indication of an amount of a manual bolus may be received by a user entering a numerical value (e.g., an amount of insulin, a number of carbohydrates, or another calculation) associated with administering insulin. As described above, the automated GLCS may automatically-calculate a meal dose of insulin and present it to a user via a user interface where a user may enter the manual bolus information. At the time of making the meal announcement, the user may have an option to enter the manual bolus. The meal controller of the glucose pump can provide a recommendation against the manual entry if there is a prior history of online operation or a basis for making the recommendation.

The information may be received from a user via a user interface. This user interface may be provided by the automated GLCS. Alternatively, or in addition, the user interface may be generated by another device, such as a laptop or desktop, a smartphone, a smartwatch, or any other computing device that can communicate via wired or wireless communication with the automated GLCS. The information may include one or more of: an indication of delivery of a manual bolus (e.g., via injection therapy), an amount of the manual bolus, a type of the insulin (or other medicament), a time when the manual bolus was delivered, a general location that the manual bolus was administered to the subject (e.g., back, stomach, arm, leg, etc.), a reason for the manual bolus (e.g., a meal, a maintenance dose, a glucose level reading, in advance of exercise, etc.), and any other information that may be useable by the GLCS in controlling the glucose level of the subject.

Advantageously, in certain embodiments, providing manual dosing information to the automated glucose level control system (GLCS) can help the GLCS maintain the glucose level of the subject within a desired range when the automated features of the GLCS are active or operational. For example, if the automated GLCS determines from a CGM sensor reading that a subject's glucose level is high, the automated GLCS might normally administer a bolus of insulin. However, if the automated GLCS receives an indication that a manual bolus of insulin was administered recently (e.g., within the past thirty minutes), the automated GLCS may reduce or not administer a bolus of insulin, thereby preventing a Hypoglycemic event. In some such cases, the automated GLCS may continue monitoring the glucose level of the subject and may administer additional insulin at a later time if the glucose level readings do not reflect an expected glucose level based on the reported manual bolus of insulin.

In some cases, it may be unnecessary to receive an indication of the manual bolus because, for example, a user may cause the automated GLCS to provide the manual bolus. In such cases, the automated GLCS may track the amount of insulin delivered and the timing of the administering of the bolus. To track the manual bolus, the automated GLCS may store the information associated with the manual bolus in a therapy log. Accordingly, when the automated GLCS is operating in an automatic mode, the automated GLCS can access the therapy log to determine whether any manual bolus was administered and, if so, the timing and amount of the manual bolus.

In some cases, the automated GLCS may model the diminishing of insulin, or other medicament, in the blood plasma over time based on the information associated with the manual bolus. Modeling the diminishing of medicament over time may be used to estimate a future effect of the medicament previously administered. In some cases, the model may account for previously administered medicament by the automated GLCS. Further, in some cases, the model may account for physiological characteristics of the subject, such as the subject's weight or an input parameter related to the subject's weight (e.g., body mass index). Moreover, the model may account for perfusion over time of the medicament bolus from a subcutaneous infusion site into the blood plasma of the subject. Further, the automated GLCS may model an accumulation of insulin, model time course of activity of insulin, or model a finite rate of utilization of insulin.

Based on the model, the automated GLCS may adjust the automated administering of insulin, or other medicament when operating in an automatic mode. Further, the automated GLCS may operate the administering of medicament (e.g., by controlling a medicament pump) based on a glucose level of the subject and the modeled concentration of medicament in the subject.

In some cases, the automated GLCS may confirm that the manual bolus was delivered to the subject. The confirmation may be determined based at least in part on whether glucose level readings by the CGM sensor match or are within a threshold level anticipated by the automated GLCS based on the manual dosing information. Alternatively, or in addition, the automated GLCS may request, via a user interface, that a user confirm that the manual bolus was delivered. In cases where the manual bolus in delivered by the automated GLCS, a user may be requested to confirm the administering of the manual bolus by using a particular gesture or sequence of interactions with a user interface (e.g., a touchscreen) of the automated GLCS or of a device (e.g., laptop or smartphone, etc.) that communicates with the automated GLCS.

As previously described, in some cases, the information relating to the manual bolus may include an amount of insulin and a reason the manual bolus was administered (e.g., for a meal of a particular size). In some such cases, the automated GLCS may determine an amount of insulin the automated GLCS would administer in an automatic operating mode based on the manual dosing information if the manual bolus had not been supplied. If the automated GLCS determines it would have supplied a different quantity of the medicament, and if the difference exceeds a threshold, the automated GLCS may adjust a glucose control algorithm to account for the difference. For example, the automated GLCS may change the operating setpoint or range of insulin the automated GLCS attempts to maintain in the subject. As another example, the automated GLCS may supplement the manual bolus with additional insulin to account for an under-administering of insulin, or may reduce a subsequent dosage of insulin to account for an over-administering of insulin.

As previously indicated, the automated GLCS may maintain a therapy log of manual insulin therapy. This therapy log may be maintained based on the use of the automated GLCS to provide a manual bolus, or based on information provided by the user based on manual administering of insulin (e.g., via injection). The manual boluses may be supplied when the automated GLCS is not operating, is not operating in an automatic mode, or is not connected to the subject. Once the automated GLCS is connected to the subject and is configured in automatic mode, the automated GLCS may determine therapy, if any, to provide to the subject based on a combination of the therapy log and the glucose control algorithm implemented by the automated glucose level control system.

The automated glucose level control system may generate a dose control signal based on the determined therapy. This dose control signal may be supplied to a medicament pump, which may control delivery of the medicament (e.g., insulin) to the subject.

In some cases, a user may control whether the automated GLCS is operating in a manual mode or an automatic mode by interacting with a user interface of the automated GLCS or of a device that communicate with the automated GLCS. The user interaction may include any type of user interaction with a user interface. For example, the user interaction may include interaction via physical buttons or interactions with a touchscreen including gestures or taps on the touchscreen.

Additional embodiments relating to managing meal medicament doses and manual dosing that can be combined with one or more embodiments of the present disclosure are described in U.S. Provisional Application No. 62/911,143, which was filed on Oct. 4, 2019 and is titled "SYSTEM AND METHOD OF MANAGING MEAL DOSES IN AN AMBULATORY MEDICAL DEVICE," the disclosure of which is hereby incorporated by reference in its entirety herein for all purposes.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: providing an option to a user to select between receiving medicament using a manual delivery component or an automated delivery system. The method also includes receiving, by the automated delivery system, subjective information regarding the activity or action that may alter the glucose level. The method also includes receiving, by the manual delivery component, an amount of the medicament to be infused. The method also includes storing a time and the amount of medicament that is infused into the automated delivery system that controls glucose level. Other embodiments of this aspect include corresponding computer systems, apparatus, and computer programs recorded on one or more computer storage devices, each configured to perform the actions of the methods.

Implementations may include one or more of the following features. The method where the automated delivery system modifies medicament delivery based on the time and the amount of medicament that was received from either the manual delivery component or the automated delivery system. The method where the manual delivery component includes a keypad which allows the user to type in the dosage amount of the desired medicament. The method where providing the option to select is provided prior to a user performing the activity that may alter the glucose level. The method where the activity that may alter the glucose level includes of consuming food or exercising. The method where the subjective information regarding the activity of consuming food includes the approximate relative size of the food that is to be digested. The method where the approximate relative size of the food is compared to the recommended meal doses for the user, and depending on whether the approximate relative size is the same, larger, or smaller than the recommended doses, the model predictive control component is able to determine the actions that may be required to regulate the glucose level of the blood. The method where the subjective information regarding the activity of exercising includes the intensity and the duration of the exercise. The method where the intensity and the duration of the exercise is compared to the recommended intensity and duration, and depending on whether it is the same, larger, or smaller than the recommended intensity and duration, the automated delivery system is able to determine the actions that may be required to regulate the glucose level of the blood. Implementations of the described techniques may include hardware, a method or process, or computer software on a computer-accessible medium.

In certain embodiments, a system having a medical device configured to provide an option to a user to select between receiving medicament using a manual delivery component or an automated delivery system is disclosed. The system may also include an automated delivery system configured to receive subjective information regarding the activity that may alter the glucose level. The system may also include a manual delivery component configured to receive an amount of the medicament to be infused. The system may also stores in memory a time and the amount of medicament that is infused into a subject via an automated delivery system that controls glucose levels of the subject. In some embodiments, the system may include corresponding computer systems, apparatus, and computer programs recorded on one or more computer storage devices, each configured to perform the actions of the methods disclosed herein.

Users may have different preferences when utilizing an ambulatory medical device to request a therapy change. Optional features of the AMD disclosed herein may allow users to more closely control therapy changes and to be more engaged with controlling the subject's disease via the ambulatory medical device than existing disease maintenance devices.

In order to fulfill the variety of preferences, an ambulatory medical device may provide options which enable the user to either manually request the amount of the desired medicament or to choose an automated delivery system that automatically delivers the right amount of the medicament at the right time without further assistance. To manually select medicament, the user may input a desired medicament amount on a keypad that is in communication with the medical device. The medical device may confirm the medicament quantity or type and may deliver the requested medicament or confirm manual delivery of the medicament. After the medicament is infused through a manual delivery component, the data is stored into a model predicative control component which is further used to control and regulate the glucose level. However, if the user decides to use the automated delivery system, the user may provide subjective information regarding the activity or the action that may alter the glucose level. For example, if the glucose level changing activity is consuming food, the user may provide the time and the dosage amount of the food that is going to be digested. This information may be associated with the automated delivery system, and the subjective information is further stored into a model predicative control component.

Embodiments described herein include an ambulatory medical device that has a keypad which allows a user to type in a dose of insulin or glucagon to be administered to a user. A user may wish to receive a single dose of insulin prior to consuming food and decide how much insulin need to be administered. In other embodiments, the user may choose to receive a burst of glucagon due to low blood glucose because of physical activities. Embodiments may include the options for manual inputs of medicament and automated delivery system of medicament. In various implementations, the automated delivery system of medicament is driven by the glucose level or related trends. Embodiments herein address a problem that may arise when the user has just received a manual dose and has switched on the automated delivery system. In such cases, the automated delivery system may receive data indicating manual medicament infusion amounts and the timing of such infusions. Accordingly, the manual delivery component may inform the automated delivery system upon delivering any medicament the type of medicament delivered, the amount of medicament and the timing of the medicament delivered. By having the above information, the automated delivery system may determine the amount of medicament that is the user's blood stream and adjust the automated delivery of medicament and the timing of the automated delivery. Accordingly, embodiments are directed to allowing for a risk free, or reduced risk, transition from the manual delivery component to the automated delivery system.

In some embodiments the manual delivery of medicament may be correlated or associated with an automated delivery system. In some such cases, the dose input from the user may be stored and can be used as an input into the MPC algorithm (Model Predictive Control) instead of or in addition to use by the meal delivery algorithm. Other embodiments may include selection being able to have a relativistic algorithmically tuned value. Other embodiments may include a learning algorithm that includes a usual size meal or larger size meal or smaller size meal. Embodiments may include corelating the manual inputs, such as user indication of meal size, to insulin effects enabling the system to learn how doses of insulin affect the user. Embodiments may include corelating the manual inputs to asking the user what activity the user performed and learning how the glucagon affects the user for a particular activity.

GLCS with Manual Dose Management

Figure 36:
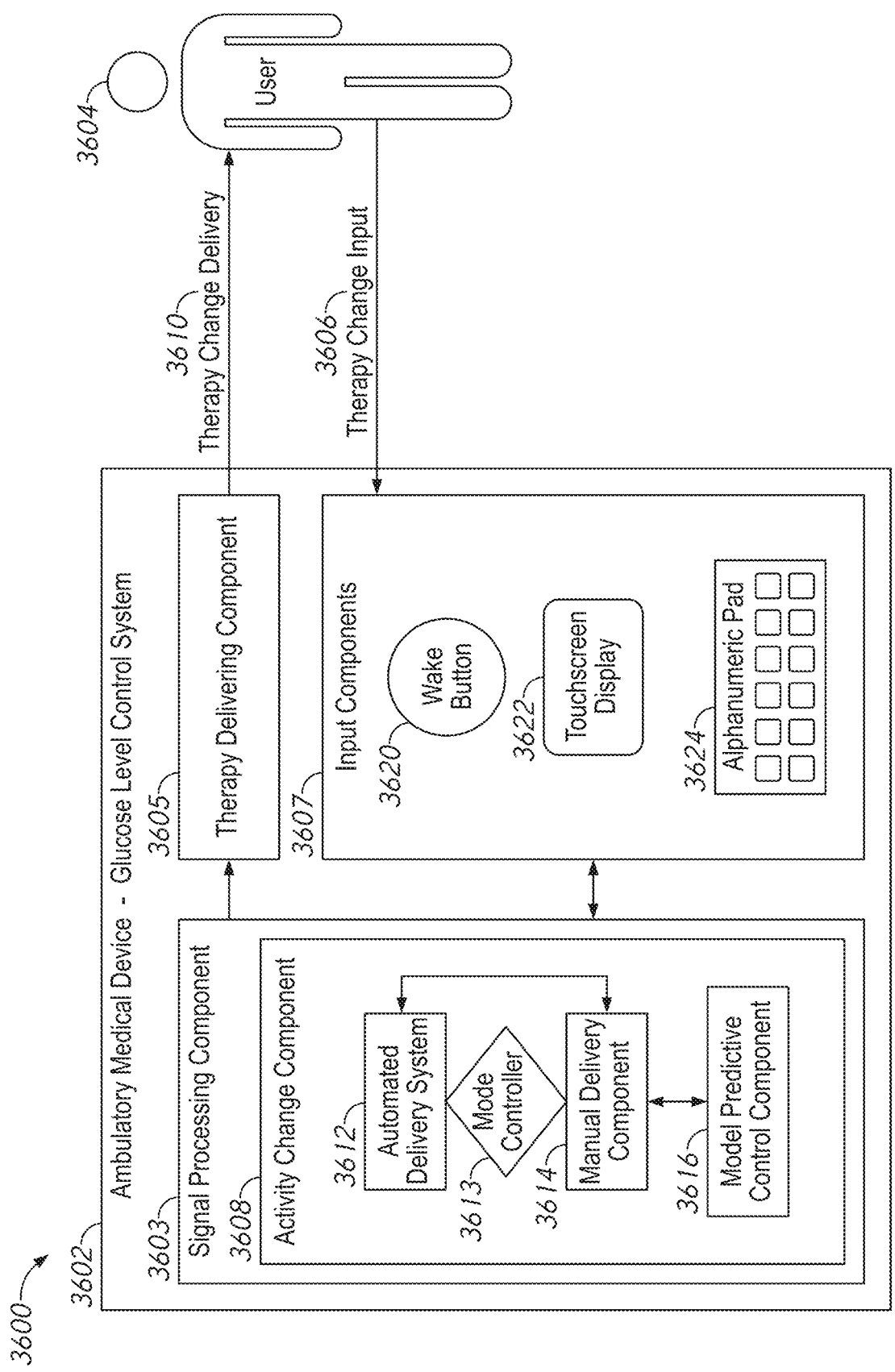
FIG. 36 is a schematic diagram illustrating an ambulatory medical device that provides the user with various options for providing medicament.

FIG. 36 illustrates a schematic of the therapy change delivery system 3600 in an ambulatory medical device 3602 that allows the user the choice of receiving manual delivery of medicament or automated delivery of medicament. Moreover, the therapy change delivery system 3600 allow the user to transition between the manual mode and the automated mode with ease. The therapy change delivery system 3600 includes the ambulatory medical device 3602, a signal processing component 3603, a user 3604, a therapy delivery component 3605, a therapy change input 3606, input components 3607, activity change component 3608, and a therapy change delivery 3610. When the user intends to receive a therapy from an ambulatory medical device 3602, the user 3604 may initiate a therapy change input 3606 to request the manual or automated medicament.

The ambulatory medical device 3602 may be any type of medical device that a user 3604 may carry around and use, generally with the approval of a medical professional, to help manage a subject's health or a disease of the subject (e.g., diabetes). There are many different types of ambulatory medical devices 3602. In some embodiments, the ambulatory medical device 3602 is an insulin and/or glucagon infusion device for user 3604 that has type I diabetes. Ambulatory medical devices 3602 allow users 3604 the freedom to receive medical care in any setting at their convenience. However, the drawback of using an ambulatory medical device 3602 could be the user 3604 making mistakes when the user is away from the medical professionals. One possible issue may be caused when the user 3604 switches from a manual delivery mode to an automated delivery mode when the ambulatory medical device 3602 is unable to determine the amount of medicament in the subject (e.g., the amount of insulin on board or IOB) or in the subject's blood stream. Embodiments are directed to the manual medicament delivery information being provided to the automated medicament delivery system so that it can adjust its operations based on the current and future medicament in the subject's blood stream. In some cases, such as when the ambulatory medical device 3602 is an insulin and/or glucagon infusion device, automated delivery of medicament can be problematic, such as when unreported manual doses of medicament are administered.

The ambulatory medical device 3602 includes a signal processing component 3603, a therapy delivery component 3605, and input components 3607. The signal processing component 3603, therapy delivery component 3605, and input components 3607 may be physically connected, wirelessly connected, connected via a cloud-based computer system, or connected in any other way.

The signal processing component 3603 is a computing system that performs the computing functions for the ambulatory medical device 3602. The signal processing component 3603 includes a processor, memory, and storage. The signal processing component 3603 may be a single computing system or may be made up of several computing systems. The signal processing component 3603 may perform the computing functions for a single ambulatory medical device 3602 or many ambulatory medical devices. The signal processing component 3603 receives signals from the therapy delivery component 3605 and from the input components 3607. The signal processing component 3603 also transmits signals to the therapy delivery component 3605 and the input components 3607. Signals of the therapy change input 3606, the therapy change delivery 3610, and the activity change component 3608 may be received or transmitted by the signal processing component 3603.

The user 3604 may be any individual that uses the ambulatory medical device 3602. In some embodiments, the user 3604 is an individual with diabetes that requires a periodic infusion of insulin or glucagon to maintain healthy blood glucose levels. In various embodiments, the ambulatory medical device 3602 infuses insulin or glucagon into the user 3604. The user 3604 may transport the ambulatory medical device 3602. Thus, as the user 3604 moves around, there is a danger that the user 3604 will inadvertently activate input in the ambulatory medical device 3602 that initiates a therapy change input 3606.

The therapy delivery component 3605 provides medicaments to the user 3604. Signals received from the signal processing component 3603 are executed by the therapy delivery component 3605 to change therapy such as starting, modifying, or stopping a therapy. The therapy delivery component 3605 may have a computing component for interpreting and executing instructions from the signal processing component 3603. Thus, the therapy delivery component 3605 can follow a program that is controlled by the signal processing component 3603. In some embodiments, the therapy delivery component 3605 may include one or more infusion pumps. An infusion pump may be capable of delivering fluids at varying rates to a user 3604. The infusion pump may deliver any fluid, including medicaments. The infusion pump may be connected to a user 3604 through any means. In one example, the infusion pump is connected to the body through a cannula. In some embodiments, the therapy delivery component 3605 may be an insulin infusion pump and/or a glucagon infusion pump. Signals received from the signal processing component 3603 may be interpreted by an insulin and glucagon pump to start, stop, or change the rate of insulin and glucagon being delivered into a user 3604.

In some embodiments, the therapy delivery component 3605 may be an electrical stimulation device. An example of an electrical stimulation device is a cardiac pacemaker. A cardiac pacemaker stimulates the cardiac muscle to control heart rhythms. Instructions received from the signal processing component 3603 may be interpreted by a cardiac pacemaker to start stimulating a cardiac muscle, stop stimulating a cardiac muscle, or change the rate of stimulation of a cardiac muscle. Another example of an electrical stimulation device is a deep brain stimulator to treat Parkinson's disease or movement disorders. Instructions received from the signal processing component 3603 may be interpreted by the deep brain stimulator to start, stop, or modify the stimulation of the brain.

The therapy change input 3606 is an input provided by the user 3604 to change a therapy that is currently being delivered to the user 3604. The change of therapy may be to start a therapy, modify a therapy, or cancel a therapy. There are many types of possible therapy changes, and the types of therapy changes are dependent on the type of ambulatory medical device 3602. In some embodiments, the ambulatory medical device 3602 may be an insulin or glucagon infusion device. However, there are many possible embodiments of ambulatory medical devices 3602 for the disclosed subject matter. The therapy change input 3606 in an insulin or glucagon infusion device may be an instruction, that when executed, causes the insulin or glucagon infusion device to start infusing an amount of insulin or glucagon into the user 3604. Alternatively, the therapy change input 3606 may be an instruction to modify the rate of insulin or glucagon infusion into the user 3604. The therapy change input 3606 may also be an instruction to cancel insulin or glucagon infusion into the user 3604 from the insulin or glucagon infusion device. In some embodiments, the ambulatory medical device 3602 may be an electrical implant, that when operated, stimulates a part of the body. An example is an electrical brain implant for users 3604 with Parkinson's disease or for pain management. The implementation of the therapy change can be to modify the rate of electrical stimulation to the body.

Figure 43:
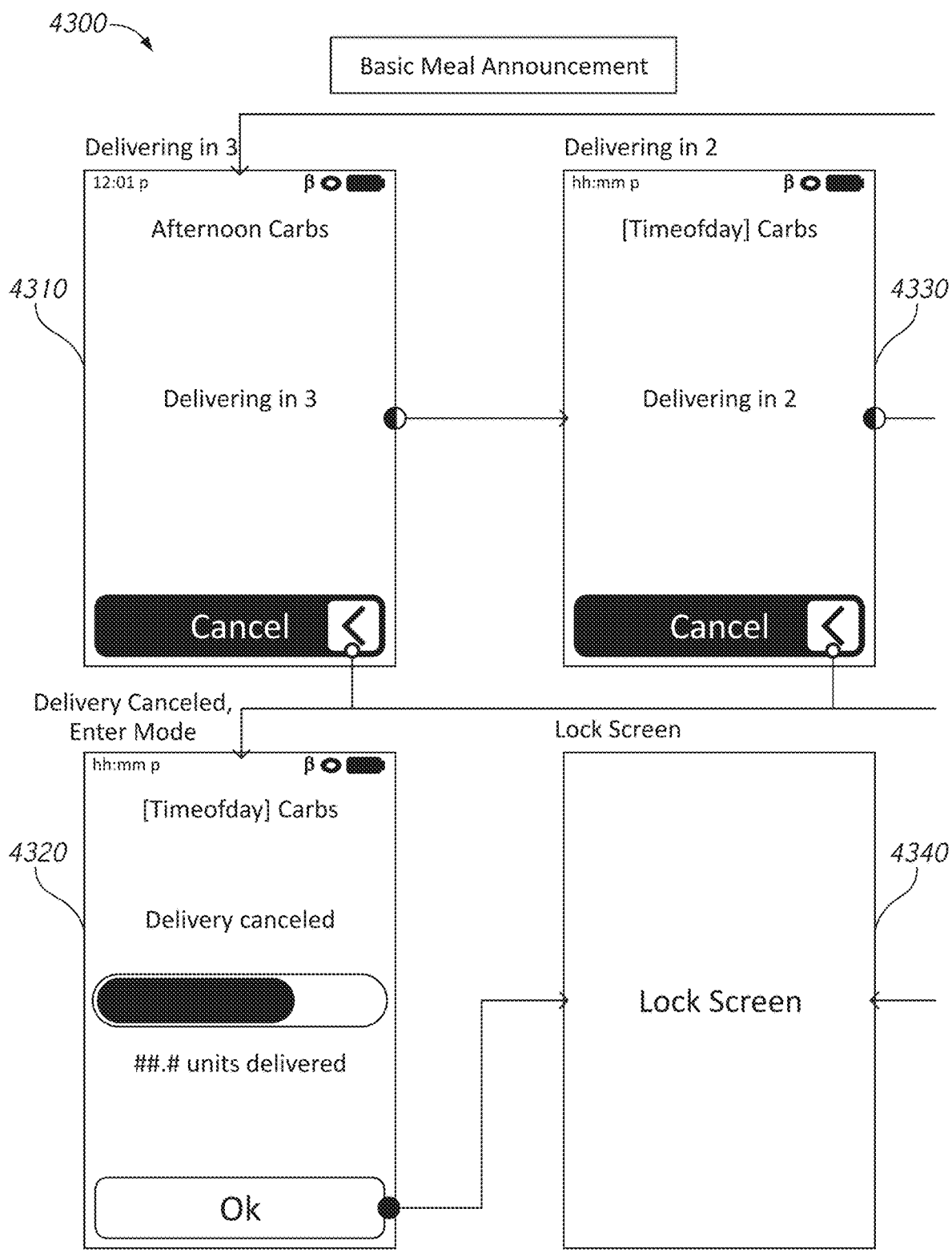
FIG. 43 is a series of screen displays showing an ambulatory medical device delivering the units and cancelling the delivery of the units.

The therapy change delivery 3610 is the performance, by the ambulatory medical device 3602, of the therapy change input 3606 that was verified by the 3608. The therapy change that is delivered by the therapy change delivery 3610 corresponds to the therapy change selection made by the user 3604. In some embodiments, the ambulatory medical device 3602 alerts the user 3604 that it is performing a therapy change delivery 3610. In an example of various embodiments, the ambulatory medical device 3602 displays the therapy change during the therapy change delivery 3610. Any number of details of the therapy change may be displayed during the therapy change delivery 3610. As shown in FIG. 43, a simple message of "Delivering" may be displayed during the therapy change delivery 3610. Alternatively, more exact details, such as "Delivering 2 units of insulin" or "Delivering insulin at 2 units per minute" may be displayed. In another example, the ambulatory medical device 3602 plays a sound effect during the therapy change delivery 3610. In some embodiments, as illustrated in FIG. 43, the therapy change delivery 3610 may be canceled by an input by the user 3604. The input to cancel a therapy change delivery 3610 may be any input such as a wake signal input or a series of touch inputs such as a gesture.

The input components 3607 allow the user 3604 to interact with and control the ambulatory medical device 3602. The amount of control that a user 3604 has may vary based on the type of ambulatory medical device 3602 and the user 3604. For example, an ambulatory medical device 3602 that delivers pain medication may allow the user more control than an ambulatory medical device 3602 that controls heart rhythms. In another example. a user 3604 that is a young child (less than about 10, 11 or 12 years) may be allowed less control over an ambulatory medical device 3602 than a user 3604 that is a teen or an adult. The input components 3607 include a wake button 3620, a touchscreen display 3622, and an alphanumeric pad 3624.

The wake button 3620 may be activated by a user 3604 to create a wake signal input to unlock an ambulatory medical device 3602. The wake button 3620 may be any input button. In some embodiments, the wake button 3620 is a capacitive button that detects a change in capacitance. The wake button 3620 may have a computing component for interpreting and executing instructions from the signal processing component 3603. Thus, the wake button 3620 can follow a program that is dictated by the signal processing component 3603.

The touchscreen display 3622 may display a therapy change user interface for the user 3604 and receive user 3604 inputs on the touchscreen display 3622 input surface. Inputs on the touchscreen display 3622 may be registered by any touch technology including, but not limited to capacitive and resistive sensing. The touchscreen display 3622 may be a part of a mobile computing device, such as a cellular phone, tablet, laptop, computer or the like. The touchscreen display 3622 may have a computing component for interpreting and executing instructions from the signal processing component 3603. Thus, the touchscreen display 3622 can follow instructions that are directed by the signal processing component 3603. To receive input, the touchscreen display 3622 may display buttons, alphanumeric characters, symbols, graphical images, animations, or videos. The touchscreen display 3622 may display an image to indicate when the ambulatory medical device 3602 is locked or inaccessible via the touchscreen display 3622. The touchscreen display may receive the series of inputs that make up the first gesture and the second gesture.

The alphanumeric pad 3624 registers numerical inputs, alphabetical inputs, and symbol inputs. The alphanumeric pad 3624 includes a multitude of keys corresponding to numerical, alphabetical, and symbol inputs. The alphanumeric pad 3624 may have a computing component for interpreting and executing instructions from the signal processing component 3603. Thus, the alphanumeric pad 3624 can follow instructions that are dictated by the signal processing component 3603. The alphanumeric pad 3624 may be configured to provide haptic feedback from its keys. The alphanumeric pad or pads 3624 may have any number of keys and any number of characters and may span multiple screens that the user 3604 can toggle between to find particular characters. In one embodiment, the wake button 3620 is incorporated into the alphanumeric pad 3624. In various embodiments, the wake button 3620 may be any one or more keys of the alphanumeric pad 3624. In an exemplary embodiment, the alphanumeric pad 3624 is displayed as part of the touchscreen display 3622. Characters from the alphanumeric pad 3624 may be used as input for the wake signal input, first gesture, therapy change selection, and second gesture. In an exemplary embodiment, the first gesture and/or second gesture are created by entering predetermined characters on the alphanumeric pad 3624.

The activity change component 3608 may be part of a specialized software that is executed on an ambulatory medical device or include a specialized hardware that performs the various functions described here. The activity change component 3608 may receive inputs from the user regarding weather the user is about to conduct activities that will change the glucose of the user. For example, the user may provide input using the input components 3607 that the user is about to perform exercise that may lower their blood glucose or eat a meal that will increase their blood glucose. Upon receiving the activity change from the input components 3607, the activity change component 3608 offers the user the option via the mode controller 3613 to select between the automated delivery system 3612 or the manual delivery component 3614. As shown in FIG. 36, the manual delivery system may inform the automated delivery system 3612 and the model predictive control component 3616 regarding any manual medicament deliveries of insulin or glucagon.

In various embodiments, the user may choose the dosage amount, the drug type (insulin or glucagon; fast or slow acting) and the time of the delivery and the manual delivery component 3614 may receive such information and deliver the medicament(s) accordingly. In some embodiments, the manual delivery component 3614 may inform the automated delivery system 3612 and the model predictive control component 3616 regarding the drug type (insulin or glucagon; fast or slow acting) and the time of the delivery.

When the user activates the automated delivery system 3612, the data from previous manual medicament infusions can be readily available so that the automated delivery system 3612 may be able to determine how much medicament is still in the user's blood stream. The automated delivery system 3612 may make that determination by tracking the finite rate of utilization of infused insulin by the subject based on the time and amount of any manual medicament infusions reported to the automated delivery system 3612.

FIG. 37 is a flow chart of a process 3700 detailing a medicament selection process, according to an exemplary embodiment. In step 3710, the medical device provides an option to a user to select between receiving medicament using a manual delivery component or an automated delivery system. By using the mode controller 3613, the user can select the method for the therapy change request between manual delivery component and the automated delivery system.

In step 3720, the medical device may receive subjective information regarding the activity or action that may alter the glucose level. Subjective information may include the size of the meal and/or the type of physical activity. In step 3730, the manual delivery component may receive an amount of the medicament to be infused. The medicament may be a plurality of hormones, including but not limited to, glucagon or insulin. At step 3740, the medical device may store a time and the amount of medicament that was infused into the automated delivery component that controls the glucose level. The systems that are disclosed in FIG. 36 may be utilized to accomplish one or more of the operations associated with the steps 3710, 3720, 3730 and 3740.

Figure 38:
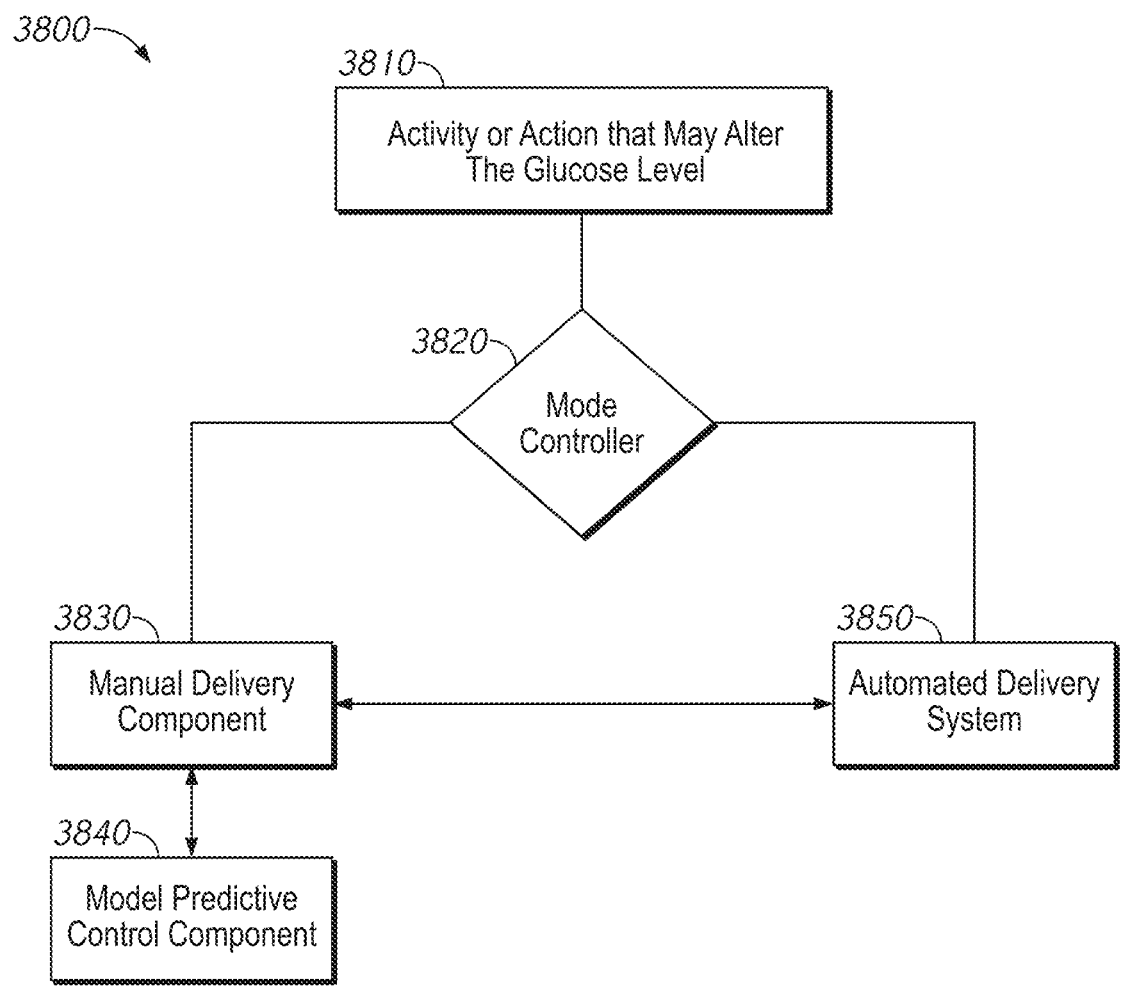
FIG. 38 is another flow diagram of a process for providing options for meal dosage selection on an ambulatory device.

FIG. 38 is another flow diagram of a process 3800 for providing options for meal dosage selection or physical activity of the user on an ambulatory device. Embodiments described herein may include an ambulatory medical device that has a keypad or other user interface device that enables a user to enter a dose of insulin or glucagon to be administered to a user. A user may wish to receive a single dose of insulin prior to consuming food and decide how much insulin need to be administered. In other embodiments, the user may choose to receive a burst of glucagon due to low blood glucose because of physical activities. Embodiments may include the options for manual inputs of medicament and automated delivery system of medicament. In various implementations, the automated delivery system of medicament is driven by the glucose level or related trends. Embodiments herein address a problem that may arise when the user has received a manual medicament dose and has switched on the automated delivery system. In such cases, data indicating the quantity and timing of a manual medicament dose may be provided to or transmitted to the automated delivery system. Accordingly, the manual delivery component may transmit to the automated delivery system the type of medicament delivered, the amount of medicament and the timing of the medicament delivered. By having the above information, the automated delivery system may determine the amount of medicament that is the user's blood stream and adjust the automated delivery of medicament and the timing of the automated delivery. Accordingly, embodiments disclosed herein enable a risk-free or reduced risk transition from the manual delivery component to the automated delivery system, or vice versa.

At block 3810, the user may inform the activity change component 3608 that the user is about to engage in activities that may alter the glucose level of the user. The mode controller 3613 may be activated at decision block 3820 and ask whether the user wants to use the manual delivery component 3830 or the automated delivery system 3850. If the user chooses to use the manual delivery component 3830 and the user provides an input to infuse medicament, the ambulatory device 3602 may delivery the medicament to the user. Upon the manual delivery process completion, the manual delivery component 3830 may inform at least one of the model predictive control component 3840 and the automated delivery system 3850 regarding the type of medicament, amount of medicament and the time when the medicament was delivery. The model predictive control component 3840 and automated delivery system 3850 may track these manual infusions of medicament and determine that based on the rate of decay or the half-life of the medicament the total amount of medicament that remains in the user's blood stream at a particular time or a period of time. Accordingly, when the automated delivery system 3850 is activated by the user, the automated delivery system 3850 may change its medicament infusion based on the medicament that remains in the user's blood stream after a manual infusion by the user.

Differences from other system may include that the manual delivery may be tied to an automated delivery system, the dose input from the user is then stored into the MPC algorithm (Model Predictive Control) instead of the meal delivery algorithm and is handled by the MPC algorithm. Other embodiments may include selection being able to have a relativistic algorithmically tuned value. Other embodiments may include a learning algorithm that includes a usual size meal or larger size meal or small size mean. Embodiments may include correlating the manual inputs to asking the user what was the size of the meal and learning how the insulin affects the user. Embodiments may include corelating the manual inputs to asking the user what activity the user performed and learning how the glucagon affects the user for a particular activity.

Figure 39:
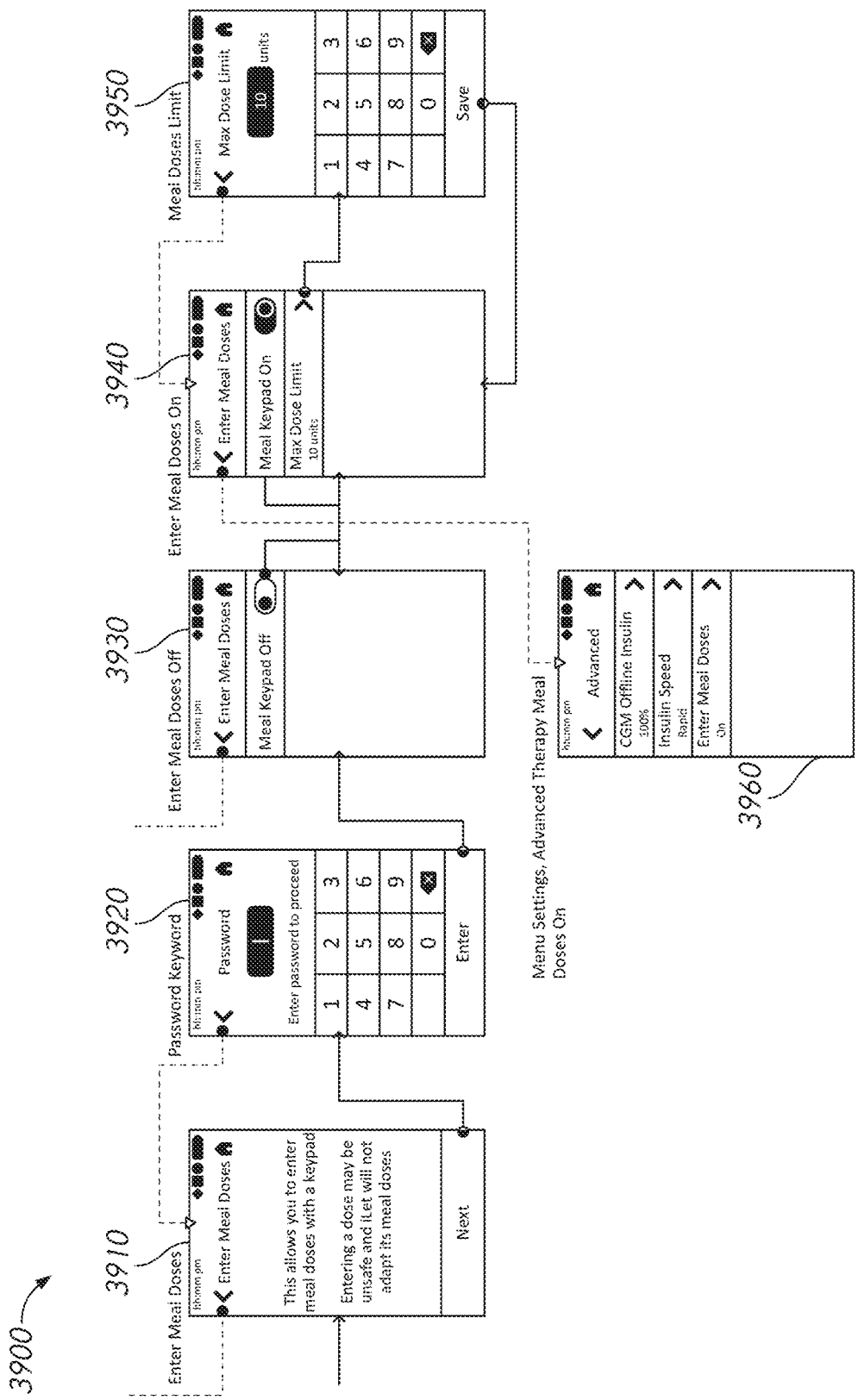
FIG. 39 is a series of screen displays showing a user initiating the activation of meal dosage on an ambulatory device.

FIG. 39 illustrates a plurality of screens 3900 that may be produced by the ambulatory medical device 100. The plurality of screens 3900 demonstrates a process that a user may take in order to enter meal doses. When the mode controller 3613 is activated, the enter meal doses screen 3910 may be displayed. Once the screen 3910 is displayed, a warning text may be displayed for the user to ensure safety. The warning text states that entering a dose may be unsafe and the device will not adapt its meal doses. This warning text cautions the user of the risks that may be involved in the process of using the ambulatory medical device 3602. After a user acknowledges the warning sign and choses to proceed, a password screen 3920 may be displayed. Once the password screen 3920 is displayed, a keypad is provided for the user to enter a predetermined sequence of numbers to ensure that the user is the actual registered user of the ambulatory medical device 3602. When the ambulatory medical device 3602 receives the correct predetermined password from the user, the enter meal doses screen 3930 (with meals key in OFF state) or enter meal doses off screen 3940 (with meals key on ON state) may be displayed. The user may decide to access the advanced screen 3960, and upon doing so, the advanced screen 3960 will allow the user to double check the CGM Insulin levels and change the speed of the of the insulin pump. In screen 3930 and screen 3940, the user is provided the option to have the meal keypad on or off. If the user selects to have the keypad on, then an option may be provided for the user to choose the max dose limit. If the user decides to choose the max dose limit, the official max dose limit screen 3950 is displayed, where the user may enter up to 10 units of the dose. The provided number of units is then stored in the model predictive control component 3616 for further regulation of the glucose level.

Figure 40:
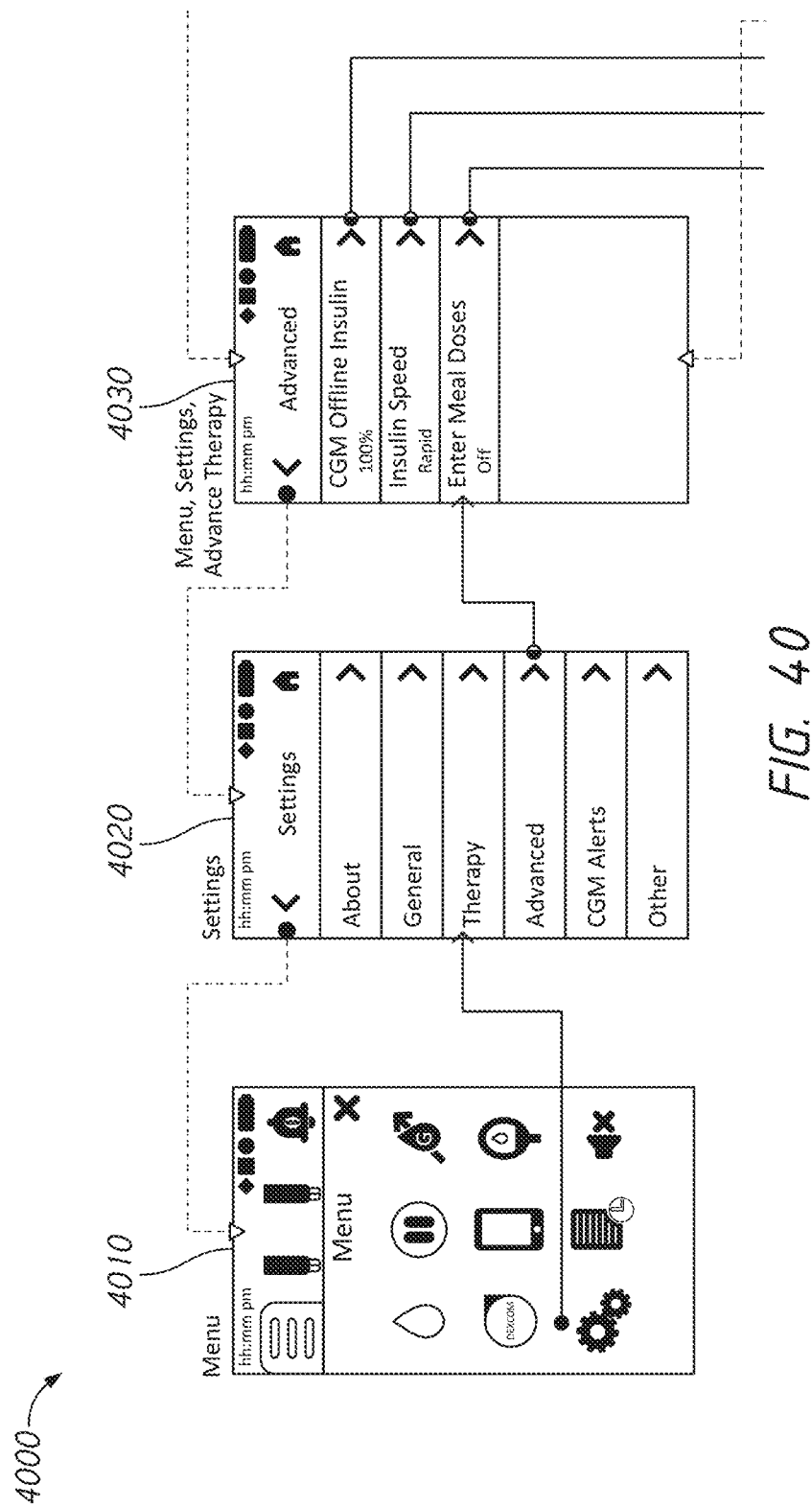
FIG. 40 is a series of screen displays showing a user activating meal dosage on an ambulatory device.

FIG. 40 illustrates a plurality of screens 4000 that may be produced by the ambulatory medical device 3602. Upon activating the ambulatory medical device 100, the initial menu screen 4010 may be displayed. In the initial menu screen 4010, options regarding functionalities of the ambulatory medical device 3602 is provided. The list of functionalities may cover some or all of the aspects of the ambulatory medical device 3602. The user may access and control many aspects of the device by choosing the setting option. The setting option will allow the user to further assess and regulate the adjustable functionalities of the ambulatory medical device 3602. Upon selecting the setting option, the setting screen 4020 may be displayed and the user may select the advanced setting option. Upon selecting the advanced option, the advanced setting screen 4030 is displayed, and the user is provided the option to double check the CGM insulin levels and change the speed of the of the insulin pump. The user may speed up the process or slow down the process depending on the regulation stats that are provided by the model predictive control component 3616.

Figure 41:
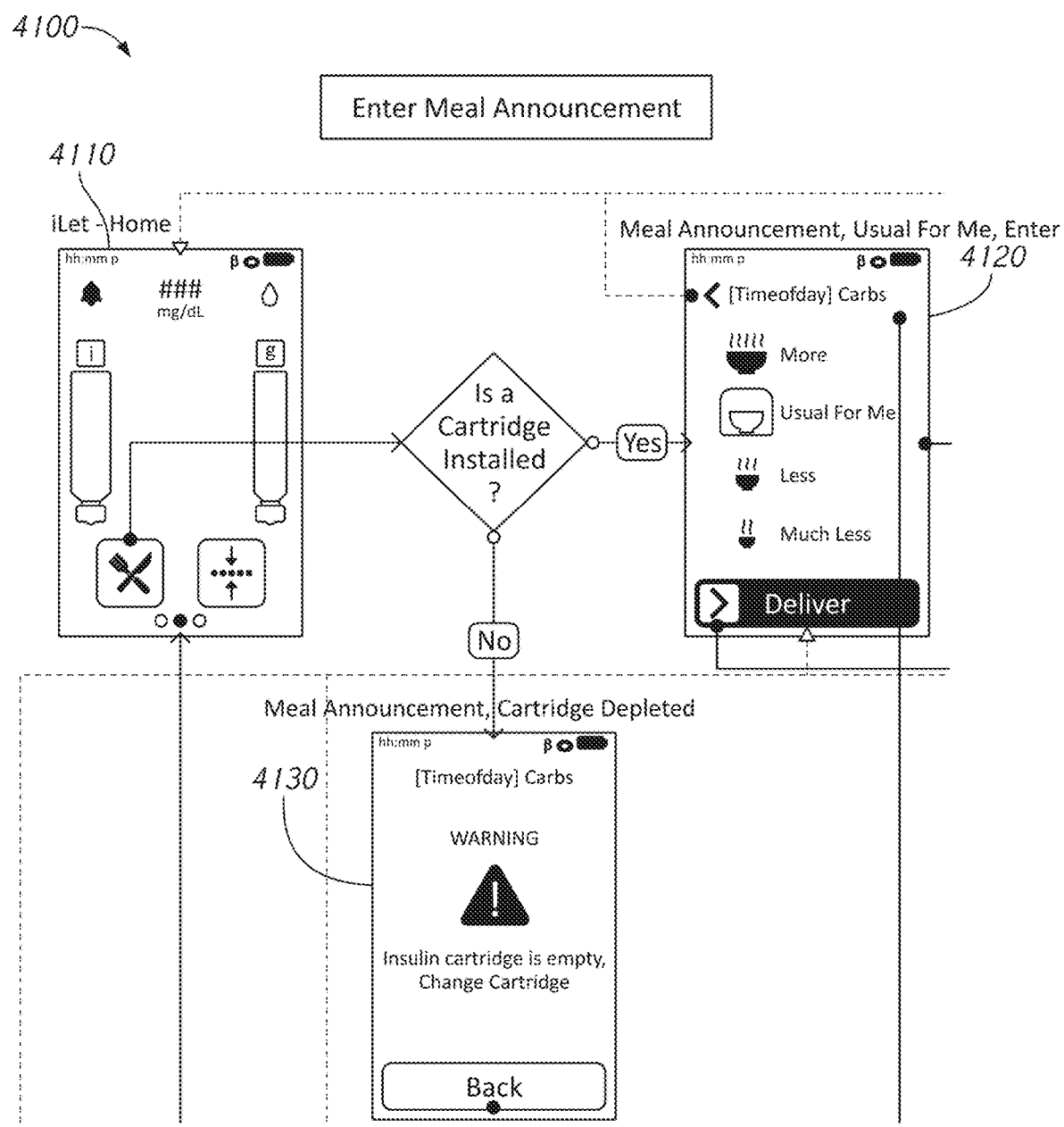
FIG. 41 is a series of screen displays showing a user activating meal announcement on an ambulatory device.

FIG. 41 illustrates a plurality of screens 4100 that may be produced by the ambulatory medical device 3602. The plurality of screens 4100 is the process that a user may take in order to enter meal announcements. The home screen 4110 provides information and stats regarding the cartridge of the ambulatory medical device 3602. The user may select the meal button with or without an installation of a new cartridge. If a user selects the meal button without installing a new cartridge, the ambulatory device 3602 will display the warning screen 4130, where the user is warned that the insulin cartridge is empty, and the device further advises the user to change the cartridge. However, if a new cartridge is already installed and the food button is pressed, the ambulatory medical device 3602 will display the carbs screen 4120, where the user is provided the option to choose a meal dose option. The carbs screen 4120 allows the user to provide subjective information regarding the food that is to be digested. This subjective data provided by the user is further stored in the model predictive control component 3616 for further regulation of the glucose level.

Figure 42:
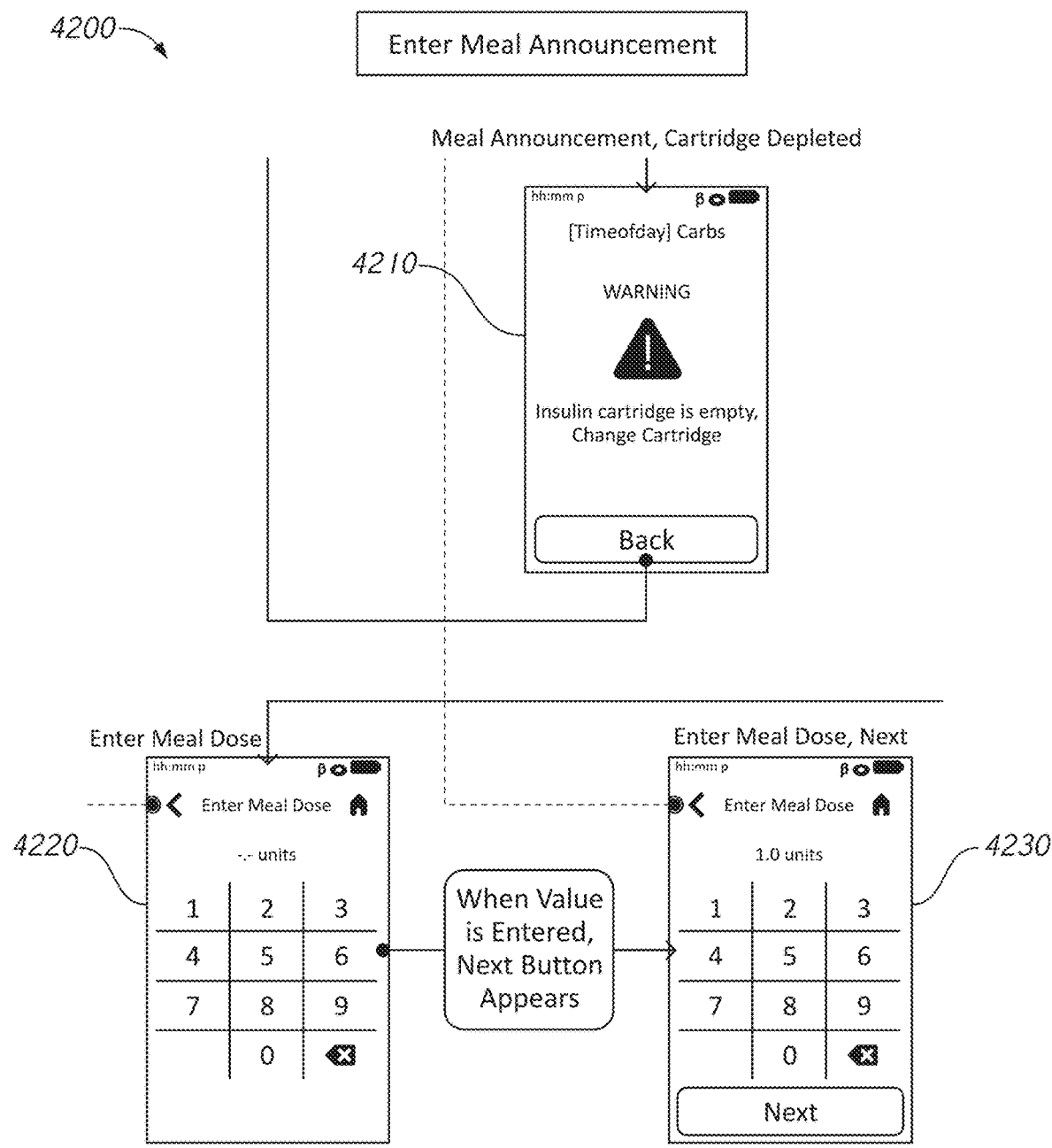
FIG. 42 is a series of screen displays showing a user inputting the total number of units on an ambulatory device.

FIG. 42 illustrates a plurality of screens 4200 that may be produced by the ambulatory medical device 3602. The plurality of screens 4200 demonstrates the process of the user being alerted about the empty cartridge and having the option to replace the cartridge and further enter the meal doses. Warning screen 4210 alerts the user that the insulin cartridge is empty and the fact that it needs to be replaced. Upon replacing the cartridge, screens 4220 and 4230 will be displayed. Screen 4220 is initially displayed, and a user may enter a specified dose for each meal on a numerical pad. Upon inserting a numerical specified dose, screen 4230 is displayed where a next button is provided for the user to further complete the therapy change. The numerical specified dose is further stored in the model predictive control component 3616 for further regulation of the glucose level.

FIG. 43 illustrates a plurality of screens 4300 that may be produced by the ambulatory medical device 3602. Upon selecting the delivery request, a user may cancel the delivery of the medicaments prior to the completion of the delivery. The ambulatory medical device 3602 displays a countdown prior to delivery. The initial countdown screen 4310 is proceeded by the secondary countdown screen 4330. During these countdown screens, a cancel button is provided for the user to cancel the therapy change. During the initial countdown screen 4310 or the secondary countdown screen 4330, the user may cancel the delivery at any time. By swiping the cancel button, the user may officially stop the delivery of the therapy change. If the user does not cancel, the therapy change may be delivered successfully. Furthermore, the time and the amount of the therapy change delivery is stored in the model predictive control component 3616 for further regulation of the glucose level. However, if the user decides to cancel the delivery, the delivery will be canceled and the screen 4320 will be provided. Once the delivery cancelation is requested and the screen 4320 is displayed, upon pressing the ok button, the ambulatory medical device 3602 will display a lock screen 4340 and take the time to officially cancel the therapy change request.

Figure 44:
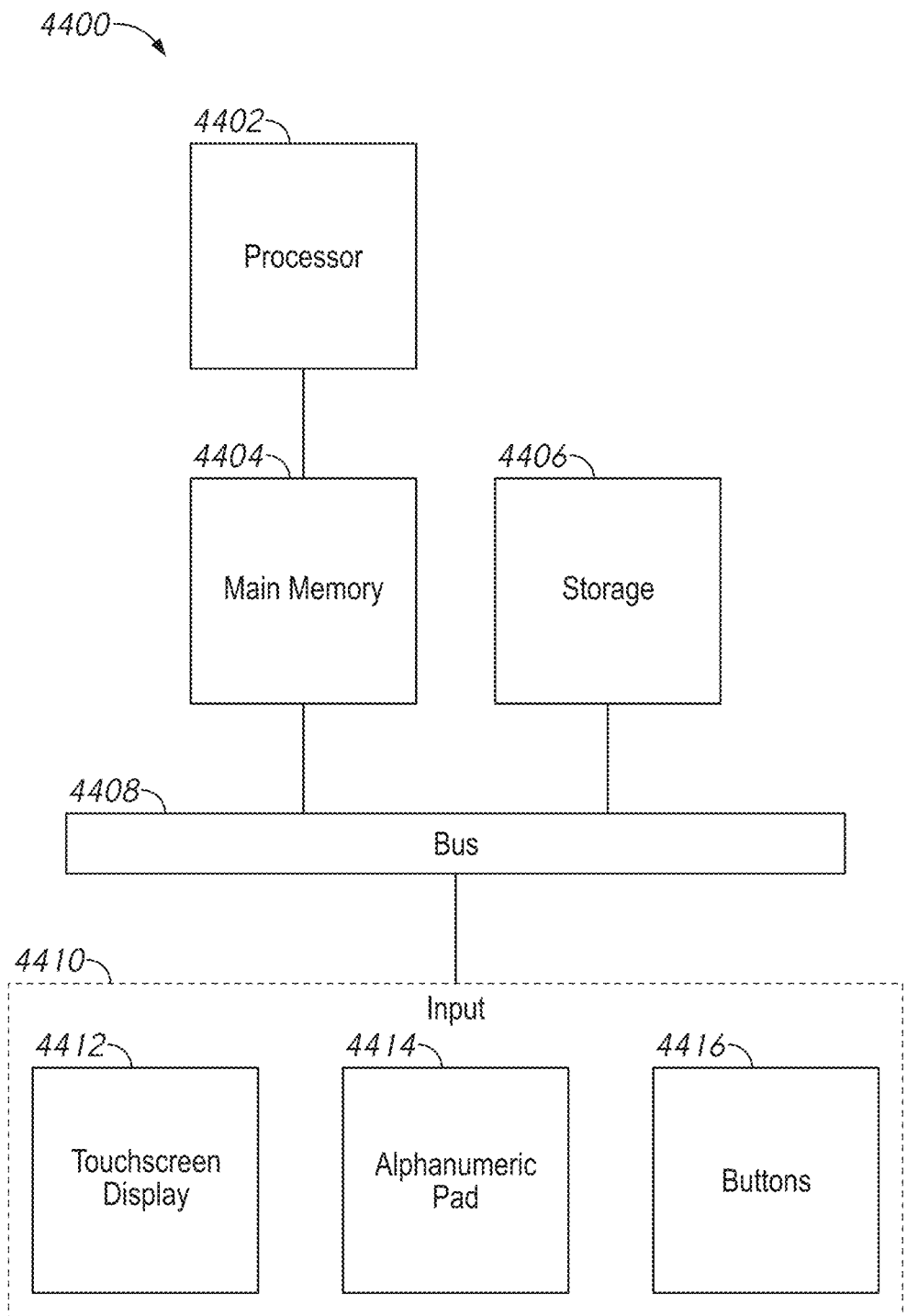
FIG. 44 is a schematic illustrating a computer system that can be implemented in various embodiments of the described subject matter.

FIG. 44 is a block diagram illustrating a computer system 4400 that may be implemented in the various embodiments in the described subject matter. The computer system 4400 includes a processor 4402, main memory 4404, storage 4406, a bus 4408, and input 4410. The processor 4402 may be one or more processors. The processor 4402 executes instructions that are communicated to the processor through the main memory 4404. The main memory 4404 feeds instructions to the processor 4402. The main memory 4404 is also connected to the bus 4408. The main memory 4404 may communicate with the other components of the computer system through the bus 4408. Instructions for the computer system 4400 are transmitted to the main memory 4404 through the bus 4408. Those instructions may be executed by the processor 4402. Executed instructions may be passed back to the main memory 4404 to be disseminated to other components of the computer system 4400. The storage 4406 may hold large amounts of data and retain that data while the computer system 4400 is unpowered. The storage 4406 is connected to the bus 4408 and can communicate data that the storage holds to the main memory 4404 through the bus 4408.

The processor 4402 may be any type of general purpose processor including, but not limited to a central processing unit ("CPU"), a graphics processing unit ("GPU"), a complex programmable logic device ("CPLD"), a field programmable gate array ("FPGA"), or an application-specific integrated circuit ("ASIC"). Some embodiments of the computer system 4400 in the ambulatory medical device 100 includes a CPU as the processor 4402. However, embodiments may be envisioned for the computer system of the ambulatory medical device 100 that incorporate other types of processors 4402.

The main memory 4404 can be any type of main memory that can communicate instructions to the processor 4402 and receive executed instructions from the processor 4402. Types of main memory 4404 include but are not limited to random access memory ("RAM") and read only memory ("ROM"). In some embodiments, the computer system 4400 incorporates RAM as the form of main memory 4404 to communicate instructions to the processor 4402 and receive executed instructions from the processor 4402. Other embodiments may be envisioned that incorporate other types of main memory 4404 in the computer system 4400.

The storage 4406 can be any type of computer storage that can receive data, store data, and transmit data to the main memory 4404 via the bus 4408. Types of storage 4406 that can be used in the computer system 4400 include, but are not limited to, magnetic disk memory, optical disk memory, and flash memory. In some embodiments, flash memory is used as the storage 4406 in the computer system 4400 of the ambulatory medical device 100. Other embodiments that use other types of storage 4406 for the computer system 4400 may be envisioned.

The bus 4408 connects the internal components of the computer system 4400. The bus 4408 may include a multitude of wires that are connected to the components of the computer system 4400. The wires of the bus 4408 may differ based on the components of the computer system 4400 to which the bus 4408 connects. In various embodiments, the bus 4408 connects the processor 4402 to the main memory 4404. In various embodiments, the processor 4402 is directly connected to the main memory 4404.

The input 4410 of the computer system 4400 includes a touchscreen display 4412, an alphanumeric pad 4414, and buttons 4416. The touchscreen display 4412 both produces output and accepts input. The bus 4408 may be coupled to the touchscreen display 4412 to produce visual output. The touchscreen display 4412 may also accept input via capacitive touch, resistive touch, or other touch technology. The input surface of the touchscreen display 4412 can register the position of touches on the surface. Some types of touchscreen display 4412 can register multiple touches at once. The alphanumeric pad 4414 includes a multitude of keys with numerical, alphabetical, and symbol characters. Signals from the alphanumeric pad 4414 are communicated by the bus 4408 to the main memory 4404. Keys of the alphanumeric pad 4414 may be capacitive or mechanical. In some embodiments, the alphanumeric pad 4414 is displayed on the touchscreen display 4412. Buttons 4416, such as the wake button 2620, may be capacitive, mechanical, or other types of input buttons.

In-Patient Glucose Control

Providing glucose control therapy, such as glucose control therapy, generally requires regular delivery of medicament. For example, in a healthcare context, a healthcare provider may need to set a rate of medicament delivery to a subject. This rate may need to be regularly and/or frequently adjusted in response to a variety of factors. For instance, a subject may require additional insulin delivery after a meal.

In some cases, a subject will receive a basal rate of medicament. For example, a subject may receive a regular or basal rate of insulin to maintain a desired glucose level. This basal rate may be set by a healthcare provider, such as a nurse or a doctor. The basal rate may need to be modified as needed. The modifications may need to be made in response to changes to a user's consumption pattern or other factor. For example, the basal rate may need to be modified in response to a meal announcement. The basal dose can be generated using a basal control algorithm such as discussed above. Meal announcements are not the only changes that may cause modifications to the basal rate. In some cases, the therapy delivered (e.g., the basal rate) may need to be paused or stopped. This may be particularly relevant during activities (e.g., swimming, sports, where delivery is not possible, not possible, not comfortable, or otherwise not preferred.

Manual therapy can be provided to the subject that is different from the basal rate. For example, in an in-patient setting, a healthcare provider may set an initial dose control signal that commands a delivery of medicament to the subject according to a particular schedule. This initial dose control signal may be modified from time to time using a glucose level control system.

In some cases, an emergency may arise that requires specialized therapy. As discussed herein, one or more embodiments of the systems described herein may determine that the basal rate or other rate of delivery of medicament to the subject is insufficient to maintain health-appropriate therapy. Health-appropriate therapy may include therapy that is sufficient to maintain a baseline level of health for the subject. For example, health-appropriate therapy may be therapy that is configured to maintain a glucose level of the subject within a threshold range. The threshold range may include glucose levels or predicted glucose levels from about 70 mg/dl to about 180 mg/dl. In some embodiments, the threshold range can be from about 70 mg/dl to about 170 mg/dl, from about 75 mg/dl to about 160 mg/dl, from about 80 mg/dl to about 150 mg/dl, from about 80 mg/dl to about 140 mg/dl, from about 85 mg/dl to about 130 mg/dl, from about 90 mg/dl to about 125 mg/dl, or a range between any of the foregoing values.

If it is determined that the subject is not receiving health appropriate therapy, the system may generate (e.g., automatically) an emergency dose control signal that is configured to command administration of modified glucose control therapy to the subject via the medicament pump. Based on the emergency dose control signal, the system may modify the manual therapy instruction and transmit the emergency dose control signal to the pump controller of the medicament pump.

In some scenarios, the system can supply critical updates to a subject's therapy during an emergency situation. For example, the subject may receive a counter-regulatory dose of medicament if, for example, a glucose sensor determines that a level of glucose level in the subject's body has exceeded a threshold maximum level and/or if the glucose level is below a threshold minimum level.

Figure 45:
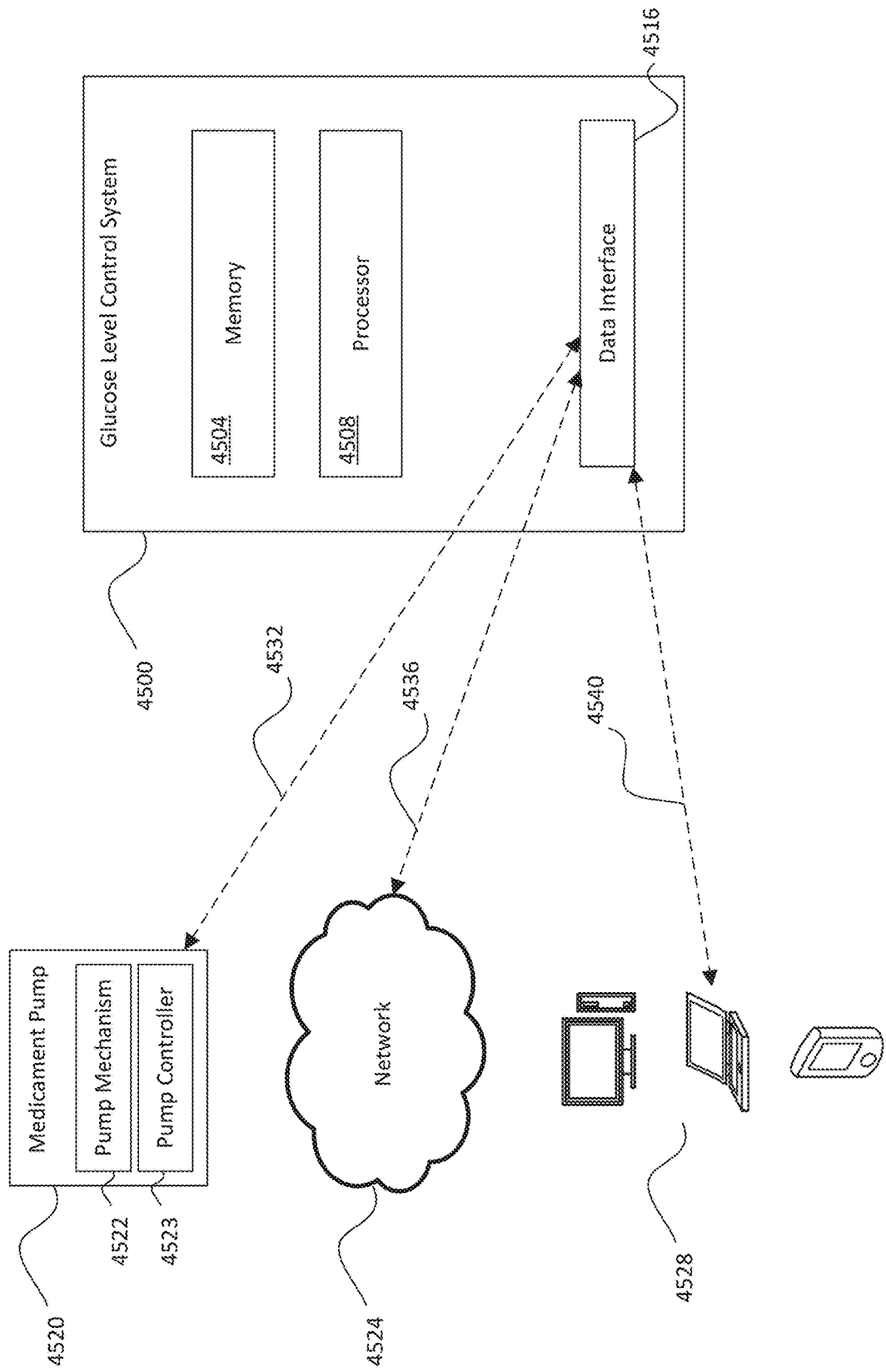
FIG. 45 shows an example glucose level control system configured to configured to modify a manual therapy instruction and to generate an emergency dose control signal.

FIG. 45 shows an example glucose level control system 4500 configured to configured to modify a manual therapy instruction and to generate an emergency dose control signal. "Modify" may refer to its plain and ordinary meaning, and may include adjusting, updating, complementing, temporarily overriding, or permanently overriding the manual therapy instruction. The emergency dose control signal can be configured to command administration of modified glucose control therapy to a subject via a medicament pump 4520. The glucose level control system 4500 includes a non-transitory memory 4504, an electronic hardware processor 4508, and a data interface 4516. The data interface 4516 may include a wireless and/or wired data interface. The data interface 4516 can include a short-range wireless data interface.

The data interface 4516 may be in communication (e.g., wired, wireless) with the medicament pump 4520 (e.g., via a medicament pump connection 4532). For example, in a hospital setting, the glucose level control system 4500 may be directly connected to the medicament pump 4520 within a hospital room or other healthcare setting. Additionally, or alternatively, the data interface 4516 can be in communication with a network 4524 (e.g., via a network connection 4536), and/or a user device connection 4540 (e.g., via a user device connection 4540). Each of the connections 4532, 4536, 4540 may be one-way or two-way. The data interface 4516 may also be in communication with other elements of the medicament pump 4520, such as the pump mechanism 4522 and/or the pump controller 4523. The communication with the other elements within the medicament pump 4520 may be via a wired connection. The glucose level control system 4500 can represent one or a plurality of medicament pumps. In some embodiments, for example, the glucose level control system 4500 is in communication with a medicament pump that is to be replaced as well as an additional pump to replace that pump. However, for simplicity, reference to the medicament pump 4520 will represent one or a plurality of medicament pumps.

The medicament pump 4520 may be any medicament pump described herein, such as the AMD 100 and/or the pump 212. In some embodiments, the medicament pump 4520 is a medicament pump coupled to the subject during in-patient therapy delivery. The pump controller 4523 is configured to direct medicament from a medicament reservoir to the subject using the pump mechanism 4522.

The data interface 4516 may be able to communicate (e.g., wirelessly, via wired connection) with a medicament pump 4520, a network 4524, and/or a user device 4528 via respective connections 4532, 4536, 4540. The data interface 4516 can communicate with the medicament pump 4520, such as via a wireless connection. The medicament pump 4520 can include a pump mechanism 4522 and a pump controller 4523. In some embodiments, the data interface 4516 communicates with the pump controller 4523 of the medicament pump 4520.

The network 4524 may include any wired network, wireless network, or combination thereof. For example, the network 4524 may be a personal area network, local area network, wide area network, over-the-air broadcast network (e.g., for radio or television), cable network, satellite network, cellular telephone network, or combination thereof. As a further example, the network 4524 may be a publicly accessible network of linked networks, possibly operated by various distinct parties, such as the Internet. In some implementations, the network 4524 may be a private or semi-private network, such as a corporate or university intranet. The network 4524 may include one or more wireless networks, such as a Global System for Mobile Communications (GSM) network, a Code Division Multiple Access (CDMA) network, a Long Term Evolution (LTE) network, or any other type of wireless network. The network 4524 can use protocols and components for communicating via the Internet or any of the other aforementioned types of networks. For example, the protocols used by the network 4524 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein. The network 4524 may comprise the "cloud." The network 4524 may include a remote computing environment.

Various example user devices 4528 are shown in FIG. 45, including a desktop computer, a laptop, and a mobile phone, each provided by way of illustration only. In general, the user devices 4528 can be any computing device such as a desktop, laptop or tablet computer, personal computer, tablet computer, wearable computer, server, personal digital assistant (PDA), PDM, hybrid PDA/mobile phone, mobile phone, smartphone, set top box, voice command device, digital media player, and the like. A user device 4528 may execute an application (e.g., a browser, a stand-alone application) that allows a user to access and interact with interactive graphical user interfaces as described herein.

The glucose level control system 4500 may be configured to receive a manual therapy instruction. The manual therapy instruction may include an initial dose of medicament that is to be delivered to the subject. The manual therapy instruction can direct a default or basal rate of medicament delivery to the subject. The glucose level control system 4500 may receive the manual therapy instruction via a manual therapy control interface. In some examples, the glucose level control system 4500 may include the manual therapy control interface. The manual therapy control interface may be a graphical user interface. The manual therapy control interface may be integrated into the glucose level control system 4500 or may be a separate element. For example, the manual therapy control interface may be integrated with the user device 4528 described above. The user interface may be operatively coupled to the glucose level control system 4500 via, for example, the wireless data interface. The manual therapy control interface can include a touchscreen display. The touchscreen display may display a therapy modification interface for modifying therapy the subject and/or for receiving subject inputs on the therapy modification interface. Inputs on the touchscreen display may be registered by any touch technology including, but not limited to capacitive and resistive sensing. The touchscreen display may be a part of a mobile computing device, such as a cellular phone, tablet, laptop, computer or the like (e.g., the user device 4528). The touchscreen display may have a computing component for interpreting and executing instructions from the processor 4519. Thus, the touchscreen display can follow instructions that are directed by the processor 4519. To receive input, the touchscreen display may display buttons, alphanumeric characters, symbols, graphical images, animations, or videos. In some embodiments, the user interface is not a touchscreen display. The user interface may comprise one or more mechanical buttons. The user interface may include an alert generator, such as a light emitter, a speaker, a haptic feedback system, or other sensory alert system.

The glucose level control system 4500 can be configured to transmit an initial dose control signal to a pump controller of the medicament pump 4520. The initial dose control signal may be configured to cause the medicament pump 4520 to infuse an initial amount of medicament into a subject. This initial amount of medicament may be a regular (e.g., basal) rate of medicament.

It may be advantageous to periodically (or at least once) take into account the glucose level of the subject. This may be especially true after the medicament pump 4520 has begun delivering the initial amount of medicament into the subject. For example, if the initial amount of medicament is too much or too little than is needed by the subject, the glucose level of the subject may fail to fall within the acceptable range. The glucose level of the subject may be obtained in one or more ways. For example, a nurse or other healthcare provider may take a measurement of the glucose level by pricking the subject's finger. This glucose measurement may be taken periodically (e.g., regularly). For example, the measurement may be taken about once per hour, about twice per hour, about three times per hour, about four times per hour, about five times per hour, or some other time. The measurements may be taken at regular intervals over a time period in some cases. The time period may be about an hour, about 2 hours, about 3 hours, about 4 hours, about 5 hours, about 6 hours, about 9 hours, about 12 hours, about 18 hours, about 24 hours, any time period therein, or fall within any range of times having any of those values as endpoints. For example, in some embodiments, the time period is about an hour. Additionally, or alternatively, the measurements may be taken at irregular points after the initial dose control signal has been received by the medicament pump 4520. The measurement may be manually input into an analyzer (not shown in FIG. 45. The analyzer may, in some embodiments, directly relay the glucose level measurement to the glucose level control system 4500. This may be done automatically. However, in some embodiments, the glucose level control system 4500 can receive the glucose level of the subject via a manual input into the glucose level control system 4500 (e.g., via a manual therapy control interface).

In some embodiments, the glucose level control system 4500 receives the glucose level of the subject via an automated measuring device, such as a bedside blood monitoring system. The bedside blood monitoring system may include an intravenous monitoring system, such as a "keep vein open" (KVO) system configured to periodically take up the patient's blood and monitor the glucose level. Additionally or alternatively, the monitoring system may be configured to directly transmit the glucose level of the subject to the glucose level control system 4500 once it is received. Thus, the glucose level control system 4500 may be configured to receive one or more glucose level measurements of the subject.

Additionally or alternatively, a continuous glucose monitor (CGM) may be coupled to the subject and may determine a glucose level of the subject, such as a glucose level of the subject within the interstitial fluid in the subcutaneous depot of the subject. The CGM may determine the glucose level of the subject by receiving an electrochemical signal from the subject's blood and/or interstitial fluid. The CGM may transmit the glucose level of the subject wirelessly or via a wired connection to the glucose level control system 4500.

Once the glucose level control system 4500 has received the glucose level of the subject, the glucose level control system 4500 can determine whether the initial dose control signal indicates health-appropriate therapy. This may be determined based at least in part on the received glucose level of the subject. For example, the glucose level control system 4500 may determine that the current rate of therapy, the subject will no longer have a glucose level that is within an acceptable range, such as that described herein. The glucose level control system 4500 may determine that the initial dose control signal does not indicate health-appropriate therapy by, for example, determining a time-varying glucose level of the subject over the time period mentioned above. Additionally or alternatively, the determination may be made by estimating an amount of insulin in the subject. Estimating the amount of insulin in the subject may include determining an amount of insulin delivered to the subject. If the total amount of insulin delivered to the subject is known, the glucose level control system 4500 may be able to estimate what an approximate glucose level of the subject may be, based on other factors already known by the glucose level control system 4500, such as those described above. Additionally or alternatively, the glucose level control system 4500 may estimate the amount of insulin in the subject by determining a rate of insulin absorption in the subject. This rate of insulin absorption may be calculated using values previously measured and then received by the glucose level control system 4500. Additionally or alternatively, the rate of insulin absorption may be received by a manual input by a healthcare provider via the manual therapy control interface. The glucose level control system 4500 may receive additional information in determining whether the subject is receiving health-appropriate therapy. Such additional information may include a weight of the subject.

The glucose level control system 4500 may determine that the initial amount of medicament is either insufficient or more than is needed by the subject. This determination may cause the glucose level control system 4500 to determine that modified therapy should be delivered to the subject. In some embodiments, the glucose level control system 4500 can determine maximum time within which the modified therapy must be given. In some cases, if the maximum time is less than a threshold time, the glucose level control system 4500 may be configured to generate an emergency dose control signal. The threshold time may refer to an amount of time that can elapse before the patient may suffer injury or pain. Additionally or alternatively, the threshold may indicate a time within which the glucose control therapy must be modified before future pain or injury of the subject can be avoided. The emergency dose control signal can be configured to command administration of modified glucose control therapy to the subject via the medicament pump 4520. The emergency dose control signal may be configured to command administration of medicament (e.g., insulin) at a lower rate of therapy than was commanded by the initial dose control signal. In some embodiments, the emergency dose control signal is configured to command administration of medicament (e.g., glucagon) at a higher rate of therapy than was commanded by the initial dose control signal. In some embodiments, the glucose level control system 4500 determines that the initial dose control signal does not indicate health-appropriate therapy based on the manual therapy instruction discussed above.

The glucose level control system 4500 may modify (e.g., override) the manual therapy instruction based on the determination that initial amount of medicament is insufficient to provide health-appropriate therapy to the subject. For example, the glucose level control system 4500 may temporarily override the manual therapy instructions. The override may be over an override time period. The override time period may be on the order of minutes or hours. For example, the override timer period may be about 5 minutes, about 15 minutes, about 30 minutes, about 45 minutes, about an hour, about 2 hours, about 3 hours, about 6 hours, about 12 hours, any value therein, or fall within a range having endpoint therein. In some embodiments, the glucose level control system 4500 can transmit the emergency dose control signal to the pump controller 4523 of the medicament pump 4520.

In some embodiments, the glucose level control system 4500 can be configured to receive additional data relevant to the care of the subject. For example, the glucose level control system 4500 may receive a rate of insulin delivered to the subject. This may include an amount of insulin that is delivered at a regular rate and/or a bolus of insulin delivered to the subject. Additionally or alternatively, the glucose level control system 4500 may receive a rate of dextrose delivered to the subject and/or a rate of saline delivered to the subject. In some embodiments, the glucose level control system 4500 can receive a rate of glucagon delivered to the subject. These data may be input by a healthcare provider (e.g., via the manual control therapy interface). Additionally or alternatively, these data may be transmitted automatically to the glucose level control system 4500 by an analyzer. In some embodiments, the glucose level control system 4500 is configured to receive a rate of nutrition delivered to the subject. This rate of nutrition may be received via the manual therapy control interface. Other data receivable by the glucose level control system 4500 are described below.

In some embodiments, the glucose level control system 4500 can transmit via the data interface 4516 data to a graphical user interface. For example, the glucose level control system 4500 may transmit a glucose level of the subject, glucose control therapy data (e.g., a time and/or amount of delivered medicament), one or more glucose control parameters, an indication of the glucose trend of the subject, and/or other similar data to the graphical user interface for display. Additionally, or alternatively, the data may be transmitted to a remote device, such as a user device 4528 and/or the network 4524, via a corresponding connection 4536, 4540.

As noted above, the glucose level control system 4500 can receive, store, and/or transmit one or more glucose control parameters to the one or more devices illustrated, such as the medicament pump 4520 (e.g., the medicament pump to be replaced, a replacement medicament pump), the user device 4528, and/or the network 4524. As described above, example glucose control parameters can include a variety of parameters. A non-exhaustive list of such glucose control parameters includes, but is not limited to: an insulin decay rate constant associated with a decay rate of insulin at a subcutaneous depot of the subject, a clearance time associated with an estimate of an amount of time for a bolus of insulin to be utilized by the subject, an insulin rise rate constant associated with a rise rate of insulin in blood of the subject after a bolus of insulin, a value (e.g., half-life value) associated with when a concentration of insulin in blood plasma of the subject reaches a threshold concentration (e.g., half, maximum) in the blood plasma, a weight of the subject, an age of the subject, a learned parameter (e.g., via a control algorithm described herein), glucose level data of the subject, a model parameter associated with a pharmacokinetic (PK) model, a health state of the subject (e.g., sick, pregnant, etc.), a parameter associated with an activity level of the subject, an aspect of a diet of the subject (e.g., smoker), a basal rate of insulin delivered to the subject, a correction factor, a carbohydrate ratio associated with the subject, a glucagon control parameter, demographic information associated with the subject, a sensitivity constant associated with the subject's sensitivity to a glucose level or bolus of medicament, or any other parameter that may be used in calculating a dose control signal, such as those described herein. Other parameters may be included, such as those with reference to the control algorithm above.

The glucose level control system 4500 can receive various data related to an amount of insulin on board and/or a value used in a pharmacokinetic (PK) model of the control algorithm described above. The glucose level control system 4500 may be configured to execute the control algorithm in some embodiments. The glucose control therapy data may include the amount of insulin on board and/or the value used in the PK model.

If the glucose level control system 4500 determines that the therapy delivery (e.g., amount and/or rate of medicament delivery) is below or above a threshold amount to provide health-appropriate therapy, the glucose level control system 4500 can generate (e.g., automatically) a user alert that indicates that additional delivery of medicament may be necessary or that the therapy delivery should be modified. As with other alerts described herein, the user alert may include any type of alert. For example, the alert may be a visual alert (e.g., a light or changing light), an audible alert (e.g., a beep or series of beeps), a haptic or vibration alert, an email alert, a text alert, or any other type of alert. In some cases, the user alert is dismissible and/or may be snoozed by the user. In some embodiments, the alert may be different for an emergency alert (e.g., if the maximum time is less than the threshold time described above) compared to a standard alert (e.g., if the maximum time is greater than or equal to the threshold time).

Alerts may vary based on when falling below or rising above the threshold time was detected, the time of day, or the detected activity of a subject (e.g., sleep, abnormal activity, or elevated activity). The alert frequency may be for a static time period (e.g., every 5 hours) or may ramp towards more frequency (e.g., every 5 hrs for 1 to 3 reminders, every 4 hours for 3 to 6 reminders, etc.), or may change based on time of day, etc.

The alert may prompt the healthcare provider to modify the therapy that is delivered to the subject. The alert can recommend an amount of therapy to be delivered and/or an indication of an estimated time before the current level of therapy raises an urgent or critical medical situation.

The glucose level control system 4500 can be configured to receive a request for modifying the therapy delivered to the subject. The request may be made by a user via user interaction with a manual therapy control interface, such as one described herein. The request may be made via a gesture, such as a movement of the eye and/or finger. In some examples, the input is received via a touchscreen interface. In some examples, the touchscreen interface is part of a separate device, such as the user device 4528 and/or the glucose sensor described herein. The request may include an amount of medicament to be delivered, a time for the medicament delivery to begin, a time for the medicament delivery to end, a rate of medicament delivery, a record of the current/previous medicament delivery (e.g., total medicament delivered, rate of delivery, time of start of previous medicament delivery), and/or some other request. In some examples, the glucose level control system 4500 can propose to the user one of the request options mentioned above (e.g., an amount and/or time of medicament to be delivered), allowing the user to confirm or decline the option. Such recommendations can help a user (e.g., the healthcare provider) make a correct input and to avoid user error.

Figure 46:
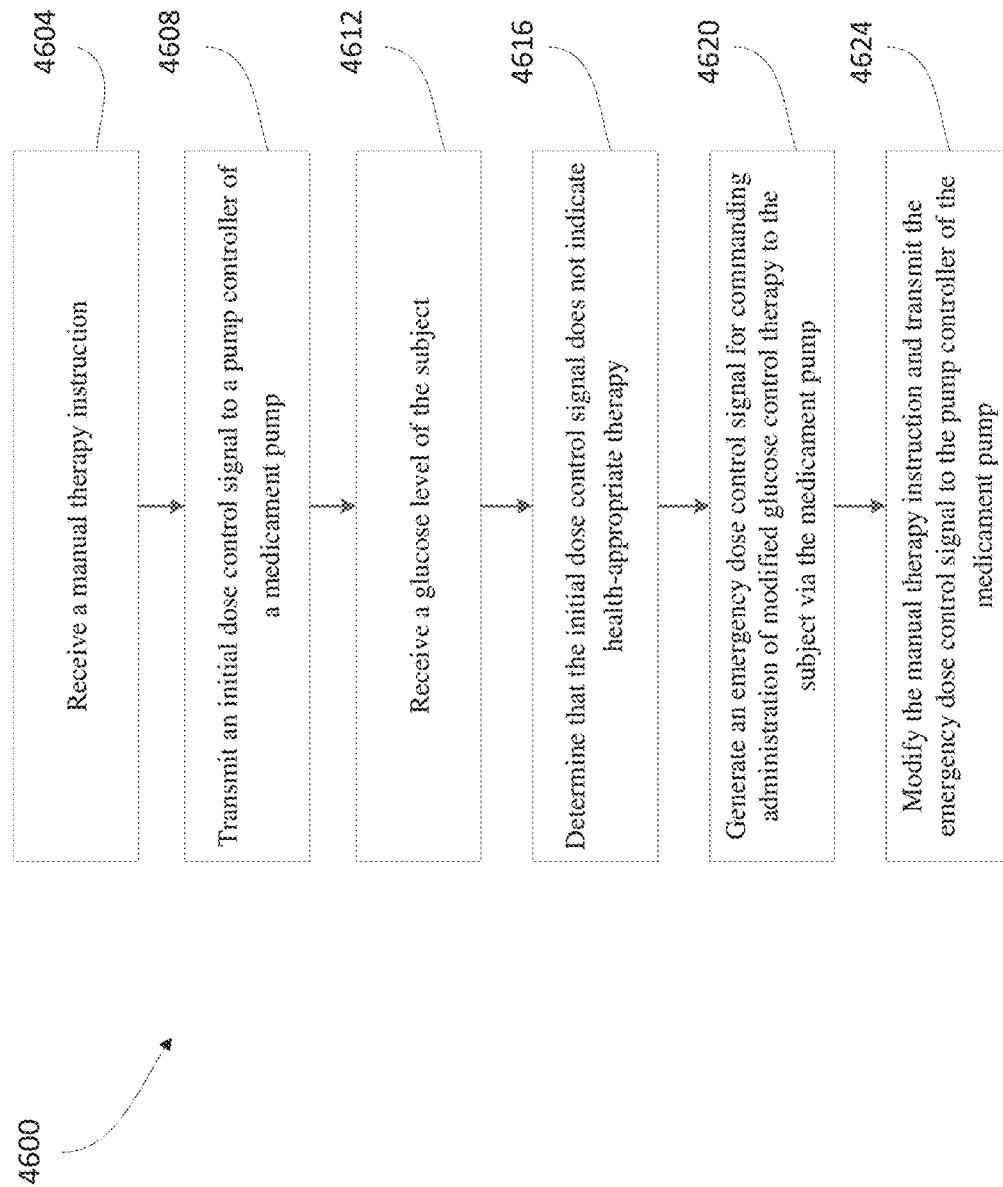
FIG. 46 shows a flow diagram illustrating an example method that may be used by a control system to generate an emergency dose control signal for commanding administration of modified glucose control therapy to a subject via a medicament pump.

FIG. 46 shows a flow diagram illustrating an example method 4600 that may be used by a control system (e.g., the glucose level control system 4500) to generate an emergency dose control signal for commanding administration of modified glucose control therapy to a subject via a medicament pump. The system can receive a manual therapy instruction at block 4604. At block 4608 the system transmits an initial dose control signal to a pump controller of a medicament pump. The glucose control parameter can include one or more of the glucose control parameters described above. At block 4612, the system receives a glucose level of the subject. At block 4616, the system determines that the initial dose control signal does not indicate health-appropriate therapy. At block 4620 the system generates an emergency dose control signal for commanding administration of modified glucose control therapy to the subject via the medicament pump. At block 4624, the system modifies the manual therapy instruction and transmits the emergency dose control signal to the pump controller of the medicament pump. Other details related to these steps are described above.

Example Implementation of Glucose Control System

Figure 47:
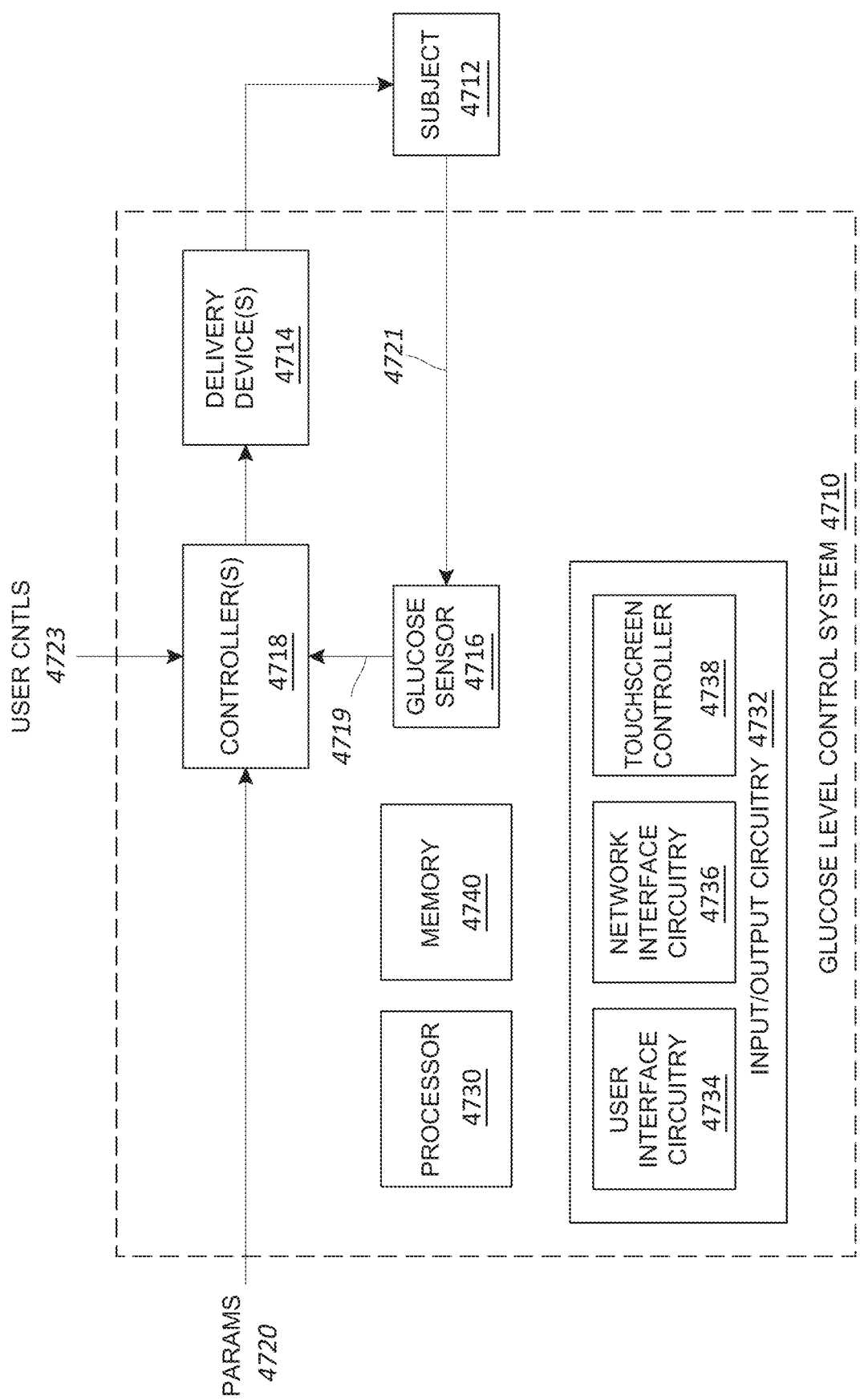
FIG. 47 illustrates a block diagram of a glucose level control system in accordance with certain embodiments.

FIG. 47 illustrates another example of an automated glucose control system 4710 for regulating the glucose level of an animal subject (subject) 4712, which may be a human. The automated glucose control system 4710 is an example of a medicament infusion system and may include any of the embodiments previously described above with respect to medicament infusion systems.

The subject 4712 may receive doses of insulin from one or more delivery devices 4714, for example infusion pump(s) coupled by catheter(s) to a subcutaneous space of the subject 4712. As described below, the delivery devices 4714 may also deliver a counter-regulatory agent or hyperglycemic agent, such as glucagon or dextrose, for control of the glucose level under certain circumstances. For the delivery of both insulin and a counter-regulatory agent (e.g., glucagon), the delivery devices 4714 may be mechanically driven infusion mechanisms having dual cartridges for insulin and the counter-regulatory agent, respectively. In the present description, reference is made to glucagon specifically, but it is to be understood that this is for convenience only and that other counter-regulatory agents (e.g., dextrose) may be used. Similarly, the term "insulin" herein is to be understood as encompassing all forms of insulin-like substances including natural human or animal insulin as well as synthetic insulin in any of a variety of forms (commonly referred to as "insulin analogs").

For online or autonomous operation, a glucose sensor 4716 is operatively coupled to the subject 4712 to continually sample a glucose level of the subject 4712. In some cases, the glucose sensor 4716 may be referred to as a continuous glucose monitoring (CGM) sensor, which may continuously or periodically measure or sense glucose levels of the subject 4712 for at least a period of time. Sensing may be accomplished in a variety of ways, generally involving some form of physical coupling 4721 between the subject 4712 and the glucose sensor 4716. A controller 4718 may control operation of the delivery device(s) 4714 as a function of a glucose level signal 4719 from the glucose sensor 4716 and subject to programmed input parameters (PARAMS) 4720 which may be provided by a user such as the subject 4712, a parent or guardian of the subject 4712, or a healthcare provider (e.g., a clinician or doctor). One input parameter for automatic operation may include the weight of the subject 4712. In some cases, the glucose control system 4710 can provide effective automated control without receiving explicit information regarding either meals that the subject 4712 has ingested or any other "feedforward" information, which is achieved in part by an adaptive aspect to operation of the controller 4718. In some cases, the glucose control system 4710 can use received information regarding either meals that the subject ingested, or plans to ingest, or other "feedforward" information to modify control of glucose level (e.g., blood glucose level) and/or delivery of insulin or counter-regulatory agent.

The controller 4718 is an electrical device with control circuitry that provides operating functionality as described herein. In one embodiment, the controller 4718 may be realized as a computerized device (e.g., a hardware processor) having computer instruction processing circuitry that executes one or more computer programs each including respective sets of computer instructions. In some cases, the processing circuitry will generally include one or more processors 4730 along with memory 4740 and input/output circuitry 4732 coupled to or in communication with the processor(s) 4730, where the memory 4740 stores computer program instructions and data, and the input/output circuitry 4732 can provide interface(s) to external devices such as the glucose sensor 4716 and delivery device(s) 4714. In some cases, the input/output circuitry 4732 may provide a user interface, or may operate with one or more processors (e.g., the controller 4718 or a separate processor 4730 included in the glucose control system 4710 or in a separate computing system, such as a smartphone, a laptop computer, a desktop computer, a smartwatch, and the like) to provide a user interface to a user (e.g., the subject 4712, a parent or guardian, or a clinician). In some cases, the input/output circuitry 4732 may include a touchscreen and/or a touchscreen controller 4738 configured to control a touchscreen (not shown).

In some cases, the controller 4718 may perform all of the functionality of the glucose level control system 4710. In such cases, the processor 4730 may be optional or omitted. In some cases, the controller 4718 may perform at least automated glucose level control of the subject 4712, and one or more separate processors 4730 may perform one or more additional operations of the glucose level control system 4710 (or medicament pump), such as tracking occurrences of hyperglycemic or hypoglycemic events or risk events, outputting data to a user, controlling or initiating communication with another computing system, regulating access to the glucose level control system 4710, or other operations unrelated to operation of a medicament pump or the delivery devices 4714.

The input/output circuitry 4732 may control communication with one or more other computing systems and/or with a user. In some cases, the input/output circuitry 4732 may include one or more separate interface circuits or controllers to facilitate user interaction and/or communication. For example, the input/output circuitry 4732 may include user interface circuitry 4734, network interface circuitry 4736, and/or a touchscreen controller 4738.

The user interface circuitry 4734 may include any circuitry or processors that may output a user interface to a user and/or receive user input from the user via the user interface. The user interface circuitry 4734 may receive one or more signals from a processor 4730 corresponding to a user interface. The user interface circuitry 4734 may control a display to present the user interface to a user based on the one or more signals received from the processor 4730. Further, the user interface circuitry 4734 may include any circuitry that can receive a signal corresponding to an interaction by a user with a user interface and can provide the signal to the processor 4730 and/or controller 4718 for further processing. In some cases, the user interface circuitry may be replaced by a touchscreen controller 4738 that can control a touchscreen interface. In some cases, the touchscreen controller 4738 may be in addition to the user interface circuitry 4734.

The network interface circuitry 4736 may include any circuitry that enables communication with a wired or wireless network. The network interface circuitry 4736 may include one or more network interface cards and/or wireless radios (e.g., a Bluetooth radio, a Bluetooth Low Energy (BLE) radio, a 4g LTE radio, a 5G radio, a ND-LTE radio, and the like).

The memory 4740 can include non-volatile memory and/or volatile memory. The non-volatile memory may include flash memory or solid-state memory.

The control system 4710 is also able to operate in an offline manner in which it is used to provide delivery of insulin (and potentially glucagon as well), independent of or without receipt of glucose levels reported by the sensor 4716. For example, in cases where the sensor 4716 needs replacing, is not properly connected to the subject 4712, or is defective, the glucose control system 4710 may operate in an offline manner without input from the sensor 4716. Thus, overall operation may be divided between online periods each including a succession of sampling intervals when a glucose signal (level) 4719 is available, and offline periods each including a succession of sampling intervals when the glucose signal (level) 4719 is either completely or intermittently unavailable. The description below uses the terms "online" and "offline" for these periods. Also, offline operation may be user-selected for some reason even when a glucose level signal 4719 is available for use.

User control inputs (USER CNTLs 4723) may be provided via a local or remote user interface of some type. In some embodiments, the user interface may resemble that of conventional insulin pumps or similar devices, e.g., by including control buttons for commanding the delivery of a bolus and perhaps a small display. In other embodiments, the system may have a wired or wireless interface to a remote device that may incorporate a fuller-function user interface, such as a smartphone, smartwatch, laptop computer, desktop computer, cloud computing service, or other wearable device or computing device. In some cases, the wireless interface may provide access to a local area network, such as a personal home network, a company network, or otherwise. Alternatively, or in addition, the wireless interface may provide a direct connection between local devices available to a user (e.g., via Bluetooth or other near field communication technologies). In some cases, the wireless interface may provide access to a wide area network, such as, but not limited to, the Internet. For example, the wireless interface may include a cellular interface that permits access to a network via a 4G or 5G cellular connection. In some cases, the cellular interface may be a low power interface, such as narrowband LTE or other Internet of Things (IoT) interfaces.

In offline mode, the glucose sensor 4716 may be absent, non-functioning, or not coupled to the subject 4712. As such, in offline mode, the glucose level signal 4719 may not be available to control automatic operation. In some cases, a user may provide one or more glucose level measurements to the control system 4710 to facilitate automatic operation of the control system 4710. These measurements may be provided over a particular time period. Alternatively, or in addition, the glucose control system 4710 may use a therapy history and/or a history of prior glucose level control measurements to facilitate automatic operation of the control system 4710 for at least a particular time period.

The description herein refers to a "user" as the source of the user control inputs 4723. The "user" as used herein may be the subject 4712, a parent or guardian of the subject 4712, a healthcare provider (e.g., a clinician, doctor, or other person who may provide medical care to the subject), or any other user who may be authorized to help manage therapy of the subject 4712. In certain implementations, the glucose level control system 4710 is a personal device worn by a subject 4712 for continual glucose control. In some such implementations, the user and subject 4712 may be the same person. In other implementations, there may be another person involved in the care of the subject 4712 and providing control input, and in such implementations, that other person has the role of user.

Example Controllers for a Glucose Level Control System

Figure 48:
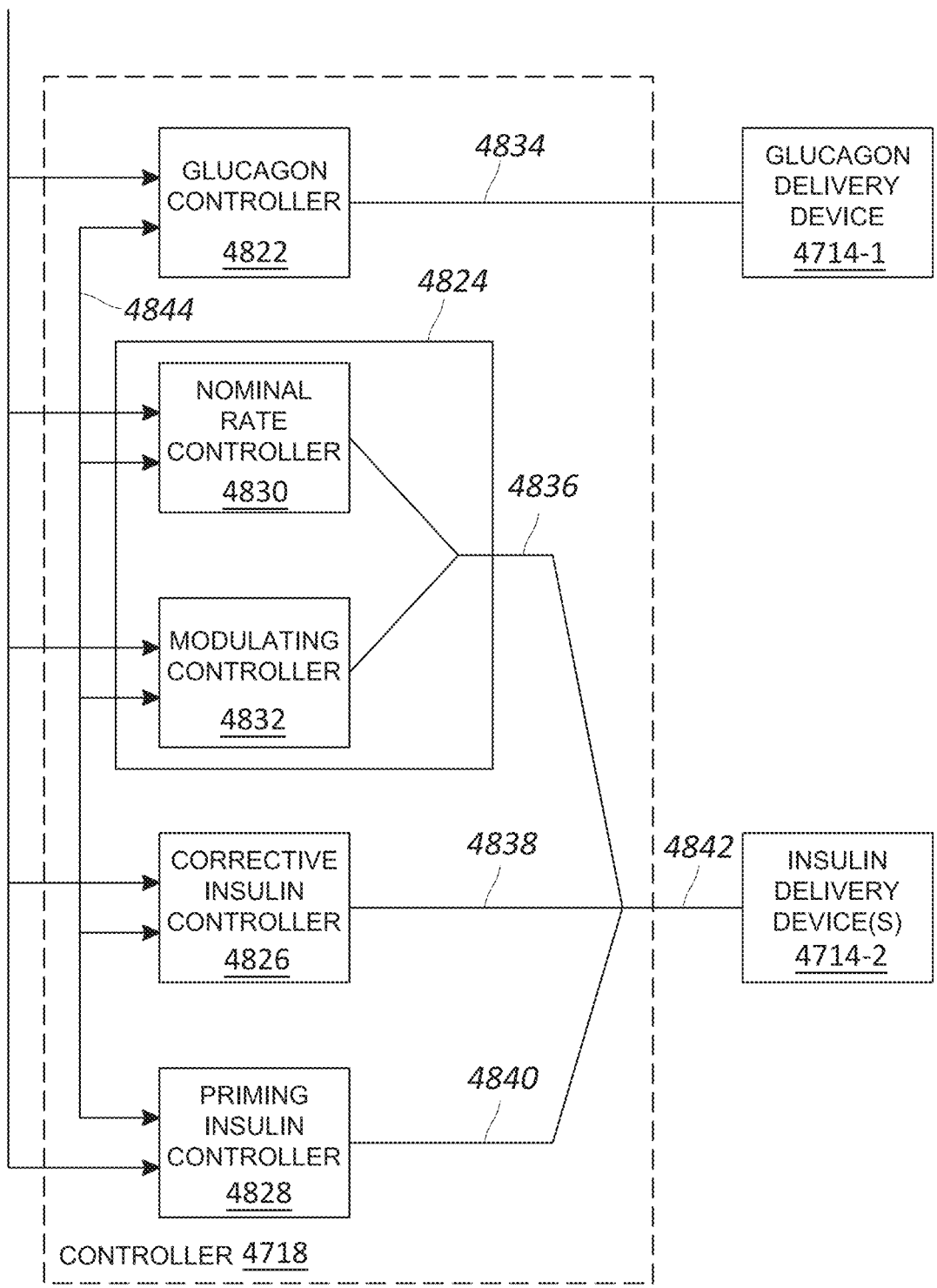
FIG. 48 illustrates a block diagram of a controller system in accordance with certain embodiments.

FIG. 48 shows an example structure of the controller 4718 in accordance with certain embodiments. The controller 4718 illustrated in FIG. 48 may represent a physical structure with different controllers or processors, or a logical structure that is implemented by one or more physical processors. In other words, a single processor may be used to implement each of the controllers illustrated in FIG. 48, each controller may be implemented by its own processor, or certain processors may implement multiple, but not necessarily all, of the controllers illustrated in FIG. 48 as part of the controller 4718. Moreover, although the controllers of FIG. 48 are illustrated as part of the controller 4718, in some implementations, one or more of the controllers may be separate from the controller 4718.

The controller 4718 may include four separate controllers, namely a glucagon (or counter-regulatory agent) controller 4822, a basal insulin controller 4824, a corrective insulin controller 4826, and a priming insulin controller 4828. The basal insulin controller 4824 includes a nominal rate controller 4830 and a modulating controller 4832. As shown, the glucagon controller 4822 generates a glucagon dose control signal 4834 provided to a glucagon delivery device 4714-1. Respective outputs 4836-4840 from the controllers 4824-4828 may be combined to form an overall insulin dose control signal 4842 provided to insulin delivery device(s) 4714-2. As shown, the output signal 4836 from the basal insulin controller 4824 may be formed by a combination of respective outputs of the nominal rate controller 4830 and a modulating controller 4832. The insulin delivery device(s) 4714-2 may include devices tailored to deliver different types and/or quantities of insulin, and the exact configuration may be known to and/or under the control of the controllers 4824-4828. For ease of description, the collection of one or more insulin delivery devices 4714-2 is referred below to in the singular as an insulin delivery device 4714-2.

Also shown in FIG. 48 are input/output signals of the various controllers, including the glucose level signal 4719, parameters 4720 and user control inputs 4723 as well as a set of inter-controller signals 4844. The inter-controller signals 4844 enable communication of information from one controller, where the information is developed or generated, to another controller where the information may be used for that controller's control function.

The controllers 4822-4828 may be operated in either the online/automatic mode or in the offline mode. In the automated mode, the corrective controller 4826 regulates glucose level using a control scheme such as described in U.S. Pat. No. 7,806,854, the contents of which are hereby incorporated by reference in its entirety herein. The basal controller 4824 and priming insulin controller 4828 may perform adaptive automated control as described in International Patent Application Publication WO 2012/058694 A2, the contents of which are hereby incorporated by reference in its entirety herein. The controllers 4822-4828 generally employ control methods or algorithms that include control parameters that are mathematically combined with reported glucose values to generate an output value that is converted (either directly or via additional conditioning) into the dose control signals 4834, 4842. For example, the control scheme described in U.S. Pat. No. 7,806,854 includes a generalized predictive control (GPC) method that incorporates a variety of control parameters. The control algorithms are generally adaptive, meaning that control parameters are dynamically adjusted during operation to reflect changing operating circumstances and a "learning" aspect—by monitoring its own operation, the algorithm adjusts its operation to be more specifically tailored to the individual user, enhancing the algorithm's effectiveness and reducing or avoiding a need for additional explicit input information about the user. It should be noted that the input parameters 4720 may form part of the control parameters used by the control algorithm. Other control parameters are internal parameters according to the specifics of the algorithm, and selected ones of those internal control parameters are dynamically adjusted to realize the adaptation of the control algorithm.

One feature of operation is the ability of the controllers to learn from recent past periods of online operation and to use that learning during offline operation. U.S. Pat. No. 10,543, 313, the contents of which are hereby incorporated by reference in its entirety herein, describes two methods that are usable independently or together in offline operation. A first method automatically calculates the correct size of a correction bolus of insulin at a time of receiving an isolated glucose measurement, the correction bolus then being administered by the system in response to a user control input. A second method automatically calculates the correct size of a meal bolus of insulin and administers it in response to a user control input. Both methods utilize information obtained during past periods of online operation to automatically calculate correct values, freeing the user of a need to make the calculation or provide a correction factor.

Carbohydrate Therapy Equivalence Tracking

Hyperglycemia is a condition that occurs when the levels of sugar or glucose in the blood exceeds a particular level (e.g., 180 mg/dL). This condition may occur in diabetics. To help reduce the occurrence of hyperglycemia, a subject may use an automated glucose level control system, which may automatically provide insulin to a subject using a medicament pump. The administered insulin may help control the glucose level of the subject by consuming glucose in the subject. In some examples, glucose level may comprise a physiological glucose level of the subject that can be a concentration of glucose in subject's blood or an interstitial fluid in part of the subject's body (e.g., expressed in milligram per deciliter (mg/dl)).

Hypoglycemia is a condition that occurs when the levels of sugar or glucose in the blood are below a particular level (e.g., 70 mg/dL). This condition may have adverse consequences including loss of consciousness, seizures, and death. The levels of blood glucose that lead to hyperglycemia and hypoglycemia may vary from patient to patient. To reduce the risk of hypoglycemia, a subject may consume carbohydrates to increase blood glucose. Because of the severe consequences associated with a hypoglycemic event, subjects usually consume carbohydrates that metabolize quickly. These carbohydrates are often unhealthy but are preferable to the occurrence of a hypoglycemic event. For example, the carbohydrates may include candy bars with a lot of refined sugar.

A bihormonal glucose-control system may reduce the risk of occurrence of hypoglycemia by including, in addition to insulin, a counter-regulatory agent (e.g., Glucagon) that can be administered to a subject when the glucose level drops too low (e.g., below 50 mg/dL). For subjects who do not have a bihormonal glucose-control system, it may be useful to understand the reduction in carbohydrate therapy, or the consumption of carbohydrates to address hypoglycemic events or potential hypoglycemic events, that can be achieved by switching to a bihormonal glucose-control system. Further, it may be useful for subjects who do have a bihormonal glucose-control system to understand the reduction in carbohydrate therapy obtained by having the bihormonal glucose-control system. For example, understanding the amount of carbohydrate therapy consumed or avoided can be important in monitoring the subject's nutrition intake. While monitoring nutrition in take is important for all people, it is particularly important for diabetics because diabetics must balance eating healthy with ensuring that their blood glucose is maintained in a particular range to avoid both hyperglycemia and hypoglycemia.

The present disclosure relates to a system that can perform a computer-implemented method of generating an indication of total carbohydrate therapy over a time period in a subject using a medicament pump configured to deliver at least insulin therapy to the subject. The system may be an automated glucose level control system (e.g., the glucose level control system 4710) that includes a hardware processor (e.g., controllers 4718) for determining dose control signals to provide the medicament pump (e.g., delivery devices 4714). In some cases, the medicament pump may be configured to deliver both insulin therapy and counter-regulatory agent (e.g., Glucagon) therapy. Alternatively, the system may be separate from the glucose level control system but may receive glucose level information from the glucose level control system. For example, the system may be personal computing system or a cloud computing system that can received glucose level information from the glucose level control system.

The system may receive or determine a glucose level of a subject (e.g., subject 4712). The glucose level of the subject may be determined based on a signal (e.g., a glucose level signal) received from a continuous glucose monitoring (CGM) sensor (e.g., glucose sensor 4716) that corresponds to the glucose level of the subject. In some cases, the glucose level may be determined from an isolated glucose measurement, such as may be obtained using a glucose measurement kit and/or glucose paper.

Using at least the glucose level of the subject, the system can determine whether a triggering event for raising the subject's glucose level has occurred. The triggering event may include a glucose level that indicates an occurrence of a hypoglycemic event or a risk of the occurrence of a hypoglycemic event exceeding a risk threshold within a particular period of time. A risk of a hypoglycemic event may be determined when a glucose level of the subject falls below a glucose threshold. This glucose threshold may vary for different subjects and may, in some cases, be specified by the subject or a caregiver (e.g., healthcare provider, parent, or guardian). Thus, in some cases, different triggering events may be defined based on a risk tolerance of a subject to an occurrence of hypoglycemia or to possible different preferences for an amount of glucose to be present in the subject (e.g., in the subjects blood). Different subjects may prefer that glucose level be maintained, or attempt to be maintained, at different levels due, for example, to differences in activity levels or metabolism by different subjects. Determining the risk of the occurrence of a hypoglycemic event may include receiving an indication of a risk of hypoglycemia from a glucose sensor or a prediction of a glucose level at a future time. For example, a determination of an imminent risk of hypoglycemia may comprise a determination that the subject's glucose level is expected to be below 60 mg/dl within the next 5-15 minutes.

Responsive to the triggering event, the system may determine an amount of counter-regulatory agent to administer, or an amount of counter-regulatory agent that would be administered if the glucose level control system included the capability of administering a counter-regulatory agent. In some cases, the counter-regulatory agent is administered by, for example, the automated glucose level control system. In some cases, the counter-regulatory agent is not administered. For example, the automated glucose level control system may not be capable of delivering the counter-regulatory agent. As another example, the automated glucose level control system may be capable of delivering the counter-regulatory agent but may not have a dose of the counter-regulatory agent available.

The system can use the indication of the counter-regulatory agent that is administered or that would be administered to determine a corresponding amount of carbohydrates. The corresponding amount of carbohydrates may be indicative of the amount of carbohydrates that were consumed to prevent the hypoglycemic event, to reduce the risk of the hypoglycemic event, or in response to an occurrence of a hypoglycemic event. Alternatively, or in addition, the corresponding amount of carbohydrates may be indicative of the amount of carbohydrates that would have been consumed if the counter-regulatory agent were not available.

The corresponding amount of carbohydrates may be obtained from a mapping between amounts of a counter-regulatory agent and amounts of carbohydrates. In some cases, the mapping may be based on a measured equivalency between carbohydrates and a counter-regulatory agent. Alternatively, or in addition, the mapping may be between a determined amount of counter-regulatory agent and an amount of carbohydrate a subject indicates he or she normally consumes when determining that a hypoglycemic event may occur.

The mapping may be implemented by a lookup table that maps different amounts of counter-regulatory agent to different corresponding amounts of carbohydrates. In some cases, a single quantity of counter-regulatory agent may map to different amounts of carbohydrates depending on the type of carbohydrate consumed (e.g., simple vs complex carbohydrates, or the type of candy bar consumed, etc.). Alternatively, the mapping may be based on a formula that converts an amount of counter-regulatory agent to an amount of carbohydrates based on a correspondence between the amount of counter-regulatory agent and the amount of carbohydrates. The determination of a relationship between the counter-regulatory agent and carbohydrates may be based on clinical tests comparing carbohydrates to the counter-regulatory agent (e.g., Glucagon, dextrose, etc.). Further, the mapping may be based at least in part on a subject's preferred carbohydrate source and/or characteristics of the subject (e.g., weight).

In some cases, the system can track a number of hypoglycemic events or a number of occurrences of a trigger indicating an impending risk of a hypoglycemic event within a particular time period. The time period may be days, weeks, months, years, or any other period of time over which it is desirable to determine a relationship between carbohydrates consumed or avoided based on the lack of availability or availability of a counter-regulatory agent. In some cases, the tracking of carbohydrate therapy may be based on a number of hypoglycemia events or hypoglycemia risk events instead of or in addition to a time period.

For each occurrence of a hypoglycemic event or occurrence of a trigger indicating an impending risk of a hypoglycemic event, the system can determine an estimate of the carbohydrate therapy saved or that would have been saved by having access to the counter-therapy agent. The system can generate a report for the time period that indicates the total carbohydrate saved or that would have been saved with access to counter-regulatory agent. The report may include an aggregate or sum of the carbohydrate therapy required or saved during the time period. This time period may be days, weeks, months, years, or since a particular time (e.g., since the subject starting using the system). Further, the report may indicate the type of carbohydrates typically consumed by the subject when responding to a hypoglycemic event or a risk of an impending hypoglycemic event. This report can be presented to the subject, a healthcare provider, and/or a parent or guardian of the subject. The healthcare provider can use this report to help care for the subject. For example, the healthcare provider can use the report to generate a nutrition plan for the subject that accounts for the carbohydrates consumed to maintain the glucose level within a desired or setpoint range.

The report may include a range of carbohydrate therapy avoided or likely consumed to address the risk of hypoglycemia events. Further, the report may include an amount of calories saved or not consumed, an amount of sugar avoided, an amount of food not consumed, a likely weight gain avoided, etc. based on the use of a counter-regulatory agent in place of carbohydrate therapy.

Carbohydrate Therapy Equivalence Tracking Process

Figure 49:
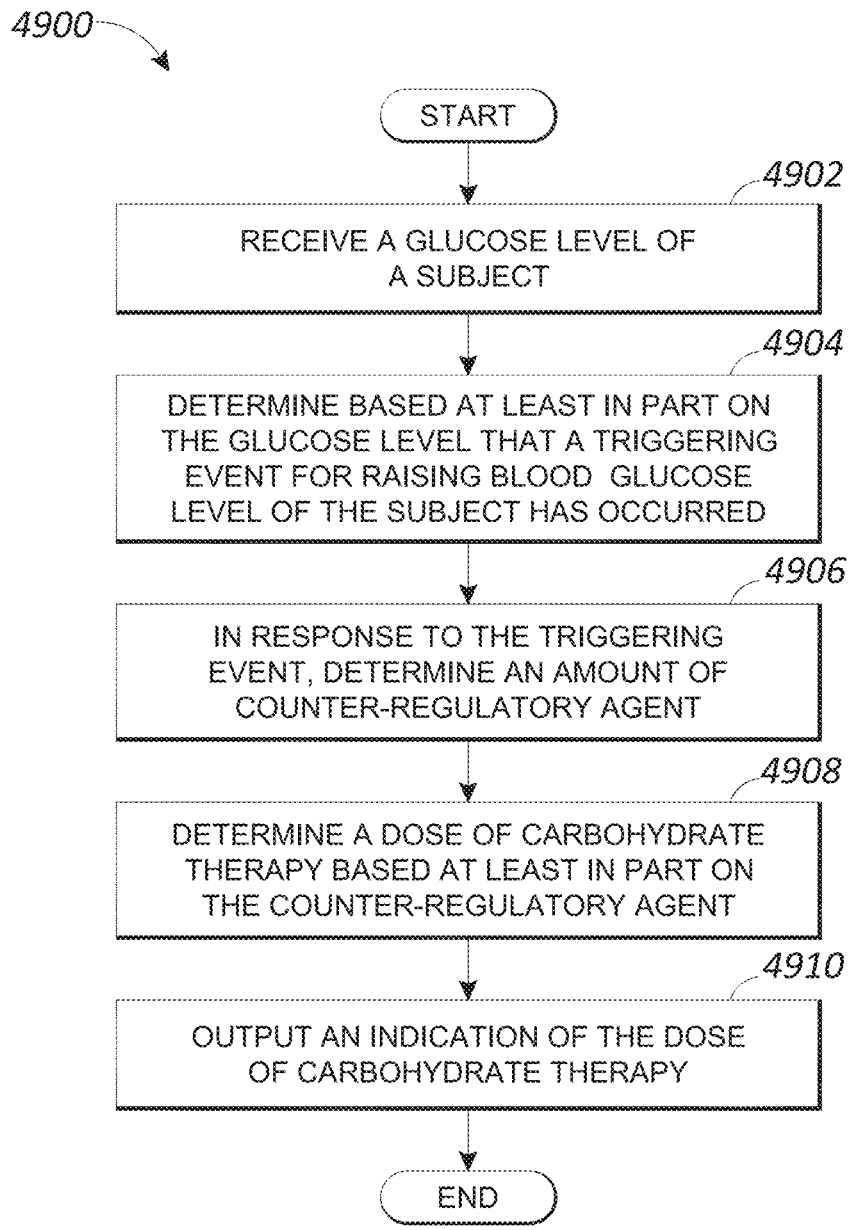
FIG. 49 presents a flowchart of an example carbohydrate therapy equivalence tracking process in accordance with certain embodiments.

FIG. 49 presents a flowchart of an example carbohydrate therapy equivalence tracking process 4900 in accordance with certain embodiments. The process 4900 may be performed by any system that can track the glucose level of a subject over time and identify hypoglycemic events, or occurrences when a risk of a hypoglycemic event satisfies a threshold (e.g., when the risk of the hypoglycemic event matches or is above a particular probability). For example, the process 4900 may be performed by one or more elements of the glucose level control system 4710. In some cases, at least certain operations of the process 4900 may be performed by a separate computing system that receives indications of glucose levels of the subject 4712 from the glucose level control system 4710 and/or indications of hypoglycemic events (or identified above threshold hypoglycemic risk events). Although one or more different systems may perform one or more operations of the process 4900, to simplify discussions and not to limit the present disclosure, the process 4900 is described with respect to particular systems.

The process 4900 begins at block 4902 where the glucose level control system 4710 receives a glucose level of a subject 4712. Receiving the glucose level may include receiving a glucose level signal corresponding to a glucose level of the subject. The glucose level signal may be received from the glucose sensor 4716 (e.g., a CGM sensor). Alternatively, or in addition, the glucose level may be received from a user that provides the glucose level to the glucose level control system 4710 via a user interface, such as a user interface generated by the processor 4730 that may be output on a touchscreen by the touchscreen controller 4738. The glucose level received from the user may be a glucose level measured using an alternative sensor or measurement mechanism (e.g., diabetes measurement strips) that may be used in place of the glucose sensor 4716.

At block 4904, the glucose level control system 4710 determines based at least in part on the glucose level that a triggering event for raising the glucose level of the subject 4712 has occurred. The triggering event may include a determination that a hypoglycemic event or an episode of hypoglycemia is present or is occurring in the subject 4712. Alternatively, or in addition, the triggering event may include a determination that there is an impending risk of hypoglycemia in the subject 4712, or an impending risk that a hypoglycemic event will occur within a particular amount of time in the subject 4712. The determination of the hypoglycemic event or the risk of a hypoglycemic event occurring may be determined by comparing the glucose level of the subject to a glucose threshold. Alternatively, or in addition, the determination of the hypoglycemic event or the risk of a hypoglycemic event occurring may be determined by comparing a trend and/or rate of change (e.g., rate of decrease) in the glucose level to a threshold. In some cases, the particular glucose level and the trend in the glucose level may be combined to determine a risk of hypoglycemia. For example, if the glucose level is low (e.g., below a particular threshold, such as 60 mg/dL), but a determined trend in the glucose level is upwards, then a risk of hypoglycemia may be lower than if the glucose level is above the threshold, but the determined trend in the glucose level is downwards towards a threshold. In some cases, the threshold(s) used to determine whether a hypoglycemic event is occurring or to determine that there is an above threshold risk of hypoglycemia occurring may vary based on physiological characteristics of the subject 4712. The physiological characteristics may be based on physiological characteristics associated or shared among groups of patients (e.g., gender, age, weight) or may be specific to the particular subject 4712. For example, thresholds associated with a risk of hypoglycemia may be determined based on determined glucose levels of the subject 4712 during prior occurrences of hypoglycemia as determined by the glucose level control system 4710 or based on clinical data specific to the subject 4712.

In response to the triggering event at the block 4904, the glucose level control system 4710 determines an amount of counter-regulatory agent at block 4906. The glucose level control system 4710 may determine the amount of counter-regulatory agent based at least in part on the glucose level of the subject 4712, the amount or percentage of risk of hypoglycemia occurring (e.g., a 99% risk or probability of hypoglycemia may trigger a larger counter-regulatory agent dose than a 75% risk or probability of hypoglycemia), physiological characteristics of the subject 4712, a trend in the glucose level of the subject 4712, or a type of counter-regulatory agent.

In some cases, the glucose level control system 4710 may use a delivery device 4714-1 to deliver the determined amount of counter-regulatory agent to the subject 4712. The counter-regulatory agent may be delivered to the subject 4712 in response to the impending risk of hypoglycemia or the episode of hypoglycemia, and/or in response to the glucose level satisfying or falling below a threshold glucose level. The threshold glucose level or the determination of whether to deliver the counter-regulatory agent may be based on physiological characteristics of the subject 4712 and/or the risk tolerance of the subject 4712 to a hypoglycemic event. It should be understood that, in the present context, risk tolerance generally does not refer to a user's subjective propensity for risk. Instead, the risk tolerance is typically an objective determination of how likely the subject 4712 is to have a hypoglycemic event, or for symptoms of hypoglycemia to occur, when the glucose level of the subject 4712 is at a particular level. This risk tolerance may be determined based on a history of hypoglycemia, or lack thereof, in the subject 4712 at particular glucose levels and/or based on clinical data obtained for the subject 4712.

In some cases, the glucose level control system 4710 may not deliver counter-regulatory agent to the subject 4712 because, for example, the glucose control system 4710 may not be capable of delivering counter-regulatory agent or because the cartridge holding the counter-regulatory agent may be empty or have less than a threshold amount of counter-regulatory agent remaining.

At block 4708, the glucose level control system 4710 determines a dose of carbohydrate therapy based at least in part on the counter-regulatory agent. The carbohydrate therapy may refer to carbohydrates consumed to prevent or respond to an occurrence of hypoglycemia. The carbohydrates may include any type of carbohydrate that the subject 4712 may consume to prevent or respond to an occurrence of hypoglycemia, and typically includes fast-acting carbohydrates, which may include sugary foods that are easily converted into sugars in the human body. For example, the carbohydrate may be a candy bar, soda, fruit juice, or other foods that may have a lot of sugar or refined sugars.

Determining the dose of carbohydrate therapy may include accessing a mapping between the counter-regulatory agent and carbohydrates. This mapping may be stored in, and accessed from, the memory 4740 and/or may be accessed from another computing device. The glucose level control system 4710 may determine the dose of carbohydrate therapy based at least in part on the mapping and the amount of the counter-regulatory agent. In some cases, the mapping may vary based on the type of counter-regulatory agent and/or the type of carbohydrates. The type of counter-regulatory agent may be identified by a user or may automatically be determined based on a medicament cartridge installed or inserted into the glucose level control system 4710. Further, the type of carbohydrates may be specified by a user and may include an identity of the type of carbohydrates usually consumed by the subject 4712 when responding to an occurrence or a risk of an occurrence of hypoglycemia. For example, the user may specify, via a user interface, whether the subject usually consumes a candy bar or fruit juice, or the size of the carbohydrate usually consumed when responding to an occurrence or a risk of an occurrence of hypoglycemia.

In some cases, the mapping between the counter-regulatory agent and carbohydrates may be generated based on a clinical comparison of the counter-regulatory agent to the carbohydrates. Alternatively, or in addition, the mapping may be based at least in part on a physiological characteristic of the subject 4712.

The mapping may be stored in a lookup table or other data structure that can store relationships between different carbohydrates and counter-regulatory agents. The mapping may be between different quantities and/or types of carbohydrates and different quantities and/or types of counter-regulatory agent. Alternatively, or in addition, the mapping may be a formula that relates the carbohydrates to the counter-regulatory agent or vice versa. For example, the glucose level control system 4710 may use the determined amount of counter-regulatory agent as an index to a lookup table to determine a corresponding quantity of carbohydrates. Alternatively, the glucose control system 4710 may apply the determined amount of counter-regulatory agent to a formula to calculate a corresponding quantity of carbohydrates. This formula may be generated based on the type of counter-regulatory agent and/or carbohydrates, physiological characteristics of the user, and/or clinical data.

In some cases, the mapping may vary based on the glucose level control system 4710. For example, the glucose level control system 4710 may include a first mapping when the glucose level control system 4710 (or medicament pump thereof) is a bi-hormonal pump configured to deliver insulin and counter-regulatory agent therapy to the subject, and may include a second mapping when the glucose level control system 4710 is not configured to deliver the counter-regulatory agent therapy to the subject 4712. In some cases, the glucose level control system 4710 may store both mappings in the memory 4740. For example, the glucose level control system 4710 may use the first mapping when counter-regulatory agent is available and may use the second mapping when counter-regulatory agent is not available. The mappings may vary for a number of reasons including because a bi-hormonal glucose level control system 4710 may more precisely control the occurrence of hypoglycemic events due to the availability of counter-regulatory agent, which may therefore alter the frequency and type of carbohydrates that a subject may consume.

At block 4910, the glucose level control system 4710 outputs an indication of the dose of carbohydrate therapy. Outputting the indication of the dose of carbohydrate therapy may include outputting an indication of the dose of carbohydrate therapy on a display for presentation to a user. Further, the indication of the dose of carbohydrate therapy may be transmitted to another computing system for display or aggregation with other therapy data associated with the subject 4712, such as therapy data used by a clinician to help manager the subject's 4712 care. In some cases, the indication of the dose of carbohydrate therapy may be included in a report corresponding to care of the subject 4712.

In certain embodiments, the operations of the process 4900 are performed or repeated over a period of time. For example, the operations associated with the block 4902-4908 may be repeated one or more times over the period of time. In such cases, the determined doses of carbohydrate therapy may be aggregated for the period of time to determine a total carbohydrate therapy for the period of time. Further, the block 4910 may include outputting an indication of the dose of carbohydrate therapy for each individual time that a dose of carbohydrate therapy is determined and/or the aggregated determined doses of carbohydrate therapy for the period of time. The period of time may be any time period. For example, the period of time may be a day, week, month, year, since the subject 4712 began using the glucose level control system 4710, since a user obtained or ceased obtaining access to a counter-regulatory agent, or any other period of time. In some cases, the period of time is defined by the occurrences of hypoglycemic events or occurrences of the risk of hypoglycemia satisfying a threshold. For example, the period of time may be the time associated with 5, 10, 15, 100, or any other number of hypoglycemic events or occurrences of the risk of hypoglycemia satisfying a threshold.

The indication of total carbohydrate therapy may correspond to a reduction in carbohydrates consumed by the subject 4712 because, for example, of the availability of counter-regulatory agent to the glucose level control system 4710, and consequently, the subject 4712. Thus, the indication of total carbohydrate therapy may correspond to a reduction in carbohydrates achievable by an availability to the subject 4712 of the counter-regulatory agent. Further, the indication of total carbohydrate therapy may correspond to an amount of counter-regulatory agent provided or that can be provided to the subject as a substitute for carbohydrates.

The particular carbohydrates consumed, or the amount of carbohydrates consumed by each subject or during each hypoglycemic event, may vary. For example, a subject 4712 may consume a particular candy bar when the subject's 4712 measured glucose level is too low or when the subject feels that the blood glucose level is likely low (e.g., begins to feel some hypoglycemic effects). The subject may consume the whole candy bar or may consume a portion. Some of the candy bar may be lost to the subject (e.g., fall on the ground). In some cases, the subject may have different candy bars available, or other refined sugar sources, during different hypoglycemic events. Thus, even though there may be an objective mapping between carbohydrates and counter-regulatory agent, the amount of carbohydrates consumed or avoided due to the availability of counter-regulatory agent may vary for each hypoglycemic event. Accordingly, the indication of total carbohydrate therapy avoided, or that could be avoided if counter-regulatory agent were available, may indicate a range of carbohydrates that may potentially be replaced by the availability of counter-regulatory agent.

In some cases, the indication of carbohydrate therapy or total carbohydrate therapy may include one or more of an indication of calories, an indication of carbohydrates, an indication of a measure of sugar, an indication of a quantity of food, or an indication of weight of the subject attributable to the carbohydrate therapy. The indications may be associated with what is consumed due to a lack of counter-regulatory agent, or what is avoided based on the availability of counter-regulatory agent. For example, the indication of calories may be the number of calories not consumed because of the presence of the counter-regulatory agent. Advantageously, the availability of therapy information relating to the carbohydrate therapy or avoided carbohydrate therapy can assist in patient care. For example, a subject can reduce refined sugar consumption that can have a number of health consequences. Further, a healthcare provider can better help a subject control his or her weight based on the carbohydrate information.

The indication of carbohydrate therapy may be presented to a user in any presentable form. For example, the indication of carbohydrate therapy may be presented as a table, a chart, a graph, a histogram, or other data presentation tool for indicating the reduction in carbohydrates over time that is achieved by the presence of counter-regulatory agent or that could be achieved by the use of counter-regulatory agent for the particular subject 4712. It should be understood that the indication of carbohydrate therapy data may vary for different users due to differences in physiological characteristics of the users, differences in the diabetes of each user, differences in lifestyle of each user, among other factors. Advantageously, by using the glucose level control system 4710 to track the carbohydrate therapy of the subject 4712 or to determine the carbohydrate therapy avoided or avoidable associated with counter-regulatory agent, management of the subject's 4712 glucose level can be personalized.

Additional Carbohydrate Therapy Equivalence Tracking Embodiments

People with diabetes often consume oral carbohydrates for the purpose of treating or preventing hypoglycemia. Such extra carbohydrates can have unhealthy consequences, contributing to weight gain being one of them. Having a bihormonal glucose-control system that infuses a counter-regulatory agent (e.g., Glucagon) to reduce the frequency, extent, and duration of hypoglycemia can significantly reduce the amount of oral carbohydrates that are needed "medicinally" to treat or prevent hypoglycemia Certain embodiments of the present disclosure relate to a method for translating an amount of online counter-regulatory dosing (e.g. glucagon) computed by an autonomous glucose-control system to an amount of carbohydrates that the user is estimated to have been spared from needing by virtue of the counter-regulatory dosing, or that the user would be spaced from needing if the user had access to the counter-regulatory agent. In a bihormonal autonomous glucose-control system that infuses both insulin and a counter-regulatory agent/hormone, the method may include a mapping between the online counter-regulatory dosing, which was delivered to treat or prevent low glucose levels, and oral carbohydrates that are estimated to have otherwise been required to achieve a comparable safe control situation (had the counter-regulatory dosing not been delivered). In an insulin-only autonomous glucose-control system, where doses of a counter-regulatory agent/hormone are not delivered, but are still computed online, the method may include a mapping between the computed online counter-regulatory dosing and an estimated amount of oral carbohydrates that the subject will likely have been spared from needing to consume to treat or prevent low glucose levels had the counter-regulatory agent been available and its doses actually delivered.

Without loss of generality, embodiments disclosed herein include an autonomous glucose-control system where the counter-regulatory agent is glucagon. However, other medicaments and/or counter-regulatory agents may be utilized. The method may include relating computed online glucagon dosing with consumed oral carbohydrates for the treatment or prevention of low glucose levels ("treatment carbs") as observed in real use (e.g., during clinical studies) in the insulin-only configuration, and relating the relationship between the counter-regulatory agent and carbohydrates to a similar relationship between delivered online glucagon doses (or other counter-regulatory agent) and similarly consumed oral carbohydrates in the bihormonal (insulin-glucagon) configuration.

Using data gathered from real use (e.g., clinical studies), a relationship between the consumed treatment carbs in an insulin-only configuration, $C_{io}$, and the online computed (but not delivered) glucagon dosing, Gc, can be described by the relationship $C_{io}=R_{io}(x)*Gc$, where $R_{io}(x)$ may be a relating factor that can be a function of several dependencies that are included in vector x. Such dependencies can include the specific insulin and/or glucagon being used (e.g., their clinical properties), and/or the pharmacokinetic settings assumed by the control system in relation to insulin and/or glucagon. The dependencies can also include the user's body mass and the glucose target used by the glucose-control system. In some embodiments, Rio(x) may be a constant, or Rio(x)=Rio, for a system exhibiting limited variation in the relationship between $C_{io}$ and $G_c$ (e.g., due to limited effect, or limited or no variation in the associated dependencies).

Similar to the insulin-only configuration, from real-use data, a relationship between the consumed treatment carbs in a bihormonal (insulin-glucagon) configuration, $C_{bh}$, and the online delivered glucagon dosing, $G_d$, can be described by the relationship $C_{bh}=R_{bh}(x)*G_d$, where $R_{bh}(x)$ may be described in a similar fashion to $R_{io}(x)$ above. In some cases, the quantities $C_{io}$, $G_c$, $C_{bh}$, and $G_d$ can refer to daily amounts, as averaged over some period of use (e.g., a week). In some cases, the quantities $C_{io}$, $G_c$, $C_{bh}$, and $G_d$ can refer to average daily amounts per body mass of the user, in which case dependency on body mass can be eliminated from x.

In cases where $G_c$ is computed, but no glucagon is actually delivered in an insulin-only system, $G_c$ has no effect on glucose insofar as treating or preventing low glucose levels, which in turn is generally expected to invoke further computed glucagon dosing (e.g., goes towards increasing the magnitude of $G_d$ for a given situation). By contrast, since $G_d$ is delivered in a bihormonal system, it is expected to have an effect in preventing or reducing the frequency, extent, or duration of low glucose levels, which in turn is expected to limit the overall magnitude of glucagon dosing (e.g., limits $G_d$ for a given situation). As such, for a given set of dependencies, it is generally expected that $G_c>G_d$ between the two system configurations. Likewise, since $G_c$ has no effect in combating low glucose levels while $G_d$ does have such an effect, it is expected that treatment carbohydrates $C_{io}>C_{bh}$, when comparing the two system configurations.

If one can ideally relate, for a given real-use case of an insulin-only system with Gc, what the corresponding $C_{io}$ would have been for the same real-use scenario, had the computed online glucagon dosing actually been delivered as $G_d$, one can project an estimate that the user would have required "$C_{io}-C_{bh}$" less treatment carbs (e.g., would have saved that much), had they instead been using a bihormonal system (with the same insulin controller), where glucagon would have been delivered. Conversely, if one can ideally relate, for a given real-use case of a bihormonal system with $G_d$, what the corresponding $C_{bh}$ would have been for the same real-use scenario, had the delivered online glucagon dosing not been delivered but only computed as $G_c$, one can project an estimate that the user had actually avoided the need to take "$C_{io}-C_{bh}$" additional treatment carbs, had they been instead using an insulin-only system (with the same insulin controller), where glucagon would not have been delivered. It should be understood that the above calculations are an estimate in an ideal situation as, in practice, it is not possible to have a re-run of a past real-use scenario to obtain such ideal relationships.

For practical implementation, real-use cases where the insulin-only system is used can be re-simulated while assuming a bihormonal system is available, where glucagon is assumed to be delivered. Since the control system may take delivered doses into account when issuing subsequent nearby glucagon doses, the simulated glucagon dosing may exhibit a reduction relative to the original $G_c$ of the insulin-only system. With the glucose profile kept unaltered in a simulation, the simulation may lack reflecting any resulting glucose excursions in response to the assumed delivered glucagon dosing. The simulation in turn may lack reflecting the full reduction in glucagon dosing down to $G_d$ that may have been observed if the glucose excursions had in fact benefited from glucagon being delivered. Thus, the reduced glucagon dosing that is observed in the simulation, pseudo delivered glucagon $\hat{G}_d$, may arguably be exaggerated in magnitude relative to what would have been the "real $G_d$". As described above, based on prior analyses $G_c$ can be mapped to a corresponding amount $C_{io}$ in the insulin-only configuration, and $\hat{G}_d$ can be mapped to a corresponding amount $\hat{C}_{bh}$ in the bihormonal configuration. The simulation results, therefore, can map the reduction "$G_c-\hat{G}_d$" to an estimate "$C_{io}-\hat{C}_{bh}$" of treatment carbs that the user would spare had they been using the bihormonal system. The estimates may be conservative estimates. Repeating the simulation analyses across a variety of real-use cases that span the range of $G_c$ observed in practice provides a global mapping between them and the associated range of (in some cases, conservative) estimates "$C_{io}-\hat{C}_{bh}$" of treatment carbs that the user would likely not need to consume had they been using the bihormonal system. Conversely, the mapping can be utilized when a bihormonal system is being used, where the observed dosing $G_d$ is mapped back to a pseudo computed glucagon $\hat{G}_c$ and the resulting associated difference "$\hat{C}_{io}-C_{bh}$" provides a (in some cases, conservative) estimate of the treatment carbs that the user had likely saved by virtue of being on the bihormonal system.

Certain embodiments includes a system that comprises a controller for automatic control of a glucose level of a subject. The controller may be operative to generate an insulin dose control signal based on time-varying glucose levels of the subject as represented by a glucose level signal over time. The glucose level signal can be generated by a glucose sensor operative to continually sense a glucose level of the subject. The insulin dose control signal may control the delivery of doses of insulin by a delivery device. Further, the controller can operate at a regular frequency to generate an insulin dose control signal to regulate the glucose levels in the subject. During online operation, the controller can employ a control algorithm that generates a glucagon dosing signal, which may be mapped to an associated amount of oral carbohydrates.

The oral carbohydrates may be associated with the prevention or treatment of low glucose levels. Further, the mapping between the glucagon dosing signal and the oral carbohydrates may be derived from analysis of clinical data. The glucagon dosing signal may be computed, but not delivered in an insulin-only system configuration. In contrast, the glucagon dosing signal can be computed, and glucagon can be delivered in an insulin-glucagon system configuration. The computed glucagon dosing in an insulin-only system configuration can be mapped to an amount of oral carbohydrates that is estimated to have been saved had glucagon dosing been delivered if an insulin-glucagon system configuration had instead been used. The delivered glucagon dosing in an insulin-glucagon system configuration can be mapped to an amount of oral carbohydrates that is estimated to have been saved if an insulin-only system configuration had instead been used. The mapping may be dependent on the clinical properties of the insulin and glucagon being used, and settings in the control system related to the action and effect of insulin and glucagon. Further, the mapping may be dependent on the subject's body mass.

Backup Therapy Protocol Generation

An ambulatory medicament device, such as a glucose level control system (e.g., an insulin pump or a combined insulin and counter-regulatory agent (e.g., Glucagon) pump), can provide personalized therapy to a subject. In other words, the ambulatory medicament device may provide medicament that is specific to a subject's physiology, condition, activity, and the like. Further, some ambulatory medicament device's monitor a condition of the subject to determine when to provide therapy, what type of therapy to provide (e.g., insulin or counter-regulatory agent therapy), and/or how much therapy to provide. The therapy provided by the ambulatory medicament device may be ongoing and, in some cases, lifesaving. Thus, it is important that ambulatory medicament device function uninterrupted.

Despite best efforts, sometimes therapy by the ambulatory medicament device is interrupted. For example, the ambulatory medicament device may break, a subject may run out of or not have access to a necessary disposable (e.g., a replacement insulin cartridge, a site kit for changing the site of the ambulatory medicament device, a replacement battery, and the like), or the subject may forget to charge a battery of the ambulatory medicament device or not be in a location where a power source is available to charge the ambulatory medicament device. Thus, there are occasions when the ambulatory medicament device may not be available or may need replacing.

When the ambulatory medicament device is not available, or when a replacement (temporary or permanent) ambulatory medicament device is being used, it may be desirable to have an indication of the therapy settings from the ambulatory medicament device. For example, if a user (e.g., a subject, healthcare provider, parent, or guardian) is providing alternative therapy (e.g., injection therapy) while the ambulatory medicament device, it may be necessary to know the quantity of therapy to provide under particular circumstances or at particular times.

In some cases, a healthcare provider may have access to therapy information that may have been previously determined, for example, via clinical testing. This therapy information may include any type of information that can be used to determine therapy to provide to a subject at a particular time or under particular conditions. For example, the therapy information may indicate a setpoint insulin range for the subject, a quantity of insulin to provide to the user to adjust glucose levels, an amount of time for insulin to reach max concentration in the subject, or any other information that might impact the timing or amount of dosing of a medicament.

The therapy information available to the healthcare provider may be insufficient. For example, the subject may not be able to reach the healthcare provider to obtain the therapy information at a point in time when the information is needed. Further, in some cases the information may be outdated because, for example, the ambulatory medicament device may have refined the therapy over time. If the refinements have occurred recently, it is possible that the outdated values of the healthcare provider may be sufficient until a replacement ambulatory medicament device can repeat the refinement process of the original ambulatory medicament device. In some cases, the outdated therapy information may be insufficient because, for example, the refinements were significant or the subject may have had physiological changes (e.g., weight gain or weight loss, or metabolism changes) since the last time a clinical test was performed. Using outdated therapy information may be less effective and may cause discomfort or harm to a subject.

Certain embodiments of a system disclosed herein can generate backup therapy data. Using the backup therapy data, a subject (or user) can perform injection therapy or configure a replacement ambulatory medicament device if the subject's current device malfunctions. By using the backup therapy data, the subject can maintain a level of therapy care that matches or more closely matches what was being provided by the ambulatory medicament device than clinical data, which may be outdated if available at all.

The system can include an automated glucose level control system (e.g., the glucose level control system 4710) configured to generate a backup therapy protocol comprising insulin therapy instructions derived from autonomously determined doses of insulin. During normal operation, the system may receive glucose level signals from a sensor operatively configured to determine glucose levels in a subject. The sensor can include any type of sensor that can determine glucose levels. For example, the sensor may be a Continuous Glucose Monitoring (CGM) sensor.

Using the determined glucose levels, the system may autonomously determine and/or generate a dose control signal using a control algorithm. The determination and/or generation of the dose control system may be performed without any user action or interaction with the glucose level control signal. In some cases, the lack of user action or interaction with the glucose level control system refers to conscious action and may exclude sensor measurements of physiological characteristics of the subject. The control algorithm may autonomously determine doses of insulin to be infused into the subject for the purpose of controlling glucose level (e.g., blood glucose level) of the subject based at least in part on the glucose level signal. The control algorithm may include any type of control algorithm.

For example, the control algorithm may be a biexponential pharmacokinetic (PK) model that models the accumulation of insulin doses in the blood plasma of the subject. The automated glucose level control system may control delivery or administering of insulin or a counter-regulatory agent based on the bi-exponential PK model and one or more glucose level measurements of the subject. The bi-exponential PK model may model the absorption of subcutaneously administered insulin into blood and/or a rate of diminishing glucose in the blood. The bi-exponential PK model over time may be represented by the following equation:

$$p(t) = KU_0(e^{-\alpha_1 t} - e^{-\alpha_2 t}) \quad (1)$$

where $U_0$ is the subcutaneous dose in units (U), K is a scaling constant, and $\alpha_1$ and $\alpha_2$ are time constants.

As an alternative example, the control algorithm may include a linear algorithm that models diminishing glucose or the accumulation of glucose in the subject based on a linear reduction rate. For example, the control algorithm may determine that a particular dose, D, of insulin is to be administered to the subject. The control algorithm may then estimate that 0.25*D of the insulin is absorbed into the blood plasma per hour over 4 hours. Similarly, the control algorithm may estimate that the insulin diminishes at a rate of 0.33*D per hour over three hours upon the insulin reaching maximum concentration within the blood plasma.

Regardless of the control algorithm used, the automated glucose level control system may administer insulin and, in some cases, a counter-regulatory agent one or more times over a particular time period. There may be multiple reasons and/or triggers that cause the automated glucose level control system to supply insulin. For example, the automated glucose level control system may provide a basal does of insulin on a periodic basis in an attempt to maintain a steady glucose level in the blood plasma of the subject. As another example, the automated glucose level control system may supply mealtime boluses of insulin to account for an expected amount of glucose to be consumed as part of a meal. The mealtime bolus may be an amount specified by a user or may be an amount of insulin administered in response to an indication of meal size by the subject. This indication of meal size may be subjective. In some cases, the size of the bolus of insulin for an identified meal size may be a fixed or constant value. In some cases, the size of the bolus of insulin for an identified meal size may vary over time as the automated glucose level control system learns or refines the amount of insulin to administer to a subject to keep the subject's glucose level (e.g., blood glucose level) within a target setpoint. The automated glucose level control system may learn or refine the optimal insulin to administer based on a comparison of expected glucose level measurements to actual glucose level measurements when the subject (or other user) makes a subjective identification of meal size. In addition to basal and mealtime boluses of insulin, the automated glucose level control system may also supply correction doses of insulin to the subject based on the glucose level signal. The correction doses of insulin may be supplied in response to a model predictive controller (MPC) determining or estimating that a user's level of insulin is expected to fall below a threshold in some future period of time based on glucose level readings. The MPC may execute a control algorithm that can regulate glucose concentration to a reference setpoint while simultaneously minimizing both the control signal aggressiveness and local insulin accumulation. A mathematical formulation describing the subcutaneous accumulation of administered insulin may be derived based on nominal temporal values pertaining to the pharmacokinetics of insulin in the subject. The mathematical formulation may be in terms of the insulin absorption rate, peak insulin absorption time, and/or overall time of action for the insulin (or another medicament). Examples of an MPC controller that may be used with embodiments of the present disclosure are described in U.S. Pat. No. 7,806,854, issued on Oct. 5, 2010, the disclosure of which is hereby incorporated by reference in its entirety herein for all purposes.

The automated glucose level control system may track insulin therapy administered to the subject over a tracking period. Although the tracking period is not limited in length and may generally be any period of time, typically the tracking period is at least a minimum period of time sufficient for the automated glucose level control system to learn or refine the amount of medicament (e.g., insulin) to administer to the subject under particular conditions (e.g., when particular glucose levels are detected or when particular meal sizes are identified). For example, the automated glucose level control system may initially administer 6 units of insulin for lunch and 10 units of insulin for dinner. These initial values may be set be a healthcare provider and/or a subject based, for example, on clinical data for the subject. However, over time (e.g., 3-5 days), the automated glucose level control system may determine that providing 7 units of insulin for lunch and 8 units of insulin for dinner maintains the subject's glucose level closer to the median of the setpoint range than did the initial configuration. Although not limited as such, generally each unit of insulin is $\frac{1}{100}^{th}$ of a milliliter of insulin.

As indicated, the tracking period can be any length of time. For example, the tracking period could be 1 day, 3 days, 5 days, 7 days, anything in between, or more. Typically, the tracking period is at least long enough to provide sufficient time to learn or refine initial settings of the automated glucose level control system for the subject. In some cases, the tracking period may be 1 or 2 days. In some cases, the tracking period may be from a particular time period until a current time period. For example, the tracking period may be from the start of therapy until a current point in time. In some cases, the tracking period may be a moving or shifting window. For example, the tracking period may be the least week, two weeks, month, or year. Further, for non-blood glucose systems, the tracking period may differ based on the amount of time sufficient to determine or refine medicament control values for the subject. In some cases, the tracking period may a window of a particular length. This window may be a moving window. For example, the window may be the previous 7 days. As time passes, the window moves to continue to encompass the previous 7 days.

Tracking the insulin therapy may include storing the autonomously determined doses of insulin delivered to the subject. These autonomously determined doses of insulin may include one or more of basal insulin doses, mealtime insulin boluses, or correction insulin doses. Moreover, tracking the insulin therapy may including tracking the type of insulin used. The type of insulin may include any type of insulin, such as fast-acting insulin (e.g., Lispro, Aspro, or Glulisin), regular or short-acting insulin (e.g., Humulin R, Novolin R, or Velosulin R), intermediate-acting insulin (e.g., Humulin N, Novolin N, ReliOn), long-acting insulin (e.g., detemir (Levemir), and glargine (Basaglar, Lantus)), or Ultra long-acting insulin (e.g., degludec (Tresiba), glargine u-300 (Toujeo)). Further, tracking the insulin therapy may include tracking counter-regulatory agent (e.g., Glucagon) therapy.

In some cases, tracking the insulin therapy may include calculating average therapy provided over a period of time (e.g., over the tracking window). For example, the tracking the insulin therapy may include determining a moving average of the past 7 days of nominal basal doses during each dosing interval. Assuming basal therapy is provided every five minutes, the moving average may be calculated based on the previous 288 doses (e.g., over 1 day) or 2016 doses (e.g., over 7 days). This calculation can be used to obtain a basal rate profile for backup therapy. In some cases, the time period may be broken up into different time segments that may be associated with different rates of therapy. For example, there may be 4 basal therapy periods (e.g., 10 pm-4 am, 4 am-10 am, 10 am-4 pm, and 4 pm-10 pm). Thus, a separate moving average may be calculated for each of the basal therapy periods over a day, or over some other time period (e.g., 7 days). The calculated averages may be used to calculate a backup basal rate that can be used to program an automated glucose control system. Further, the basal rate profile may include aggregating the doses across the day to determine a dose of long-acting insulin that can be used for injection therapy.

Similar to the basal therapy, a moving average of correction doses can be calculated to determine a correction bolus of insulin to supply via a pump or injection therapy. Alternatively, or in addition, the moving average of correction doses in combination with measurements of glucose level of the subject over time may be used to determine a rate of change of glucose level from a unit of insulin provided during correction therapy.

Mealtime boluses may also be calculated using a moving average. Further, a separate moving average may be calculated for each meal (e.g., breakfast, lunch, and dinner) dose over some period of time (e.g., 7 previous days of mealtimes). In some cases, each of the moving averages may be calculated using different windowing functions. For example, the moving average may be calculated using a Hann window or a Hamming window. In some cases, different levels of dosing may be determined for different meal sizes and different doses may be determined for different meals. In some cases, different meals (e.g., breakfast vs lunch) may have different dosing despite similarity in size due, for example, to differences in the subject's glucose levels when they wake up versus when they usually have lunch, or because differences in types of foods consumed at breakfast versus lunch. Further, in some cases, differences in metabolisms of different subjects may result in different mealtime boluses.

The insulin therapy may be stored in a therapy log, or any other type of data structure. Further, the insulin therapy may be stored in a memory of the automated glucose level control system, on a companion device, on a computing device of the subject or user (e.g., a laptop or desktop), in a cloud computing environment, or in any other storage system capable of receiving the insulin therapy information from the automated glucose level control system.

Using the therapy log or tracked insulin data, the automated glucose level control system, or a computing system with access to the therapy log or tracked insulin data, may generate a backup insulin therapy protocol. The backup insulin therapy protocol may include a backup injection therapy protocol or a backup pump therapy protocol. The backup injection therapy protocol may include one or more amounts of insulin (or other medicament) to administer using injection therapy (e.g., manually provided shots) at one or more times to help maintain the subject's condition within a normal or desired physiological range or condition. The backup pump therapy protocol may include data and/or instructions for a replacement medicament pump of the same type or of a different type to supply therapy to the subject. The replacement medicament pump may be a permanent replacement or a temporary replacement.

The backup pump therapy protocol may be the same as and/or include the same type of information as the backup injection therapy protocol. Alternatively, or in addition, the backup pump therapy protocol may include different values than the backup injection therapy protocol. For example, the backup pump therapy protocol may include an indication of basal therapy to provide periodically on relatively short increments (e.g., every 5 minutes, every half hour, every hour, etc.). Because an insulin pump may automatically administer insulin, it is possible to provide a steady or periodic drip of insulin. It may be impractical for a subject using injection therapy to administer insulin manually on similar short increments. Instead, a user might administer therapy on a less regular basis (e.g., once every roughly 4-5 hours or 6-8 hours, prior to mealtimes, after waking, and/or before sleeping, etc.). Accordingly, the backup therapy protocol for a pump and for injection may differ. Further, the type of insulin used or identified in the backup protocol may differ. For example, the backup protocol may call for use of long-acting insulin, such as, for example, insulin glargine, or intermediate-acting insulin, such as, for example human recombinant insulin.

In some cases, the backup pump therapy protocol may be used to manually refine pump settings for a replacement glucose level control system to be used by the subject. In some cases, the replacement glucose level control system may automatically configure itself based on the backup therapy protocol. For example, a user may cause the backup therapy protocol to be provided to the replacement glucose level control system, which may use the information to self-calibrate.

In some implementations, one or both of the backup pump therapy protocol and the backup injection therapy protocol may include a calculation of a carbohydrate ratio. This carbohydrate ratio may be specific to the subject. Alternatively, or in addition, the carbohydrate ratio may be associated with a set of subjects or patients. This set of subjects may share one or more characteristics or demographics with the subject. For example, the set of subjects may be the same age, gender, weight range, ethnicity, live in the same geographical region, etc. In some cases, an initial carbohydrate ratio may be included in the backup pump therapy protocol and/or backup injection therapy protocol that is not specific to the subject. Over time, the carbohydrate ratio may be updated based on specific data obtained for the subject as determined by the automated glucose level control system and/or clinical data. Examples of calculations of carbohydrate ratios may be found in U.S. Publication No. 2019/0019571, which is hereby incorporated by reference in its entirety for all purposes and is made a part of this specification.

Regardless of whether a backup protocol is generated or needed, collecting and analyzing therapy data for therapy provided by the automated glucose level control system can be useful for helping to manage a subject's condition. For example, therapy data may be useful in determining whether the subject is satisfied with therapy provided by the automated glucose level control system or whether the glucose level control system is configured in a way that best matches the subject's lifestyle or therapy preferences (subjective or otherwise). One way to determine whether the glucose level control system is providing desired therapy, or therapy at a desired rate, is to determine the frequency and/or magnitude of modifications made by the subject, or other user that may help manage a subject's therapy, to therapy provided by the automated glucose level control system.

The automated glucose level control system disclosed herein can track user modifications to a control parameter over a tracking period. The tracking period may include any time period described above for tracking therapy to generate a backup protocol. Further, the control parameter may include any type of control parameter that may affect the administering of therapy. For example, the control parameter may relate to a quantity of therapy, a timing of delivered therapy, a rate that therapy is delivered, or a trigger of when or whether to deliver therapy, among other control parameters. Moreover, the control parameters may directly affect the delivery of therapy (e.g., specify a time to deliver the medicament or a quantity of medicament to deliver) or may indirectly affect therapy (e.g., adjust a setpoint range to maintain blood glucose or a rate of insulin accumulation in the subject, which may be used to modify a control algorithm for administering therapy).

The user modifications may include any change to the control parameter or settings of the automated glucose level control system. For example, the automated glucose level control system may track each instance and/or the rate or percentage of times a user reduces or increases a control parameter (e.g., an amount of administered insulin). Further, tracking changes to the control parameter may including tracking how often a user pauses therapy or temporarily adjusted a target glucose level range, or other control parameter. In addition, tracking changes to the control parameter may include tracking when a user makes changes to the control parameter. For example, the user may generally modify the control parameter at night, but leave the daytime parameter unchanged, or vice versa. In some cases, the automated glucose level control system may track a subject's weight over time. The weight may be provided by a user and may affect the glucose level control (e.g., an amount of insulin administered may be related to a subject's weight).

The automated glucose level control system may generate a report that tracks user modifications to the control parameter. The report may comprise a measure of the frequency of increases and decreases from the stored control parameter value. Further, the report may include an indicator of a percentage of times a user modified a control parameter higher or lower than the stored control parameter value of the automated glucose level control system over the tracking period. In some cases, the report indicates the number of times that the infusion of insulin is paused over the tracking period, or the speed (e.g., aggressiveness) that insulin is delivered to the subject.

Using this report, a clinician or other healthcare provider can determine whether modifications should be made to a control parameter to better manage a subject's therapy. For example, if it is determined that a subject is raising a glucose level target level 4-5 times a week during an evening time or nighttime, the clinician may determine that the target setpoint for the evening should be adjusted to reduce the number of occurrences that a user manually adjusts therapy, or control parameter settings for therapy, provided by the automated glucose level control system. In some cases, the subject may be adjusted therapy based on subjective reasons. In some such cases, the therapy report may enable the clinician or healthcare provider to train the subject on controlling his or her disease. In some cases, the clinician may determine that the subject has a different tolerance for blood glucose than initially determined or than an average subject and may adjust one or more control parameters of the automated glucose level control system accordingly.

In some implementations, the automated glucose level control system may automatically adjust one or more control parameters over time based on the report. For example, if the automated glucose level control system determines that over a course of a month the subject adjusted lower a daytime target glucose level range 20 out of 30 days, the automated glucose level control system may modify a control parameter to have a lower setpoint range. In some cases, the automated glucose level control system may communicate the change to a user, such as the subject, a parent or guardian, or a healthcare provider.

Example Backup Therapy Protocol Generation Process

Figure 50:
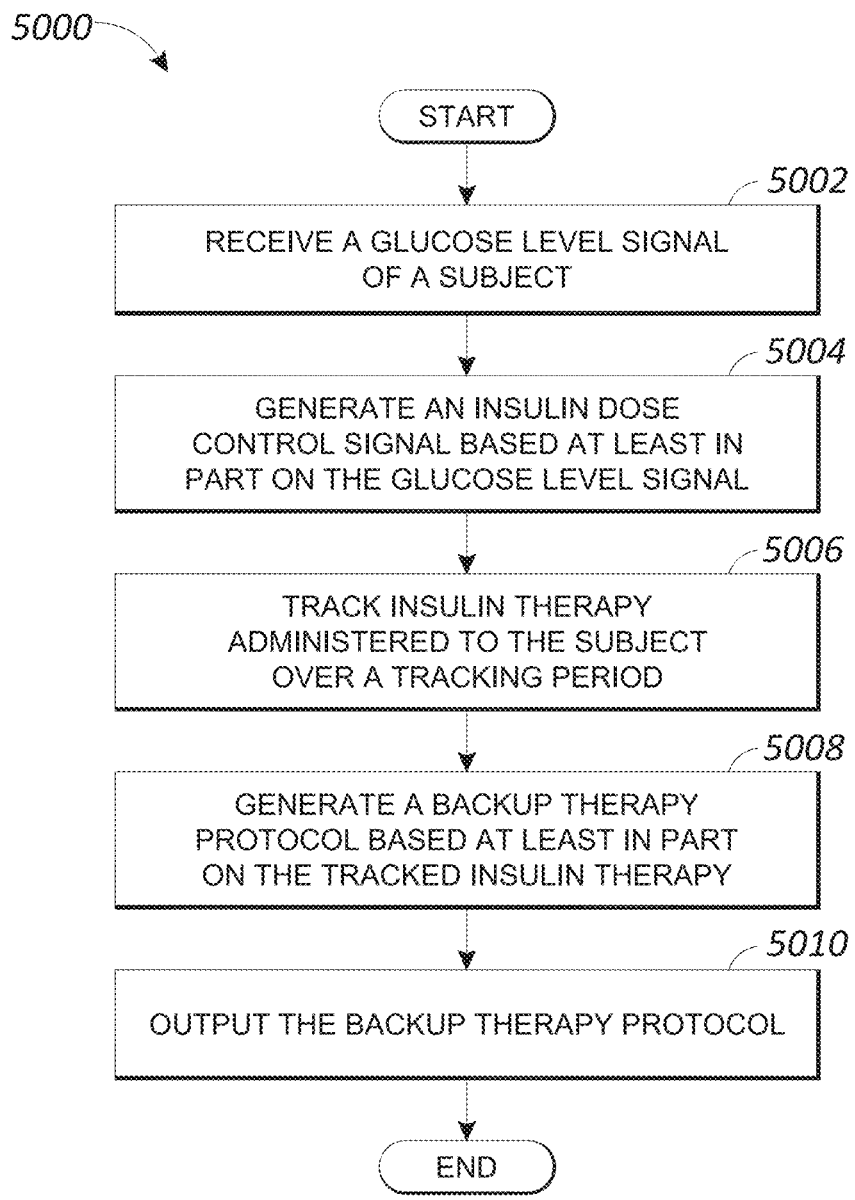
FIG. 50 presents a flowchart of an example backup therapy protocol generation process in accordance with certain embodiments.

FIG. 50 presents a flowchart of an example backup therapy protocol generation process 5000 in accordance with certain embodiments. The process 5000 may be performed by any system that can track medicament therapy (e.g., insulin therapy) provided to a subject over time and generate a backup therapy protocol that may be used if a glucose level control system 4710 becomes unavailable. For example, the process 5000 may be performed by one or more elements of the glucose level control system 4710. In some cases, at least certain operations of the process 5000 may be performed by a separate computing system that receives indications of medicament therapy provided to the subject 4712 from the glucose level control system 4710. Although one or more different systems may perform one or more operations of the process 5000, to simplify discussions and not to limit the present disclosure, the process 5000 is described with respect to particular systems.

The process 5000 begins at block 5002 where the glucose level control system 4710 receives a glucose level of a subject 4712. Receiving the glucose level may include receiving and/or determining a glucose level signal corresponding to a glucose level of the subject. The glucose level signal may be received from the glucose sensor 4716 (e.g., a CGM sensor). Alternatively, or in addition, the glucose level may be received from a user that provides the glucose level to the glucose level control system 4710 via a user interface, such as a user interface generated by the processor 4730 that may be output on a touchscreen by the touchscreen controller 4738. The glucose level received from the user may be a glucose level measured using an alternative sensor or measurement mechanism (e.g., diabetes measurement strips) that may be used in place of the glucose sensor 4716.

At block 5004, the glucose level control system 4710 generates an insulin dose control signal based at least in part on the glucose level signal. In some cases, the insulin dose control signal may be a medicament control signal configured to control a medicament pump to administer medicament (e.g., insulin, counter-regulatory agent, or other medicament) to a subject 4712. The dose control signal may be generated using a control algorithm configured to autonomously determine doses of insulin to be administered to or infused into the subject for the purpose of controlling glucose level of the subject based at least in part on the glucose level or glucose level signal determined at the block 5002.

At block 5006, the glucose level control system 4710 tracks insulin therapy administered to the subject 4712 over a tracking period. The tracking period is typically at least one day and may be longer. For example, the tracking period may be 1 day, 2 days, a week, a month, several months, a year, any length of time between the foregoing examples, or even longer. In some cases, the tracking period may be continuous from a point in time when tracking begins. For example, the tracking period may encompass the entire usage lifetime of the glucose level control system 4710 by the subject 4712. In cases where the tracking period is set for a defined period of time (which may be modified for different iterations of the process 5000), the process 5000 may be repeated periodically, upon request, or upon a triggering event using a new tracking period, of equal or different length. The triggering event may include any event that may render a prior generated backup therapy protocol potentially out-of-date. For example, the triggering event may include a change in medicament type (e.g., different insulin or counter-regulatory agent formulations), a change in physiological characteristics of the subject 4712 (e.g., a change in weight, or sensitivity to different glucose levels or medicament), or a change in average activity level of the subject 4712.

Although the tracking period is typically at least one day enabling the glucose level control system 4710 to determine a backup protocol based on data from a full cycle (e.g., waking and sleeping hours) of glucose level control system 4710 use, in some cases, the tracking period may at least initially be less than a day. For example, an initial backup therapy protocol may be generated after a half-day's activity. This initial backup therapy protocol may be updated as more data becomes available throughout the day's (and, in some cases, subsequent day's) use of the glucose level control system 4710.

In some cases, the tracking period may be defined by or based on a particular number of insulin administering events. For example, the tracking period may be defined by at least ten instances of generating an insulin dose based on a glucose level signal. As another example, the tracking period may be defined by a minimum number of meal events, correction dose events, and/or basal dose events. For instance, the tracking period may require 3 meals, or 3 meals of each meal type to occur, 2 correction doses, and/or 100 basal doses. It should be understood that the aforementioned number of doses is just an example, and the tracking period may include more or fewer dose amounts. Moreover, the tracking period may be defined or specified as a combination of time and occurrences of a particular number of doses of insulin.

In some cases, the tracking period may be variable. For example, if the glucose level control system 4710 determines that the insulin dose therapy is inconsistent or erratic over the tracking period (e.g., due to inconsistent exercise or eating habits), the tracking period may be extended.

Tracking the insulin therapy may include storing the insulin dose control signal generated based at least in part on the glucose level signal at the block 5004. Alternatively, or in addition, tracking the insulin therapy may include storing an indication of a quantity of insulin (or other medicament) corresponding to the insulin (or another medicament) dose control signal. The insulin dose control signal and/or the indication of the quantity of insulin may correspond to a dose of insulin delivered to the subject 4712 as a basal insulin dose, a correction bolus of insulin, and/or as a mealtime bolus of insulin.

Storing the insulin dose control signal and/or the indication of the quantity of insulin may include storing the insulin dose control signal and/or the indication of the quantity of insulin in a therapy log or any other type of data structure in the memory 4740 of the glucose level control system 4710. Alternatively, or in addition, the glucose level control system 4710 may store the insulin dose control signal and/or the indication of the quantity of insulin at a remote data store. This remote data store may be a local computing system with which the glucose level control system 4710 may communicate (e.g., a laptop, desktop, smartphone, or other computing device of the subject 4712 or a user). The glucose control system 4710 may provide the insulin dose control signal data or the indication of the quantity of insulin to the local computing system via Bluetooth® or other near field communication services, or via a local network. Alternatively, or in addition, the remote data store may be a remote computing system that the glucose level control system 4710 may communicate with over a wide area network, such as a wireless area network, a cellular network using IoT based communication technology, cellular communication technology, or any other communication network. In some cases, the wide area network may include the Internet. The glucose level control system 4710 may include a wireless radio that enables it to communicate with the local or remote computing system. Further, the remote computing system may be a computing system of a data center or a cloud computing environment.

Whether a local or remote computing system, the glucose level control system 4710 may establish a communication channel with the computing system. This communication channel may be an encrypted channel. Further the communication channel may be a direct end-to-end connection between the glucose level control system 4710 and the computing system. Once the communication channel is established, the glucose level control system 4710 may transmit the insulin dose control signal data or the indication of the quantity of insulin to the computing system.

Generally, the operations associated with the blocks 5002-5006 may be repeated multiple times throughout the course of the tracking period. For example, in some cases, an insulin dose control system associated with basal insulin may be generated up to 288 times a day. Accordingly, tracking the insulin therapy may include storing insulin does control signals and/or corresponding indications of quantities of insulin for a plurality of autonomously determined doses of insulin infused into the subject 4712 throughout the tracking period.

Generally, counter-regulatory agent therapy includes administering a counter-regulatory agent (e.g., glucagon) when there is a risk or occurrence of hypoglycemia. Usually, the counter-regulatory agent is not supplied on periodic or daily basis. However, it can be useful to understand the amount and frequency that counter-regulatory agent is administered to the subject 4712. For example, it may help a healthcare worker or user guide or adjust care for the subject 4712. Further, tracking counter-regulatory agent use may help determine a minimum quantity of counter-regulatory agent that should be accessible to the subject 4712, either in a bi-hormonal pump or for use in injection therapy. In some cases, the block 5006 may include tracking the counter-regulatory agent administered during the tracking period. Tracking the counter-regulatory agent therapy may include storing an indication of autonomously determined doses of counter-regulatory agent delivered to the subject 4712 responsive to the glucose level signal obtained at the block 5002.

At block 5008, the glucose level control system 4710 generates a backup therapy protocol based at least in part on the tracked insulin therapy. The backup therapy protocol may be determined based on an average quantity or rate of insulin administered to the user over the tracking period, over different portions (e.g., breakfast, lunch, and dinner, or waking and sleeping hours, etc.) of the tracking period, or in response to particular events (e.g., when eating, when glucose level exceeds a threshold level, etc.). The backup therapy protocol may include a backup injection protocol and/or a backup pump therapy protocol. The backup injection protocol may provide a user (e.g., the subject 4712, a parent or guardian, or other caretaker for the subject 4712) with quantities of insulin that may be administered to the subject 4712 via injection. Further, the backup injection therapy may indicate times that the insulin may be administered. For example, the backup injection therapy may indicate quantities of insulin to be administered at particular mealtimes. Further, the backup injection therapy may indicate an effect that a unit of insulin may have on the subject 4712 enabling a user to calculate how much insulin to administer to the subject 4712 when a glucose level reading indicates that the glucose level of the subject 4712 is too high (e.g., above a desired setpoint range).

Similar to the backup injection therapy protocol, the backup pump therapy protocol may provide a user (e.g., the subject 4712, a parent or guardian, or other caretaker for the subject 4712) with quantities of insulin that may be administered to the subject 4712 via a medicament pump. Using the backup pump therapy protocol, a user may configure the medicament pump to administer the quantities of insulin identified. The backup pump therapy protocol may be used to configure the medicament pump when access to a CGM sensor is unavailable (e.g., the subject 4712 does not possess a CGM sensor, or the medicament pump or CGM sensor has a fault, etc.). Further, the backup pump therapy protocol may be useful for providing an initial configuration to a replacement glucose level control system.

In some cases, the backup injection therapy protocol and the backup pump therapy protocol may be the same. However, often at least the recommended basal therapy settings may differ. It is generally not practicable for insulin to be administered to a subject 4712 more than a few times a day via injection therapy. Thus, the backup injection therapy protocol may identify long acting insulin units or doses that may be administered on a limited basis (e.g., once or twice a day). However, the medicament pump may more easily administer insulin on a more than limited basis (e.g., every hour, every half hour, every 5 minutes, etc.). Thus, the backup pump therapy protocol may identify a basal rate of insulin that may be administered once every time unit (e.g., once per hour or once per 15 minutes, or once per five minutes), or continuously at a particular rate (e.g., 0.5 or 0.6 units) per time unit (e.g., per hour). Moreover, the backup pump therapy protocol may identity different rates for different portions of a day (e.g., one rate each half of the day, one rate each quarter of the day, or one rate during typical waking hours and one rate during typical sleeping hours for the subject, etc.).

In some cases, an initial backup therapy protocol may be generated at the block 5008. The initial backup therapy protocol may be updated over time as additional insulin therapy data is obtained.

Generating the backup therapy protocol may include determining a number of long acting insulin units based at least in part on an average total basal insulin provided to the subject 4712 per day over the tracking period. The averaged total basal insulin provided per day may be included in a backup injection therapy protocol as a single dose of long acting insulin that is configured to help maintain the basal insulin level of the subject 4712 throughout the day. In some cases, the averaged total basal insulin provided per day may be included in a backup injection therapy protocol as multiple doses of insulin (e.g., 2 or 3 doses throughout the day).

Alternatively, or in addition, the basal insulin may be included in the backup therapy protocol, such as in a backup pump therapy protocol, as a dosage rate that may be supplied to a pump to provide a rate of basal insulin throughout the day. Further, in some cases, each day of the tracking period may be divided into a plurality of sub-periods. For example, each day of the tracking period may be divided into two, three, four, or more time periods, or equal or different length. In some such cases, generating the backup therapy protocol may include determining an hourly basal rate for each sub-period of the plurality of sub-periods. This hourly basal rate may be determined by averaging the corresponding sub-periods for each day of the tracking period. For example, if each day of the tracking period is divided into two sub-periods (e.g., noon to midnight, and midnight to noon), the basal rate supplied during the first sub-period throughout the tracking period may be averaged and the basal rate supplied during the second sub-period throughout the tracking period may be averaged to determine two basal rates for inclusion in the backup therapy protocol. The basal rate may be determined on an hourly rate or based on any other time period. Alternatively, the basal rate may be determined based on an amount of time that a particular quantity (e.g., one unit) of insulin is recommended to be administered to the subject 4712 as part of the backup therapy protocol. For example, if the glucose level control system 4710 determines that the subject 4712 is receiving one unit of insulin every 1.125 hours, the backup therapy protocol may indicate the basal rate to be one unit every 1.125 hours. Alternatively, or in addition, the backup therapy protocol may indicate a basal rate of 0.89 units per hour.

In addition, generating the backup therapy protocol may include determining an average correction bolus provided to the subject per day over the tracking period. The average correction bolus may be determined by adding the total amount of correction doses administered each data and dividing by the number of days in the tracking period. The average correction bolus may be included in the backup therapy protocol as guidance for the user. However, generally, the correction bolus is supplied in response to a determination that a subject's glucose level is spiking or exceeding a threshold, and not necessarily as a daily dose of insulin. Accordingly, the average correction bolus may be included as part of the backup therapy protocol to facilitate the user understanding an amount of insulin that is likely to be required during an average day, which may be useful for the user (e.g., the subject) to determine how much insulin to have accessible to use, for example, in injection therapy. In some cases, one or more days, or time periods, of the tracking period may be omitted when determining the average correction bolus because, for example, the one or more days or time periods may be determined to be outliers. The outliers may be omitted to provide a more accurate understanding of average insulin needs or consumption.

In some implementations, the glucose level control system 4710 may determine an average change in glucose level (e.g., blood glucose level) at least partially attributable to a unit of insulin provided as a correction bolus to the subject during the tracking period. In some cases, the glucose level control system 4710 may correlate each correction bolus applied during the tracking period to a change in the glucose level of the subject 4712.

Generating the backup therapy protocol may include determining, for each mealtime of a plurality of mealtimes per day, an average mealtime bolus of insulin provided to the subject over the tracking period. In some cases, the average mealtime bolus may be determined for particular meals (e.g., breakfast, lunch, and dinner), while other periods of food intake (e.g., snacks or teatime) may be omitted or ignored. Further, the average mealtime boluses may be associated with particular meal sizes as identified by a user. For example, the glucose level control system 4710 may determine an average mealtime bolus for a small and a large meal, or for a small, a medium, and a large meal. The average mealtime bolus may be determined by averaging an amount of insulin the glucose level control system 4710 determines should be administered to the subject 4712 using a control algorithm of the glucose level control system 4710 for each mealtime and identified meal size.

In some cases, the backup therapy protocol may include data relating to the administering of counter-regulatory agent. For example, the backup therapy protocol may include an indication of total counter-regulatory agent and/or daily counter-regulatory agent provided to the subject over the tracking period.

At block 5010, the glucose level control system 4710 outputs the backup therapy protocol. Outputting the backup therapy protocol may include displaying the backup therapy protocol on a display enabling a user to implement the backup therapy protocol. Alternatively, or in addition, outputting the backup therapy protocol may include transmitting the backup therapy protocol to a computing device of a user for display and/or storage. In some cases, the backup therapy protocol may be stored at the glucose level control system 4710 and may be accessed in response to a user interaction with a user interface of the glucose level control system 4710.

In some cases, the process 5000 can be combined at least in part with the process 47100 described below. Thus, in some cases, the backup therapy protocol may further include a record of user modifications to one or more control parameters used by the control algorithm of the glucose level control system 4710 to autonomously determine doses of insulin to be infused into or administered to the subject. This record of user modifications may include an identity of instances of user modification to the control parameter and/or a percentage of times a user modified the control parameter during each day of the tracking period and/or during the entire tracking period.

Figure 51:
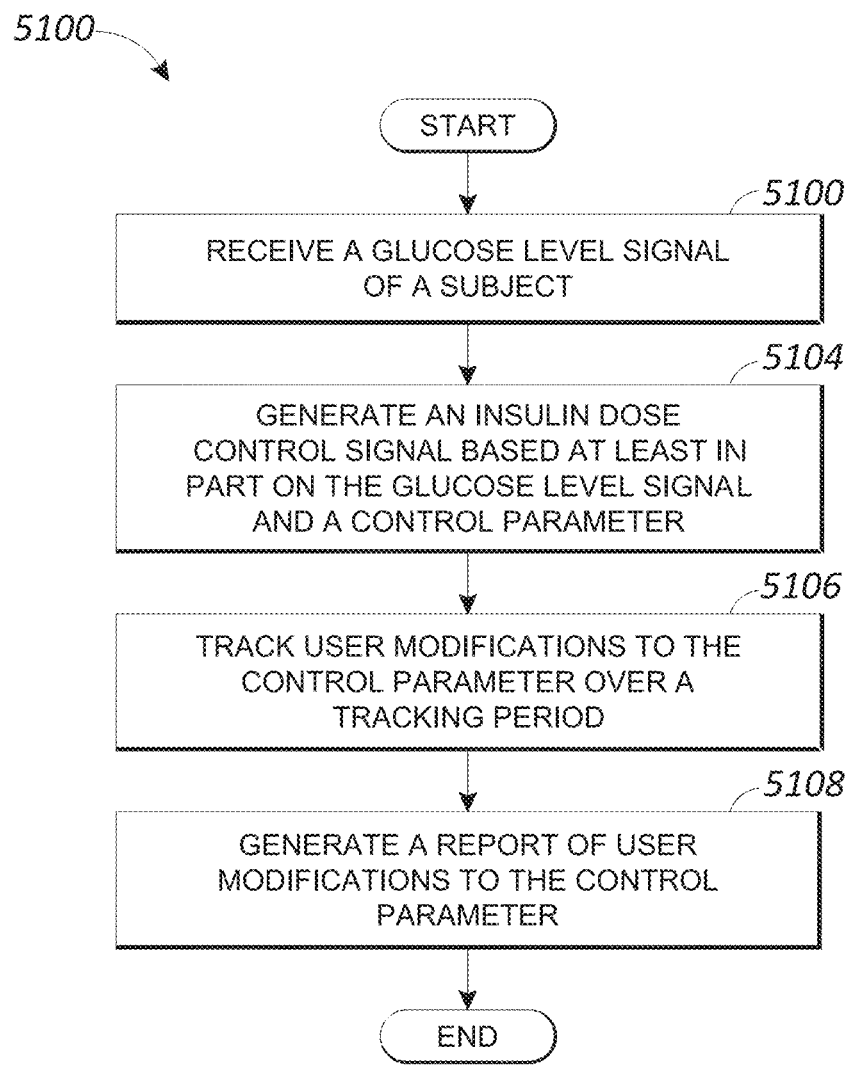
FIG. 51 presents a flowchart of an example control parameter modification tracking process in accordance with certain embodiments.

FIG. 51 presents a flowchart of an example control parameter modification tracking process 5100 in accordance with certain embodiments. The process 5100 may be performed by any system that can track user interactivity with glucose level control system 4710, and more specifically, occurrences of a user modifying a control parameter used by the glucose level control system 4710 to help control medicament delivery to the subject 4712. For example, the process 5100 may be performed by one or more elements of the glucose level control system 4710. In some cases, at least certain operations of the process 5100 may be performed by a separate computing system that receives indications of changes to control parameter settings of the glucose level control system 4710 from the glucose level control system 4710 and/or from user interaction with a user interface at the separate computing system prior to transmitting the modification to the glucose level control system 4710. Although one or more different systems may perform one or more operations of the process 5100, to simplify discussions and not to limit the present disclosure, the process 5100 is described with respect to particular systems.

The process 5100 begins at block 5102 where the glucose level control system 4710 receives a glucose level of a subject 4712. The block 5102 can include one or more of the embodiments previously described with respect to the block 5002.

At block 5104, the glucose level control system 4710 generates an insulin dose control signal based at least in part on the glucose level signal and a control parameter. The insulin dose control signal may be generated based on a control algorithm that enables the glucose level control system 4710 to autonomously determine doses of insulin to be infused into or administered to the subject to control the glucose level of the subject. The control algorithm may determine the doses of insulin based at least in part on the control parameter. The control parameter may include any parameter that can affect the operation or output of the control algorithm, or the operation of the glucose level control system 4710, and that is modifiable by a user (e.g., the subject 4712 or a user that is at least partially responsible for care of the subject 4712 (e.g., a parent or guardian)). In some cases, the control parameter may be, or may correspond to, a target setpoint for the glucose level of the subject 4712. In some cases, the control parameter may correspond to whether the glucose level control system 4710 is to generate the insulin dose control signal for at least a period of time. For example, the control parameter may relate to whether at least some operation of the glucose level control system 4710 is paused or active. The block 5104 can include one or more of the embodiments previously described with respect to the block 5004.

At block 5106, the glucose level control system 4710 tracks one or more user modifications to the control parameter over a tracking period. The tracking period may be one day, less than a day, or it may be longer than one day (e.g., 2 days, 3 days, a week, a month, etc.). Further, the tracking period may include one or more periods of time as previously described with respect to the process 5000. The user may be the subject 4712 or any other user (e.g., a parent or guardian, or a healthcare provider) that may be permitted to modify a control parameter of the glucose level control system 4710.

The user may modify the control parameter using a user interface that may be generated and/or output by the glucose level control system 4710. Alternatively, or in addition, the user interface may be generated and/or output by a computing system that can communicate with and/or modify the control parameter at the glucose level control system 4710. For example, the computing system may be a smartphone, a smartwatch, a laptop, or desktop computer, or any other type of computing device that may be used to configure the glucose level control system 4710. The user interface may be output on a touchscreen with which the user may interface to modify the control parameter. The user may interact with a control parameter selection element or other user interface element to select and/or modify the control parameter. In some cases, the user may provide the control parameter with any value supported by the glucose level control system 4710. In some cases, the user may be limited to selecting particular values for the control parameter, which may be less than the supported capability of the glucose level control system 4710 or less than what other users are permitted to select. For example, a clinician may be granted a greater modification range than a parent for modifying the control parameter.

Tracking the one or more user modifications may include storing in the one or more user modifications in a therapy log, database, or other data structure. Further, tracking the one or more user modifications may include tracking or storing whether each of the user modifications comprises an increase or a decrease in the control parameter. The determination of whether the control parameter has been increased or decreased may be determined based on whether a value for the control parameter has been increased or decreased relative to a reference value. The reference value may include a current value of the control parameter, a default value, a clinical value supplied to the glucose level control system 4710, and/or a value determined by the glucose level control system 4710. Further, tracking the one or more user modifications may include storing a time and/or one or more conditions under which the control parameter is modified. For example, the glucose level control system 4710 may store a time of day, an activity level of the subject 4712 as determined from one or more physiological sensors and/or as identified by a user, a meal being consumed or not consumed, and the like. Moreover, tracking the insulin therapy may include storing an indication of the autonomously determined doses of insulin delivered or administered to the subject 4712.

In some cases, the tracking period may be divided into a plurality of sub-periods. The sub-periods may correspond to different portions of a day within the tracking period. For example, each day of the tracking period may be divided into two equal halves corresponding roughly to day and night, or into 3 or 4 different periods corresponding to a particular number of hours in the day. The sub-periods may be of equal or unequal length. Tracking the one or more user modifications may include tracking the occurrence of modifications to the control parameter within the sub-periods of the tracking period. Further, the occurrence of modifications within a sub-period of a day within the tracking period may be combined with the occurrence of modifications within a corresponding sub-period of another day within the tracking period. In other words, each occurrence of a modification of a control parameter in a sub-period defined from 9:00-21:00 may be aggregated across days of the tracking period.

In some cases, a different reference value may be determined for the control parameter for each sub-period. In some such cases, tracking the one or more user modifications may include tracking modifications to the control parameter value with respect to the reference value for the sub-period.

At block 5108, the glucose level control system 4710 generates a report of user modifications to the control parameter. Alternatively, or in addition, the repot may be generated by another computing system, such as a cloud computing system or a computing system of a healthcare provider based on data (e.g., occurrences of user modification of the control parameter value) received from the glucose level control system 4710.

The report may include a measure of frequency of increases and decreases from the stored control parameter value. Further, the report may indicate a number of times that operation of one or more features of the glucose level control system 4710 has been paused or suspended, or a percentage of the tracking period that operation of one or more features of the glucose level control system 4710 has been paused or suspended. Moreover, the report may indicate a magnitude of the modification to each control parameter for each occurrence, in total, and/or on average. In some cases, the report may indicate a percentage of user modifications that are higher or lower than the reference value over the tracking period. Further, cases where the tracking period, or each day of the tracking period, is divided into a sub-period, the report may include a measure of frequency of increases and decreases from a reference value for the control parameter for each sub-period of the tracking period. In some cases, the report may include an identity of user activity that occurred when, or within a threshold time period, of a user modification to a value of the control parameter. For example, the report may identify whether a user was exercising (e.g., swimming, running, dancing, etc.) when a user modification to the control parameter value was made.

In some embodiments, the block 5108 may include storing the generated report at the glucose level control system 4710 (e.g., in the memory 4740) and/or at a storage of another computing device. In some cases, the computing device may be a computing device of the subject 4712 (or parent or guardian). Further, the computing device can be a computing device of a healthcare provider. In some cases, the computing device may be a computing device of a cloud computing service.

The report may be obtained from the glucose level control system 4710 by a wired connection (e.g., a USB cable). Alternatively, or in addition, the report may be obtained via a wireless connection to the glucose level control system 4710. For example, the glucose level control system 4710 may establish an encrypted connection to a computing system of a healthcare provider, which may receive the report from the glucose level control system 4710. Alternatively, or in addition, the glucose level control system 4710 may establish an encrypted communication channel with a cloud computing provider, which can receive the report from the glucose level control system 4710. This report may then be accessed by any authorized users.

Advantageously, in certain embodiments, a healthcare provider can use the report to help manage care of the subject 4712. For example, if the healthcare provider determines that a user is modifying the control parameter more than a threshold number of times or during particular time periods, the healthcare provider may use this information to modify the care being provided to the subject 4712 and/or to educate the subject 4712 on optimal care. For example, the rate of therapy may need to be modified or the amount of insulin may be too low for the subject's comfort. For example, in some cases, a subject 4712 may have a different tolerance to a glucose level than the average user leading the user to modify a setpoint range. Understanding this information can help the healthcare provider manage care of the subject 4712 (e.g., adjusting the initial setpoint range, or modifying a type of insulin prescribed).

Further, as indicated above, the process 5100 may be combined with the process 5000. In other words, a report may be generated that includes both backup therapy protocols and a record of the number of times a user may a modification to one or more control parameters of the glucose level control system 4710. In some cases, the processes 5000 and 5100 may be triggered and/or performed independently.

Example Backup Therapy Reports

FIGS. 52-54 illustrate one non-limiting example of a backup therapy report, or a set of reports, that may be generated using one or more of the embodiments disclosed herein. In other words, the reports of FIGS. 52-54 may be portions of a single report generated by the glucose level control system 4710, or may be separate reports that are concurrently generated or that are generated based on different data and/or over different tracking periods. The report may be generated by the automated glucose level control system 4710, or by another computing system that may receive therapy data from the automated glucose level control system. Further, FIGS. 52-54 represent just one non-limiting example of a report or set of reports that may be generated. It is possible for other reports to be generated that include more or less data. For example, the backup injection therapy protocol and the backup pump therapy protocol illustrated in FIG. 52 may be separated into two separate reports that may be separately generated and/or accessed.

FIG. 52 illustrates an example backup therapy protocol report 5200 in accordance with certain embodiments. The amount of insulin recommended under different ties and/or conditions may be displayed in units. In some cases, the report 5200 may identify the quantity of insulin included in a unit and/or the type of insulin. Further, in some cases, the report 5200 may be an interactive report that enables a user to modify a type of insulin or a unit size of insulin. In some such cases, the table 5202 may update the recommended number of units of insulin to administer under particular times or conditions based on the type of insulin and or unit size of insulin selected.

The report 5200 may identify the length of the tracking period 5206 used to determine the backup therapy protocol. Further, the report 5200 may identify the time or date range 5208 during which the tracking period 5206 occurred. Advantageously, knowing the tracking period 5206 may help determine an amount of trust to place in the recommendations included in the backup therapy protocols. The longer the tracking period, the more likely that the recommendations are accurate. A shorter tracking period is more susceptible to less accurate recommendations because, for example, the tracking period may encompass more days that are outliers for the subject's typical condition or activity level. For example, a tracking period of one day that occurs on a day when a subject consumed larger than normal meals or exercised significantly more than normal may result in backup therapy recommendations that do not match the subject's typical lifestyle. Further, knowing when the tracking period occurred may be useful to determine how current the recommendations are and whether they are a reliable indicator of an amount of insulin a subject should administer. For example, if the date range 5208 of the tracking period 5206 is a year old, and the subject has gained or lost significant weight over the year, the backup therapy protocol may no longer be a reliable indication of recommended injection therapy. In such cases, a user may adjust the recommendation and/or trigger a new occurrence of the process 5000.

The table 5202 illustrates an example backup injection therapy protocol, which may indicate various insulin doses that may be administered to the subject 4712 at various times or under various conditions using injection therapy. The table 5202 identifies an amount of insulin the subject 4712 may inject when consuming a usual-sized meal for breakfast, lunch, or dinner. The usual-sized meal may refer to the size of a meal that the particular subject 4712 usually consumes or has been advised to consume by a healthcare provider. The units of insulin specified may refer to an amount of insulin that the automated glucose level control system 4710 provides the subject 4712 on average when the user consumes the identified usual size meal. In some cases, the table 5202 may further include recommended insulin doses for different size meals. For example, each breakfast may illustrate three different values (e.g., 5 units, 6 units, and 8 units) corresponding to light or smaller than usual breakfast, usual size breakfast, and heavy or larger than usual size breakfast.

It should be understood that the amount of insulin delivered may vary over time and/or based on the condition of the patient at a particular time. Thus, as indicated at the top of the report 5200, the recommendations in the backup therapy protocols are suggested for temporary use for a particular quantity of time (e.g., up to 72 hours in the illustrated example). The quantity of time for which the recommendations are valid may vary based on the subject 4712, the amount of historical data collected (e.g., the size of the tracking period), the amount of daily variation in the subject's glucose level, or any number of other factors that may affect the amount of time that the backup therapy protocol can be safely followed.

As illustrated by table 5202, the backup injection therapy protocol may further identify an amount of long-lasting insulin a subject 4712 is recommended to administer each day (or at certain times throughout the day). This long-lasting insulin may be used in place of the basal insulin that the glucose level control system 4710 may provide on a periodic basis.

In addition, the table 5202 identifies the reduction in glucose level attributable to one unit of insulin. For example, as illustrated in the table 5202, the automated glucose level control system 4710 has determined that one unit of insulin (e.g., $\frac{1}{100}^{th}$ of a milliliter of insulin) may reduce a subject's 4712 glucose level by 9 mg/dL. Accordingly, a user implementing injection therapy may measure a subject's 4712 glucose level, determine a difference between the measured glucose level and a desired setpoint or threshold glucose level, and divide the difference by 9 to determine a number of units of insulin to inject in response to a determination that a correction dose is warranted (e.g., that glucose level is outside of a desired setpoint range).

The table 5204 of the report 5200 provides an example of a backup pump therapy protocol. As illustrated, the backup pump therapy protocol may have the same therapy information as the backup injection therapy protocol for mealtimes and for the correction factor. However, because a pump may be capable of providing periodic basal therapy, the long acting insulin units of the injection therapy may be replaced with a basal rate indicating a rate at which the backup or replacement pump should administer insulin to the subject. As illustrated, the basal rate may vary over time. In the illustrated example, a basal rate is supplied for four different time periods constituting a 24-hour day. However, the basal rate may be divided into a fewer (e.g., 2 twelve-hour blocks) or greater (e.g., every four hours) number of periods, with each time period potentially having a different basal rate as determined based on the historical therapy data provided by an automated glucose level control system.

In some cases, the report 5200 may include additional data that may be tracked over the tracking period. This additional data may include any data that may facilitate care of the subject 4712 and/or maintenance of the automated glucose level control system 4710. Some non-limiting examples of additional data that may be tracked and included in a report using, for example, the process 5000 or 900 are illustrated in chart 5210 of the report 5200. For example, as illustrated in the chart 5210, the report may include the average glucose level of the subject 4712 over the tracking period and/or the corresponding estimated A1C percentage. Further, the report 5200 may indicate the amount or percentage of time that the subject's glucose level is within a desired setpoint range and/or is above the desired setpoint range. Similarly, the report 5200 may indicate the amount or percentage of time that the subject's glucose level is below a threshold glucose level.

In addition, the report 5200 may indicate the average number of meal announcements per day. As illustrated in the chart 5210, the subject 4712 from which the example report 5200 was generated made an average of 4.2 meal announcements indicating that on average, the subject consumed more than 3 meals a day. In some cases, the report may further indicate the types of meals announced (e.g., two breakfasts, one lunch, and one dinner). The second breakfast may be a large snack that is roughly equivalent in size to a small breakfast for the subject. Thus, the subject may have made an additional breakfast meal announcement. In some cases, the automated glucose level control system 4710 may support a separate snack or other meal announcement option.

The report 5200 may further include the total amount of insulin administered to the subject per day, and/or the total amount of counter-regulatory agent (e.g., glucagon) administered to the subject per day. In addition, the report 5200 may indicate the amount of percentage of time that the automated glucose level control system 4710 is able to connect or communicate with the CGM sensor over the tracking period, which may correspond to the amount of time that the automated glucose level control system 4710 functions in an online mode during the tracking period.

FIG. 53 illustrates an example control parameter modification report 5300 in accordance with certain embodiments. As previously stated, the report 5300 may be a separate report generated using, for example, the process 900. Or the report 5300 may be included as a second within the report 5200.

The report 5300 may generally provide an indication of the number or percentage of times that a user modified one or more control parameters of the automated glucose level control system 4710 during a tracking period. Further, as with the report 5200, the report 5300 may identify the time or date range 5208 during which the tracking period 5206 occurred. In some cases, a user may interact with the report 5300 to determine the number of percentage of times that the user modified one or more control parameters during a subset of the tracking period. Similarly, the user may filter or narrow the date range to view other data described herein for a subset (e.g., a selected data range) of the tracking period.

The report 5300 may include a graph 5302 that illustrates the subject's glucose level with respect to the desired target setpoint range over the course of a day during the tracking period. This day can be an average of the values obtained for each day over the tracking period, or it can illustrate a particular selected day.

Further, the report 5300 may include a table 5304 that indicates the percentage of times that a user modified the glucose level target during specific time periods. In the table 5304 of the non-limiting example report 5300 indicates two time-periods, daytime and nighttime. However, it should be understood that the table 5304 may indicate fewer or more time periods. Further, the time periods may indicate specific times (e.g., from 9:00 to 21:00 and from 21:00 to 9:00) for the time periods.

As illustrated, the table 5304 may indicate the percentage of times that a user increased or decreased glucose target setpoints. In addition, the report may indicate the percentage of times that the user did not modify, or left as usual, the glucose target setpoint. This target setpoint indicated in the table 5304 may refer to a single target value (e.g., 110 mg/dL, 125 mg/dL, 130 mg/dL, etc.), or may refer to a target setpoint range (e.g., 70-180 mg/dL).

In addition, the report 5300 may indicate the number of times that a user set a temporary glucose target during the tracking period (the temporary target count 5306) or a selected data range. The report may also indicate a number of times that the user paused therapy during the tracking period (e.g., the paused insulin therapy count 5308) and/or the selected date range.

The glucose level (e.g., blood glucose level) of a subject may be affected by a subject's weight. Accordingly, the subject may provide updates of weight to the automated glucose level control system. In some such cases, the report may indicate a change in weight and when the weight parameter was modified (e.g., body weight data 5310). In some cases, the report 5300 may be filtered to show data before and after a weight change separately. The body weight data may be helpful for the healthcare provider to, for example, determine whether weight change may at least in part have been a basis for user modifications to target glucose levels. Generally, the automated glucose level control system 4710 (e.g., using glucose level readings) will automatically account for the effect weight changes may have on glucose level control. However, the subject 4712 may feel differently. The ability to collect the modification data relating to a user's modification of the automated glucose level control system 4710 and to correlate the data with weight changes can assist a healthcare provider in better treating the subject 4712 by, for example, adjusting settings of the automated glucose level control system 4710, changing insulin prescriptions, educating the subject 4712, or any other action that may improve care of the subject 4712.

In some cases, the report may omit changes to glucose level target settings that are below a threshold. In other words, minor changes that may be statistical noise may be ignored. Further, in some cases, the report may indicate when control parameters (e.g., at bedtime, with respect to a particular meal, such as dinner, etc.) are modified. In some cases, the report may also indicate the duration of the change to the glucose target setpoint, or other control parameter.

FIG. 54 illustrates an example meal selection report 5400 that may be included as part of some implementations of the control parameter modification report 5300 of FIG. 53 in accordance with certain embodiments. The report 5400 may include a table 5402 identifying the average number of times per day that a user (e.g., the subject 4712) announces each meal type. Typically, a user will announce a meal 0 or 1 times a day. However, in some cases, a user may announce a particular mealtime more than 1 time to account, for example, for large snacks that may be similar in size to a particular meal. Smaller snacks often may be handled by the control algorithm of the automated glucose level control system 4710 (e.g., by the corrective insulin controller 4826) without a meal announcement.

Further, the table 5402 may identify the number of times over the tracking period, or selected time period within the tracking period, that meals of particular sizes are announced by a user. For example, the table 5402 may indicate the number of times that a usual size meal is announced, a smaller than usual size meal is announce, or a larger than usual size meal is announced.

Additional Backup Therapy Protocol Embodiments

Some automated glucose-control systems, such as the ones that may be used for ambulatory diabetes care or in critical care situations, can use control algorithms for automated delivery of insulin or an insulin-like agent. Such an automated glucose control system may be driven by glucose data that is captured from a continuous glucose monitoring (CGM) device. Even if such a system provides effective and safe control in the face of inter- or intra-subject variability, one inevitable challenge for its user is how to cope with periods when the system is not functional, lost or otherwise not available. Current standard of care requires setting and/or utilizing patient-specific therapeutic parameters that require a lot of effort to set at effective and safe levels, that remain subjective to a high degree, and that require vigilant management to compensate for ever-changing therapeutic requirements of the patient over time.

If a user of an automated control system was previously managing their glucose control through standard-of-care methods, long-term use of the automated control system is likely to de-skill the user or adversely affect their ability to once again effectively and safely manage their glucose control if/when the automated control system becomes unavailable. Further, the user's therapeutic parameters may have diverged from what the user may have previously adopted before use of an automated glucose level control system. And if the user had been using an automated control system ever since diagnosis, then the user may not be equipped with the necessary experience to cope with effectively and safely managing his or her glucose control if/when the automated control system becomes unavailable.

Embodiments of an automated glucose control system that can be adapted for use with embodiments of the present disclosure are described in International Publication No. WO 2015/116524, published on Aug. 6, 2015; U.S. Pat. No. 9,833,570, issued on Dec. 5, 2017; and U.S. Pat. No. 7,806,854, issued on Oct. 5, 2010, the disclosures of each of which are hereby incorporated by reference in their entirety for all purposes and made a part of this specification. In some cases, the automated glucose level control system can continue to provide autonomous dosing decisions during periods when the glucose signal is offline (e.g., when the CGM is not-functioning).

In certain embodiments disclosed herein, an automated system can provide dosing guidance recommendations that the user can follow during periods when the control system is not functional or otherwise not available. The guidance may include dosing recommendations to cover or account for the user's basal insulin needs, dosing recommendations to account for food intake (such as, but not limited to, carbohydrate consumption), and dosing recommendations to cover any additional or remaining insulin needs beyond basal insulin, such as to compensate for glucose excursions and departures from normal range. For example, the values attained online (e.g., when a glucose sensor is available and operating) by the control system for its nominal basal rate, $\bar{u}_t$, can be used for guiding the user's basal insulin settings during self-management periods, such as by using averages of $\bar{u}_t$ over multiple time segments (e.g., over multiple hour segments) over a 24 hour period (e.g., four 6-hour average values to provide a basal-rate profile of four basal rates over a 24-hour day), inferred over a particular time horizon (e.g., most recent day or week). Alternatively, a single daily basal dose can be recommended by the control system, which can guide a user who follows a daily injection regimen for the basal dosing. Moreover, the latest meal doses converged upon by the algorithm during online use can provide guidance to the user on their insulin needs for different relative meal sizes (e.g., tiny or snack, smaller than typical, typical, and more than typical for the user, etc.) at different time segments of the day (e.g., breakfast, lunch, and dinner time periods). Further, total daily dosing by the system during operation (e.g., over the last day or week) can be used to provide an estimate of the user's "correction factor", CF. The CF may comprise a quantity estimating the glucose level drop expected per unit of insulin for the user. This can be done in conjunction with guides adopted by care providers on how to relate the total daily dose to CF. Examples of such estimations or guides can be found in U.S. Patent Publication No. 2009/0036753A1 ("the King publication"), the entire contents of which are incorporated by reference herein and made part of this specification. Alternatively, values attained by $A_k$ during the operation of the autonomous diabetes control system governing insulin dosing can be related to CF, as per $CF=CF_R*\bar{A}_k$, where $\bar{A}_k$ may be an average value of a parameter $A_k$ that relates insulin doses determined during operation of an automated glucose level control system to deviation from a glucose target or glucose setpoint over some time horizon (e.g., a most recent day or week) and $CF_R$ is some mapping ratio between CF and $\bar{A}_t$. For example, the mapping ratio can relate to a correction factor calculated using a known technique, such as a technique disclosed in the King publication. The recommendation CF can provide guidance to the user on the dosing to follow to compensate for glucose excursions and departures from a normal range.

Certain embodiments include a controller that is configured to provide automatic control of glucose level of a subject. The controller can be operative to generate an insulin dose control signal based on the time-varying glucose levels of the subject as represented by a glucose level signal over time. The glucose level signal may be generated by a glucose sensor operative to continually sense a glucose level of the subject. The insulin dose control signal may control the delivery of doses of insulin by a delivery device. Further, the controller may operate at a regular or periodic frequency to generate an insulin dose control signal to regulate the glucose levels in the subject. During online operation the controller can employ a control algorithm that issues and updates insulin dosing recommendations for the purpose of being utilized during periods when the system becomes not functional or unavailable.

In some cases, the insulin dosing recommendations include quantities related to the subject's basal insulin needs, insulin needs for food intake, and remaining insulin needs beyond basal insulin. Further, the insulin dosing recommendations may address the expectation that the employment of the system could ultimately de-skill the user or adversely affect their ability to effectively and safely manage their glucose levels when the system becomes not functional or unavailable. Moreover, the insulin dosing recommendations can address the expectation that the use of the system from the beginning of a user's glucose management condition could prevent the user from ever acquiring the necessary knowledge and skills that would be necessary to effectively and safely manage their glucose levels when the system becomes not functional or unavailable. The insulin dosing recommendations can address a use scenario where the system is used temporarily on the subject for the purpose of obtaining such therapeutic insulin dosing recommendations for the subject or their caregiver to subsequently manage the subject's glucose levels. In some cases, the system is successively usable on multiple subjects to obtain therapeutic insulin dosing recommendations, thereby providing a service that could be deployed in a clinical practice.

Automated Glucose Level Control Refinement

An ambulatory medical device (AMD) may include a control system that autonomously provides therapy to a subject, for example, based on a health condition of a subject (e.g., determined based on one or more measured physiological indicators or parameters of the subject). In some examples, the control system may determine the therapy time and/or the intensity of the therapy e.g., a volume or dose of medicament delivered) during each therapy delivery based on measured values of one or more physiological parameters (e.g., using one or more subject sensors, such as a CGM sensor) and according to a predictive model that may include the one or more control parameters. In some examples, the predictive model may be used to estimate a physiological effect (e.g., a blood glucose level of the subject) of the therapy in order to adjust the therapy delivery according to an intended physiological effect. It is desirable to adaptively adjust the values of the control parameters to optimize the therapy delivery to a subject in the presence of time varying and subject specific factors that may influence the physiological effects of a therapy delivery on the subject. In some cases, the AMD may be an ambulatory medicament device that regulates the level of an analyte in subject's blood. An example of such ambulatory medicament device is an automated glucose level control system (e.g., the glucose level control system 4710) that may automatically provide insulin and/or a counter-regulatory agent (e.g., Glucagon) to a subject 4712 to help control the blood glucose level (BGL) of the subject 4712. Generally, a control algorithm may be implemented by the automated blood level glucose control system 4710 to determine when to deliver insulin and/or how much insulin to provide to the subject 4712. Further, the control algorithm may control both an ongoing or periodic delivery of insulin (e.g., a basal dose), and a correction bolus that may be provided to adjust a subject's glucose level to within a desired range. The control algorithm may use glucose level readings obtained from a subject sensor (e.g., a sensor measuring one or more physiological parameters of the subject in real time), such as a continuous glucose monitoring (CGM) sensor, that obtains automated glucose level measurements from the subject. Moreover, in some cases, the control algorithm may deliver a bolus of insulin in response to an indication of a meal to be consumed or being consumed by the subject 4712.

Insulin may be administered subcutaneously to a subject 4712. In some cases, the administered insulin may directly or indirectly enter subject's blood. For example, the glucose control system may subcutaneously deliver a medicament (e.g., insulin, glucagon) via an infusion set connected to a site on subject's body. There is often a delay, referred to as pharmacokinetic (PK) delay, between when the insulin is provided and when the amount of insulin in the subject's blood plasma reaches a particular concentration level, such as maximum concentration. This amount of time may vary based on the type of insulin and/or on the physiology of the particular subject. For example, with a fast-acting insulin, it may take approximately 65 minutes for a bolus of insulin to reach maximum concentration in the blood plasma of one subject, but 60, 64, or 70 minutes for another subject. For some other types of insulin, it may take anywhere from 3-5 hours to reach maximum concentration in the blood plasma of the subject. Additionally, there might be a delay, referred to as pharmacodynamic (PD) delay, between variation of the amount of insulin in the subject's blood plasma and the resulting variation of glucose level in the subject's blood. In some examples, the value of pharmacodynamic (PD) delay may be used to estimate BGL based on an estimated concertation of insulin in patient's blood. In various implementations, a glucose level of the subject may comprise blood glucose level, or glucose level in other fluids in subject's body. A glucose level may comprise a measured glucose level estimated using a glucose level signal received from a glucose sensor operatively connected to a subject. In some cases, the blood glucose level of the subject may be estimated based at least in part on the measured glucose level of the subject.

In some cases, the glucose level control system may implement a predictive algorithm based on a pharmacokinetic (PK) model to estimate the accumulation of insulin in the blood plasma of the subject over time, following the subcutaneous administration of insulin to a subject. In some examples, the PK delay may be subject specific and/or change overtime. Accordingly, in these examples, the PK model may include one or more parameters, referred to as control parameters, that may be subject specific and/or change overtime. Examples of factors and parameters that may influence the PK delay and/or the control parameters of the PK model may include, type of insulin, glucose level (e.g., at the insulin administration time), physiological characteristics of the subject, health condition of the subject, one or more physiological parameters of the subject, time of the administration, location at which the infusion set is placed, the amount of insulin administered and the like. The physiological characteristics may include characteristics shared among large portions of the population (e.g., weight, gender, age, etc.) as well as characteristics that may be unique or specific to the subject, or shared among few people (e.g., characteristics related to genetics). Differences between the physiologies of different subjects may result in differences in the optimal glucose level range for each subject, or some subset of subjects. Further, the differences in physiologies may also affect the absorption of insulin into the blood plasma. In other words, different physiologies of different subjects may result in insulin absorption taking different amounts of time for different subjects. Thus, while the maximum concentration of glucose in blood plasma may occur 65 minutes after delivery of a bolus of fast-acting insulin for one subject, it may be 60 minutes or 70 minutes for another subject.

Accordingly, in some such examples, the glucose level control system 4710 may implement a method to adaptively change the one or more control parameters in of the PK model used in its control algorithm to modify its predictions, in order to maintain the BGL within a desired range. For example, the glucose level control system may use readings from one or more subject sensors (e.g., a CGM) and/or information received from the subject (e.g., using a user interface of the AMD), to modify one or more control parameters.

As indicated above, a glucose level control system, such as an automated glucose level control system 4710, may control delivery or administering of insulin, or a counter-regulatory agent, based on a PK model and one or more glucose level measurements of the subject. In some examples, the PK model can be a bi-exponential PK model that may be used to estimate or determine the absorption or accumulation of subcutaneously administered insulin into blood and/or a decay rate of the insulin level in the subject's blood for a given value of delivered dose of insulin. In some examples, the absorption of insulin over time according to a bi-exponential PK model may be represented by the following equation:

$$p(t)=KU_0(e^{-\alpha_1 t}-e^{-\alpha_2 t}) \qquad (2)$$

where $U_0$ is the subcutaneous dose in units (U), K is a scaling constant, and $\alpha_1$ and $\alpha_2$ are time constants that may be used as the control parameters of the model. In some examples, the peak time of absorption of insulin, starting from the time that subcutaneous dose ($U_0$) is administered, may be referred to as Tmax and can be determined based on the following equation:

$$\log\frac{\left(\frac{\alpha_2}{\alpha_1}\right)}{(\alpha_2 - \alpha_1)} \quad (3)$$

In some examples, $\alpha_1$ and $\alpha_2$ can be related (e.g., through an equation such as $\alpha_2 = 1.5\,\alpha_1$ or any other linear or nonlinear mathematical relations). In some such examples, Tmax alone may be used as the control parameter of the bi-exponential PK model. In some cases, Tmax may be referred to the time at which the concentration of insulin in subject's blood reaches a maximum level (e.g., starting from the time that subcutaneous dose is administered). In some other examples, the bi-exponential PK model may be used to estimate or determine the accumulation of counter-regulatory agent or hormone (e.g., glucagon) in subject's blood. Equation 2 may be used to calculate the pending effect of the accumulated amount of insulin in the subcutaneously administered dose, as that can be taken to be the difference between the total area ($\int_0^\infty p(t)dt$, which can describe a measure of the total amount of hormone (e.g., insulin) that can be absorbed due to a dose $U_0$) and $\int_0^\tau p(t)dt$, which can represent a measure of the expended portion of $U_0$ at time.

Often, the glucose level control system is configured to maintain a subject's glucose level (e.g., blood glucose level) within a particular range (e.g., a normal range). As glucose level rises or falls, the glucose level control system may administer particular amounts of insulin or counter-regulatory agent to the subject to bring the glucose level of the subject back to within a desired range or closer to a desired setpoint. As explained above, it may take some non-infinitesimal amount of time for the medicament to be absorbed into the subject's blood stream. Thus, a PK model (e.g., the bi-exponential PK model), may be used to determine how much insulin or counter-regulatory agent should be provided to the subject in order to maintain the subject's blood glucose within a particular range. In some examples, the PK model (e.g., the bi-exponential PK model) may be used to predict the concentration of insulin glucose level of the subject over time as insulin or counter-regulatory agent is administered. In some cases, the control parameter values of the PK model may be set by a healthcare provider based on default values obtained through clinical trials and/or based an individualized treatment plan for the subject as may be determined based on clinical tests of the subject and/or on the healthcare provider's evaluation of the subject, which may be determined based on tests of the subject.

However, as previously indicated, the pharmacokinetic delay and the control parameters of the PK model, may be subject specific and/or change overtime due to various factors. Thus, although clinical data may determine optimal or recommended values of the control parameters for an average subject through one or more trials, the determined data may not be optimal for a particular subject. Moreover, individualized treatment plans are typically based on point-in-time measurements. These point-in-time measurements may provide a good guideline for treatment, but the optimal values of the control parameters for a subject may vary at different times of day, due to different activities, due to changes in the subject over his or her lifetime, or for any other number of reasons.

The glucose level control system 4710 of the present disclosure can implement a method or process to autonomously and/or automatically modify one or more control parameters of a control algorithm, or the model used by the control algorithm, to modify therapy provided to the subject using the glucose level control system 4710. The method may be performed by a hardware processor 4730 and/or a controller 4718 that controls the administering of therapy. The system can provide therapy (e.g., insulin) to a subject in response to a determination of a glucose level of the subject. The glucose level may be determined based at least in part on a glucose level signal obtained from a glucose level sensor that is operatively connected to a subject. The determination of the therapy (e.g., an amount of insulin or counter-regulatory agent) may be based at least in part on the glucose level and/or the bi-exponential model. Moreover, the determination of therapy may be based at least in part on a value or setting of one or more control parameters of the glucose level control system. The one or more control parameters may be, or may correspond to, one or more parameters of the bi-exponential PK model, or any other model or control algorithm used to control the administering of therapy to the subject.

As mentioned above, the system 4710 may provide the therapy based on the value or setting of the one or more control parameters. The value or setting of the one or more control parameters may be based on an initial configuration of the glucose level control system 4710 by a healthcare provider, subject, or other user. Further, the initial configuration may be based on clinical data or data obtained that is specific to the subject. In some cases, a control parameter may be a time constant used by a control algorithm of the glucose level control system (e.g., Tmax in a bi-exponential PK model). This time constant may be used in a calculation of an accumulation of insulin in the subject by the control algorithm. Further, the control parameter may be used to control an insulin dosing response of the control algorithm to a glucose level excursion in the subject as indicated by a glucose level signal obtained from a glucose level sensor. In some cases, the control parameter may be, or may be related to, Tmax (e.g., defined by equation 2). For example, the control parameter may be an estimate of Tmax or a fraction (e.g., 0.5) of Tmax. As previously explained, Tmax may be the peak time of absorption of insulin, or the amount of time until the concentration of insulin from an insulin dose reaches maximum concentration in the blood of the subject.

Moreover, the control parameter may be associated with a setpoint or target glucose level, or a glucose level range. For example, the control parameter could relate to a point in time when an estimated amount of "insulin on board" (e.g., an amount of insulin in the subject as determined by a model of insulin accumulation and/or utilization in the subject) falls below a threshold value. As another example, the control parameter can be a clearance time for insulin boluses (e.g., an estimate of an amount of time for an administered bolus of insulin to be utilized by the subject). In some cases, the control parameter may relate to T½, which corresponds to a time when the concentration of insulin in the blood plasma reaches half of the maximum concentration in the blood plasma. In some cases, the control parameter may be a parameter that can be used to calculate Tmax or T½.

In some examples, the system 4710 may determine an effect of the supplied therapy (herein referred to as therapy effect or effect). For example, the therapy effect may be determined by analyzing a glycemic control of blood glucose (e.g., variation of BGL or supplied therapy over a measurement period) in the subject's blood as indicated by the glucose level signal received from the glucose sensor (e.g., a CGM sensor). In some cases, the control system may measure or determine the effect of the supplied therapy over time. In some such cases, the therapy effect may be determined based on variation of BGL and/or the amount of therapy delivered over time. Moreover, in some cases, the system may continue to supply therapy to the subject over several therapy delivery times or instances and may average or otherwise aggregate the measured or determined effects of the therapy over the several therapy delivery times or instances. In some other examples, the system 4710 may determine the therapy effect based at least in part on an input received from the subject. The input received from the subject may include a subjective or objective effect. The input received from the subject may include manual glucose level measurements obtained using, for example, test strips. Another example of input may be an indication of lightheadedness, difficulty breathing, headaches, or any other objective or subjective effect identified by the subject.

Based at least in part on the provided therapy and the measured or determined effects of the therapy (e.g., the changes in glucose level attributed to the therapy), the control system 4710 may autonomously determine a modification to one or more control parameters. For example, the control system may modify Tmax value used by the control algorithm (or the PK model used in the control algorithm), for example, to improve the effect of a subsequent therapy that may be provided to the subject. As such, the directional modification (e.g., increase or decrease) of a control parameter value may depend on the measured or determined effect of the therapy provided based on the initial or prior value of a control parameter. Moreover, the directional modification of the control parameter value may depend on a difference between the determined or measured effect of the blood glucose therapy and an expected effect of the blood glucose therapy (e.g., calculated based on PK model). In some examples, the directional modification of a control parameter may be determined based on the amount of therapy doses provided and/or measured BGL of the subject, during and between one or more previous therapy deliveries.

In some examples, the pharmacodynamic delay for a subject may be a known value. In these examples, the amount of absorbed insulin in the subject's blood may be estimated based on the measured value of BGL received from a glucose sensor. In some such examples, the directional modification may depend on the difference between calculated value of absorbed insulin based on a PK model (e.g., bi-exponential PK model) with a selected value of Tmax, and the estimated value of the absorbed insulin based on the measured value of BGL received from a glucose sensor.

Using the modified control parameter, the system 4710 may determine therapy to deliver to the subject 4712 at a therapy delivery time. As with the initial control parameter, therapy may be delivered during one or more therapy delivery times based on the modified control parameter. The system may determine the effect of the therapy delivered based on the modified control parameter using one or more of the embodiments previously described with respect to the therapy delivered using the initial control parameter.

In some examples, the control system can compare the measured, determined or reported effects (e.g., physiological effects) from the therapy delivered using the initial value of a control parameter and those from the therapy delivered using the modified value of the control parameter. Based on the comparison, the control system may determine which values of the control parameter is preferable for the subject.

In some examples, the comparison may be performed in real-time, or substantially in real-time. Further, the comparison may be performed by the system 4710 without user interaction. The comparison may be performed using a comparison method and based on one or more comparison criteria.

The comparison method may be based on finite number of therapy effects determined or measured at discrete times or based on continuous temporal variations of an effect over a period. In some examples the comparison method may involve statistical analysis of the measured or determined effects resulting from usage of the initial value and modified value of the control parameter. The comparison criterion may be based on the effects or based on the temporal variations of the effects over a period. For example, the preferable control parameter value can be a value that causes the glucose level of the subject to stay within a desired range or closer to a setpoint level for the subject. Accordingly, the system can set or maintain the control parameter to have the value that generated glucose levels that are closer to the desired range or setpoint for the subject for subsequent therapy.

In some cases, the system 4710 may repeat the process for different control parameter values enabling the system to refine the glucose level control for the subject over time. In subsequent performances of the process, the initial control parameter value may not be an initial value but may be the most recent selected value for the control parameter based on the determined effects of the control parameter.

In some cases, the determination of a second or modified value for a control parameter, or the modification of the control parameter may be triggered based on a glucose level of the subject not satisfying a threshold. Alternatively, or in addition, a process of modifying a control parameter value may be triggered based on a difference between an expected glucose value of a subject and an expected glucose value of a subject after the administering of therapy exceeding a threshold.

Using the embodiments described herein, the value of a control parameter may be autonomously modified without interaction by a subject or user with the glucose level control system. In other words, the glucose level control system can automatically adjust and/or refine a control parameter used by a control algorithm for glycemic control of the subject.

As previously described, the glucose level control system may provide both insulin therapy and counter-regulatory agent therapy to a subject. In some cases, the glucose level control system may only provide insulin therapy. In some such cases, the glucose level control system may output an indication of an amount of counter-regulatory agent that may or should be administered to the subject based on a detected condition of the subject.

The active control parameter value used by the control parameter may remain active until a subsequent occurrence of the therapy modification process. In some cases, performance of the therapy modification process is continuously performed with the control parameter value being modified based at least in part on a determined effect of the prior control parameter value. In some cases, the therapy modification process is performed until the determined effect of the therapy satisfies a desired threshold (e.g., when the detected glucose level is within a threshold of a setpoint or median setpoint value). In some cases, the therapy modification process is performed a set amount of times and the control parameter value that provides the best outcome (e.g., closes to desired glucose level) is set as the active control parameter for subsequent therapy. In some cases, providing therapy at different sites on the subject's body (e.g., back, stomach, leg, or arm) may result in different blood glucose absorption rates (associated with different PK delays). Thus, in some such cases, the therapy modification process may be performed each time the infusion set used to deliver the therapy is moved to a different site on the subject.

Example Automated Glucose Level Control Refinement Process

Figure 55:
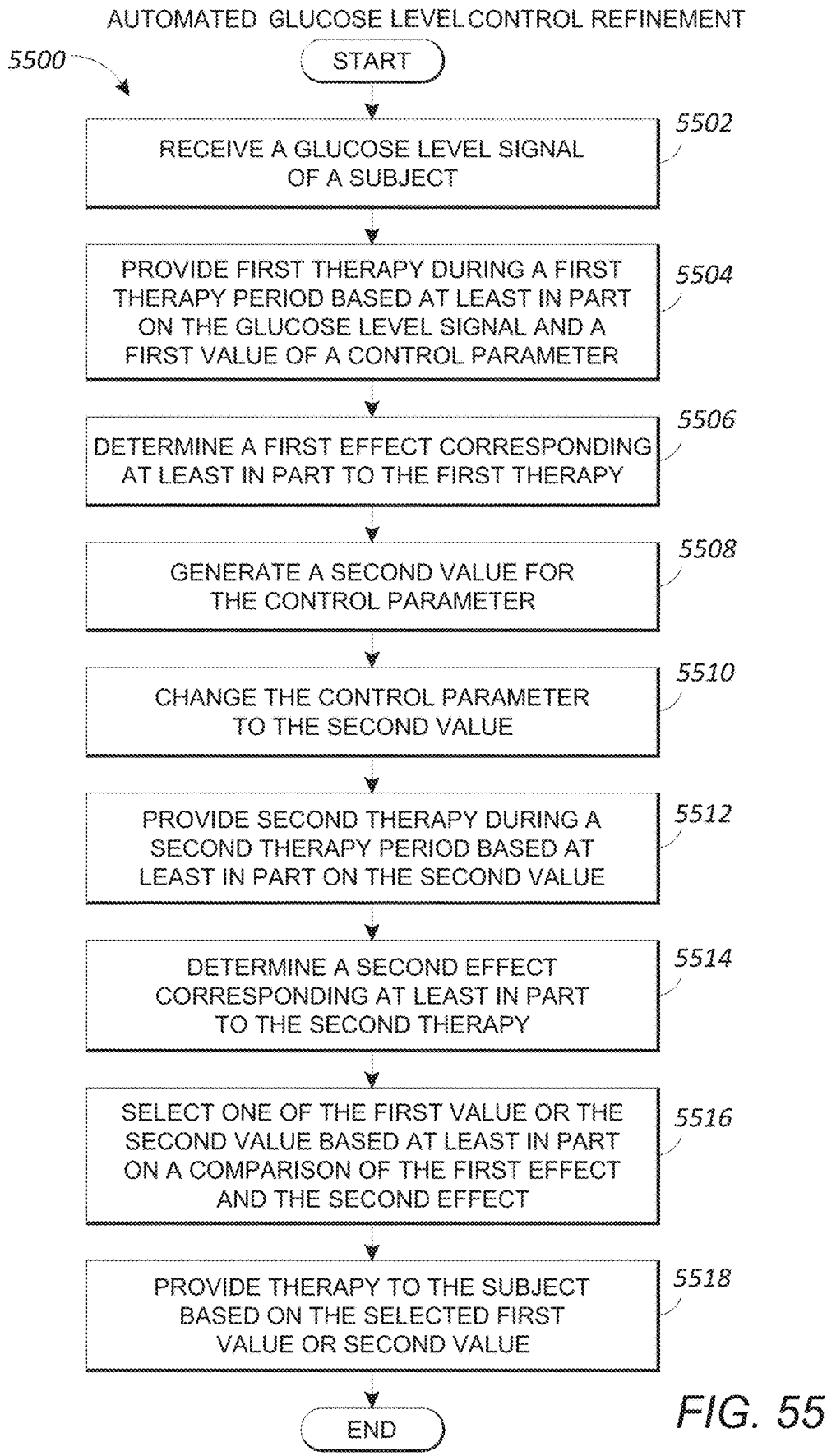
FIG. 55 presents a flowchart of an example automated glucose level control refinement process in accordance with certain embodiments.

FIG. 55 presents a flowchart of an example automated glucose level control refinement process in accordance with certain embodiments. The process 5500 may be performed by any system that can autonomously and/or automatically modify a control algorithm and/or a control parameter that affects execution of the control algorithm based on feedback (e.g., from a glucose level signal) relating to therapy administered to a subject 4712. For example, the process 5500 may be performed by one or more elements of the glucose level control system 4710. In some cases, at least certain operations of the process 5500 may be performed by a separate computing system that receives glucose level data from the glucose level control system 4710. Although one or more different systems may perform one or more operations of the process 5500, to simplify discussions and not to limit the present disclosure, the process 5500 is described with respect to particular systems.

The process 5500 may be performed automatically and without user interaction. In some cases, a user may trigger the process 5500 via a command or interaction with a user interface. However, once the process 5500 is triggered, the process 5500 may be performed automatically. Further, the process 5500 may be performed continuously, periodically, or in response to a trigger. The trigger may be time based and/or based on a measurement of the glucose level of the subject. For example, the trigger may correspond to a determination that a glucose level of a subject differs by more than a threshold from a predicted glucose level that is predicted by a glucose level control algorithm based on the administering of medicament. Further, the trigger may be based on the activation or first time use of the glucose level control system 4710 by the subject 4712.

The process 5500 begins at block 5502 where the glucose level control system 4710 receives a glucose level signal corresponding to the glucose level of a subject 4712. The glucose level signal may be received from a glucose sensor capable of measuring the level of glucose in the blood of the subject. For example, the sensor may be a continuous glucose monitoring (CGM) sensor. The block 5502 can include one or more of the embodiments previously described with respect to the block 802 or 5102.

At block 5504, the glucose level control system 4710 provides a first therapy during a first therapy period to the subject 4712. The first therapy may be based at least in part on the glucose level signal and a first value of a control parameter. The control parameter may include any control parameter that affects operation of the glucose level control system 4710 and/or performance of a control algorithm of the glucose level control system 4710. The control algorithm may include any control algorithm used to determine a dose of medicament (e.g., insulin) to administer to the subject 4712. In other words, the controller 4718 or the processor 4730 may use the control algorithm to generate a dose control signal based at least in part on a value (e.g., the first value of the block 5504) of the control parameter to cause the delivery device 4714 to administer a dose of insulin or other medicament.

In some cases, the control algorithm may be based on the PK model (equation 2). Further, in some cases, the control parameter may be Tmax, which may be calculated using equation 3. In some cases, the control parameter may be $T_{1/2}$, which may relate to the amount of time for the dose of insulin in the blood stream to drop to ½ of the maximum concentration in the blood attributable to the dose administered to the subject 4712. In some cases, the control parameter corresponds to a time until insulin within blood plasma of the subject reaches a particular concentration level subsequent to administration of an insulin dose. Moreover, in some cases, the control parameter may be a parameter that affects the determination of Tmax, such as one or more of the time constants $\alpha 1$ and $\alpha 2$. In some implementations, the control parameter may be used by the control algorithm to account for and/or determine an accumulation of insulin (or other medicament) in the subject 4712 and/or a rate of diminishment of the insulin (or other medicament) in the subject 4712. In some cases, the control parameter may be used to control an insulin dosing response of the control algorithm to a glucose level excursion in the subject as indicated by the glucose level signal received at the block 5502.

In some instances, the control parameter may relate to at least one time constant used in a calculation of an accumulation of insulin in the subject by the control algorithm, such as one or more of the time constants $\alpha_1$ and $\alpha_2$ that may be used in the calculation of Tmax. In some cases, the control parameter may correspond to a rate of insulin diminishment in the subject 4712. In some cases, the control parameter may relate to a target setpoint or a target setpoint range for maintaining or attempting to maintain the subject's 4712 glucose level.

The first therapy may correspond to a single administering of insulin to the subject 4712. This single administering of insulin may be any type of insulin administered for any reason. For example, the insulin dose may be a basal insulin dose, a priming dose, a dose supplied in response to a meal announcement, or a correction dose of insulin. Moreover, the first therapy may be medicament other than insulin, such as counter-regulatory agent (e.g., glucagon). In some cases, the first therapy may be a plurality of medicament (e.g., insulin and/or counter-regulatory agent) doses supplied or administered to the subject 4712 over the first therapy period. Further, the plurality of medicament doses may include a variety of types of medicament doses, such as one or more basal doses, one or more meal doses associated with one or more meal announcements, one or more corrective doses, etc.

The first therapy period may be a time period that corresponds to a single medicament dose. Alternatively, the first therapy period may be a time period that encompasses a plurality of medicament doses. Further, the time first therapy period may be a time period associated with a defined length of time. Alternatively, or in addition, the first therapy period may be defined based on a number of medicament delivery periods. In other words, the time period may vary based on the amount of time it takes to deliver or administer a specified number of doses of medicament (of any type or of a particular type).

The first value may be selected based on a prior therapy or a prior performance of the process 5500. In some cases, the first value is selected based on a baseline value. The baseline value may be associated with clinical data, or it may be determined based on initial operation of the glucose level control system 4710 for some period of time before performance of the process 5500. Alternatively, or in addition, the first value may be selected based on clinical data or a particular prescription for the subject 4712. In some cases, the first value may be based on clinical data for average users or average users that share certain physiological data with the subject 4712. In some cases, the first value is determined based on a healthcare provider's assessment of the subject 4712. Further, the first value may be determined based on an infusion site (e.g., back, stomach, leg, etc.) for the glucose level control system 4710. In some cases, the first value may be selected based on demographics or characteristics of the subject 4712. For example, the first value may be based on the subject's 4712 gender, weight, body mass, or age.

At block 5506, the glucose level control system 4710 determines a first effect corresponding, or attributable, at least in part to the first therapy. Determining the first effect may include receiving a glucose level signal from the glucose level sensor operatively connected to the subject. This glucose level signal may be a subsequent or updated glucose reading that is more recent than the glucose level signal received at the block 5502. The glucose level signal received at the block 5502 may be used to determine therapy to administer to the subject 4712 and the glucose level signal received at the block 5506 may be used to determine a result of the administered therapy. It should be understood that glucose level signals may be received continuously or periodically and can be used to both determine therapy to administer and to determine the effect of the administered therapy.

In some cases, determining the first effect may include analyzing glycemic control of blood glucose in the subject as indicated by the glucose level signal. Analyzing the glycemic control of the blood glucose in the subject may include tracking the glucose level of the subject 4712 over time. Further, analyzing the glycemic control of the blood glucose in the subject may include comparing the glucose level of the subject 4712 over time to a predicted glucose level for the subject 4712 over time as predicted based on the PK model used in the control algorithm using the selected value for the control parameter. As mentioned above, in some examples, the measured glucose level of the subject 4712 over time may be used to calculate the accumulation and/or diminishment of the insulin level in subject's blood. In these examples, analyzing the glycemic control of the blood glucose in the subject may include determining whether, or to what degree, the calculated accumulation and/or diminishment of insulin (or other medicament) using the PK model (e.g., bi-exponential PK model) and the control parameter values used in the control algorithm matches the accumulation or diminishment of insulin (or other medicament) estimated based on the measured glucose level (e.g., obtained from the CGM sensor). In some cases, the first effect may, at least partially, be determined by analyzing one or more signals received from one or more subject sensors that measure one or more physiological parameters of the subject (e.g., heart rate, temperature and the like).

In yet other examples, the first effect may be determined based on an input received from the subject (e.g., using a user interface of the AMD). In some cases, the first effect may be determined based at least in part on an assessment or input provided by the subject 4712 (e.g., using a user interface) with respect to the first value or the first effect. For example, if the subject 4712 feels woozy, dizzy, lightheaded, nauseous, or otherwise uncomfortable during the first therapy period, the subject 4712 may, via, for example, a touchscreen display of the AMD, indicate how the subject 4712 is feeling.

At block 5508, the glucose level control system 4710 generates a second value for the control parameter. This second value may be autonomously determined. Further, in some cases, the second value may be automatically determined. In some cases, the second value is determined based at least in part on a user triggering the glucose level control refinement process 5500. In some such cases, the control system may determine the second value and present it to the user via a user interface circuitry 4734 of the control system 4710.

In some other examples, the second value may be obtained from a user interface 4734 of the glucose level control system 4710 (e.g., in response to a user interaction with the user interface). In some examples, the second value may be obtained from a computing system that is connected to or otherwise in communication with the glucose control system. The communication connection may be a wired or wireless connection. Further, the wireless connection may be a direct connection (e.g., via Bluetooth or other near-field communication technologies) or a connection over a network (e.g., a local area network, a wide area network, a cellular network, etc.).

The second value may be an increase or decrease of the control parameter compared to the first value. The second value may be limited to a particular maximum change from the first value. Further, the second value may be selected based at least in part on the first effect. For example, if the first effect corresponding to the first value results in glucose level being near an upper range of the setpoint range, the second value may be selected in an attempt to being the glucose level closer to the middle of the setpoint range. Further, the second value may be selected based at least in part on characteristics of the subject 4712, such as age, weight, gender, or any other characteristics that may affect blood glucose management. In some examples, the second value may be selected based at least in part on the first effect determined based on an assessment provided by the subject 4712, in an attempt to reduce the symptoms felt by the subject 4712.

In some cases, the second value of the control parameter may be generated based at least in part on a baseline value of the control parameter and an output of a function defined based on glycemic control of the subject. In some examples, the glycemic control of the subject may include the measured value of the glucose level in subject's blood (e.g., provided by the CGM) and/or the amount of therapy (e.g., dose of insulin or counter-regulatory hormone) provided during the first therapy period. The baseline value of the control parameter may correspond to the first value used to provide therapy at the block 5504. This baseline value may be a last known optimal value for the subject prior to any changes to the subject (e.g., change in weight, insulin type, or metabolism changes, etc.). Alternatively, or in addition, the baseline value may be a value determined by a healthcare provider. In some cases, the second value of the control parameter is based at least in part on glycemic control indicated by the glucose level signal.

In some cases, the second value may be a modification to Tmax or $T_{1/2}$. It should be understood that Tmax and/or $T_{1/2}$ may, at least in part, be based on the physiology or biochemistry of the subject 4712. Thus, the setting of either Tmax or $T_{1/2}$ for the setting of the first value and the second value may refer to setting a parameter of the control algorithm or the PK model used by the control algorithm, representative of or corresponding to Tmax and/or $T_{1/2}$. For example, the setting of the first value and the second value may include setting one or more control parameters that may be used to determined or estimate Tmax and/or $T_{1/2}$ for the subject 4712. However, the set value may differ from the actual value of Tmax and/or $T_{1/2}$ for the subject 4712. Further, as Tmax and/or $T_{1/2}$ may vary for different subjects, it is not always possible to explicitly set or determine Tmax and/or $T_{1/2}$ for a subject. Instead, Tmax and/or $T_{1/2}$ may be estimated or determined by comparing the effects and/or glucose levels determined for different control parameter values that correspond, at least in part, to Tmax and/or $T_{1/2}$ Using the process 5500, the control parameter may iteratively approach the actual Tmax and/or $T_{1/2}$ for the subject 4712, or within a threshold of the actual Tmax and/or $T_{1/2}$ for the subject 4712. Alternatively, using the process 5500, the control parameter (such as one or more of the time constants $\alpha_1$ and $\alpha_2$) may iteratively approach a value that corresponds to the actual Tmax and/or $T_{1/2}$ for the subject 4712.

At block 5510, the glucose level control system 4710 changes the control parameter to the second value. Changing the control parameter to the second value causes a change in the operation or execution of the control algorithm. This change in the execution of the control algorithm may result in a change in one or more factors associated with the provisioning of therapy to the subject 4712. For example, the changing in the execution of the control algorithm may result in a change in an amount of medicament delivered, a timing of the delivery of the medicament, a rate at which a dose of medicament is delivered to the subject 4712, a target setpoint or target range for the glucose level (e.g., blood glucose level) of the subject, a threshold used in determining whether to deliver medicament (e.g., a threshold difference from the target setpoint), or any other factor that may affect therapy delivered to the subject 4712.

At block 5512, the glucose level control system 4710 provides second therapy during a second therapy period to the subject 4712. The second therapy is based at least in part on the updated control parameter that is updated to the second value at the block 5510. As with the first therapy, the second therapy may refer to one or a plurality of medicament doses. Further, the second therapy period may refer to a specific amount of time, an amount of time to deliver a particular number of medicament doses, or a particular number of medicament doses. In some cases, the block 5512 may include one or more of the embodiments described with respect to the block 5504 but using the second value for the control parameter over the second therapy period. In some examples, the duration of the second therapy period may be equal to the duration of the first period. In some other examples, the number of therapies delivered during the second therapy period may be equal to the number of therapies delivered during the first second therapy period.

At block 5514, the glucose level control system 4710 determines a second effect corresponding at least in part to the second therapy. The block 5514 may include one or more of the embodiments described with respect to the block 5506, but with respect to the second therapy.

At block 5516, the glucose level control system 4710 selects one of the first value or the second value based at least in part on a comparison of the first effect and the second effect. The comparison of the first effect and the second effect may be performed autonomously without action by a user. The glucose level control system 4710 may select the one of the first value or the second value to be a current or active value for the control parameter based on whether the first effect or the second effect results in improved care (e.g., closer to a desired setpoint for a greater period of time, or less volatility in glucose level values, or any other factor that a healthcare provider may use to evaluate the success of diabetes management) for the subject 4712. In some cases, the glucose level control system 4710 selects a third value to the current or active value for the control parameter. The third value may be selected based on the comparison of the first effect and the second effect. For example, if it is determined that the first effect is preferable to the second effect, the third value may be selected based on a change to the first value in the opposite direction as the change made to the first value to obtain the second value. For instance, if in the prior example, where it is determined that the first effect is preferable to the second effect, the first value corresponded to a Tmax of 60 minutes, and the second value was selected to correspond to a Tmax of a longer time period (e.g., 65 or 70 minutes), the third value may be selected to correspond to a Tmax of a shorter time period (e.g., 50 or 55 minutes).

Comparing the first effect and the second effect may include determining whether the first value or the second value brought the subject's 4712 glucose level closer to a target setpoint and/or maintained the subject's 4712 glucose level within a target range for a longer period of time. In some cases, comparing the first effect and the second effect may include determining whether the first value or the second value resulted in a more stable glucose level for the subject 4712 or less volatility in the glucose level of the subject 4712. In some cases, comparing the first effect and the second effect may include determining whether the first value or the second value resulted in more and/or greater excursions of the subject's 4712 glucose level from a target glucose level range.

Comparison of the first effect and the second effect may be performed in real-time or substantially in real-time accounting for the processing speed of the hardware processor 4730 or the glucose level control system 4710. Thus, in some cases, the comparison of the first effect and the second effect may be performed upon determination of the second effect.

In some embodiments, the comparison of the first effect and the second effect may include a statistical comparison or statistical analysis of the first effect and the second effect. In some cases, the comparison of the first and second effects may include determining whether the second therapy produced a statistically significant improvement in therapy (e.g., glycemic control) compared to the first therapy. A statistically significant improvement may vary depending on the subject or the condition of the subject. The comparison can also include a determination of whether there was a statistically significant increase in risk factors (e.g., hypoglycemia) during the second therapy period compared to the first therapy period. In some embodiments, a statistically significant improvement may be an improvement determined based on a first statistical analysis of a set of data associated with the first effect and a second statistical analysis associated with the second set of data associated with the second effect. For examples, the first and second statistical analysis may include calculating the mean and variance of the glucose levels measured during the first and second therapy periods, respectively. In some examples, an improvement may be determined by comparing the mean value and the variance of the glucose levels measured during the first and second therapy periods. In some examples, an improvement may be determined by comparing the mean value and the variance of the glucose levels measured during the first and second therapy periods with one or more reference values. The reference values may be values provided by a health care provider or a user and may be stored in the memory 4740 of the glucose level control system 4710. In some examples, the first and second therapy period may be long enough to include a plurality of therapy deliveries (e.g., infusion of glucose and/or glucagon) during each period. In some embodiments, an improvement may be determined by comparing by other statistical quantities calculated at least in part based on the glucose levels measured during the first and second therapy periods. In some such embodiments the statistical quantities may be specific statistical quantities defined for comparing the effects of a therapy (e.g., medicament delivery for controlling the glucose level in a subject).

In some cases, the first and/or second may be output to user (e.g., the subject or a parent) via a user interface of the glucose control system and/or a computing system (e.g., a smartphone, laptop, personal computer, or the like). In some examples, the user may use the determined effect to adjust the value of a control parameter.

In some cases, the value that better manages the subject's 4712 blood glucose may be output to a user (e.g., the subject or a parent). The user may then configure the glucose level control system 4710 based on the selected control parameter value. Alternatively, or in addition, the glucose level control system 4710 may automatically modify the value of the control parameter. In some cases, the user may be provided with an opportunity to confirm the modification. In some cases, the modification may occur automatically without confirmation. However, the modification may be presented to the user (e.g., the subject or a healthcare provider) and/or logged in a therapy log.

In some cases, the comparison is performed by another computing system that is in communication with the glucose level control system 4710. For example, the glucose level control system 4710 may transmit the glucose level signal, data determined from the glucose level signal, and/or the assessment received from the subject, indicative of the effect of the glucose level control, to another computing system, such as a local computing system, a smartphone, or a cloud-based computing system. Further, the glucose level control system 4710 may transmit data associated with the control parameters values and the administering of medicament to the subject 4712 to the computing system. The computing system may determine the value of the control parameter that better manages the subject's 4712 glucose level. The computing system may configure the glucose level control system 4710 with the selected value. Alternatively, or in addition, the selected value may be output to a user who can configure the glucose level control system 4710 with the selected value.

At block 5518, the glucose level control system 4710 provides therapy to the subject 4712 based on the selected value for the control parameter that is selected at the block 5516. The therapy provided at the block 5518 may be provided during a third therapy period that is at some point after the first and second therapy periods. Thus, during the first two time periods, the first and second values may be used, respectively, for the control parameter to determine the value that results in the better outcome or improved care for the subject 4712. During subsequent time periods, the value that resulted in the better outcome for the subject 4712 may be used to provide future care for the subject 4712. Alternatively, a new value that is neither the first or second value may be used to provide subsequent care in an attempt to find a value for the control parameter that may provide a better or improved level of care (e.g., closer to a desired target glucose level for a longer period of time) for the subject 4712.

In some examples, providing therapy to the subject, may include generating a dose control signal to a delivery devices 4714 (e.g., infusion pump coupled by catheter to a subcutaneous space of the subject 4712) that delivers an amount of a medicament (e.g., insulin or a counter-regulatory agent) to the subject wherein the amount may be determined by the dose signal.

Providing therapy to the subject 4712 based on the selected value may include configuring the glucose level control system 4710 to provide therapy to the subject 4712 during a third therapy period based at least in part on the active control parameter value. In some cases, configuring the glucose level control system 4710 to provide therapy to the subject 4712 based at least in part on the active control parameter value may end the process 5500. In some cases, the process 5500 may be repeated. Repeating the process 5500 may include using the selected value (e.g., the first or second value from a prior iteration of the process 5500) as the first value when performing the operations associated with the block 5504. The second value generated at the block 5508 may be a new value not used during the prior iteration of the process 5500.

The process 5500 may be repeated until a difference between the first effect and the second effect is less than a threshold difference. Alternatively, or in addition, the process 5500 may be repeated a particular number of iterations, periodically, in response to a command, or in response to determining that the subject's 4712 blood glucose does not satisfy a particular threshold for a particular amount of time.

In some examples, the process 5500 may be used to modify more than one control parameters of a glucose system (or a control algorithm used by the control system). In some such examples, the process 5500 may be used to adjust a first control parameter during a first modification period starting from block 5502 and ending at block 5518, and to adjust a second control parameter during a second modification period again starting from block 5502 and ending at block 5518. The second modification period may be immediately after the first modification period or delayed by a particular time. In some example, the control system may determine when a second control parameter should be modified following the modification of a first parameter. In some examples, the delay may be determined at least in part based on the measured glycemic control based on the glucose signal (e.g., received from a CGM sensor). In some other examples, the delay may be determined based on input received from a user. In some examples, the modification of the second control parameter may be at least partially determined based on the determined modification of the first control parameter.

In some examples, a third control parameter may be adjusted during a third time period after adjusting the first and the second control parameters. The adjustment of the third control parameter may immediately follow the adjustment of the second control parameter or may occur after a delay. The delay may be determined at least in part based on the glycemic control of the subject after the second control parameter is adjusted. In some examples, the glucose control system may be configured to sequentially adjust the first and second, or the first, second and third control parameters when the glycemic control of the subject satisfies one or more threshold conditions. In some examples, the duration of the time period during which a control parameter is adjusted may defer from that of the other parameters.

In some embodiments, a modified version of the process 5500 may be used to determine a value (e.g., an optimal value) of a control parameter. In some such examples, after determining the second effect at block 5514, the control system may skip block 5516 and block 5518, and instead obtain a third value for the control parameter. In some examples, this third value may be determined at least in part based on the determined second effect at block 5514. In some examples, this third value may be autonomously determined. Further, in some cases, the third value may be automatically determined. In some cases, the third value is determined based at least in part on a user triggering the glucose level control refinement process 5500. In some such cases the control system may determine the third value and present it to the user via a user interface 4734 of the control system 4710. In some examples, the third value may be provided by a user via a user interface 4734 of the control system 4710. In some examples, after obtaining the third value, the system may provide therapy to the subject based on the third value. This modified version of process 5500 may be repeated several times. In some examples, this modified version may be repeated until a difference between the last two subsequent effects is less than a threshold difference. Alternatively, or in addition, the modified version of the process 5500 may be repeated a particular number of iterations, periodically, in response to a command, or in response to determining that the subject's 4712 blood glucose does not satisfy a particular threshold for a particular amount of time.

As described, the process 5500 may be used to modify one or more control parameters that affect the delivery of insulin. However, the process 5500 is not limited as such and may be used to modify one or more control parameters that affect the delivery of other medicaments, such as counter-regulatory agent (e.g., glucagon, dextrose, etc.). In some cases, the process 5500 may be used to recommend a change in insulin and/or counter-regulatory agent delivery without modifying the delivery. This can be advantageous for generating recommendations regarding counter-regulatory agent in a single hormone glucose level control system 4710 that does not support counter-regulatory agent, or that supports the use of counter-regulatory agent, but does not have the counter-regulatory agent available.

Moreover, in cases where the process 5500 is used to modify multiple control parameters, the at least two or more of the control parameters may be related to each other. For example, if the control parameters include the time constants α1 and α2, there may be a relationship between $\alpha_1$ and $\alpha_2$ such that modifying α1 may cause a modification to α2. For instance, $\alpha_2$ may equal 1.5 times $\alpha_1$ The value for the control parameter set as the active parameter (e.g., the first value or the second value) at the block 5516 may be used by the control algorithm to provide therapy to the subject 4712 for a particular period of time or until the process 5500 is repeated. As previously explained, in some cases, the process 5500 is repeated periodically and/or in response to a trigger, such as a blood glucose value or an average blood glucose value over a time period, or an indicate of a site change for the connection of the glucose level control system 4710 to the subject 4712 (e.g., a change in the location of the infusion set used to provide the subcutaneous dose).

HYPOTHETICAL EXAMPLE

As previously described, the peak time of absorption of insulin may be referred to as Tmax. Different types of insulin may result in different amounts of time until peak absorption into the subject's blood or for different subjects. For example, in one hypothetical example, the aggregate Tmax among subjects for the fast-acting insulin lispro and insulin aspart may be determined to be approximately 65 minutes, while the aggregate Tmax among subjects using ultra-fast-acting insulin, such as, for example, the insulin aspart injection marketed under the Fiasp brand, which has a formulation to decrease time to peak absorption, may be determined to be approximately 40 minutes. When using an automated glucose level control system (such as the glucose level control system 4710) with a control parameter corresponding to Tmax set to 65 minutes, there may be no statistically significant improvement in the average glucose level or the frequency of hypoglycemia when using the ultra-fast-acting insulin compared to using the fast-acting insulin. In this comparison, Tmax is held constant while varying the type of insulin used.

When adjusting the value of the control parameter for the automated glucose level control system to use different Tmax settings, in a hypothetical example, mean glucose drops when Tmax is lowered when using the ultra-fast acting insulin. In this example, three cohorts of subjects employ control algorithms that use modified Tmax values when using a glucose level control system with ultra-fast-acting insulin such as Fiasp. The first cohort uses a glucose level control system configured with a Tmax of 65 minutes for a first week of therapy and a lower Tmax (such as, for example, 50 minutes) for a subsequent week of therapy. The second cohort uses the glucose level control system configured with a Tmax of 65 minutes for the first week of therapy and an even lower Tmax (such as, for example, 40 minutes) for a subsequent week of therapy. The third cohort uses the glucose level control system configured with a Tmax of 65 minutes for the first week of therapy and a sharply lower Tmax (such as, for example, 30 minutes) for a subsequent week of therapy. Comparison of the change in Tmax within each cohort and across cohorts demonstrates that the mean glucose level drops when Tmax is lowered, and there is no statistically significant increase or decrease in hypoglycemia.

When Tmax is shorter than physiological insulin absorption peak time, there is an increased risk of hypoglycemia because the glucose level control system may stack or administer multiple doses of insulin within a time period. This may occur because the glucose level control system may incorrectly identify a lower blood glucose concentration as a maximum glucose level concentration when Tmax is set below the actual peak insulin absorption time.

By using the process 5500 to compare the effect of different Tmax settings, it is possible to optimize the Tmax setting for a subject and/or a particular type of insulin. In some examples, the comparison may be based on one or more statistical methods. For example, using the glucose concentration data collected during a therapy period (e.g., using a CGM sensor), the control system may determine whether there is a statistically significant difference in mean glucose level during a later period using a different Tmax value compared to an earlier evaluation period. If the subsequent or newer value used for Tmax results in an improved effect, Tmax or a control parameter of the glucose level control system 4710 corresponding to Tmax may be set to the newer value, where the change in the control parameter value may occur automatically upon determination of a statistically significant improvement or may occur after generating a notification of the potential improvement and receiving confirmation that the change in control parameter value should occur. After collecting glucose signals of the subject 4712 for a period of time at a default or prior value for Tmax, the value for Tmax may be lowered by a significant amount from the initial Tmax. For example, the control algorithm may automatically change Tmax or an associated time constant to reflect a Tmax reduction of at least 10 minutes, at least 5 minutes, at least 2 minutes, no more than 15 minutes, no more than 20 minutes, no more than 30 minutes, or by a change within a range spanning between any two of the preceding values in this sentence, where the preceding values are included in the range. The system can perform a statistical analysis between the prior data set associated with the higher Tmax, and the current data set associated with the lower Tmax. If the controller of the glucose level control system determines that there is a significant or statistically significant improvement (e.g., more than a threshold improvement) in the mean glucose level for the subject with little or no increase in hypoglycemia events or risk events, the system can adopt or recommend the lower Tmax value as the preferred Tmax. This process can be repeated using additional reductions in Tmax. In some cases, each reduction in Tmax may be smaller than the previous reduction. Moreover, if it is determined that there is a not an improvement in the mean glucose level for the subject and/or if there is an increase in hypoglycemia or hypoglycemia risk events, the system may use the prior Tmax or may select a Tmax between the new Tmax and the prior Tmax. Thus, using the process 5500, the system can iteratively modify Tmax to find an optimal value for the subject and/or the selected insulin type.

Moreover, by performing real-time analysis and optimization of one or more control parameters, maintenance of the subject's diabetes can be improved faster and more accurately compared to delayed analysis that may occur during clinical testing. Clinical testing may be less accurate as physiological changes in the subject may not be captured in real time.

In some cases, the real-time process and statistical analysis described above can be used to analyze other types of biomedical data obtained by one or more subject sensors (e.g., measuring one or more physiological parameters). In some such cases, the additional biomedical data, such as data may be received from a smartwatch (e.g., blood pressure, heart rate), from a weight sensor, or any other type of biomedical sensor. By adapting the process 5500 to perform statistical analysis of the additional biomedical data, it is possible to perform a quantitatively objective analysis of biometric data, which can be used by a healthcare provider to care for a subject.

Further, the outcomes of the comparative analysis described above may be used to make additional recommendations to the subject. For example, if it is determined that the actual Tmax for a particular type of insulin is higher than expected for the subject, it may be recommended that the subject modify his or her diet in a particular manner while using that particular type of insulin.

Example Simulations

Embodiments of an automated glucose level control system 4710 that can be adapted for use with embodiments of the present disclosure are described in International Publication No. WO 2015/116524, published on Aug. 6, 2015; U.S. Pat. No. 9,833,570, issued on Dec. 5, 2017; and U.S. Pat. No. 7,806,854, issued on Oct. 5, 2010, the disclosures of each of which are hereby incorporated by reference in their entirety for all purposes.

The automated glucose level control system 4710 can autonomously administer insulin doses and account for online accumulation of insulin doses ("insulin on board") due to the finite rate of utilization of the insulin. The rate the insulin absorption, and in turn accumulation, of insulin doses may be modeled by a pharmacokinetic (PK) model (e.g., the bi-exponential PK model represented by equation 2 with preset values of time constants $\alpha 1$ and $\alpha 2$). Of significant clinical significance in relation to the PK model is the time it takes for an insulin dose (e.g., administered subcutaneously) to be absorbed in subject's blood. In some examples, the peak time for insulin absorption in blood is referred to as Tmax. In some other examples, Tmax may be the time at which the concentration of insulin reaches its maximum value following the delivery of a specific dose of insulin. In some such examples, Tmax may be measured from the time that insulin is provided to the subject (e.g., subcutaneously using an infusion set).

In some examples, setting the time constants in the PK model (e.g., $\alpha_1$ and $\alpha_2$ in equation 2) may be equivalent to setting Tmax that is inherently assumed by the model; conversely, setting Tmax may set the time constants of the PK model. Since the values of the time constants may be used to determine the online calculation of the accumulation of insulin by a control system, the value of the time constants may consequently control the control system's insulin dosing response to a given glucose level excursion. Thus, varying Tmax or time constants associated with Tmax controls the aggressiveness of the control system's insulin doses.

In certain embodiments, the control system implements a method to adapt the control system's PK model's Tmax (hence time constants) setting online. This method may be performed either by the control system periodically making online assessments and calculations that produce recommendations of modifications in Tmax or by the control system autonomously modulating Tmax online. In either case, the calculations may be based on the control system's performance over some time period. In some cases, adaptations to Tmax online, whether autonomously occurring or issued as recommendations can be based on the glucose-control performance by the control system over some time interval, including trends in glucose level, mean glucose level, or extent and/or duration of low glucose level (hypoglycemia) and/or high glucose level (hyperglycemia) occurrence. Alternatively, the calculation can be based on the usage of a counter-regulatory agent, the otherwise intended usage of a counter-regulatory agent had it been available (e.g., in insulin-only systems or in cases where the counter-regulatory agent or its delivery channel are temporarily unavailable). The method can impose upper and/or lower (static or dynamic) bounds for the range over which the Tmax can vary. The degree of adaptation in Tmax for a given situation can be different depending, for example, on the specific insulin being administered by the control system.

In certain embodiments, the described method may be applicable regardless of whether the continuous glucose monitor (which can provide the input glucose signal to the control system) is online or offline. For example, the method disclosed herein can be applied to system described in International Publication No. WO 2015/116524. Further, the described method can coexist with other aspects of the system being activated or not, such as, but not limited to, having a glucose target that is adapted automatically by the system, e.g., as in the system described in International Publication No. WO 2017/027459, published on Feb. 16, 2017, which is hereby incorporated by reference herein for all purposes.

As previously described, the absorption of subcutaneously administered insulin into blood may be governed by the bi-exponential PK model of equation 2. Setting the time constants in the PK model may set a measure of the pending effect of the accumulated amount of insulin in the subcutaneously administered dose, as that can be taken to be the difference between the total area ($\int_0^\infty p(t)dt$, which can describe a measure of the total action over time due to a dose U0) and $\int_0^t p(t)dt$, which can represent a measure of the expended portion of U0. The peak time, Tmax, of the absorption of insulin doses into blood may be given by equation 3. Thus, setting Tmax may set the PK model time constants, which can directly govern the magnitude (e.g., aggressive or conservative) of the control system's online insulin dosing response to a given glucose profile. Although not limited as such, for simplicity, assume that $\alpha_1$ and $\alpha_2$ are related, e.g. $\alpha_2 = 1.5\ \alpha_1$.

Figure 56A:
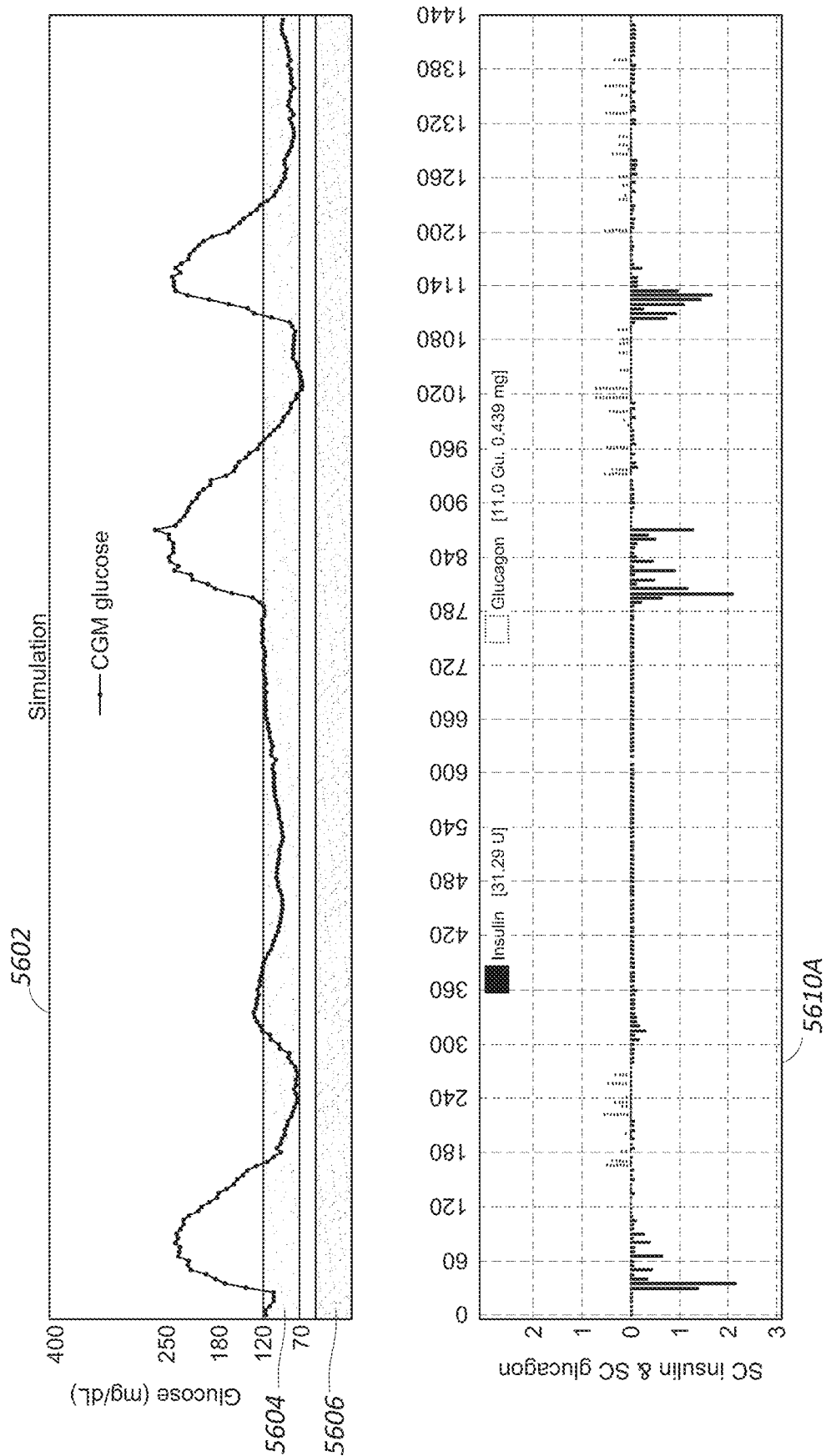
FIG. 56A illustrates a simulation of glucose level control of a subject with Tmax set to 65 minutes.
Figure 56B:
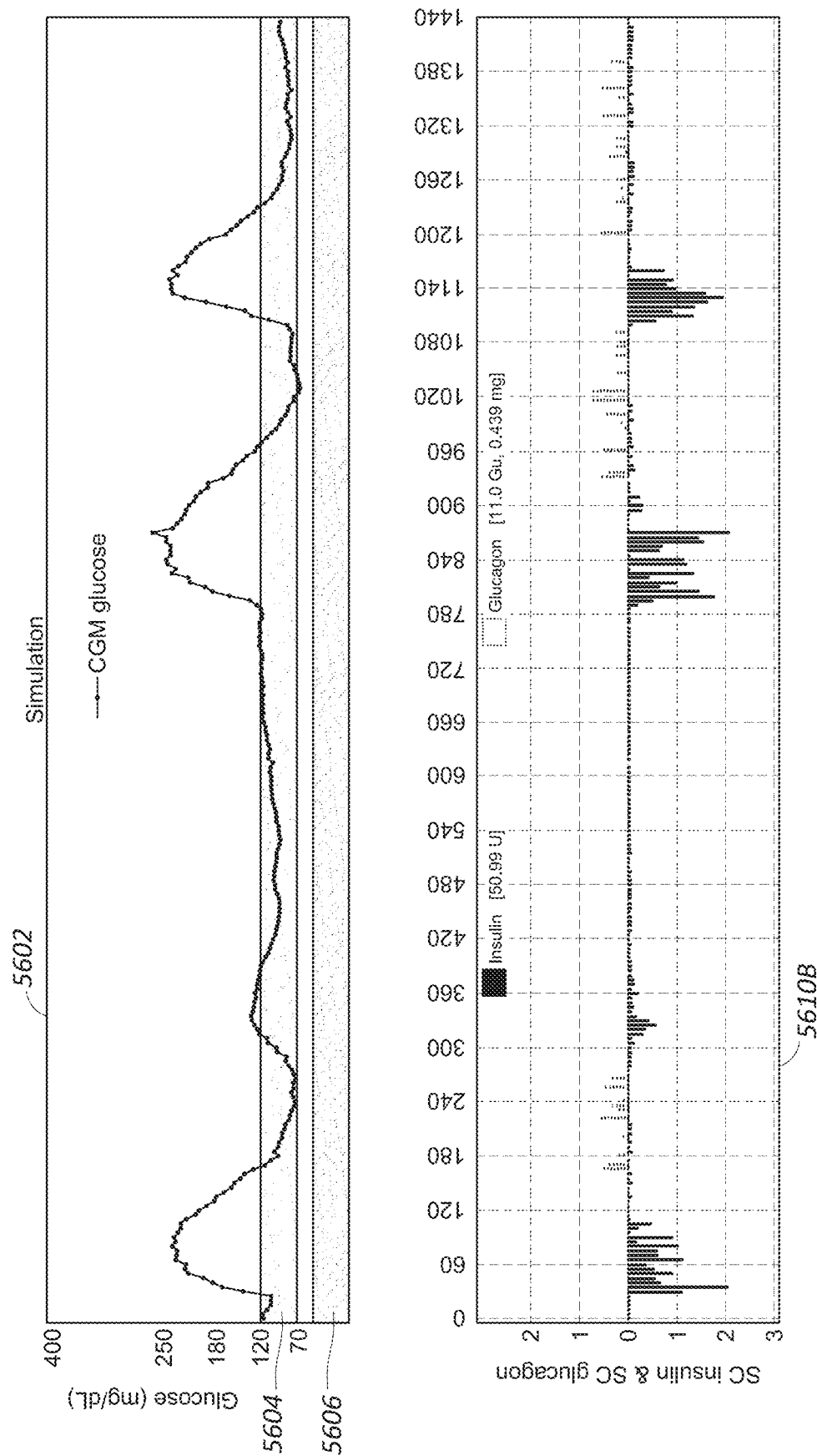
FIG. 56B illustrates a simulation of glucose level control of a subject with Tmax set to 15 minutes.
Figure 56C:
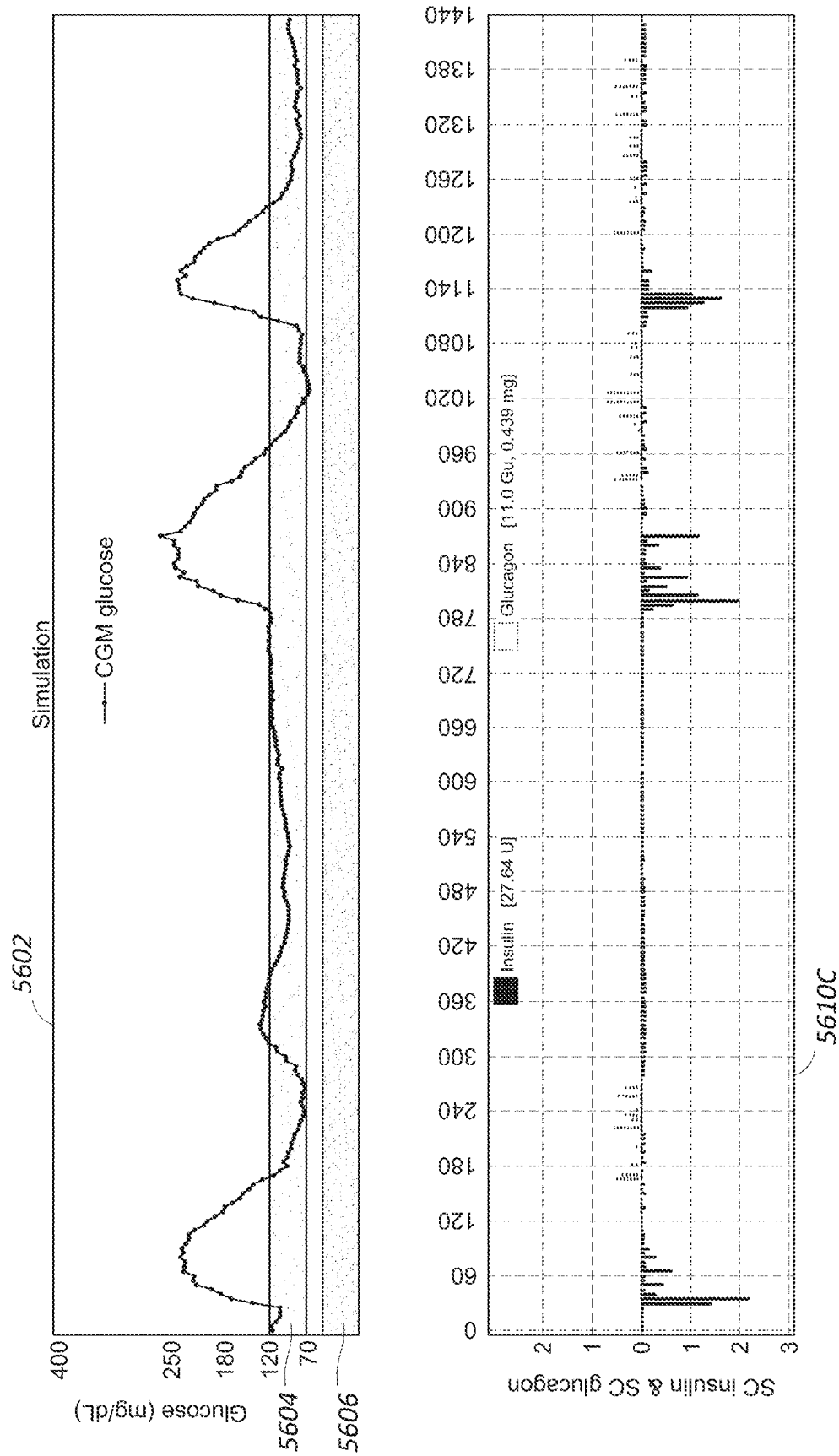
FIG. 56C illustrates a simulation of glucose level control of a subject with Tmax set to 130 minutes.

The bi-exponential PK model may be used to simulate the relation between a glucose profile and the medicament (e.g., insulin or glucagon) doses delivered to a subject. FIGS. 56A-56C illustrate a simulation demonstrating an effect that increasing or decreasing the Tmax setting, or value for a control parameter corresponding to Tmax, may have on the glucose level control system's 4710 online insulin and glucagon dosing response to a given glucose profile (e.g., temporal variation of glucose level over 24 hours).

FIG. 56A illustrates a simulation of glucose level control of a subject with Tmax set to 65 minutes. The graph 5602 illustrates the variation of glucose level (BGL) of a subject over 24 hours. The range 5604 indicates the desired target setpoint range (e.g., between 70 and 120 mg/dL) for the subject's glucose level. Further, the range 5606 indicates the range in glucose level (e.g., below 60 mg/dL) for the subject that is associated with hypoglycemia or a risk of hypoglycemia. The graph 5610A illustrates the administering of medicament (insulin or glucagon) to the subject over the same 24-hour time period as graph 5602 based at least in part on the glucose level variation illustrated in the graph 5602.

FIG. 56B illustrates a simulation of glucose level control of a subject with Tmax set to 15 minutes. The graph 5610B corresponds to the graph 5610A, but with Tmax set to 15 minutes instead of 65 minutes. As illustrated by comparing the graph 5610B to 5610A, reducing Tmax to 15 minutes may result in an increase in insulin dosing required to maintain the given glucose profile 5602.

FIG. 56C illustrates a simulation of glucose level control of a subject with Tmax set to 130 minutes. The graph and 5610C corresponds to the graph 5610A, but with Tmax set to 130 minutes instead of 65 minutes. As illustrated by comparing the graph 5610C to 5610A, increasing Tmax to 130 minutes may result in a decrease in insulin dosing required to maintain the given glucose profile 5602.

Even if the glucose profile of a subject is unchanged, increasing or decreasing insulin (or counter-regulatory agent) dosing may affect care of the subject 4712. For example, the subject may experience different degrees of symptoms (e.g., dizziness, nausea, etc.) attributable to maintenance of the subject's diabetes. Advantageously, autonomous optimization of one or more control parameters of a glucose control system, may reduce the amount and/or frequency of the medicament doses required to maintain a normal glucose profile.

The simulations illustrated in FIGS. 56A-56C illustrate one non-limiting example of the impact of modifying a control parameter of a glucose control system. In some cases, different dosing may subsequently lead to different glucose level excursions which in turn may vary the determined insulin-glucagon doses subsequently. Nonetheless, the simulations shown in FIGS. 56A-56C, demonstrate the correlation between Tmax as a control parameter and the determined medicament doses by the glucose level control system 4710 for each therapy. Further these simulations demonstrate that the determined therapy doses may be used as a feedback to adjust Tmax as descried below.

Example Automated Glucose Level Control Refinement Process

In some implementations, the value of Tmax can be varied automatically online based on glycemic control in a receding time period. For example, Tmax can be described using the following the equation:

$$T_{max}(k) = T_{max}^\circ + f(y_k, g_k), \quad (4)$$

where $T_{max}^\circ$ is a baseline value of Tmax, $f(y_k, g_k)$ is a parameter control adjustment function (herein referred to as adjustment function), based on glycemic control of the glucose signal, $y_k$, and/or the amount of counter-regulatory dosing, $g_k$, that is computed by the control system (whether delivered or not). Evaluation of $f(y_k, g_k)$ could be over a time period (e.g., one week, two weeks, four weeks or other time intervals). For example, $f(y_k, g_k) = \Sigma_{k-N}^k f(y_n, g_n)$. In some examples, k may represent a current therapy period and N may indicate a receding time period that may include one or more therapy periods.

The parameter control adjustment function $f(y_k, g_k)$ can cause an increase in $T_{max}(k)$ relative to $T_{max}^\circ$ for an increase in hypoglycemia (in severity and/or duration) or impending hypoglycemia in glycemic control of the glucose signal, $y_k$, over the receding time period (that may include one or more therapy periods) and, conversely, can cause a decrease in $T_{max}(k)$ relative to $T_{max}^\circ$ for an increase in hyperglycemia (in severity and/or duration) in glycemic control of the glucose signal, $y_k$, over the receding time period. Moreover, $f(y_k, g_k)$ can cause an increase or decrease in $T_{max}(k)$ relative to $T_{max}^\circ$ respectively for an increase or decrease in amount of counter-regulatory dosing, $g_k$, over the receding time period. The adjustment $f(y_k, g_k)$ to $T_{max}(k)$ can be evaluated and effected at discrete times, which can be at scheduled periodic intervals (e.g., once every 24 hours, once every three days, once a week, etc.), in response to a user command, or based on a physiological measurement of the subject. Alternatively, or in addition, adjustments can be evaluated and effected online when some metric satisfies a threshold or meets certain criteria within the current computation window (e.g., a week, a month, etc.). This criterion can include when hypoglycemia in $y_k$ reaches or crosses a certain threshold or the level of counter-regulatory dosing in $g_k$ reaches or crosses a certain threshold. Alternatively, or in addition, the adjustment can be effected after some evaluation related to the glucose signal $y_k$ (e.g., mean value) in the current computation window has attained a statistically significant difference from its evaluation in a preceding computation window (e.g., the week before). These described implementations allow for having dynamic instances that are mathematically determined online as to when $T_{max}(k)$ gets adjusted and/or the magnitude by which it is adjusted.

In some examples, therapy periods can be scheduled regular or periodic time intervals (e.g., 24 hour periods, two day periods, one week periods, etc.), based on a user command, or based on a physiological measurement of the subject. In some other examples, therapy periods may be defined as the time interval between two subsequent therapy deliveries, and each therapy period may be identified based on the therapy delivery time that marks the beginning of the therapy period. In either case, $f(y_k, g_k)$ may be the adjustment to $T_{max}$ for the $k^{th}$ therapy period and $f(y_k, g_k)$ may be evaluated based on the equation $f(y_k, g_k) = \Sigma_{k-N}^{k} f(y_n, g_n)$ wherein $y_n$ is the glucose signal measured during the $n^{th}$ therapy period, $g_n$ is the computed dose of a counter-regulatory hormone for the $n^{th}$ therapy period and N indicates the receding time period that may include one or more therapy periods. In some examples, N may be the number of the therapy periods receding the $k^{th}$ therapy period.

Figure 57:
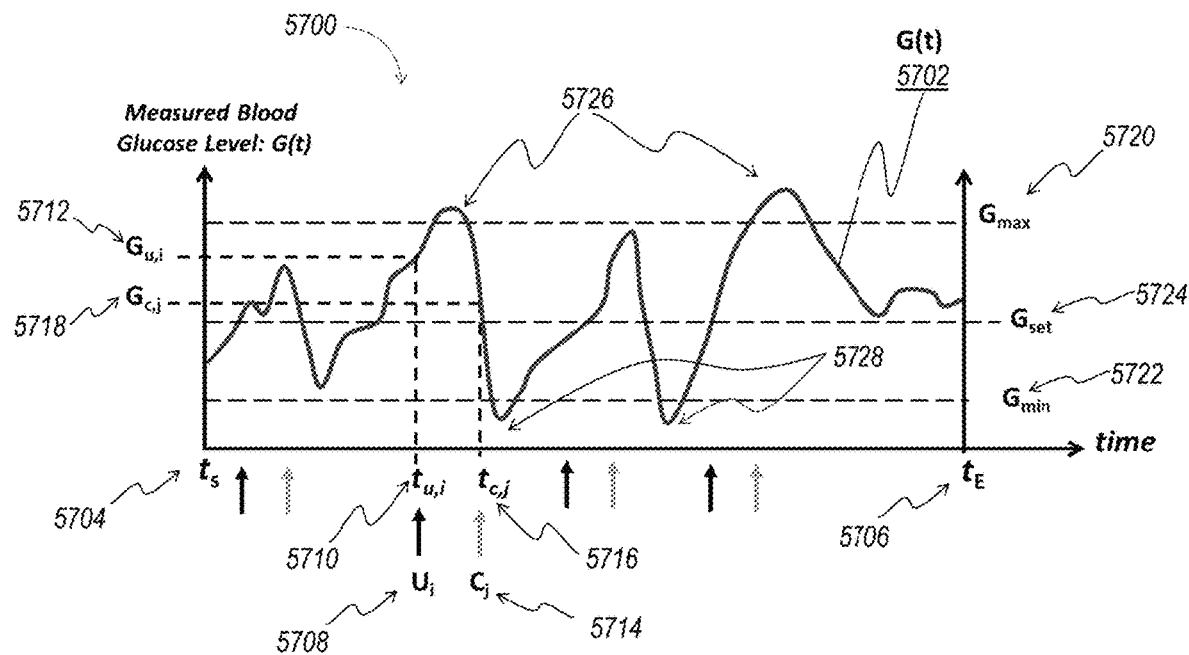
FIG. 57 illustrates an example of glucose level signal (CGM trace) and some of the parameters associated with glycemic control using a glucose level control system.

FIG. 57 is a plot 5700 that illustrates an example of glucose level signal G(t) 1502 (e.g., a CGM trace received from a CGM sensor) over a therapy period (starting from $t_S$ 5704 and ending at $t_E$ 5706) during which one or several doses of insulin and/or a counter-regulatory agent (e.g., glucagon) are determined and/or administered by the glucose control system 4710. For example, an insulin dose of $U_i$ 5708 units may be provided at time $t_{u,i}$ 5710 at a measured glucose level of $G_{u,i}$ 14712 (where i varies from 1 to the number of insulin deliveries between $t_S$ 5704 and at $t_E$ 5706). Similarly the control system may have calculated a dose of $C_j$ 14714 units, that may have been administered or not, a glucose level $G_{c,j}$ 14718 at which glucagon may have been delivered and the time $t_{c,j}$ 14716, at which glucagon may have been delivered, (where j varies from 1 to the number of glucagon deliveries between $t_S$ 5704 and at $t_E$ 5706). The control system may be configured to provide therapy in order to maintain the BGL within a normal range defined by an upper bound $G_{max}$ 5720 and a lower bound $G_{min}$ 5722 and close to a setpoint $G_{set}$ 5724. In some examples, the glucose levels above $G_{max}$ 5720 may indicate hyperglycemia and glucose levels below $G_{min}$ 5722 may be considered hypoglycemia. For example, during the therapy period shown in FIG. 57, two instances of hyperglycemia 5726 and two instances of hypoglycemia 5728 may be identified by the control system. In some examples, during each therapy period the control system may store G(t) 5702, $t_{u,i}$ 5710, $t_{c,j}$ 5716, $U_i$ 5708 and $C_j$ 5714, for all therapy deliveries (all values of i and j). In some examples, the value of one or more control parameters (e.g., Tmax, $G_{set}$) may not change during the therapy period between $t_S$ 5704 and $t_E$ 5706.

Figure 58:
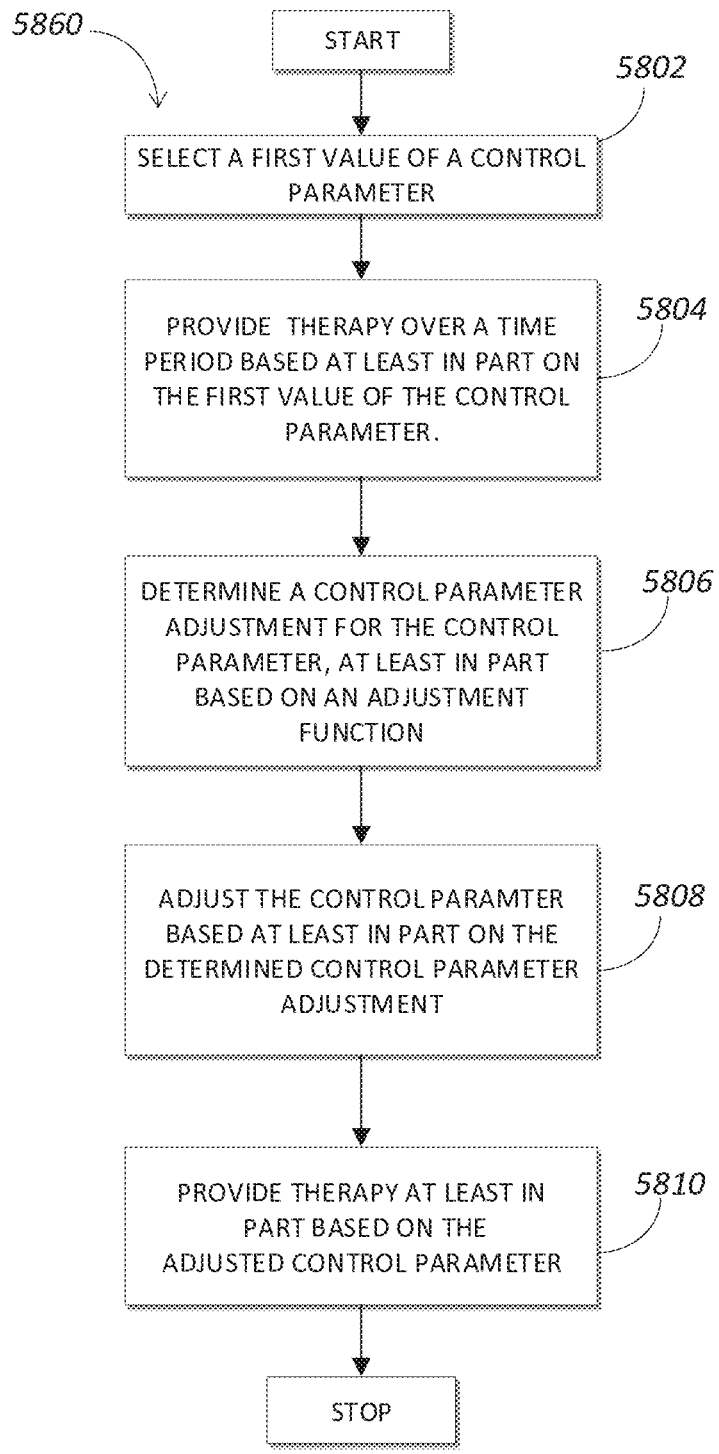
FIG. 58 presents a flowchart of an example automated glucose level control refinement process based on an adjustment function in accordance with certain embodiments.

FIG. 58 presents a flowchart of an example automated glucose level (e.g., blood glucose level) refinement process that may use the above-mentioned modification method to control Tmax and/or other control parameters of a glucose control system. The process 5800 may be performed by any system that can autonomously and/or automatically modify a control algorithm and/or a control parameter that affects execution of the control algorithm based on feedback (e.g., from a glucose level signal) relating to therapy administered to a subject 4712. For example, the process 5800 may be performed by one or more elements of the glucose level control system 4710. In some cases, at least certain operations of the process 5800 may be performed by a separate computing system that receives glucose level data from the glucose level control system 4710. Although one or more different systems may perform one or more operations of the process 5800, to simplify discussion and not to limit the present disclosure, the process 5800 is described with respect to particular systems.

The process 5800 may be performed automatically and without user interaction. In some cases, a user may trigger the process 5800 via a command or interaction with a user interface. However, once the process 5800 is triggered, the process 5800 may be performed automatically. Further, the process 5800 may be performed continuously, periodically, or in response to a trigger. The trigger may be time based and/or based on a measurement of the glucose level of the subject. For example, the trigger may correspond to a determination that a glucose level of a subject differs by more than a threshold from a predicted glucose level that is predicted by a glucose level control algorithm based on the administering of medicament. Further, the trigger may be based on the activation or first time use of the glucose level control system 4710 by the subject 4712.

The process 5800 begins at block 5802 where a first value is selected for a control parameter (e.g., a control parameter that may be adaptively modified) of the glucose control system 4710. For example, the control parameter can be a Tmax value used in the control algorithm of the glucose control system 4710. In some examples, Tmax may be related to one or more parameters in a PK model used by the control algorithm. As another example, the control parameter can be a setpoint (e.g., $G_{set}$ 5724 in FIG. 57) or the target value for the measured value of the blood glucose concentration of a subject 4712 (e.g., measured using a CGM sensor).

The first value of the control parameter may be selected based on a baseline value. The baseline value may be associated with clinical data, may be determined based on operation of the glucose level control system 4710 for some period of time before performance of the process 5800, or may be determined from a prior performance of the process 5800. Alternatively, or in addition, the baseline value may be selected based on clinical data or a particular prescription for the subject 4712. In some cases, the baseline value may be based on clinical data for average users or average users that share certain physiological data with the subject 4712. In some cases, the baseline value is determined based on a healthcare provider's assessment of the subject 4712. Further, the baseline value may be determined based on an infusion site (e.g., back, stomach, leg, etc.) for the glucose level control system 4710. In some cases, the baseline value may be selected based on demographics or characteristics of the subject 4712.

At block 5804, the glucose control system 4710 provides therapy over a time period to the subject 4712 based at least in part on the first value of the control parameter. Further, the therapy may be provided based at least in part on one or more glucose signals received during the time period. The glucose signals may be received from a glucose sensor (e.g., a CGM) and may correspond to a glucose level of the subject. In some cases, the time period may include one or more therapy periods. In some examples, the number of therapy periods included in the time period may be equal or unequal therapy periods. A therapy period may be a time period that corresponds to a single delivered medicament dose, which may include an instantaneous delivery or a delivery of the medicament dose over a period of time. Alternatively, a therapy period may be a time period that encompasses a plurality of medicament dose deliveries. Further, a therapy period may be a time period associated with a defined length of time. Alternatively, or in addition, the therapy period may be defined based on a number of medicament periods. In other words, the time period may vary based on the amount of time it takes to deliver or administer a specified number of doses of medicament (of any type or of a particular type).

In some examples, the time of delivery and dose of the plurality of therapies may be based at least in part on the glucose level signal and the first value of a control parameter of the control algorithm used by the glucose control system 4710. The control parameter may include any control parameter that affects operation of the glucose level control system 4710 and/or performance of a control algorithm of the glucose level control system 4710.

For example, the control parameter can be Tmax, $T_{1/2}$, speed of delivery of a medicament dose, a setpoint for the glucose level, a glucose level range, a threshold value of glucose level (e.g., a maximum or minimum value) and the like. The control algorithm may include any control algorithm and/or PK model used to determine a dose of medicament (e.g., insulin) to administer to the subject 4712. In other words, the controller 4718 or the processor 4730 may use the control algorithm to generate a dose control signal based at least in part on a value (e.g., the first value selected at the block 5802) of the control parameter to cause the delivery device 4714 to administer a dose of insulin or other medicament.

Each therapy of the plurality of the therapies provided over the time period, may correspond to a single administering of insulin to the subject 4712. This single administering of insulin may be any type of insulin that may be administered for any reason. For example, the insulin dose may be a basal insulin dose, a priming dose, a dose supplied in response to a meal announcement, or a correction dose of insulin. Moreover, each therapy provided may be a medicament other than insulin, such as counter-regulatory agent (e.g., glucagon). In some cases, each therapy delivery may include a plurality of medicament (e.g., insulin and/or counter-regulatory agent) doses supplied or administered to the subject 4712 over a therapy period. Further, the plurality of medicament doses may include different types of medicament doses, such as one or more basal doses, one or more meal doses associated with one or more meal announcements, one or more corrective doses, etc.

In some examples, the value of the control parameter that is being adjusted may change from one therapy period to another therapy period during the time window. For example, the value of the control parameter may change by a given amount in the beginning of each therapy period or group of therapy periods. In some other examples, the value of the control parameter may change by a given amount after certain number of therapies. In some examples, the amount by which the control parameter is changed may be determined based on one or more receding therapy periods in the time window. In some cases, the block 1604 may include one or more of the embodiments described with respect to the block 5504.

In some examples, during the therapy period or one or more therapy periods of the plurality of therapy periods included in the time period, therapy data may be obtained and/or stored. With reference to FIG. 57, in some examples, therapy data may include the glucose signal, G(t) 5702, the calculated or actual delivery time ($t_{c,j}$ 14716) and the estimated or delivered amount of a counter-regulatory agent ($C_j$ 14714). This therapy data may be stored in the memory 4740 of the glucose level control system 4710. Further, the therapy data may include a total amount of the counter-regulatory hormone administered during a therapy period. Alternatively, or in addition, other parameters and data associated with each therapy period may be stored in the memory 4740. For example, the total amount of insulin administered, an amounts of insulin delivered ($U_i$ 5708), a delivery time ($t_{u,t}$ 5710) of the insulin delivered during each therapy period, data received from other sensors that may measure one or more physiological parameters of the subject, data received from the subject or user (e.g., via a user interface), and the like.

At block 5806, the glucose level control system 4710 determines a control parameter adjustment for the control parameter. The control parameter adjustment may be based at least partially on the therapy data. In some embodiments, the adjustment may be determined using an adjustment function. For example, the adjustment function may be the function $f(y_k, g_k)$ for modifying Tmax according to equation 4. In some examples, the control parameter adjustment may be determined by analyzing glycemic control of blood glucose in the subject as indicated by the glucose level signal (e.g., G(t) 1502 or the CGM trace). Analyzing the glycemic control of the blood glucose in the subject may include tracking the glucose level of the subject 4712 over time. Further, analyzing the glycemic control of the blood glucose in the subject may include comparing the glucose level of the subject 4712 over time to a predicted blood glucose for the subject 4712 over time estimated based on the PK model and control parameter values used in the control algorithm. In some examples, the value of the adjustment function $f(y_k, g_k)$ may be calculated at least in part using the estimated or actual values of $t_{c,j}$ 14716, $C_j$ 14714, and $G_{c,j}$, (where j varies from 1 to the number of counter-regulatory provided during the time period). In some other examples, determination of the adjustment function $f(y_k, g_k)$ may include a statistical analysis based on the estimated or actual values of $t_{c,j}$ 14716, $C_j$ 14714, and $G_{c,j}$, (where j varies from 1 to the number of counter-regulatory provided during the time period). In some such examples, the statistical analysis may be based on statistical quantities and/or the analytical tools described below.

In some cases, the adjustment to the control parameter may be determined based on the number of hypoglycemia 5728 and/or hyperglycemia 5726 events and/or duration of each event. In some examples, the adjustment to the control parameter may be determined based on the difference between measured glucose level and the setpoint ($G_{set}$ 5724). In some examples, the adjustment may be determined based on the time intervals during which the glucose level stays within a target range (e.g., between $G_{max}$ 5720 and $G_{min}$ 5722). In some cases, the adjustment may be determined based on the stability of the measured glucose level for the subject 4712 or less volatility in the glucose level of the subject 4712. For example, a statistical analysis may be performed to determine the distribution rate of change for G(t) beyond one or more threshold rates.

In some cases, the adjustment to the control parameter may, at least partially, be determined by analyzing one or more signals received from one or more subject sensors that measure one or more physiological parameters of the subject (e.g., heart rate, temperature and the like). In yet other examples, the adjustment to the control parameter may be determined based on an assessment or input received from the subject 4712 (e.g., using a user interface of the AMD). For example, if the subject 4712 feels woozy, dizzy, lightheaded, nauseous, or otherwise uncomfortable during one or a plurality of therapy periods, the subject 4712 may, via, for example, a touchscreen user interface or other interface of the AMD, indicate how the subject 4712 is feeling.

The adjustment may be determined in real-time or substantially in real-time accounting for the processing speed of the hardware processor 4730, the glucose level control system 4710, or the time for the subject to provide an assessment of his or her condition to the glucose level control system 4710. In some cases, the adjustment to the control parameter may be determined by a computing system that is in communication with the glucose level control system 4710. For example, the glucose level control system 4710 may transmit the therapy data, to another computing system, such as a local computing system, a smartphone, or a cloud-based computing system. Further, the glucose level control system 4710 may transmit the therapy data and data associated with the control parameters values to the computing system. The computing system may determine the adjustment that better manages the subject's 4712 glucose level in the next time period.

At block 5808, the glucose level control system 4710 adjusts the control parameter using the control parameter adjustment determined at the block 5806. In some examples, the adjustment may be performed autonomously or automatically. In some other examples, the control parameter adjustment determined at block 5806 may be presented to the subject or other user (e.g., parent, guardian, clinician, etc.) via a user interface (e.g., a touchscreen display). In some such cases, the subject or other user may be able to confirm or modify the control parameter adjustment. In some cases, the display of the control parameter adjustment may be presented for informational purposes and may not be adjustable by a user. In some cases, the control parameter may be adjusted only after receiving the user confirmation (e.g., a user interaction with a user interface). In some other examples, where the adjustment is determined by a computing system, the adjustment value may be presented to user via a user interface of the glucose control system or a user interface of the computing system. In some cases, the user may adjust the control parameter of the glucose control system using the adjustment value received from or presented by the computer system.

The adjustment at block 5808 may cause a change in the operation or execution of the control algorithm. This change in the execution of the control algorithm may result in a change in one or more factors associated with the provisioning of therapy to the subject 4712. For example, the change in the execution of the control algorithm may result in a change in an amount of medicament delivered, a timing of the delivery of the medicament, a rate at which a dose of medicament is delivered to the subject 4712, a target setpoint or target range for the glucose level of the subject, a threshold used in determining whether to deliver medicament (e.g., a threshold difference from the target setpoint), or any other factor that may affect therapy delivered to the subject 4712.

In some cases, the adjusted value of the control parameter may be output to a user (e.g., the subject or a parent). The user may then configure the glucose level control system 4710 based on the selected control parameter value. Alternatively, or in addition, the glucose level control system 4710 may automatically adjust the value of the control parameter. In some cases, the user may be provided with an opportunity to confirm the adjustment. In some cases, the adjustment may occur automatically without confirmation. However, the adjustment may be presented to the user (e.g., the subject or a healthcare provider) and/or logged in a therapy log.

At block 5810, the glucose level control system 4710 provides therapy based at least in part on the updated control parameter that is updated at the block 5808. The new value of the control parameter may be maintained during a second time period. The second time period may refer to a specific amount of time, an amount of time to deliver a particular number of medicament doses, or a particular number of medicament doses.

The process 5800 may be repeated during subsequent time periods. In some examples, the process may be repeated periodically (every 24 hours, every two days, every week, or other time intervals). In some cases, the time period may be provided by the subject or a user. Further, the process may be repeated in response to a command. In some cases, the process may be repeated in response to determining that the subject's 4712 glucose level does not satisfy one or more criteria for a particular amount of time. For example, the process may be repeated when a statistically significant difference between the measured mean value of the BGL and a target BGL exceeds a threshold, or a number of hypoglycemia and/or hyperglycemia detected exceeds a threshold number during a specific amount of time.

In some examples, the process 5800 may be used to adjust several control parameters that affect the therapy delivery by the glucose control system. In some such examples, the process 5800 may be used to adjust a first control parameter during a time period and to adjust a second control parameter during a second time period. The second time period may be immediately after the first time period or delayed by a particular time. In some implementations, the control system 4710 may determine when to adjust the control parameter. In some examples, a delay between periods of control parameter adjustment may be determined at least in part on the glycemic control of the glucose signal. In some cases, the delay may be determined based on input received from a user. Further, the adjustment of the second control parameter may be at least partially determined based on the determined adjustment for the first control parameter.

In some embodiments, a third control parameter may be adjusted during a third time period. The adjustment of the third control parameter may immediately follow the adjustment of the second control parameter or may occur after a delay. The delay may be determined at least in part based on the glycemic control of the subject after the second control parameter is adjusted. In some cases, the glucose control system may be configured to sequentially adjust the first and second, or the first, second, and third control parameters when the glycemic control of the subject satisfies one or more threshold conditions. In some examples, the duration of the time period during which a control parameter is adjusted may differ from that of the first and second control parameters.

As described above, the process 5800 may be used to adjust one or more control parameters that affect the delivery of insulin. However, the process 5800 is not limited as such and may be used to modify one or more control parameters that affect the delivery of other medicaments, such as a counter-regulatory agent (e.g., glucagon). In some cases, the process 5800 may be used to recommend a change in insulin and/or counter-regulatory agent delivery without modifying the delivery. This can be advantageous for generating recommendations regarding counter-regulatory agent in a non-bi-hormonal glucose level control system 4710 that does not support counter-regulatory agent, or that supports the use of counter-regulatory agent, but does not have the counter-regulatory agent available.

Implementation of Statistical Analysis in Automated Glucose Level Control Refinement As described above, a value (e.g., a baseline value or optimal clinical value) of one or more control parameters of a PK model and/or control algorithm used by a glucose control system 4710 may be determined by statistical analysis of therapy data sets (e.g., glycemic control information) collected from multiple cohorts of subjects (e.g., 20, 50, 100, 200 subjects) during a clinical study. In some examples, the control parameter (e.g., Tmax) may be directly measured for the subjects within each cohort (e.g., based on results of blood analysis following manual or automated medicament administrations). These measurements may be used to determine an optimal value, or substantially optimal within a threshold range for a particular subject, of a control parameter (e.g., Tmax) to be used in a glucose control system. In some cases, the glucose level (BGL) of the subjects may be controlled and recorded for a given period (e.g., one week, two weeks, one months, or other periods) using identical or nearly identical glucose control systems. The subjects in each cohort may use the same values for a control parameter of the glucose control system while the subjects in different cohorts may use different values of the same control parameter. Subsequently, the measured therapy data sets, (e.g., comprising measured and/or determined glycemic control information for the subjects) over the given period may be compared using statistical analysis to evaluate an optimal value of the control parameter. For example, the measured glycemic control of subjects in a first cohort in response to setting Tmax to a first value, may be compared to the measured glycemic control of subjects in a second cohort in response to setting Tmax to a second value. Such comparison may include various statistical analysis that can reveal statistically significant differences between measured glycemic controls. For example, the mean value, variance and/or standard deviation of the measured glucose level data obtained from the first and second cohort, may be compared to a set of reference values that may be obtained from a third cohort of subjects with normal glucose level (e.g., nondiabetic subjects). To generate accurate results, such clinical studies often require several cohorts each comprising a large number of subjects (e.g., large enough to produce enable statistical analysis) and therefore large number of identical glucose control systems. For example, in some studies 10, 20, 50, or 100 subjects and glucose systems may be required. As such, determining the optimal value of one or more control parameters based on clinical studies can be expensive and time consuming. Moreover, clinical studies typically cannot capture unique physiological characteristics of and real-time physiological changes of a subject (even studies include several large cohorts).

A portable glucose control system that monitors the BGL in real time and autonomously or automatically provides medicament to a subject, may collect and store therapy data sets that, similar to those collected in clinical studies, may include sufficient number data points for a statistical analysis. In some examples, therapy data may include glycemic control information (e.g., received from a CGM sensor), other physiological effects of the therapy (e.g., obtained from subject sensors or the subject), an amount and type of medicament delivered, medicament delivery times, and the like. Advantageously, these therapy data sets may be used to determine an optimal value of one or more control parameters of the glucose control system or a value for the one or more control parameters of the glucose control system that provides improved diabetes management compared to a default value, baseline value, or initial clinically determined value. The optimal or improved values may be determined based on statistical analysis, including the type of statistical analysis that may be used in clinical studies. In some embodiments, the statistical analysis may include calculating one or more statistical quantities such as mean, variance, standard deviation, various statistical distributions (e.g., those described with respect to FIG. 57 and FIG. 59 below) and the like. On board and real-time (or near real-time) evaluation of values of one or more control parameters of a glucose control system based on therapy data collected during one or more therapy periods eliminates the need for expensive and time consuming clinical studies and may improve the maintenance of a subject's diabetes by, for example, taking into account unique physiological characteristics of and real-time physiological changes of a subject. Moreover, on board evaluation of control parameter values provides for faster and more accurate diabetes evaluation and management compared to clinical testing. Some of the embodiments described herein may be used to determine optimal values of one or more control parameters that may be used by a user to adjust the control parameters via a user interface of the glucose control system. In some cases, the glucose control system may autonomously adjust one or more control parameters using the determined optical values.

The therapy data collected by a glucose control system may include glycemic control information, information related to medicament delivery times, doses of medicament provided, the BGL level at the time of medicament delivery (e.g., measured based on a glucose signal obtained from a CGM sensor), the physiological effects of the medicament on a subject (e.g., BGL in a time period after medicament delivery, subjects assessment and the like), and any the type of data that may be determined from therapy provided to the subject. In some embodiments, the glucose control system may collect therapy data during one or more therapy periods. With reference to FIG. 57, the collected and stored therapy data during each therapy period (e.g., a period starting at $t_S$ 5704 and ending at $t_E$ 5706) may include, but is not limited to: a CGM trace G(t) 5702, delivered doses (Ui 5708) and delivery times (time $t_{u,i}$) of insulin, delivered or determined doses ($C_i$ 14714) and delivery times ($t_{c,i}$ 14716), of a counter-regulatory agent (e.g., glucagon) and the like. The therapy data may be stored in a memory (e.g., a flash drive, a solid-state drive, a hard disk, or any other type of non-volatile memory) of the glucose control system as one or more data sets. Each data set may be associated with one or more categories of therapy data or a specific therapy period during which the therapy data was collected. In some cases, the value of the one or more control parameters may change from one therapy period to another therapy period. For example, the value of the control parameter may change by a given amount in the beginning of a therapy period or a group of therapy periods. The value of the control parameter may be changed automatically by the glucose level control system 4710 or by a user via a user interface. In some cases, the control parameter may be changed by a given amount after certain number of therapy periods. The amount by which the control parameter is changed may be determined based on therapy data collected during one or more preceding therapy periods. Alternatively, or in addition, the amount by which the control parameter is changed may be provided by a user via a user interface. In some cases, the duration of one or more therapy periods is selected such that the measured or determined data sets are sufficiently large for statistical analysis. In some examples, an uncertainty associated with an optimal or improved value of a control parameter determined using statistical analysis may depend on the size of the data set used for the analysis.

In some embodiments, the process 5500 may be used to determine a value (e.g., an optimal value) of a control parameter using statistical analysis. For example, statistical analysis may be used to determine the therapy effects at block 5506, block 5514, or to compare the therapy effects resulting from different control parameter values at block 5516. In some such examples, at block 5508, the second value of the control parameter may be provided by the user (e.g., the subject or the guardian) based at least in part on the first effect and outcomes of the statistical analysis performed on the therapy data collected and/or stored during the first therapy period (block 5504). In some examples, at block 5516, a statistical analysis may be performed based at least in part on the first effect and the second effect to obtain a comparative assessment. The comparative assessment may be used to determine whether one of a pair or set of values of a control parameter results in an improved glycemic control of the subject compared to the other values used for the control parameter. In some embodiments, the determined value of the control parameter at block 5516 may be provided to the subject, a guardian or a healthcare provider via a user interface of the glucose control system 4710 and/or a computing system (e.g., a smartphone, a notebook a personal computer and the like) connected to the glucose control system (e.g., via a wireless link). In some such embodiments, the subject, the guardian or the healthcare provider may change the value of the corresponding control parameter to the determined value by an interaction with a user interface before the next therapy period (e.g., at block 5518). Alternatively, or in addition, the glucose level control system 4710 may automatically change value of the control parameter to the determined value and proceed to block 5518. In some such cases, the user may be provided with an opportunity to confirm the modification. In some cases, the modification may occur automatically without confirmation. However, the modification may be presented to the user (e.g., the subject or a healthcare provider) and/or logged in a therapy log.

In some examples, the first and second therapy provided to the subject during the first (block 5504) and second (block 5512) therapy periods, may include a plurality of therapy deliveries. During the first (block 5504) and second (block 5512) therapy periods, a first and second first therapy data may be obtained by the control system 4710. In some such cases, the therapy data may comprise glycemic control information that at least includes the glucose signal received during the corresponding therapy period. Determining the first effect may include calculating statistical characteristics of the therapy data collected during the plurality of therapies provided during each period. For example, the control system 4710 may calculate the mean value, deviation from mean value, and the variance of the measured BGL. In some cases, the control system 4710 may calculate one or more quantities (e.g., statistical quantities) to quantify the average glucose level and its deviation from a baseline level. In some embodiments, the control system 4710 may determine one or more quantities (e.g., statistical quantities) to evaluate the variability of glycemic control and the associated risks (e.g., risk of hypoglycemia or hyperglycemia) or quantify the average glucose level and its deviations from a baseline (e.g., normal) level. In some cases, the duration of the second period may be equal to the duration of the first period. Alternatively, or in addition, the duration of each period may be selected such that each period includes the same number of therapies provided to the subject. In some embodiments, the duration of each period may be selected such that the number of times therapy is administered during the time period is large enough to enable statistically significant assessments. In some cases, at block 5516, the comparison between the first effect and the second effect, may include statistical analysis of statistical data generated based on the data collected during the first and second period.

In some examples, in addition to the optimal values of one or more control parameters, the control system may generate a control parameter optimization report that may include the statistical quantities calculated during the optimization process. Further, the report may include a graphical representation of the therapy data and related risk assessments. In some such examples, this report may be used by the subject or a healthcare provider to make decisions related to selecting a determined optimal parameter value. Additionally, the control parameter optimization report may include information that may be used by the subject or a healthcare provider to modify the overall strategy for managing the subject's glycemic control. For example, modifying the mealtime, content or amount of meal consumed by the subject, and the like.

Figure 59:
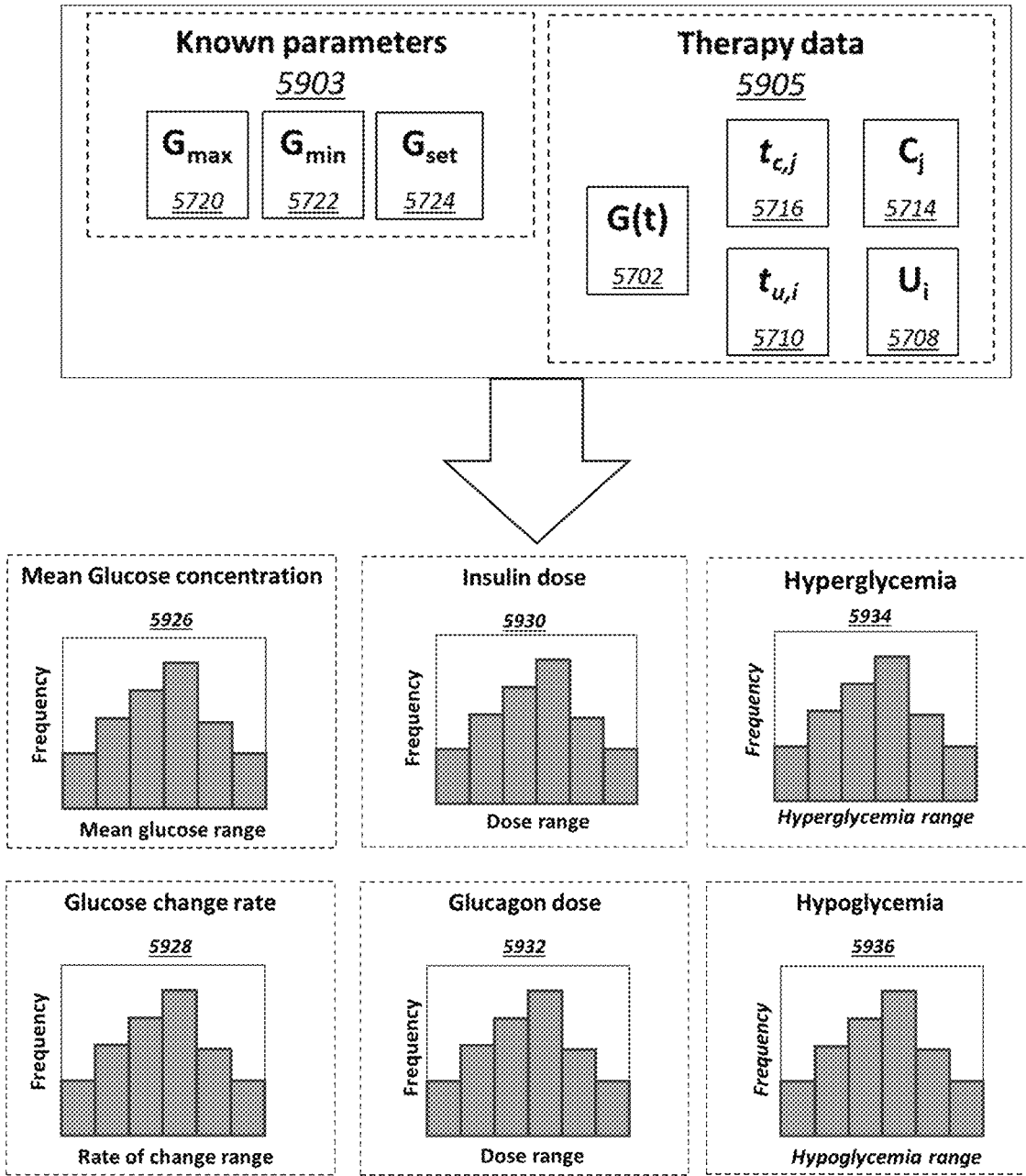
FIG. 59 illustrates some examples of statistical quantities that may be generated and utilized by the glucose level control system as part of statistical analysis.

FIG. 59 illustrates some examples of statistical quantities that may be generated and utilized at blocks 5506 and 5514 of the process 5500, using the therapy data 5905 during a therapy period, and known parameters 5903 of the control system. In some embodiments, during the therapy period the value of certain control parameter may be fixed and/or selected based on baseline values (e.g., outcomes of previous clinical studies) or a previously determined value (e.g., by a different control parameter modification and/or optimization process). With reference to FIG. 57, in the example shown in FIG. 59, $G_{min}$ 5722 (lower bound for normal BGL), $G_{max}$ 5720 (upper bound for normal BGL) and $G_{set}$ 5724 (target BGL) are assumed to be known values provided by the subject, the user, a health care provider or determined by a computing system based on a set of clinical data. For example, $G_{min}$ 5722 may between 65 mg/dL and 75 mg/dL, $G_{max}$ 5720 may be between 175 mg/dL and 185 mg/dL and $G_{set}$ 5724 may be between 70 mg/dL and 180 mg/dL. In some examples, $G_{set}$ 5724 may be a value (e.g., an optimal) determined by a previous optimization process (e.g., the process 5500). G(t) 5702 (the CGM trance or the measured glycemic control), $U_i$'s 5708, $t_{u,i}$'s 5710, $C_i$'s 5714 and $t_{c,i}$'s 5716 may be included in the therapy data collected during the therapy period. In some examples, the therapy data 5905 may be used to generate various types of statistical quantities. For example, the therapy data 5905 may be used to generate probability distributions (e.g., discrete or continuous) and/or frequency distributions (e.g., absolute, relative, or cumulative) for certain measured or determined values. For example, the distributions associated with the glucose concentration 5926 (e.g., portions of the therapy period during which the glucose signal was within selected ranges), glucose change rate 5928 (e.g., portions of the therapy period during which the glucose change rate signal was within selected ranges rates), insulin dose 5930 (percent of insulin doses provided within selected dose ranges), glucagon dose 5932 (percent of glucagon doses provided within selected dose ranges), hyperglycemia 5934 (percent of hyperglycemia events detected wherein the glucose signal was above $G_{max}$ by an amount within selected ranges), hypoglycemia 5936 (percent of hypoglycemia events detected wherein the glucose signal was below $G_{min}$ by an amount within selected ranges) and the like. In some examples, one or more characteristic of these statistical distributions (mean, variance, deviation from mean, and the like) or a specific combination of some characteristics of these statistical distributions, may be used to determine (e.g., quantify) the effect of a therapy. In some examples the therapy data considered to generate certain statistical data (e.g., a histogram) may be filtered to exclude the data points collected during certain events. For example, during a mealtime, during exercise, and the like. In some examples, time bins associated with these events may be specified by a user through a user interface.

In some embodiments, the statistical analysis may comprise analytical methods and tools that can compare the effect of different control parameter values. Some examples of analytical methods and tools that can be used with one or more of the embodiments described herein are described in the article "*Statistical Tools to Analyze Continuous Glucose Monitor Data*" (W. Clarke et al., Diabetes Technology and Therapeutics, vol. 11, S45-S54, 2009), which is hereby incorporated by reference in its entirety herein. Examples of methods and tools that may facilitate extraction of information from complex and voluminous measured glycemic control information during therapy periods, are discussed herein. In some cases, the therapy data used for statistical analysis includes the glucose trace of the subject or G(t). In some examples, G(t) may be a time-stamped series of glycemic data received from a CGM sensor (see FIG. 57). In some examples, the glucose signal obtained from CGM may represent glucose level as a discrete time series that approximates G(t) in steps determined by the resolution of the particular device (e.g., a reading every 2 min, 5 min, 10 min and the like). In some examples, statistical analysis may be performed on the therapy data (e.g., the glucose signal received from a CGM sensor) to provide an assessment (e.g., a comparative assessment) related to: (1) average glucose level and deviations from normal glycemic control (sometimes referred to as normoglycemia), (2) variability and risk assessment, and (3) clinical events, such as post-meal glucose excursions and hypoglycemic episodes. In some embodiments, the assessment may be made based on two sets of therapy data collected during two time periods. In some such examples, the assessment may be used by the control system 4710 to determine whether the glycemic control for a subject has been improved from a first therapy period to a second therapy period. In some examples, the assessment may be used by a health care provider to evaluate the glycemic control of a subject during one or more time periods.

In some cases, the glucose level control system may determine three values of average blood glucose: the mean value (e.g., computed for the entire G(t) measured during a therapy period or part of a therapy period), a pre-meal mean value (e.g., computed for the time window of 60-120 min after the meal), and post-meal mean value (e.g., computed for the time window of 0-60 min before meal). Computing of pre- and post-meal averages and the difference between the averages can serve as an indication of the overall effectiveness of pre-meal bolus timing and bolus amount. In some examples, deviation from target or normoglycemia may be evaluated by determining percentages of time spent within, below, or above preset target limits (e.g., $G_{min}$=70 and $G_{max}$=180 mg/dL). In some examples, the percentage of time within each range may be calculated via linear interpolation between consecutive glucose readings. In some other examples, percentage of time within additional ranges can be computed. In some such examples, the probability of occurrence of extreme hypoglycemia and hyperglycemia may be also evaluated. To quantify variability of glucose level, in some examples, standard deviation and variance may be used to compute variability of BGL. In some cases, a risk index may be defined that can serve as a measure of overall glucose variability when focusing of the relationship between glucose variability and risks for hypo- and hyperglycemia. In some examples, an individual function may be calculated to split the overall glucose variation into two independent sections related to excursions into hypo- and hyperglycemia, and at the same time equalize the amplitude of these excursions with respect to the risk they carry. For example, a BGL transition from 180 to 250 mg/dL may appear threefold larger than a transition from 70 to 50 mg/dL, whereas if converted into risk, these fluctuations would appear equal. In some cases, analysis of BGL rate of change (e.g., measured in mg/dL/min) may be used to evaluate the dynamics of BGL fluctuations on the time scale of minutes. In other words, this is an evaluation of the "local" properties of the system as opposed to "global" properties discussed above. In some examples the local properties may be assessed at a neighborhood of any point in time by the value BGL, its first or, sometimes, second derivatives (acceleration).

In some examples, in addition to statistical analysis of the therapy data, in the blocks 5506, 5514, and 5516 of the process 5500, a statistical analysis of the user inputs provided during the first or second therapy period may be used in determining or comparing the therapy effects. For example, the number of times and time of the day that the subject has indicated certain symptoms, may be used to determining therapy effects.

In some cases, in addition to the statistical analysis of the therapy data in the blocks 5506, 5514, and 5516 of the process 5500, a statistical analysis of the biomedical or physiological data received from one or more subject sensors (e.g., a smart watch, weight sensor, etc.) may be used in determining or comparing the therapy effects. For example, subject's temperature, blood pressure, heart rate), from a weight sensor, or any other type of biomedical sensor.

In some examples, the process 5500 may be modified to determine the optimal value of Tmax, or a value of Tmax that provides improved maintenance of the subject's diabetes, by reducing Tmax (increasing the aggressiveness of the therapy) after each therapy period in a series of therapy periods, until a statistical assessment shows that further reduction of the Tmax does not improve the mean glucose level without increasing the probability of hypoglycemia. Improved maintenance of the subject's diabetes may include maintaining a mean glucose level closer to a setpoint glucose level range or reducing fluctuations in mean glucose level over time compared to prior control value (e.g., Tmax) settings. It should be understood that other metrics may be used to measure an improvement of maintenance of the subject's diabetes, such as reduction in hypoglycemia risk events or reduction in administration of insulin without increasing diabetic effects or corresponding risks.

Figure 60:
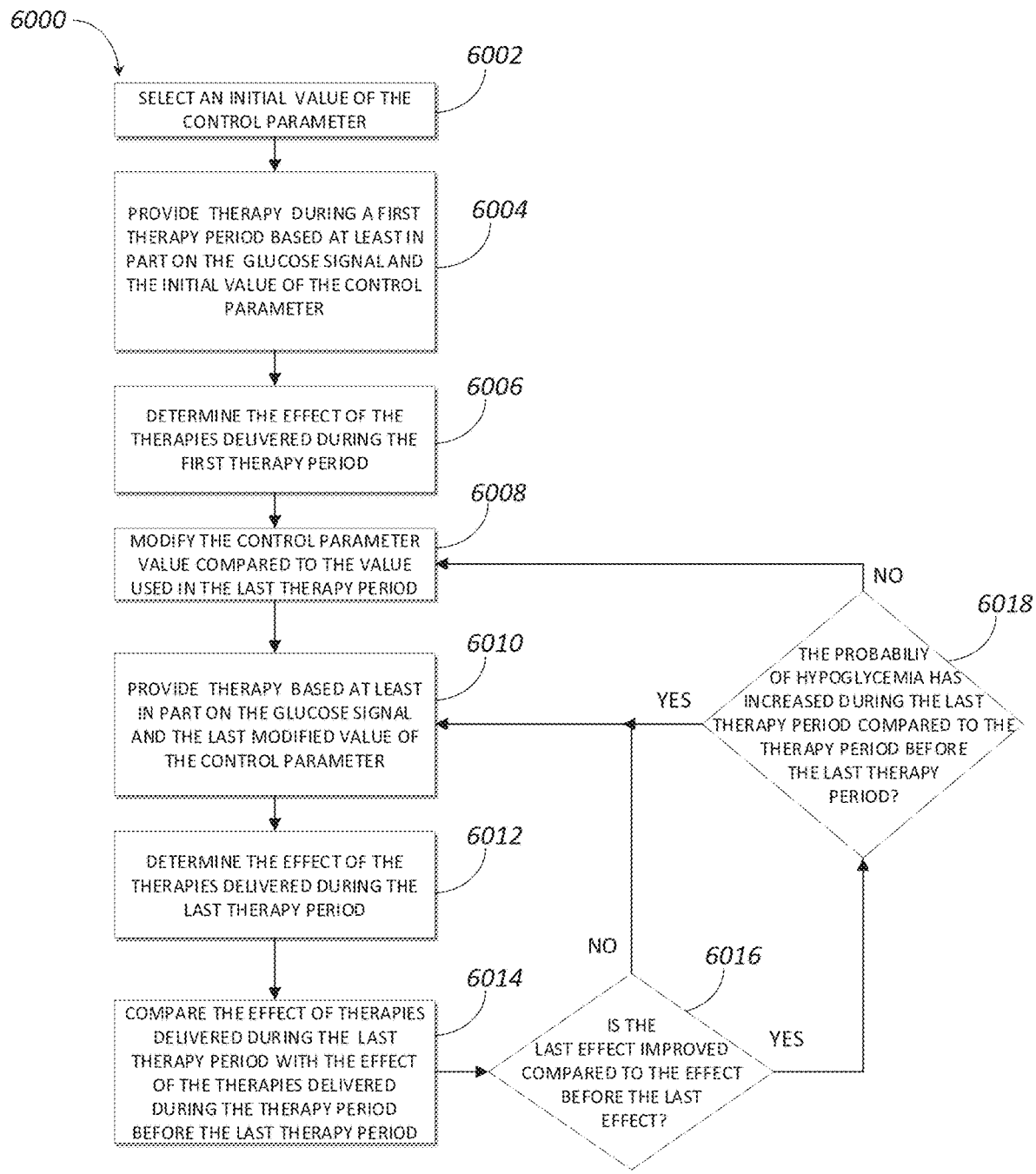
FIG. 60 presents a flowchart of an example automated glucose level control refinement process in accordance with certain embodiments

FIG. 60 presents a flowchart of an example automated control parameter refinement process in accordance with certain embodiments. The process 6000 may be performed by any system that can autonomously and/or automatically modify a control algorithm and/or a control parameter that affects execution of the control algorithm based on feedback (e.g., from a glucose level signal) relating to therapy administered to a subject 4712. For example, the process 6000 may be performed by one or more elements of the glucose level control system 4710. In some cases, at least certain operations of the process 6000 may be performed by a separate computing system that receives glucose level data from the glucose level control system 4710. Although one or more different systems may perform one or more operations of the process 6000, to simplify discussions and not to limit the present disclosure, the process 6000 is described with respect to particular systems.

The process 6000 may be performed automatically and without user interaction. In some cases, a user may trigger the process 6000 via a command or interaction with a user interface. However, once the process 6000 is triggered, the process 6000 may be performed automatically. Further, the process 6000 may be performed continuously, periodically, or in response to a trigger. The trigger may be time based and/or based on a measurement of the glucose level of the subject. For example, the trigger may correspond to a determination that a glucose level of a subject differs by more than a threshold from a predicted glucose level that is predicted by a glucose level control algorithm based on the administering of medicament. Further, the trigger may be based on the activation or first time use of the glucose level control system 4710 by the subject 4712.

In some embodiments, the glucose level control system 4710 may perform the process 6000 in order to adjust one or more control parameters of the glucose control system 4710 to improve the glycemic control of a subject. The control parameter may include any control parameter that affects operation of the glucose level control system 4710 and/or performance of a control algorithm of the glucose level control system 4710. In some such embodiments, in addition to improving the glycemic control of the subject, the process 6000 may take into account the risk of hypoglycemia in the subject. In some embodiments, the process 6000 may include one or more of the embodiments previously described with respect to the process 5500.

The process 6000 begins at block 6002 where an initial value is selected for a control parameter of the glucose control system (e.g., Tmax or other control parameters of the glucose control system selected to be optimized). The control parameter can be a control parameter of a pharmacokinetic (PK) model used by a control algorithm PK of the glucose control system 4710. In some examples, the control parameter may be a time until insulin within blood plasma of the subject reaches a particular concentration level subsequent to administration of an insulin dose. In some cases, the initial value of the control parameter may be based on therapy delivered during a time period prior to the first therapy period, a clinical value, or a body mass of the subject.

In some examples, the initial value of the control parameter may be selected using one or more of the embodiments described with respect to the block 5504 of the process 5500. In some embodiments, the control parameter may be a control parameter used by the control algorithm of the glucose control system to account for accumulation of insulin in a subject. In some embodiments the control parameter may be used to control an insulin dosing response of the control algorithm to a glucose level excursion in the subject based on a glucose level signal received from a glucose level sensor (e.g., a SGM sensor).

At block 6004, the control system 4710 may provide therapy during a first therapy period based at least in part on the glucose level signal and the initial value of the control parameter. In certain embodiments, the block 6004 can include one or more of the embodiments previously described with respect to the block 5504 of the process 5500. In some embodiments, the first therapy data may include glycemic control information resulting from the delivery of the first therapy. In some examples, the system may store all or some of the therapy data generated during the first therapy period in a memory of the control system 4710. In some examples, the therapy provided at block 6004, may comprise a plurality of medicament deliveries.

At block 6006, the control system 4710 may determine the therapy effect of the therapy provided during the first therapy period using statistical analysis of the first therapy data collected and stored at block 6004. In some examples, the statistical analysis may include calculating the statistical quantities discussed above and with reference to FIG. 59. In some cases, the statistical analysis may include regression analysis between certain measured and/or calculated parameters at block 6004. In some such examples the regression analysis may include determining an autoregression model. In some examples, the control system 4710 may determine the therapy effect using one or more of the embodiments described with respect to the block 5506 of the process 5500.

At block 6008, the control system 4710 may modify the value of the control parameter compared to the initial value selected at block 6002 or the value used in the last therapy period. In some examples, the modified value may be a value that makes the therapy more aggressive (e.g., aggressive by a significant amount). For example, when the control parameter is Tmax, at block 6008 the value of Tmax may be reduced to an amount less (e.g., 5, 10, 15 minutes, or more) than the value used in a previous therapy period (e.g., the initial value or the last modified value). In some examples, the modified value of the control parameter may be received from a user interface of the glucose level control system responsive to a user interaction with the user interface. The previous therapy period may be the first therapy period or any earlier therapy period. In some examples, the value for Tmax may be lowered by a significant amount (e.g., 10 minutes, 15 minutes, or other values). Further, the amount by which Tmax is reduced may be smaller than a previous reduction during a previous iteration of the process 6000. In some embodiments, the control parameter may be modified automatically without action by a user. In some cases, modifying the control parameter may change a timing, a dosage size, or a speed of injection of insulin administered to the subject.

At block 6010, the control system 4710 provides therapy to the subject based at least in part on the glucose signal and the modified value of the control parameter received from block 6008. In some examples, the duration of the therapy period (at block 6010), may be equal to the duration of one or more previous therapy periods. In some other examples, the duration of the therapy period may be determined based on the determined therapy effects of the therapies delivered during one or more previous therapy periods. In some examples, at block 6010 the system may store all or some of the therapy data generated during the therapy period. In some examples, the therapy provided at block 6010, may comprise a plurality of medicament deliveries. In some cases, the therapy data may include glycemic control information resulting from the delivery of the therapy.

At block 6012, the control system 4710 determines the therapy effect of the therapy provided at block 6010 during the last therapy period. In some examples, the therapy effects may be determined based at least in part on the therapy data obtained and stored at block 6010. In some examples, the control system 4710 may determine the therapy effect using one or more of the embodiments described with respect to the block 5506 of the process 5500.

At block 6014, the control system 4710 performs a statistical analysis based at least in part in the determined therapy effect of the therapies provided and stored during the last therapy period and the therapy period before the last therapy period to obtain a comparative assessment. In some such examples the comparative assessment may be based on statistical analysis of determined effects and the therapy data collected during the corresponding therapy periods. In some examples, the statistical analysis may include generating statistical quantities (e.g., distributions shown in FIG. 17) using the therapy data. In some examples, the statistical analysis may include the analytical method described above. In some such examples, one or more characteristics of the statistical data may be used to compare the therapy effects. In some examples, the statistical analysis may include calculating one or more of a mean, a median, a mode, a standard deviation, a rate, a ratio, or a probability based on the therapy data obtained in the last two therapy periods or the determined effects of the therapies provided during the last two periods.

At the decision block 6016, the control system 4710, based at least in part on the comparative assessment received from block 6014, the control system 4710 may determine whether the value of the control parameter used during the last therapy period has improved the glycemic control for the subject compared to the therapy period before the last therapy period. In some embodiments, the control system 4710 may determine whether the modified value for the control parameter has resulted in statistically significant improvement in glycemic control. In some embodiments, the control system 4710 may determine whether the modified value for the control parameter has resulted in an improvement of a physiological parameter of the subject. In these embodiments, the physiological parameter may be determined based at least in part on the glucose level signal received from a glucose level sensor.

If the control system 4710 determines at the decision block 6016 that the glycemic control for the subject is not improved, the control system 4710 may return to the block 6010 and continue providing therapy to the subject based on the last modified value of the control parameter without any further modification.

If at the decision block 6016 the control system 4710 determines that the value of the control parameter used during the last therapy period has improved the glycemic control for the subject compared to the therapy period before the last therapy period, the control system 4710 proceeds to decision block 6018. In some cases, the improvement in the glycemic control should be larger than a threshold level before the system 4710 proceeds to block 6018. In some cases, the control system proceeds to block 6018 if the modified value of the control parameter results in a reduced occurrence of glucose level excursions compared to the first value of the control parameter.

At decision the block 6018 the control system 4710 may determine whether the frequency and/or severity of hypoglycemia events is increased during the last therapy period compared to the therapy period before the last therapy period. In some examples, if the control system 4710 determines that the frequency and/or severity of hypoglycemia events is increased (e.g., beyond a threshold number or amount) during the last therapy period, the control system 4710 may return to the block 6010 and continue providing therapy to the subject based on the last modified value of the control parameter without any further modification. If at decision block 6018, the control system determines that the change in frequency and/or severity of hypoglycemia events is negligible (e.g., below a threshold number or amount), the control system may proceed to the block 6008 where the control system 4710 modifies the value of the control parameter. In some examples, the modified value may be a value that results in more aggressive therapy (e.g., the value of Tmax may be reduced). In some such examples, the amount by which the control parameter is changed may be smaller than a reduction amount in one or more previous modifications.

In some examples, at the block 6018 the control system may determine risks or the frequency and severity of one or more events other than hypoglycemia. For example, the control system may determine that in spite of an improvement in glycemic control for the subject, the rate and magnitude of glucose concentration has increased beyond threshold value. In some such examples, these additional risk determinations may be used to determine whether to keep or modify the last value of the control parameter.

In some embodiments, a modified version of the process 6000 may be used by the glucose control system wherein the process stops at block 6016 and the control system continues providing therapy based on the last modified value of the control parameter until a user input is received. In some such examples, the last value of the control parameter (modified at block 6008), the results of the comparative assessment generated based on the comparison performed at block 6014 (e.g., whether a statistically significant improvement in subject's glycemic control resulted from the last control parameter change), may be output to the subject, a guardian or a healthcare provider via a user interface of the glucose control system 4710 and/or a computing system (e.g., a smartphone, a notebook a personal computer and the like) connected to the glucose control system (e.g., via a wireless link). In some such embodiments, at least in part based on the outcomes of the comparative assessment, the subject, the guardian or the healthcare provider may change the value of the corresponding control parameter (e.g., an interaction with a user interface) before the next therapy period.

In some examples, the statistical analysis used to determine the therapy effects (e.g., at blocks 5506 and 5512 in the process 5500, and block 6006 and 6012 in the process 6000) or to compare between therapy effects (e.g., at block 5516 in the process 5500 and block 6014 in the process 6000), may include regression analysis. In some examples, regression analysis may be used to find a relation between parameters calculated and/or measured during the therapy period. For example, with reference to FIG. 57, a regression analysis may be used to find a relation between $U_i$ and the rate of glucose concentration change (e.g., using $G(t)$ near $t_i$) for a plurality of therapies provided during a therapy period. In some cases, the outcomes of one or more regression analysis may be used in the optimization process to determine a value of the control parameter.

In some examples, the therapy data captured and stored during one or more therapy periods may be divided to equal time intervals wherein each time interval starts and ends at substantially the same specific start and end times within a 24 period. In some such examples, an autoregression model may be derived for the glycemic control over the time interval between the specific start and end times. Subsequently, the resulting autoregression model may be used to determine whether the glycemic control has been improved compared to a previous therapy period. In some cases, the resulting autoregression model may be used to make additional adjustments to one or more control parameters in the subsequent therapy periods (after therapy periods following the period in which an autoregression model is determined).

In some examples, the outcome of the statistical analysis of therapy data may be used to evaluate the accuracy glucose signal generated by a CGM sensor.

As mentioned above in some examples the glucose control system may generate a control parameter optimization report that may include some or all of the statistical quantities calculated during the optimization process, outcomes of the statistical analysis and graphical representation of the therapy data and related risk assessments. In some such examples, a Control Variability-Grid Analysis (CVGA) may be included in the control parameter optimization report, to visualize the variability of CGM data at a group level from a glucose-control point of view. In some examples the graphs may comprise distinctive groups of graphs, for example, to visualize average glycemia and deviations from target values, visualize variability and risk assessment, and event-based clinical characteristics. In some other examples, the graphical data may represent average glycemia and deviations from target glucose trace and aggregated glucose trace representing the time spent below, within or above the preset target range and visualizing the crossing of glycemic thresholds. In yet other examples, the control parameter optimization report may include graphs representing variability and risk assessment data. For example, a risk trace may be presented to highlighting essential variance (e.g., by equalizing the size of glucose deviations towards hypo- and hyperglycemia, emphasizing large glucose excursions, and suppress fluctuation within target range). In some other examples, histogram of glucose level rate of change may be included in the report to presented, for example, the spread and range of glucose transitions. In yet other examples, Poincare' plots may be included in the report to visualize the stability of the glucose signal during different therapy periods that may be also associated with different values of a control parameter.

EXAMPLE EMBODIMENTS

Some additional nonlimiting examples of embodiments discussed above are provided below. These should not be read as limiting the breadth of the disclosure in any way.

Example 1: A glucose level control system configured to modify a manual therapy instruction and to generate an emergency dose control signal for commanding administration of modified glucose control therapy to a subject via a medicament pump, the glucose level control system comprising:
  a data interface configured to receive a glucose level of the subject;
  a non-transitory memory configured to store specific computer-executable instructions; and
  an electronic processor in communication with the non-transitory memory and configured to execute the specific computer-executable instructions to at least:
    receive, via a manual therapy control interface, the manual therapy instruction;
    based on the manual therapy instruction, transmit an initial dose control signal to a pump controller of the medicament pump;
    receive, via the data interface, the glucose level of the subject;
    determine, based at least in part on the glucose level, that the initial dose control signal does not indicate health-appropriate therapy;
    based on the determination that the initial dose control signal does not indicate health-appropriate therapy, generate the emergency dose control signal for commanding administration of modified glucose control therapy to the subject via the medicament pump; and
    based on the emergency dose control signal, modify the manual therapy instruction and transmit, via the data interface, the emergency dose control signal to the pump controller of the medicament pump.

Example 2: The glucose level control system of example 1, wherein the specific computer-executable instructions, when executed by the electronic processor, are configured to: receive, via the manual therapy control interface, one or more of a rate of insulin delivered to the subject, a rate of dextrose delivered to the subject, a rate of saline delivered to the subject, and/or a rate of glucagon delivered to the subject.

Example 3: The glucose level control system of example 1 or 2, wherein the specific computer-executable instructions, when executed by the electronic processor, are configured to: receive, via the manual therapy control interface, a rate of nutrition delivered to the subject.

Example 4: The glucose level control system of any of examples 1-3, wherein the specific computer-executable instructions, when executed by the electronic processor, are configured to: receive the glucose level of the subject from a glucose sensor.

Example 5: The glucose level control system of example 4, wherein the specific computer-executable instructions, when executed by the electronic processor, are configured to: receive the glucose level of the subject from the glucose sensor at a regular interval over a time period.

Example 6: The glucose level control system of example 5, wherein the time period is at least an hour.

Example 7: The glucose level control system of example 5, wherein determining that the initial dose control signal does not indicate health-appropriate therapy comprises determining a time-varying glucose level of the subject over the time period.

Example 8: The glucose level control system of any of examples 1-7, wherein determining that the initial dose control signal does not indicate health-appropriate therapy comprises estimating an amount of insulin in the subject.

Example 9: The glucose level control system of example 8, wherein estimating the amount of insulin in the subject comprises determining an amount of insulin delivered to the subject.

Example 10: The glucose level control system of example 8 or 9, wherein estimating the amount of insulin in the subject comprises determining a rate of insulin absorption in the subject.

Example 11: The glucose level control system of any of examples 1-10, wherein determining that the initial dose control signal does not indicate health-appropriate therapy comprises receiving a weight of the subject.

Example 12: The glucose level control system of any of examples 1-11, wherein the initial dose control signal is configured to command delivery of insulin to the subject at a first rate, and wherein the emergency dose control signal is configured to command delivery of insulin at a second rate lower than the first rate.

Example 13: The glucose level control system of any of examples 1-12, wherein the initial dose control signal is configured to command delivery of glucagon to the subject at a first rate, and wherein the emergency dose control signal is configured to command delivery of glucagon at a second rate higher than the first rate.

Example 14: The glucose level control system of any of examples 1-13, wherein determining that the initial dose control signal does not indicate health-appropriate therapy is based on the manual therapy instruction.

Example 15: The glucose level control system of any of examples 1-14, wherein modifying the manual therapy instruction comprises temporarily overriding the manual therapy instruction.

Example 16: An automated glucose level control system configured to generate a backup therapy protocol comprising insulin therapy dosing recommendations derived from autonomously determined doses of insulin, the automated glucose level control system comprising:
- a medicament delivery interface configured to operatively connect to a medicament pump for infusing medicament into a subject;
- a memory configured to store specific computer-executable instructions; and
- a hardware processor in communication with the memory and configured to execute the specific computer-executable instructions to at least:
  - track insulin therapy administered to the subject over a tracking period by the automated glucose level control system, wherein tracking the insulin therapy comprises storing an indication of autonomously determined doses of insulin delivered to the subject as correction boluses of insulin or as basal doses of insulin;
  - generate the backup therapy protocol comprising at least one of a plurality of backup therapy dosing recommendations, wherein the plurality of backup therapy dosing recommendations comprises:
    - a correction dosing recommendation comprising a correction factor based on at least some of the correction boluses of insulin administered during the tracking period; and
    - a basal dosing recommendation comprising a basal rate based on at least some of the basal doses of insulin administered during the tracking period; and
  - output the backup therapy protocol as determined by the automated glucose level control system for the purpose of being used when the automated glucose level control system is not providing therapy to the subject.

Example 17: The automated glucose level control system of example 16, wherein the backup therapy protocol comprises one or more of a backup injection therapy protocol or a backup pump therapy protocol, wherein the backup injection therapy protocol comprises one or more insulin dosing recommendations useable by a user to manually inject insulin, and wherein the backup pump therapy protocol comprises one or more insulin dosing recommendations useable to configure one or more glucose level control systems to infuse medicament into the subject.

Example 18: The automated glucose level control system of example 16 or 17, wherein the basal rate comprises an hourly basal rate or a daily basal rate.

Example 19: The automated glucose level control system of any of examples 16-18, wherein the basal dosing recommendation comprises a plurality of basal rates, at least one basal rate of the plurality of basal rates corresponding to a different portion of a day than at least one other basal rate of the plurality of basal rates.

Example 20: The automated glucose level control system of example 19, wherein the at least one basal rate of the plurality of basal rates comprises an hourly basal rate.

Example 21: The automated glucose level control system of any of examples 16-20, wherein tracking the insulin therapy further comprises storing an indication of autonomously determined doses of insulin delivered to the subject as a mealtime bolus of insulin.

Example 22: The automated glucose level control system of any of examples 16-21, wherein the plurality of backup therapy dosing recommendations further comprises a meal dosing recommendation comprising an indication of a mealtime bolus size of insulin corresponding to an average mealtime bolus provided as a mealtime bolus to the subject during the tracking period.

Example 23: The automated glucose level control system of example 22, wherein the meal dosing recommendation is one of a plurality of meal dosing recommendations included in the plurality of backup therapy dosing recommendations, at least one meal dosing recommendation of the plurality of meal dosing recommendations associated with a different meal occurring during a day than at least one other meal dosing recommendation of the plurality of meal dosing recommendations.

Example 24: The automated glucose level control system of example 22, wherein the meal dosing recommendation is one of a plurality of meal dosing recommendations included in the plurality of backup therapy dosing recommendations, at least one meal dosing recommendation of the plurality of meal dosing recommendations associated with a different size meal than at least one other meal dosing recommendation of the plurality of meal dosing recommendations.

Example 25: The automated glucose level control system of any of examples 22-24 wherein the average mealtime bolus is calculated as a moving average determined over a particular time period window during the tracking period.

Example 26: The automated glucose level control system of any of examples 16-25, wherein the basal rate is based on: a moving average determined over a particular time period and/or a particular number of doses during the tracking period.

Example 27: The automated glucose level control system of any of examples 16-26, wherein the hardware processor is further configured to execute the specific computer-executable instructions to at least track counter-regulatory agent therapy administered to the subject over the tracking period, wherein tracking the counter-regulatory agent therapy comprises storing an indication of autonomously determined doses of counter-regulatory agent delivered to the subject responsive to a glucose level signal.

Example 28: The automated glucose level control system of example 27, wherein the plurality of backup therapy dosing recommendations further comprises a counter-regulatory agent dosing recommendation comprising an indication of total counter-regulatory agent and/or daily counter-regulatory agent provided to the subject over the tracking period.

Example 29: The automated glucose level control system of any of examples 16-28, wherein the hardware processor is further configured to execute the specific computer-executable instructions to at least output the backup therapy protocol on a display.

Example 30: The automated glucose level control system of any of examples 16-29, wherein the hardware processor is further configured to execute the specific computer-executable instructions to at least: establish a communication channel with an external computing system that is separate from the automated glucose level control system; and transmit the backup therapy protocol to the external computing system.

Example 31: The automated glucose level control system of any of examples 16-30, wherein the correction factor corresponds to a change in glucose level at least partially attributable to a unit of insulin provided in a correction bolus to the subject.

Example 32: The automated glucose level control system of any examples 16-31 wherein the correction factor is an average change in glucose level at least partially attributable to a unit of insulin.

Example 33: The automated glucose level control system of any of examples 16-32, wherein the basal rate is an average of the at least some of the basal doses of insulin administered during one or more days or sub-periods of a day during the tracking period.

Example 34: The automated glucose level control system of example 33, wherein the average is a moving average calculated based on a particular set of basal doses of insulin administered during the tracking period.

Example 35: The automated glucose level control system of any of examples 16-34, wherein the basal dosing recommendation comprises a recommendation of a dose of long-acting insulin.

Example 36: The automated glucose level control system of example 35, wherein the recommendation of the dose of long-acting insulin is based on an aggregation of at least some of the basal doses of insulin.

Example 37: A computer-implemented method of generating a backup therapy protocol comprising insulin therapy dosing recommendations derived from autonomously determined doses of insulin determined by an automated glucose level control system, the computer-implemented method comprising:
  by a hardware processor of the automated glucose level control system,
    tracking insulin therapy administered to a subject over a tracking period by the automated glucose level control system, wherein tracking the insulin therapy comprises storing an indication of autonomously determined doses of insulin delivered to the subject as correction boluses of insulin or as basal doses of insulin;
    generating the backup therapy protocol comprising at least one of a plurality of backup therapy dosing recommendations, wherein the plurality of backup therapy dosing recommendations comprises:
      a correction dosing recommendation comprising a correction factor based on at least some of the correction boluses of insulin administered during the tracking period; and
      a basal dosing recommendation comprising a basal rate based on at least some of the basal doses of insulin administered during the tracking period; and
    outputting the backup therapy protocol as determined by the automated glucose level control system for the purpose of being used when the automated glucose level control system is not providing therapy to the subject.

Example 38: The computer-implemented method of example 37, wherein the backup therapy protocol comprises one or more of: a backup injection therapy protocol comprising one or more insulin dosing recommendations useable by a user to manually inject insulin; or a backup pump therapy protocol comprising one or more insulin dosing recommendations useable to configure one or more glucose level control systems to infuse medicament into the subject.

Example 39: The computer-implemented method of examples 37 or 38, wherein the basal rate comprises one or more of a daily basal rate or an hourly basal rate.

Example 40: The computer-implemented method of any of examples 37-39, wherein the basal dosing recommendation comprises a plurality of basal rates, at least one of the plurality of basal rates corresponding to a different portion of a day than at least one other basal rate of the plurality of basal rates.

Example 41: The computer-implemented method of any of examples 37-40, wherein tracking the insulin therapy further comprises storing an indication of autonomously determined doses of insulin delivered to the subject as a mealtime bolus of insulin; and wherein the plurality of backup therapy dosing recommendations further comprises a meal dosing recommendation comprising an indication of a mealtime bolus size of insulin corresponding to an average mealtime bolus provided as a mealtime bolus to the subject during the tracking period.

Example 42: The computer-implemented method of example 41, wherein the meal dosing recommendation is one of a plurality of meal dosing recommendations included in the plurality of backup therapy dosing recommendations, and wherein: at least one meal dosing recommendation of the plurality of meal dosing recommendations is associated with a different meal occurring during a day than at least one other meal dosing recommendation of the plurality of meal dosing recommendations; and/or at least one meal dosing recommendation of the plurality of meal dosing recommendations is associated with a different size meal than at least one other meal dosing recommendation of the plurality of meal dosing recommendations.

Example 43: The computer-implemented method of any of examples 37-42, further comprising tracking counter-regulatory agent therapy administered to the subject over the tracking period, wherein tracking the counter-regulatory agent therapy comprises storing an indication of autonomously determined doses of counter-regulatory agent delivered to the subject responsive to a glucose level signal, and wherein the plurality of backup therapy dosing recommendations further comprises a counter-regulatory agent dosing recommendation comprising an indication of total counter-regulatory agent and/or daily counter-regulatory agent provided to the subject over the tracking period.

Example 44: The computer-implemented method of any of examples 37-43, wherein outputting the backup therapy protocol further comprises: outputting the backup therapy protocol on a display; or establishing a communication channel with an external computing system that is separate from the automated glucose level control system, and transmitting the backup therapy protocol to the external computing system.

Example 45: The computer-implemented method of any of examples 37-44, wherein the correction factor corresponds to a change in glucose level at least partially attributable to a unit of insulin provided in a correction bolus to the subject.

Example 46: The computer-implemented method of any of examples 37-45, wherein the correction factor is an average change in glucose level at least partially attributable to a unit of insulin.

Example 47: The computer-implemented method of any of examples 37-46, wherein the basal rate is an average of the at least some of the basal doses of insulin administered during one or more days or sub-periods of a day during the tracking period.

Example 48: The computer-implemented method of example 47, wherein the average is a moving average calculated based on a particular set of basal doses of insulin administered during the tracking period.

Example 49: The computer-implemented method of any of examples 37-48, wherein the basal dosing recommendation comprises a recommendation of a dose of long-acting insulin, and wherein the dose of long-acting insulin is based on an aggregation of at least some of the basal doses of insulin.

TERMINOLOGY

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware. Further, the computing system may include, be implemented as part of, or communicate with an automated glucose system, an ambulatory medicament system, or an ambulatory medical device.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Many variations and modifications may be made to the above-described embodiments, the elements of which are to be understood as being among other acceptable examples. All such modifications and variations are intended to be included herein within the scope of this disclosure.

What is claimed is:

1. A glucose level control system configured to modify a manual therapy instruction and to generate an emergency dose control signal for commanding administration of modified glucose control therapy to a subject via a medicament pump, the glucose level control system comprising:
   a data interface configured to receive a glucose level of the subject;
   a non-transitory memory configured to store specific computer-executable instructions; and
   an electronic processor in communication with the non-transitory memory and configured to execute the specific computer-executable instructions to at least:
   receive, via a manual therapy control interface, the manual therapy instruction;

based on the manual therapy instruction, transmit an initial dose control signal to a pump controller of the medicament pump;

receive, via the data interface, the glucose level of the subject; determine, based at least in part on the glucose level, that the initial dose control signal does not indicate health-appropriate therapy;

based on the determination that the initial dose control signal does not indicate health-appropriate therapy, generate the emergency dose control signal for commanding administration of modified glucose control therapy to the subject via the medicament pump; and based on the emergency dose control signal, modify the manual therapy instruction and transmit, via the data interface, the emergency dose control signal to the pump controller of the medicament pump along with graphic user interface updating and concomitant visual displays.

2. The glucose level control system of claim 1, wherein the specific computer-executable instructions, when executed by the electronic processor, are configured to:

receive, via the manual therapy control interface, one or more of a rate of insulin delivered to the subject, and/or a rate of glucagon delivered to the subject.

3. The glucose level control system of claim 1, wherein the specific computer-executable instructions, when executed by the electronic processor, are configured to:

receive, via the manual therapy control interface, a rate of nutrition delivered to the subject.

4. The glucose level control system of claim 1, wherein the specific computer-executable instructions, when executed by the electronic processor, are configured to:

receive the glucose level of the subject from a glucose sensor.

5. The glucose level control system of claim 4, wherein the specific computer-executable instructions, when executed by the electronic processor, are configured to:

receive the glucose level of the subject from the glucose sensor at a regular interval over a time period.

6. The glucose level control system of claim 5, wherein the time period is at least an hour.

7. The glucose level control system of claim 5, wherein determining that the initial dose control signal does not indicate health-appropriate therapy comprises determining a time-varying glucose level of the subject over the time period.

8. The glucose level control system of claim 1, wherein determining that the initial dose control signal does not indicate health-appropriate therapy comprises estimating one or more of a rate of insulin delivered to the subject, and/or a rate of glucagon delivered to the subject.

9. The glucose level control system of claim 8, wherein estimating the amount of insulin in the subject comprises determining an amount of insulin delivered to the subject.

10. The glucose level control system of claim 8, wherein estimating the amount of insulin in the subject comprises determining a rate of insulin absorption in the subject.

11. The glucose level control system of claim 1, wherein determining that the initial dose control signal does not indicate health-appropriate therapy comprises receiving a weight of the subject.

12. The glucose level control system of claim 1, wherein the initial dose control signal is configured to command delivery of insulin to the subject at a first rate, and wherein the emergency dose control signal is configured to command delivery of insulin at a second rate lower than the first rate.

13. The glucose level control system of claim 1, wherein the initial dose control signal is configured to command delivery of glucagon to the subject at a first rate, and wherein the emergency dose control signal is configured to command delivery of glucagon at a second rate higher than the first rate.

14. The glucose level control system of claim 1, wherein determining that the initial dose control signal does not indicate health-appropriate therapy is based on the manual therapy instruction.

15. The glucose level control system of claim 1, wherein modifying the manual therapy instruction comprises temporarily overriding the manual therapy instruction.

* * * * *